United States Patent
Song et al.

(10) Patent No.: US 12,545,637 B2
(45) Date of Patent: Feb. 10, 2026

(54) EXTRAHEPATIC TARGETED CATIONIC LIPID COMPOUND WITH HIGH EFFICIENCY AND LOW TOXICITY AND ITS COMPOSITION

(71) Applicant: BEIJING YOUCARE KECHUANG PHARMACEUTICAL TECHNOLOGY CO., LTD., Beijing (CN)

(72) Inventors: Gengshen Song, Beijing (CN); Honglei Zhang, Beijing (CN); Xichao Chen, Beijing (CN); Huanyu Wang, Beijing (CN); Dawei Huang, Beijing (CN); Xiaowen Yu, Beijing (CN); Yangjian Liu, Beijing (CN); Yuqing Li, Beijing (CN); Rucan Yan, Beijing (CN); Lianyong Qiao, Beijing (CN); Xiaojuan Li, Beijing (CN); Xiaoling Chen, Beijing (CN); Zhenlong Sun, Beijing (CN); Shuai Wang, Beijing (CN); Kai Dong, Beijing (CN); Jinyu Zhang, Beijing (CN)

(73) Assignee: BEIJING YOUCARE KECHUANG PHARMACEUTICAL TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/717,752

(22) PCT Filed: Apr. 10, 2023

(86) PCT No.: PCT/CN2023/087310
§ 371 (c)(1),
(2) Date: Jun. 7, 2024

(87) PCT Pub. No.: WO2024/164426
PCT Pub. Date: Aug. 15, 2024

(65) Prior Publication Data
US 2025/0109092 A1    Apr. 3, 2025

(30) Foreign Application Priority Data
Feb. 8, 2023   (CN) .................. 202310077355.X

(51) Int. Cl.
C07C 229/16   (2006.01)
A61K 31/7088  (2006.01)
A61K 47/18    (2017.01)

(52) U.S. Cl.
CPC ........ *C07C 229/16* (2013.01); *A61K 31/7088* (2013.01); *A61K 47/18* (2013.01)

(58) Field of Classification Search
CPC .... C07C 229/16; A61K 31/7088; A61K 47/18
USPC ........................................................ 560/171
See application file for complete search history.

(56) References Cited

FOREIGN PATENT DOCUMENTS

| | | |
|---|---|---|
| CN | 110520409 A | 11/2019 |
| CN | 112672772 A | 4/2021 |
| CN | 113018449 A | 6/2021 |
| CN | 112979483 B | 8/2021 |
| CN | 108368028 B | 9/2021 |
| CN | 114044741 A | 2/2022 |
| CN | 115784921 A | 3/2023 |
| WO | WO2017049245 A2 | 3/2017 |
| WO | WO2020061367 A1 | 5/2020 |
| WO | WO2022218295 A1 | 10/2022 |

OTHER PUBLICATIONS

CAS Registry Record for CAS RN: 1330745-78-2 (Sep. 9, 2011).
CAS Registry Record for CAS RN: 1330745-83-9 (Sep. 9, 2011).
CAS Registry Record for CAS RN: 1330745-87-3 (Sep. 9, 2011).
CAS Registry Record for CAS RN: 1330745-91-9 (Sep. 9, 2011).
CAS Registry Record for CAS RN: 1330745-95-3 (Sep. 9, 2011).
CAS Registry Record for CAS RN: 2089252-89-9 (Apr. 10, 2017).
Coelho et al. "Safety and efficacy of RNAi therapy for transthyretin amyloidosis." New England Journal of Medicine, 369, 2013, pp. 819-829.
International Search Report and Written Opinion for Application No. PCT/CN2023/087310, mailed Feb. 8, 2023, 10 pages. (Chinese Only).

*Primary Examiner* — Ana Z Muresan
(74) *Attorney, Agent, or Firm* — DINSMORE & SHOHL LLP

(57) ABSTRACT

Provided in the present disclosure is a compound of formula (I), or an N-oxide, solvate, pharmaceutically acceptable salt or stereoisomer thereof, which is an extrahepatic targeted cationic lipid compound with high efficiency and low toxicity. Further provided are a composition containing the aforementioned compound, and the use thereof in the delivery of a therapeutic or prophylactic agent.

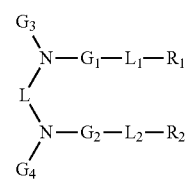

24 Claims, 9 Drawing Sheets

EXTRAHEPATIC TARGETED CATIONIC LIPID COMPOUND WITH HIGH EFFICIENCY AND LOW TOXICITY AND ITS COMPOSITION

This application is a national phase application under 35 U.S.C. § 371 of International Application No. PCT/CN2023/087310 filed Apr. 10, 2023, titled "EXTRAHEPATIC TARGETED CATIONIC LIPID COMPOUND WITH HIGH EFFICIENCY AND LOW TOXICITY AND ITS COMPOSITION", which claims the priority to Chinese Patent Application No. 202310077355.X, filed with the China National Intellectual Property Administration on Feb. 8, 2023, and titled "EXTRAHEPATIC TARGETED CATIONIC LIPID COMPOUND WITH HIGH EFFICIENCY AND LOW TOXICITY AND ITS COMPOSITION". The entire contents of each of the above-referenced disclosures is specifically incorporated by reference herein without disclaimer.

FIELD OF THE INVENTION

The present disclosure belongs to the field of medicine. The present disclosure specifically relates to a cationic lipid compound, a composition containing the same and uses thereof.

BACKGROUND OF THE INVENTION

Effective targeted delivery of biologically active substances such as small molecule drugs, peptides, proteins and nucleic acids, especially nucleic acids, is a persistent medical problem. Nucleic acid therapeutics face great challenges due to low cell permeability and high susceptibility to degradation of certain nucleic acid molecules, including RNA.

Compositions, liposomes and liposome complexes (lipoplexes) containing a cationic lipid have been demonstrated as delivery carriers to effectively deliver biologically active substances, such as small molecule drugs, polypeptides, proteins and nucleic acids, into cells and/or intracellular compartments. These compositions generally comprise one or more "cationic" and/or amino (ionizable) lipids, and can also comprise a neutral lipid, a structured lipid, and a polymer-conjugated lipid. Cationic and/or ionizable lipids include, for example, amine-containing lipids that can be readily protonated. Although a variety of such lipid-containing nanoparticle compositions have been demonstrated, safety, efficacy and specificity remain to be improved. Notably, the increased complexity of lipid nanoparticles (LNPs) complicates their production and may increase their toxicity, which is a major concern that could limit their clinical application. For example, LNP siRNA particles such as patisiran require preadministration of steroids and antihistamines to eliminate unwanted immune responses (T. Coelho, D. Adams, A. Silva, et al., Safety and efficacy of RNAi therapy for transthyretin amyloidosis, N Engl J Med, 369 (2013) 819-829). Accordingly, there is a need to develop improved cationic lipid compounds, and compositions comprising the same, that facilitate the delivery of therapeutic and/or prophylactic agents such as nucleic acids to cells.

SUMMARY OF THE INVENTION

One aspect of the present disclosure provides a novel cationic lipid compound, which is a compound of formula (I)

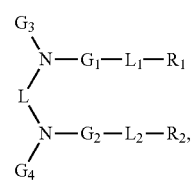

or an N-oxide, solvate, pharmaceutically acceptable salt or stereoisomer thereof, wherein: $G_1$ is $C_{2-8}$ alkylene; $G_2$ is $C_{2-8}$ alkylene; $L_1$ is —C(O)O— or —OC(O)—; L2 is —C(O)O— or —OC(O)—; $R_1$ is $C_{6-25}$ linear or branched alkyl; $R_2$ is $C_{6-25}$ linear or branched alkyl; $G_3$ is $HO(CH_2)_2$— or $HO(CH_2)_3$—; $G_4$ is $HO(CH_2)_2$— or $HO(CH_2)_3$—; and L is —$(CH_2)_2$— or —$(CH_2)_3$— or —$(CH_2)_4$—.

For example, the compound of formula (I) has one of the following structures:

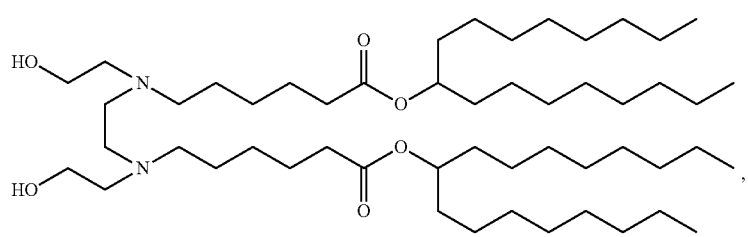

YK-401

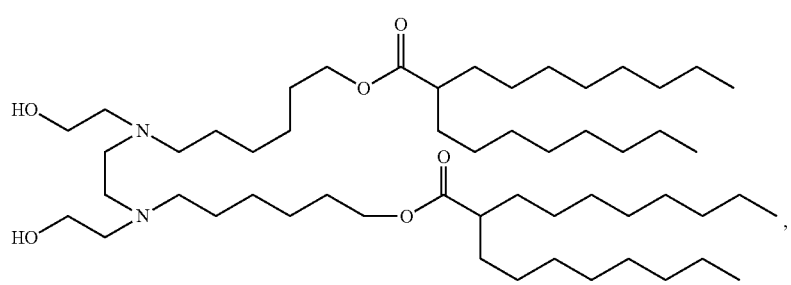

YK-402

-continued
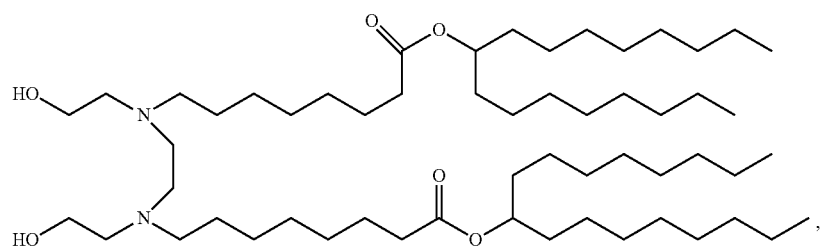
YK-403
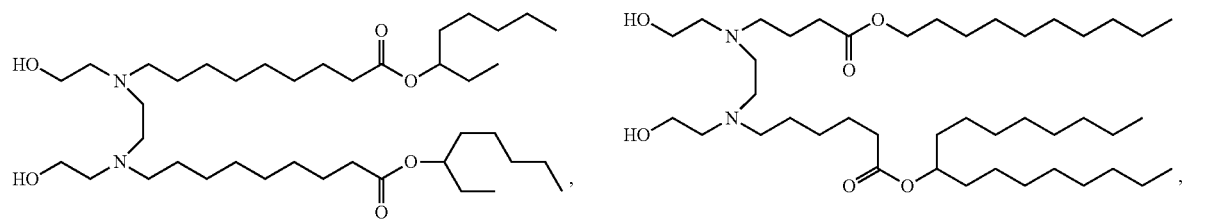
YK-404, YK-405
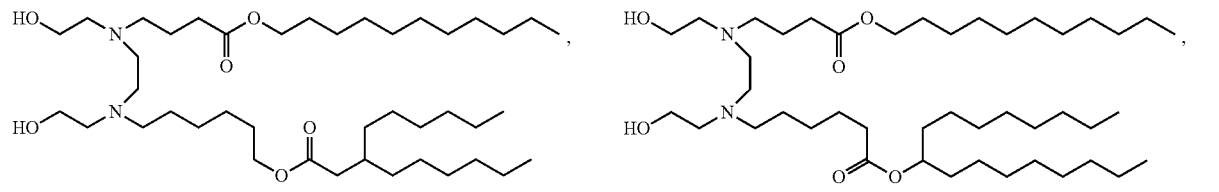
YK-406, YK-407
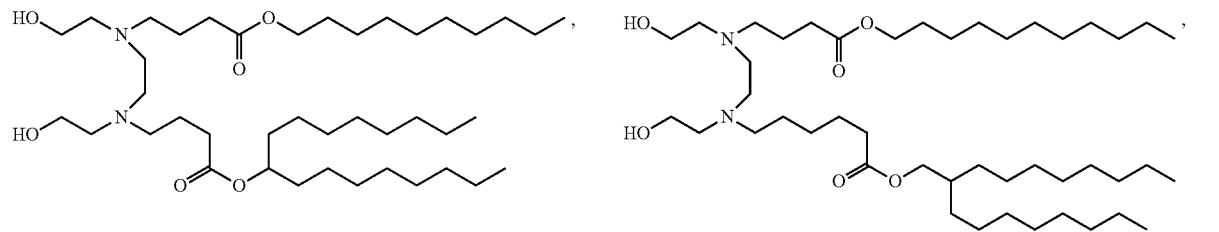
YK-408, YK-409
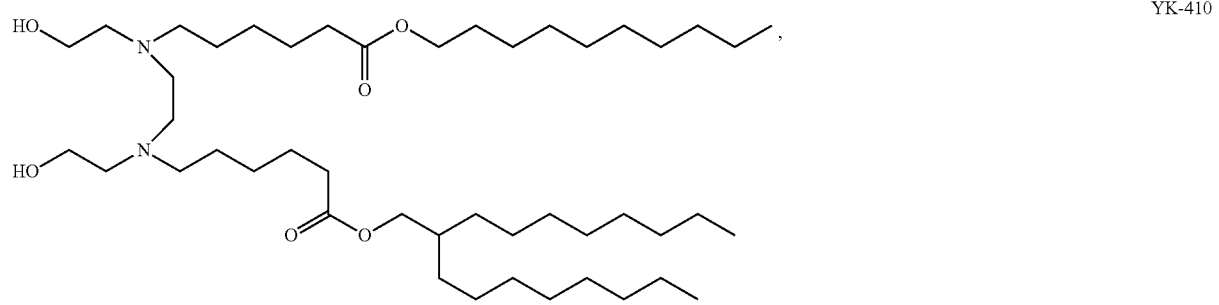
YK-410
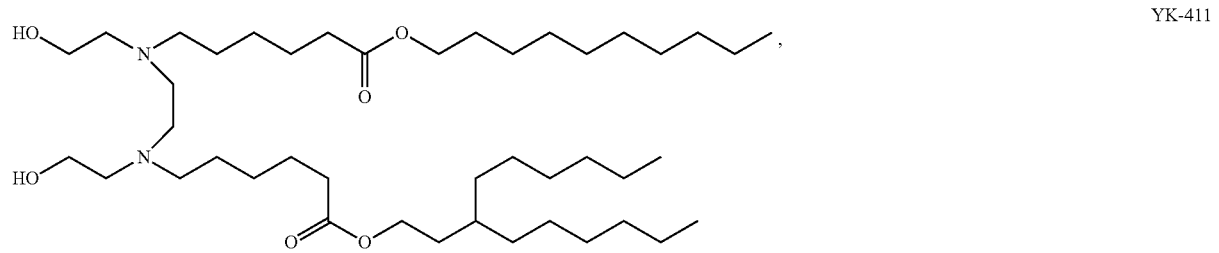
YK-411

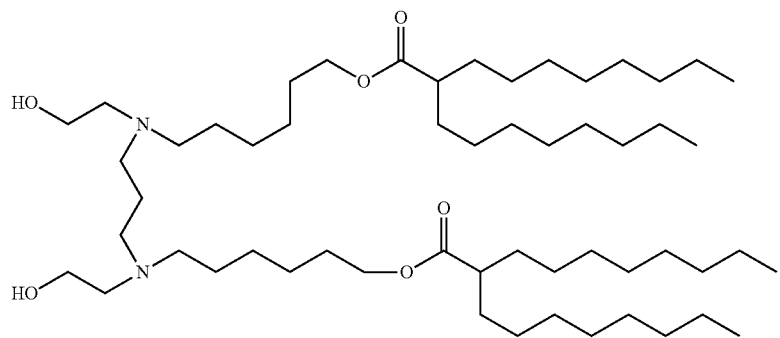
YK-412
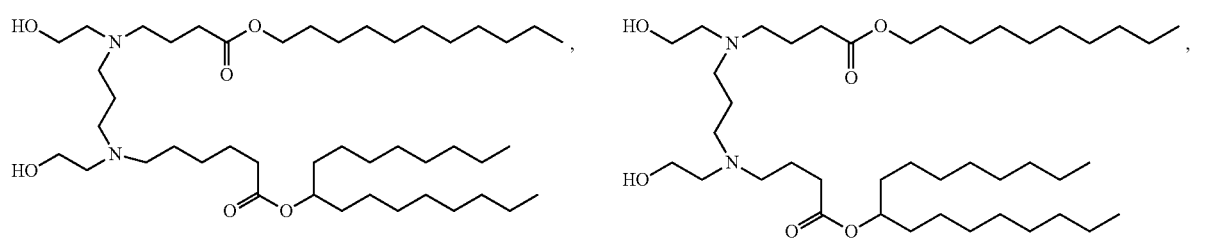
YK-413, YK-414
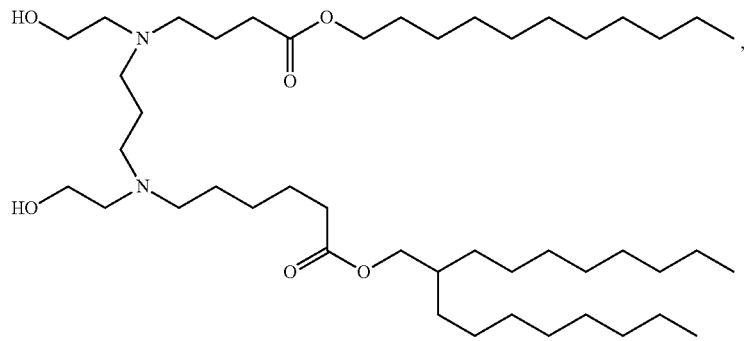
YK-415
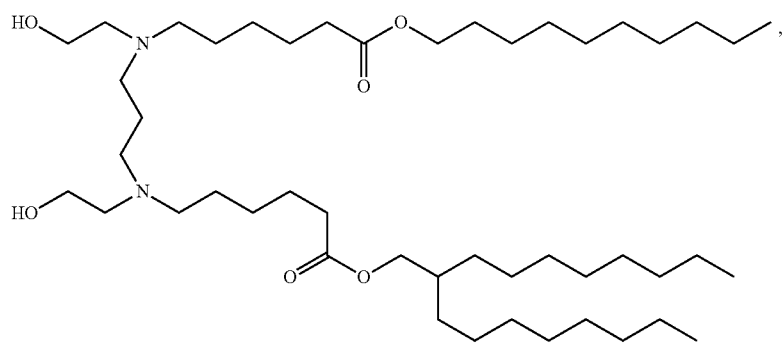
YK-416
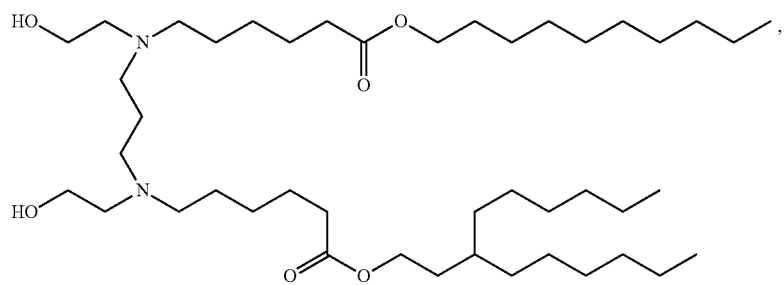
YK-417

-continued
YK-418
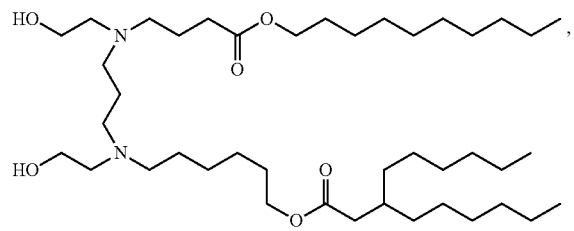
YK-419
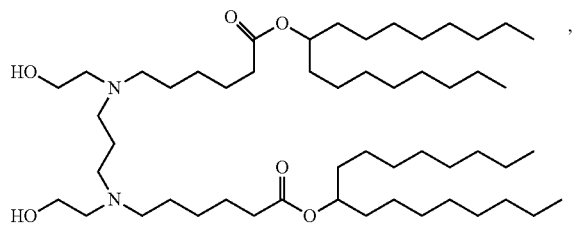
YK-420
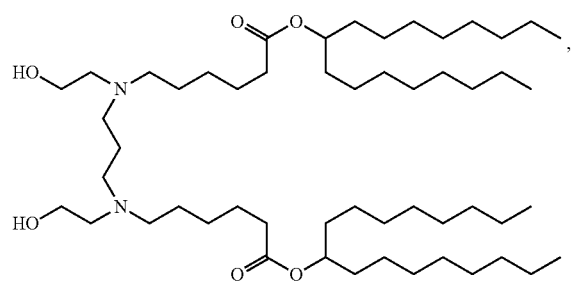
YK-421
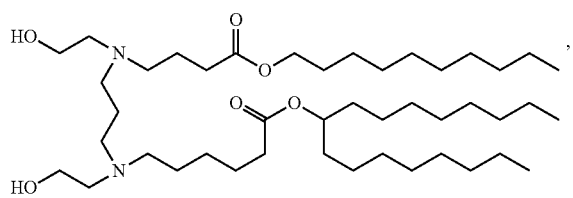
YK-422
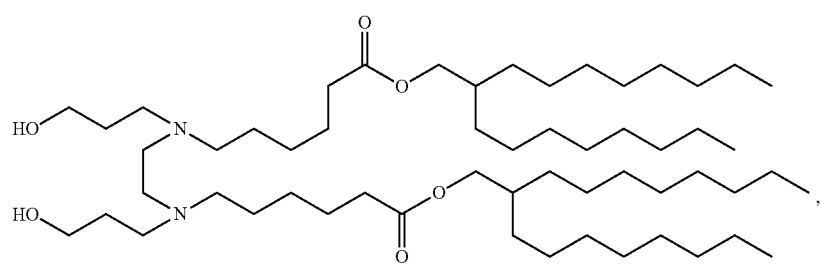
YK-423
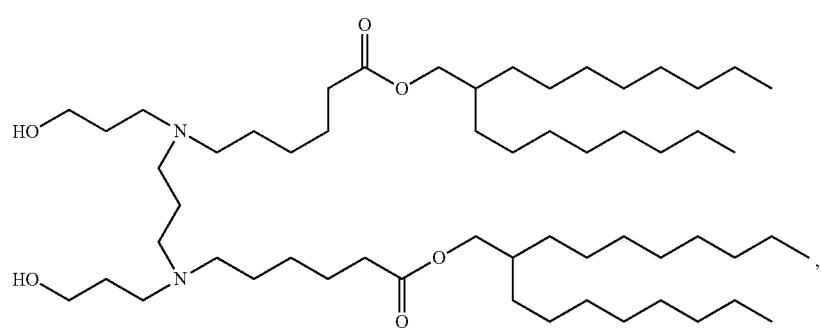

-continued

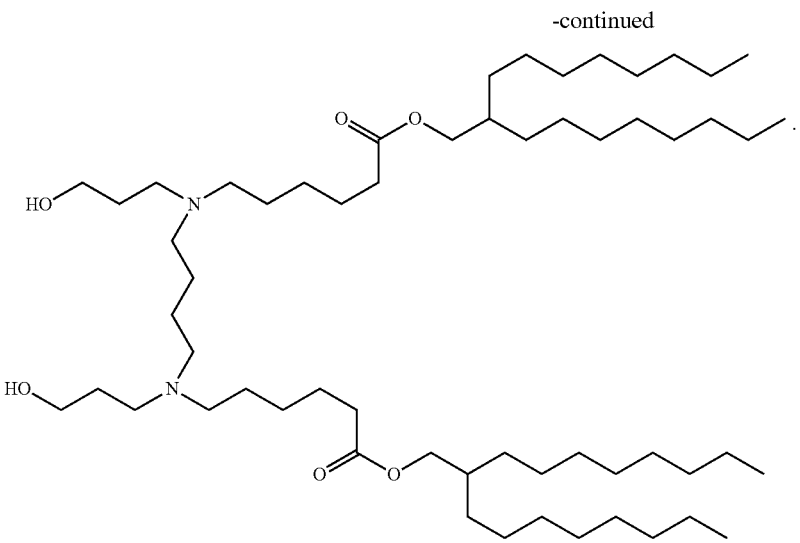

YK-424

Another aspect of the present disclosure provides a composition comprising a carrier, wherein the carrier comprises a cationic lipid, and the cationic lipid includes the compound of formula (I) described above or an N-oxide, solvate, pharmaceutically acceptable salt or stereoisomer thereof. In one embodiment, the composition further comprises a therapeutic or prophylactic agent.

Yet another aspect of the present disclosure provides the cationic lipid or composition described above, for use in delivering a therapeutic or prophylactic agent to a patient in need thereof.

Yet another aspect of the present disclosure provides a method of treating or preventing a disease or condition, comprising administering to a patient or subject in need thereof a therapeutically or prophylactically effective amount of the composition described above.

Yet another aspect of the present disclosure provides the use of the compound of formula (I) described above or an N-oxide, solvate, pharmaceutically acceptable salt or stereoisomer thereof or the composition described above in the manufacture of a nucleic acid drug, a gene vaccine, a small molecule drug, or a polypeptide or protein drug.

Yet another aspect of the present disclosure provides the use of the compound of formula (I) described above or an N-oxide, solvate, pharmaceutically acceptable salt or stereoisomer thereof or the composition described above in the manufacture of a medicament for treating a disease or condition in a mammal in need thereof.

DETAILED DESCRIPTION OF THE INVENTION

Figure 1:
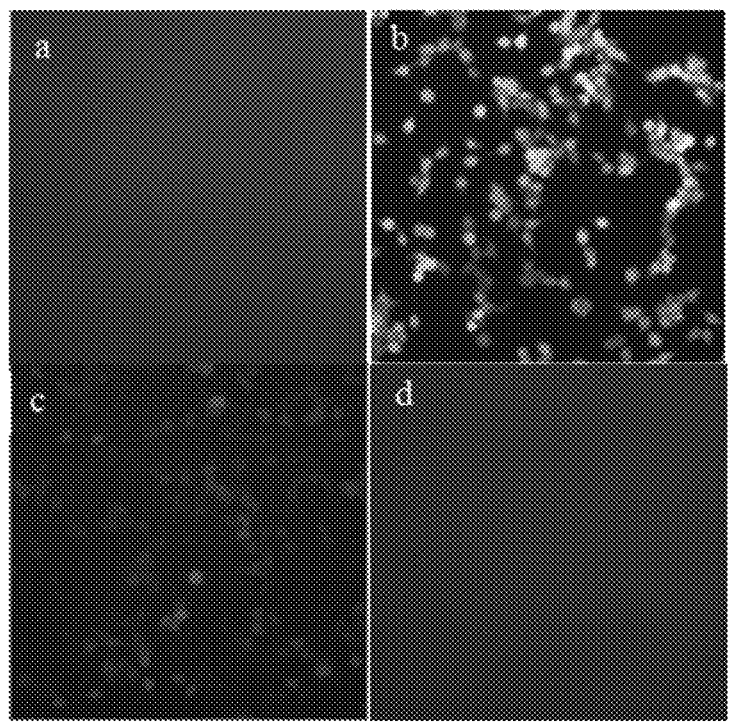
FIG. 1 shows the results of cell transfection tests with different weight ratios of the carrier to mRNA used in the preparation of LNP formulations, wherein a has carrier:mRNA of 5:1, b has carrier:mRNA of 15:1, c has carrier:mRNA of 35:1, and d is a blank control.

In order to make the purpose, technical solutions and advantages of the examples of the present disclosure clearer, the technical solutions of the examples of the present disclosure will be clearly and completely described below in conjunction with the drawings of the examples of the present disclosure. Apparently, the described examples are some of the examples of the present disclosure, not all of them. Based on the described examples of the present disclosure, all other examples obtained by a person of ordinary skill in the art without creative efforts shall fall within the protection scope of the present disclosure.

The present disclosure may be embodied in other specific forms without departing from essential attributes of the present disclosure. It should be understood that any and all embodiments of the present disclosure can be combined with technical features in any other embodiment(s) to obtain additional embodiments under the premise of no conflict. The present disclosure includes additional embodiments obtained from such combinations.

All publications and patents mentioned in this disclosure are incorporated herein by reference in their entirety. If usage or terminology used in any publications and patents incorporated by reference conflicts with usage or terminology used in the present disclosure, the usage and terminology in the present disclosure shall prevail.

The section headings used herein are for the purpose of organizing the article only and should not be construed as limitations on the subject matter described.

Unless defined otherwise, all technical and scientific terms used herein have their ordinary meanings in the art to which the claimed subject matter belongs. In the event that more than one definitions exist for a term, the definition herein controls.

Except in the working examples or where otherwise indicated, all numbers stating quantitative properties such as dosages in the specification and claims are to be understood as modified in all instances by the term "about". It is also to be understood that any numerical range recited herein is intended to include all sub-ranges within that range and any combination of various endpoints of such ranges or sub-ranges.

The words "comprising", "including" or "containing" and similar words used in the present disclosure mean that the element appearing before the word covers the elements listed after the word and their equivalents, and does not exclude unrecited elements. The terms "comprising" or "including (containing)" used herein can be open, semi-closed and closed. In other words, the terms also include "consisting essentially of", or "consisting of".

The term "pharmaceutically acceptable" in this application means that a compound or composition is chemically and/or toxicologically compatible with the other ingredients making up the formulation and/or with the human or mammal in which it is used to prevent or treat a disease or condition.

The term "subject" or "patient" in this application includes humans and mammals.

The term "treating" as used herein refers to the administration of one or more drug substances to a patient or subject suffering from a disease or symptoms of the disease in order to cure, alleviate, relieve, ameliorate or affect the disease or symptoms of the disease. In the context of this application, unless specifically stated to the contrary, the term "treating" may also include prophylaxis.

The term "solvate" in this application refers to a complex formed by combining a compound of formula (I) or a pharmaceutically acceptable salt thereof with a solvent (e.g., ethanol or water). It should be understood that any solvate of a compound of formula (I) for use in the treatment of a disease or condition may provide different properties including pharmacokinetic properties, however will result in the compound of formula (I) upon absorption into a subject, such that the use of the compound of formula (I) encompasses the use of any solvate of the compound of formula (I) respectively.

The term "hydrate" refers to the situation where the solvent in the above term "solvate" is water.

It should be further understood that a compound of formula (I), or a pharmaceutically acceptable salt thereof may be isolated in the form of a solvate, and therefore any such solvate is included within the scope of the present disclosure. For example, a compound of formula (I), or a pharmaceutically acceptable salt thereof may exist in an unsolvated form as well as a solvated form with a pharmaceutically acceptable solvent such as water, ethanol, or the like.

The term "pharmaceutically acceptable salt" refers to a relatively non-toxic, inorganic or organic acid addition salt of a compound of the present disclosure. For example, see S. M. Berge et al. "Pharmaceutical Salts", *J. Pharm. Sci.* 1977, 66, 1-19. The inorganic acid is for example hydrochloric, hydrobromic, hydroiodic, sulfuric, phosphoric, or nitric acid; and the organic acid is for example formic acid, acetic acid, acetoacetic acid, pyruvic acid, trifluoroacetic acid, propionic acid, butyric acid, hexanoic acid, heptanoic acid, undecanoic acid, lauric acid, benzoic acid, salicylic acid, 2-(4-hydroxybenzoyl)-benzoic acid, camphoric acid, cinnamic acid, cyclopentanepropionic acid, digluconic acid, 3-hydroxy-2-naphthoic acid, nicotinic acid, pamoic acid, pectinic acid, 3-phenylpropionic acid, picric acid, pivalic acid, 2-hydroxyethanesulfonic acid, itaconic acid, sulfamic acid, trifluoromethanesulfonic acid, dodecylsulfuric acid, ethansulfonic acid, benzenesulfonic acid, para-toluenesulfonic acid, methansulfonic acid, 2-naphthalenesulfonic acid, naphthalinedisulfonic acid, camphorsulfonic acid, citric acid, tartaric acid, stearic acid, lactic acid, oxalic acid, malonic acid, succinic acid, malic acid, adipic acid, alginic acid, maleic acid, fumaric acid, D-gluconic acid, mandelic acid, ascorbic acid, glucoheptanoic acid, glycerophosphoric acid, aspartic acid, or sulfosalicylic acid. For example, a pharmaceutically acceptable salt may be formed by using a compound of formula (I) and HCl (or hydrochloric acid), HBr (or hydrobromic acid solution), methanesulfonic acid, sulfuric acid, tartaric acid or fumaric acid.

The nitrogen-containing compounds of formula (I) of the present disclosure may be converted to N-oxides by treatment with an oxidizing agent (e.g., m-chloroperbenzoic acid, hydrogen peroxide, ozone). Therefore, under the conditions allowed by the valence state and structure, the compounds claimed in this application include not only the nitrogen-containing compounds shown in the structural formulas, but also their N-oxide derivatives.

Certain compounds of the present disclosure may exist as one or more stereoisomers. Stereoisomers include geometric isomers, diastereomers and enantiomers. Accordingly, the compounds claimed in this disclosure also include racemic mixtures, single stereoisomers, and optically active mixtures. It will be understood by those skilled in the art that one stereoisomer may have better efficacy and/or lower side effects than other stereoisomers. Single stereoisomers and optically active mixtures can be obtained by methods such as chiral source synthesis, chiral catalysis, and chiral resolution. The racemate can be chirally resolved by chromatographic resolution or chemical resolution. For example, chiral tartaric acid, chiral malic acid or other chiral acid resolution reagents may be added to form a salt with the compound of the present disclosure, and the product may be separated by utilizing the different physical and chemical properties of the product, such as solubility.

The present disclosure also includes all suitable isotopic variations of the disclosed compounds. An isotopic variant is defined as a compound in which at least one atom is replaced by an atom of the same atomic number but with an atomic mass different from that commonly found or predominantly found in nature. Examples of isotopes that may be incorporated into compounds of the present disclosure include isotopes of hydrogen, carbon, nitrogen, and oxygen, such as $^2$H (deuterium), $^3$H (tritium), $^{11}$C, $^{13}$C, $^{14}$C, $^{15}$N, $^{17}$O, and $^{18}$O, respectively.

The term "alkyl" is used in this disclosure to include branched and linear saturated aliphatic monovalent hydrocarbon groups having the specified number of carbon atoms. The term "alkylene" is used in this disclosure to include branched and linear saturated aliphatic divalent hydrocarbon groups having the specified number of carbon atoms. $C_{n-m}$ refers to groups having n to m carbon atoms. For example, $C_{2-5}$ alkylene includes $C_2$ alkylene, $C_3$ alkylene, $C_4$ alkylene, and $C_5$ alkylene.

An alkyl (or alkylene) group can be unsubstituted, or an alkyl (or alkylene) group can be substituted wherein at least one hydrogen is replaced by another chemical group.

A "therapeutically effective amount" is an amount of a therapeutic agent being administered which can improve a disease or condition in a patient. A "prophylactically effective amount" is an amount of a prophylactic agent being administered which will prevent a disease or condition in a subject. The "therapeutically effective amount" for a therapeutic agent or the "prophylactically effective amount" for a prophylactic agent may vary with the therapeutic/prophylactic agent, the disease state and its severity, the age and weight of a patient/subject to be treated/prevented, etc. The therapeutically effective amount and the prophylactically effective amount can be routinely determined by a person of ordinary skill in the art based on his knowledge and this disclosure.

In this application, when the name of the compound is inconsistent with the structural formula, the structural formula shall prevail.

It should be understood that the term "compound of the present disclosure" used in the present application may include the compound of formula (I), N-oxide thereof, solvate thereof, pharmaceutically acceptable salt thereof, stereoisomer thereof, or mixture thereof according to the context.

The term "cationic lipid" as used herein refers to a lipid that is positively charged at a selected pH value.

Cationic lipids are prone to bind to negatively charged nucleic acids, that is, to form lipid nanoparticles (LNPs) by interacting with negatively charged phosphate groups present in nucleic acids through electrostatic forces. LNP is one of the mainstream delivery carriers at present.

After screening a large number of compounds, the inventors found that it is very difficult to screen out a suitable cationic lipid compound that meets the following conditions: having huge differences in structure from the representative cationic lipids of the prior art, having extremely high transfection efficiency and extremely low cytotoxicity, and having high and sustained expression in mice. The inventors have found that some compounds, such as YK-407, YK-401, YK-402, YK-403, YK-422 and YK-423, etc., can deliver nucleic acids with significantly improved intracellular transfection efficiency, significantly reduced cytotoxicity, and significantly improved expression amount and duration in animals as compared with cationic lipids having very different chemical structures in the prior art.

Briefly, the present disclosure is based on at least the following findings:

1. A series of designed compounds, including YK-407, YK-401, YK-402, YK-403, YK-422 and YK-423, have great differences in structure from the representative cationic lipids, such as SM-102 (compound 25 disclosed in WO2017049245A2), ALC-0315 (compound 3 disclosed in CN108368028B), compound 21 and compound 23 disclosed in WO2021055833A1, HHMA (compound 1 disclosed in CN112979483B) and compound YK-009 disclosed in CN114044741B. Their head structures are significantly different, wherein the head structure of this series of designed compounds comprises two tertiary amine groups, an L group connected to the nitrogen atoms in the two tertiary amine groups, and $G_3$ and $G_4$ groups connected to the nitrogen atoms of the two tertiary amine groups respectively, while the head structures of SM-102, ALC-0315, compound 21, compound 23 and YK-009 only include one tertiary amine group and a $HO(CH_2)_2$— group connected to the nitrogen atom in the tertiary amine. Their other moieties are also very different, resulting in great differences in polarity, acidity and alkalinity, and hydrophilicity.

Therefore, it is impossible to predict on the cell transfection efficiencies, cytotoxicities, and in vivo expressions in animals of LNP formulations prepared from this series of compounds on the basis of the above cationic lipid compounds disclosed in the prior art.

The chemical structures of SM-102, ALC-0315, compound 21, compound 23 and HHMA are as follows:

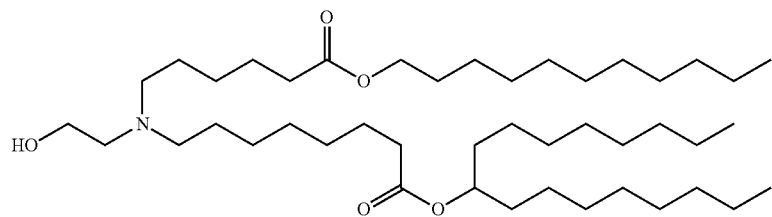

SM-102

(WO2017049245A2, page 29 of the specification);

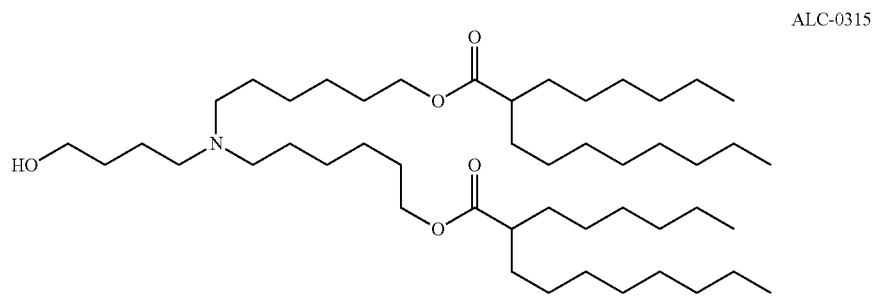 [SMILES: CCCCCCCCC(CCCCCC)C(=O)OCCCCCCN(CCCCO)CCCCCCOC(=O)C(CCCCCC)CCCCCCCC]

ALC-0315

(CN108368028B, page 24 of the specification);

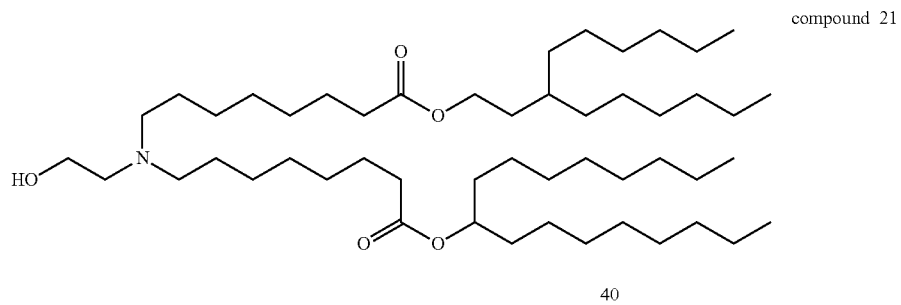

compound 21

40

(WO2021055833A1, page 22 of the specification);

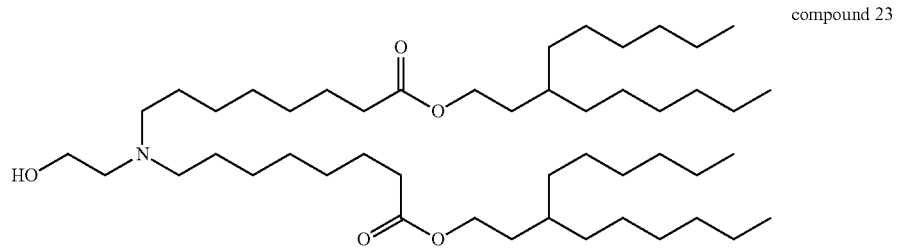 [SMILES: CCCCCCC(CCCCCC)CCOC(=O)CCCCCCCN(CCO)CCCCCCCC(=O)OCCC(CCCCCC)CCCCCC]

compound 23

(WO2021055833A1, page 22 of the specification);

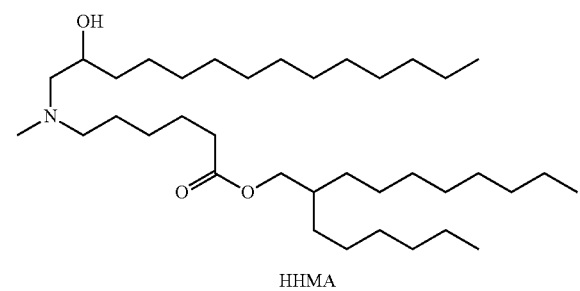

HHMA (CN112979483B, page 12 of the specification).

2. Among this series of designed compounds, LNP formulations prepared from YK-407, YK-401, YK-402, YK-403, YK-422 and YK-423 have significantly improved encapsulation efficiency, drug loading concentration, and total RNA concentration, significantly improved cell transfection efficiency, significantly reduced cytotoxicity, significantly improved mRNA expression amount and duration in mice, reduced or no toxicity to the liver, and the ability to deliver mRNA directly to the spleen, as compared with the representative cationic lipids in the prior art.

For example, YK-407 can have an encapsulation efficiency 29.0% higher than compound 23, a drug loading concentration 1.78 times that of compound 23, and a total RNA concentration 1.41 times that of compound 21. The cell transfection efficiency of YK-407 could reach 12 times that of SM-102, 13 times that of compound 21 and 15 times that of compound 23. The cell survival rate of YK-401 can be 28.00% higher than that of ALC-0315, 7.31% higher than that of SM-102, and 10.94% higher than that of HHMA. LNP formulation prepared by YK-407 can have an mRNA expression in mice that is 27 times that of SM-102, 22 times that of ALC-0315, 28 times that of compound 21, 27 times that of compound 23, and 27 times that of HHMA. LNP formulations prepared from compounds designed by this application have a reduced amount of the target protein expressions in the liver (YK-402), or do not stay and express the target protein in the liver (YK-407, YK-411, YK-418, YK-419 and YK-424), which have reduced or no toxicity to the liver. YK-407, YK-419 and YK-424 can deliver mRNA directly to the spleen without expression in other organs such as liver, lung, heart and kidney, which significantly improve the prophylactic effect without changing the vaccine components.

Among compounds with very small differences in chemical structure designed in this application, LNP formulations prepared from YK-407, YK-401, YK-402, YK-403, YK-422 and YK-423 have significantly improved cell transfection efficiency, significantly reduced cytotoxicity, and significantly increased expression amount and duration of mRNA in mice compared with other compounds. This series of compounds only differs in some groups such as $G_3$, $G_4$ or L group by 1-2 C with other structures slightly different, but the cell transfection efficiency of YK-407 can reach 2500 times that of YK-404 and YK-411, and the cytotoxicity of YK-407, YK-401, YK-402, YK-403, YK-422 and YK-423 can be reduced by 50% compared with YK-411. The LNP formulation prepared from YK-407 has an expression level of mRNA in mice which can reach 1000 times that of YK-411. [0064]3. There is no obvious corresponding relationship between the structure of a cationic lipid compound and intracellular transfection efficiency, toxicity to cells, and the high expression and sustained expression of mRNA in animals for a LNP formulation prepared from the cationic lipid compound. Even compounds with small structural differences are likely to have very large differences in transfection efficiency and/or toxicity to cells and intracellular expression.

For example, YK-411 is very similar in structure to YK-407. Compared with YK-407, YK-411 only has 2 more C in the $G_1$ group; 1 less C in the $R_1$ group; 2 more C in the single chain of the R2 group, and 2 less C in each single chain of the double chain. However, the cell transfection efficiency of YK-407 is 2500 times that of YK-411. The toxicity of YK-407 to transfected cells is 55% lower than that of YK-411. The mRNA expression in mice of YK-407 can reach 1000 times that of YK-411.

Therefore, it is very difficult and requires a lot of creative work to screen out a suitable cationic lipid compound that can simultaneously have high transfection efficiencies and low toxicities to cells, as well as high and sustained expressions of mRNA in mice.

4. Through unique design and extensive screening, the present disclosure has found that some compounds, such as YK-407, YK-401, YK-402, YK-403, YK-422 and YK-423 can deliver nucleic acids with significantly improved encapsulation efficiencies, drug loading concentrations and total RNA concentrations, significantly improved cell transfection efficiency, significantly reduced cytotoxicity, and significantly improved expression amount and duration in animals as compared with other compounds in the prior art, and have reduced or no toxicity to the liver, which can deliver mRNA directly to the spleen without expression in other organs, such as liver, lung, heart and kidney, thus achieving unexpected technical effects.

In short, through unique design and extensive screening, the present disclosure has found some compounds, such as YK-407, YK-401, YK-402, YK-403, YK-422 and YK-423. These compounds are significantly different in chemical structures from the representative cationic lipids in the prior art. Compared with other compounds in the prior art, these compounds can deliver nucleic acids with significantly improved cell transfection efficiency, significantly reduced cytotoxicity, and significantly improved expression amount and duration in animals, and have reduced or no toxicity to the liver, thus achieving unexpected technical effects.

The details are as follows:

1. Compared with the representative cationic lipids in the prior art, such as SM-102, ALC-0315, compound 21, compound 23, YK-009 and HHMA, the chemical structures of this series of designed compounds are significantly different.

This series of designed compounds are compared with the representative cationic lipids in the prior art.

1) This series of designed compounds have the biggest structural differences from HHMA. It can be seen from the chemical structure formula that only one side chain in the groups connected to the central N atom of HHMA is similar to one side chain in this series of compounds, and the other parts are significantly different.

2) This series of designed compounds have significantly different head structure compared with SM-102, ALC-0315, compound 21, compound 23 and YK-009. The head structures of this series of designed compounds include two tertiary amine groups, an L group connected to the nitrogen atoms of the two tertiary amine groups, and $G_3$ and $G_4$ groups connected to the nitrogen atoms of the two tertiary amine groups respectively, while the head structures of SM-102, ALC-0315, compound 21, compound 23 and YK-009 only include one tertiary amine group and a $HO(CH_2)_2$— group connected to the nitrogen atom of the tertiary amine group. In addition, the $G_1$, $L_1$, $R_1$, $G_2$ and $R_2$ groups of this series of compounds are also significantly different from those of SM-102, ALC-0315, compound 21, compound 23 and YK-009.

3) This series of designed compounds also have significantly different polarity, acidity and alkalinity and hydrophilicity from those of SM-102, ALC-0315, compound 21, compound 23, HHMA and YK-009 due to the very large structural differences.

2. The encapsulation efficiencies, drug loading concentrations and total RNA concentrations are significantly improved compared with representative cationic lipids and compounds with similar structures in the prior art.

LNP formulations prepared from some of the compounds designed in this application including YK-407, YK-401, YK-402, YK-403, YK-422 and YK-423 have significantly improved encapsulation efficiencies, drug loading concentrations and total RNA concentrations, compared with cationic lipids in the prior art, such as SM-102, ALC-0315, compound 21, compound 23, HHMA and YK-009. For example, YK-407 can have an encapsulation efficiency 29.0% higher than compound 23, a drug loading concentration 1.78 times that of compound 23, and a total RNA concentration 1.41 times that of compound 21.

3. The in vitro cell transfection efficiencies are significantly improved compared with representative cationic lipids in the prior art and several structurally similar compounds designed in this application.

1) LNP formulations prepared from YK-407, YK-401, YK-402, YK-403, YK-422 or YK-423 have the highest cell transfection efficiencies, and a significantly improved activity compared with representative cationic lipids in the prior art. For example, the cell transfection efficiency of YK-407 can reach 12 times that of SM-102, 13 times that of compound 21, and 15 times that of compound 23.

2) Compared with structurally similar compounds with $G_3$ and $G_4$ groups being $HO(CH_2)_2$— and the L group being —$(CH_2)_2$—, YK-407, YK-401, YK-402, YK-403, YK-422 and YK-423 have the highest cell transfection efficiencies. For example, the cell transfection efficiency of YK-407 could reach 2,500 times that of YK-404 and YK-411, while the cell transfection efficiency of YK-401, YK-402, YK-403, YK-422 and YK-423 could reach more than 600 times that of YK-404 and YK-411.

3) Compared with a series of structurally similar compounds with $G_3$ and $G_4$ being $HO(CH_2)_2$— or $HO(CH_2)_3$—, and the L group being —$(CH_2)_2$—, —$(CH_2)_3$— or —$(CH_2)_4$—, YK-407, YK-401, YK-402, YK-403, YK-422 and YK-423 have the highest cell transfection efficiencies. For example, the cell transfection efficiency of YK-407 could reach 170 times that of YK-417 and 180 times that of YK-418.

4) There is no corresponding relationship between the structure of a compound and the intracellular transfection efficiency. Compounds, whether they have small or large structural differences, are likely to have very large differences in transfection efficiency. Therefore, it is very difficult to screen out cationic lipid compounds with high transfection efficiencies, which requires a lot of creative work.

4. Cytotoxicities are significantly reduced compared with representative cationic lipids in the prior art and several structurally similar compounds designed in this application.

1) LNP formulations prepared from YK-407, YK-401, YK402, YK-403, YK-422 and YK-423 have the lowest cytotoxicities and significantly improved cell survival rates compared with representative cationic lipids in the prior art. For example, the cell survival rate of YK-401 is 28.00% higher than that of ALC-0315, is 7.31% higher than that of SM-102, and is 10.94% higher than that of HHMA.

2) Compared with structurally similar compounds with $G_3$ and $G_4$ groups being $HO(CH_2)_2$— and the L group being —$(CH_2)_2$—, YK-407, YK-401, YK-402, YK-403, YK-422 and YK-423 have the lowest cytotoxicities and the highest cell survival rates. For example, the cell survival rate of YK-401 is 58.88% higher than that of YK-411 and 50.25% higher than that of YK-406; the cell survival rate of YK-407 is 55.04% higher than that of YK-411 and 46.41% higher than that of YK-406.

3) Compared with a series of structurally similar compounds with $G_3$ and $G_4$ being $HO(CH_2)_2$— or $HO(CH_2)_3$—, and the L group being —$(CH_2)_2$—, —$(CH_2)_3$— or —$(CH_2)_4$—, YK-407, YK-401, YK-402, YK-403, YK-422 and YK-423 have the lowest cytotoxicities. For example, the cell survival rate of YK-401 is 53.87% and 54.16% higher than that of YK-417 and YK-418 respectively, and the cell survival rate of YK-407 is 50.03% and 50.32% higher than that of YK-417 and YK-418, respectively.

4) There is no corresponding relationship between the structure of a compound and the cytotoxicity. Compounds, whether they have small or large structural differences, are likely to have very large differences in cytotoxicity. Therefore, it is very difficult and requires a lot of creative work to screen out cationic lipid compounds with low cytotoxicities.

5. The expression amount and duration of mRNA in animals are significantly improved compared with representative cationic lipids in the prior art and several structurally similar compounds designed in this application, and the toxicity to the liver is reduced or absent, and the mRNA is directly delivered to only the spleen.

1) LNP formulations prepared from YK-407, YK-401, YK-402, YK-403, YK-422 and YK-423 have high and sustained mRNA expressions in mice, which are significantly improved as compared with those of representative cationic lipids in the prior art. For example, an mRNA expression in mice of YK-407 could reach 27 times that of SM-102, 22 times that of ALC-0315, 28 times that of compound 21, 27 times that of compound 23, and 27 times that of HHMA.

2) Compared with structurally similar compounds with $G_3$ and $G_4$ being $HO(CH_2)_2$— and the L group being —$(CH_2)_2$—, LNP formulations prepared from YK-407, YK-401, YK-402, YK-403, YK-422 and YK-423 have the highest intensity and longest duration of mRNA expressions in mice. For example, an mRNA expression in mice of YK-407 could reach more than 600 times at 6 hours, 1000 times at 24 hours, and still 100 times at 7 days that of YK-411.

3) Compared with structurally similar compounds with $G_3$ and $G_4$ being $HO(CH_2)_2$— or $HO(CH_2)_3$—, the L group being —$(CH_2)_2$—, —$(CH_2)_3$— or —$(CH_2)_4$—, and other groups being slightly different, LNP formulations prepared from YK-407, YK-401, YK-402, YK-403, YK-422 and YK-423 have the highest intensity and longest duration of mRNA expressions in mice. For example, YK-407 could reach 120 times at 48 hours, and still 20 times at 7 days that of YK-417.

4) Compared with the representative cationic lipids of the prior art, such as SM-102, ALC-0315, compound 21, compound 23 and HHMA, LNP formulations prepared from the compounds designed by the present application, such as YK-402, YK-407, YK-411, YK-418, YK-419 and YK-424 have a reduced amount of the target protein expression in the liver, or do not stay in the liver and express the target protein. Therefore, compared with cationic lipids in the prior art, LNP formulations prepared from the compound designed in this application have reduced or no toxicity to the liver. Moreover, some compounds designed in this application, such as YK-407, YK-419 and YK-424 can deliver mRNA directly to the spleen and express only in the spleen without expression in other organs such as liver, lung, heart and kidney, which significantly improve the prophylactic effect without changing the vaccine components and have important clinical significance.

5) There is no corresponding relationship between the structure of the cationic lipid and the high expression and sustained expression of delivered mRNA in mice. Regardless of the cationic lipid compounds with small or large structural differences, LNP formulations prepared therefrom are likely to have very large differences in terms of mRNA expression in animals. It is impossible to predict whether mRNA will be highly and continuously expressed in animals based on the chemical structure of cationic lipids. Therefore, it is very difficult to screen out cationic lipid compounds with high and sustained expressions of mRNA, which requires a lot of creative work.

One aspect of the present disclosure provides novel cationic lipid compounds for the delivery of a therapeutic or prophylactic agent. The cationic lipid compounds of the present disclosure can be used to deliver nucleic acid molecules, small molecule compounds, polypeptides or proteins. Compared with known cationic lipid compounds, the cationic lipid compounds of the present disclosure exhibit higher transfection efficiencies and less cytotoxicities, and thus improve delivery efficiencies and safeties.

The present disclosure provides a cationic lipid, which is a compound of formula (I)

$$\begin{array}{c} G_3 \\ \diagdown \\ N-G_1-L_1-R_1 \\ | \\ L \\ | \\ N-G_2-L_2-R_2 \\ \diagup \\ G_4 \end{array} \quad I$$

or an N-oxide, solvate, pharmaceutically acceptable salt or stereoisomer thereof, wherein:
- $G_1$ is $C_{2-8}$ alkylene, preferably unsubstituted $C_{3-8}$ alkylene;
- $G_2$ is $C_{2-8}$ alkylene, preferably unsubstituted $C_{3-8}$ alkylene;
- $L_1$ is —C(O)O— or —OC(O)—;
- $L2$ is —C(O)O— or —OC(O)—;
- $R_1$ is $C_{6-25}$ linear or branched alkyl, preferably unsubstituted $C_{11}$ linear alkyl or unsubstituted $C_{10}$ linear alkyl or unsubstituted $C_{8-18}$ branched alkyl group;
- $R_2$ is $C_{6-25}$ linear or branched alkyl, preferably unsubstituted $C_{11}$ linear alkyl or unsubstituted $C_{10}$ linear alkyl or unsubstituted $C_{8-18}$ branched alkyl group;
- $G_3$ is HO(CH$_2$)$_2$— or HO(CH$_2$)$_3$—;
- $G_4$ is HO(CH$_2$)$_2$— or HO(CH$_2$)$_3$—;
- L is —(CH$_2$)$_2$— or —(CH$_2$)$_3$— or —(CH$_2$)$_4$—, preferably —(CH$_2$)$_2$— or —(CH$_2$)$_3$—.

In one embodiment, $G_1$ is unsubstituted $C_3$ alkylene, for example, —(CH$_2$)$_3$—.

In one embodiment, $G_1$ is unsubstituted $C_5$ alkylene, for example, —(CH$_2$)$_5$—.

In one embodiment, $G_1$ is unsubstituted $C_6$ alkylene, for example, —(CH$_2$)$_6$—.

In one embodiment, $G_1$ is unsubstituted $C_7$ alkylene, for example, —(CH$_2$)$_7$—.

In one embodiment, $G_1$ is unsubstituted $C_5$ alkylene, for example, —(CH$_2$)$_8$—.

In one embodiment, $G_2$ is unsubstituted $C_3$ alkylene, for example, —(CH$_2$)$_3$—.

In one embodiment, $G_2$ is unsubstituted $C_5$ alkylene, for example, —(CH$_2$)$_5$—.

In one embodiment, $G_2$ is unsubstituted $C_6$ alkylene, for example, —(CH$_2$)$_6$—.

In one embodiment, $G_2$ is unsubstituted $C_7$ alkylene, for example, —(CH$_2$)$_7$—.

In one embodiment, $G_2$ is unsubstituted $C_8$ alkylene, for example, —(CH$_2$)$_8$—.

In one embodiment, $L_1$ is —C(O)O—.

In one embodiment, $L_1$ is —OC(O)—.

In one embodiment, $L_2$ is —C(O)O—. For example, $L_1$ and $L_2$ are both —C(O)O—.

In one embodiment, $L_2$ is —OC(O)—. For example, $L_1$ and $L_2$ are both —OC(O)—.

In one embodiment, $R_1$ is unsubstituted $C_{11}$ linear alkyl, i.e., —(CH$_2$)$_{10}$CH$_3$.

In one embodiment, $R_1$ is unsubstituted $C_{10}$ linear alkyl, i.e., —(CH$_2$)$_9$CH$_3$.

In one embodiment, $R_1$ is unsubstituted $C_{8-18}$ branched alkyl. In one preferred embodiment, $R_1$ is unsubstituted $C_{17}$ branched alkyl or $C_{18}$ branched alkyl or $C_{15}$ branched alkyl or $C_{14}$ branched alkyl or $C_8$ branched alkyl. For example, $R_1$ is

[structures shown]

In another preferred embodiment, $R_1$ is unsubstituted $C_{17}$ branched alkyl or $C_{18}$ branched alkyl or $C_8$ branched alkyl. For example, $R_1$ is

[structures shown]

In one embodiment, $R_2$ is unsubstituted $C_{8-18}$ branched alkyl. In one preferred embodiment, $R_2$ is unsubstituted $C_{17}$ branched alkyl or $C_{18}$ branched alkyl or $C_{15}$ branched alkyl or $C_{14}$ branched alkyl or $C_8$ branched alkyl. For example, $R_2$ is

[structures shown]

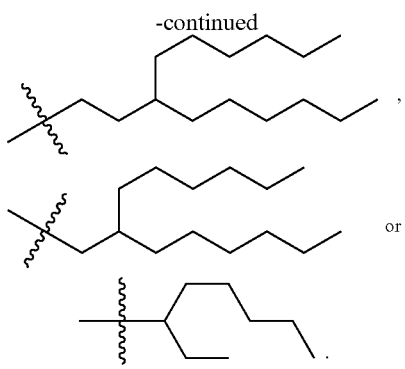

In one embodiment, L is —(CH$_2$)$_2$—.
In one embodiment, L is —(CH$_2$)$_3$—.
In one embodiment, L is —(CH$_2$)$_4$—.
In one embodiment, G$_1$ is —(CH$_2$)$_3$—, G$_2$ is —(CH$_2$)$_5$—, L$_1$ is —C(O)O—, L$_2$ is —C(O)O—, R$_1$ is —(CH$_2$)$_{10}$CH$_3$, R$_2$ is:

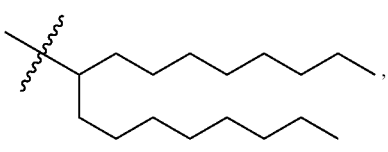 [SMILES: *C(CCCCCCCC)CCCCCCCC]

G$_3$ is HO(CH$_2$)$_2$—, G$_4$ is HO(CH$_2$)$_2$—, and L is —(CH$_2$)$_2$—.
In one embodiment, G$_1$ is —(CH$_2$)$_3$—, G$_2$ is —(CH$_2$)$_3$—, L$_1$ is —C(O)O—, L$_2$ is —C(O)O—, R$_1$ is

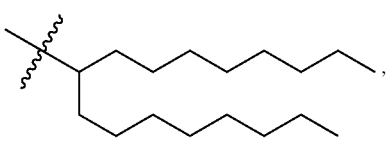 [SMILES: *C(CCCCCCCC)CCCCCCCC]

R$_2$ is

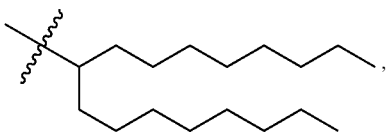 [SMILES: *C(CCCCCCCC)CCCCCCCC]

G$_3$ is HO(CH$_2$)$_2$—, G$_4$ is HO(CH$_2$)$_2$—, and L is —(CH$_2$)$_2$—.
In one embodiment, G$_1$ is —(CH$_2$)$_6$—, G$_2$ is —(CH$_2$)$_6$—, L$_1$ is —OC(O)—, L$_2$ is —OC(O)—, R$_1$ is

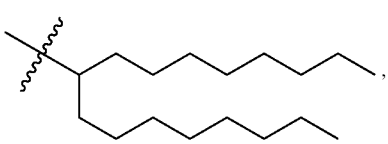 [SMILES: *C(CCCCCCCC)CCCCCCCC]

R$_2$ is

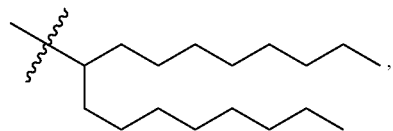 [SMILES: *C(CCCCCCCC)CCCCCCCC]

G$_3$ is HO(CH$_2$)$_2$—, G$_4$ is HO(CH$_2$)$_2$—, and L is —(CH$_2$)$_2$—.
In one embodiment, G$_1$ is —(CH$_2$)$_7$—, G$_2$ is —(CH$_2$)$_7$—, L$_1$ is —C(O)O—, L$_2$ is —C(O)O—, R$_1$ is

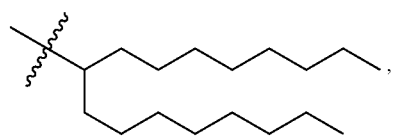 [SMILES: *C(CCCCCCCC)CCCCCCCC]

R$_2$ is

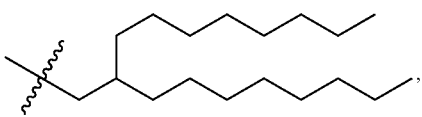 [SMILES: *CC(CCCCCCCC)CCCCCCCC]

G$_3$ is HO(CH$_2$)$_2$—, G$_4$ is HO(CH$_2$)$_2$—, and L is —(CH$_2$)$_2$—.
In one embodiment, G$_1$ is —(CH$_2$)$_5$—, G$_2$ is —(CH$_2$)$_5$—, L$_1$ is —C(O)O—, L$_2$ is —C(O)O—, R$_1$ is

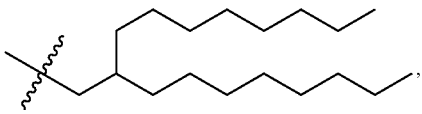 [SMILES: *CC(CCCCCCCC)CCCCCCCC]

R$_2$ is

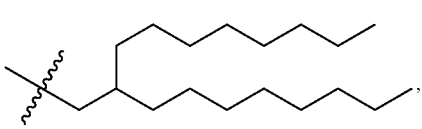 [SMILES: *CC(CCCCCCCC)CCCCCCCC]

G$_3$ is HO(CH$_2$)$_3$—, G$_4$ is HO(CH$_2$)$_3$— and L is —(CH$_2$)$_2$—.
In one embodiment, G$_1$ is —(CH$_2$)$_5$—, G$_2$ is —(CH$_2$)$_5$—, L$_1$ is —C(O)O—, L$_2$ is —C(O)O—, R$_1$ is R₂ is
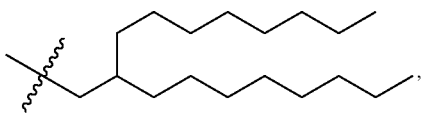 [SMILES: *CC(CCCCCCCC)CCCCCCCC]
G₃ is HO(CH₂)₃—, G₄ is HO(CH₂)₃—, and L is —(CH₂)₃—.
In an exemplary embodiment, the compound is selected from the following compounds or N-oxides, solvates, pharmaceutically acceptable salts or stereoisomers thereof:
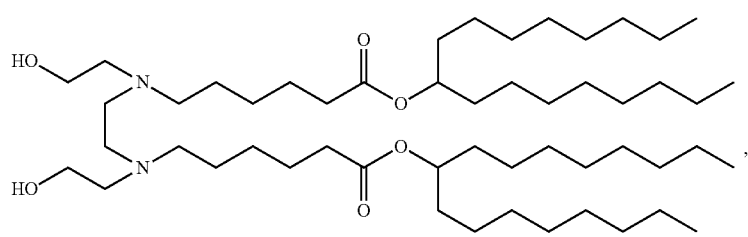
YK-401
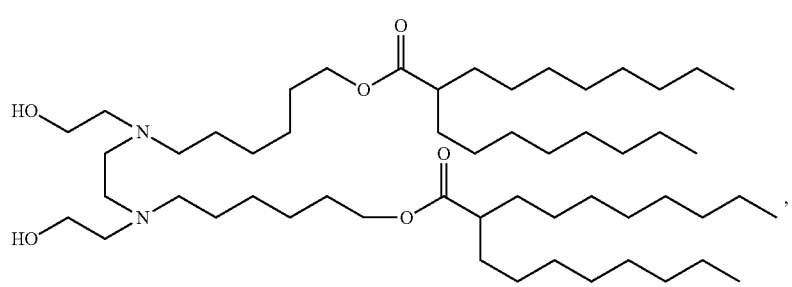
YK-402
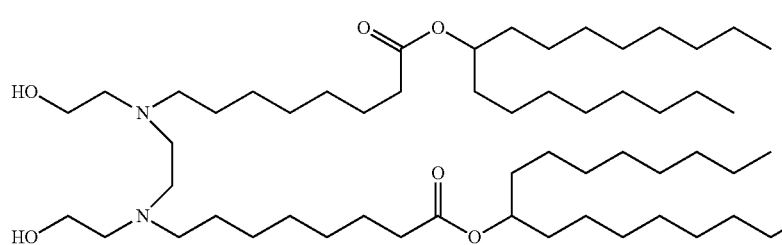
YK-403
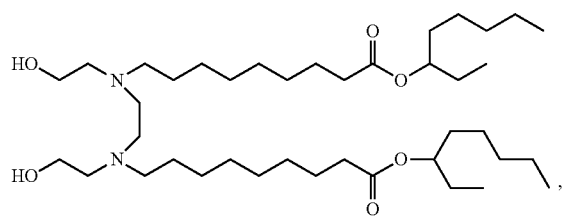
YK-404
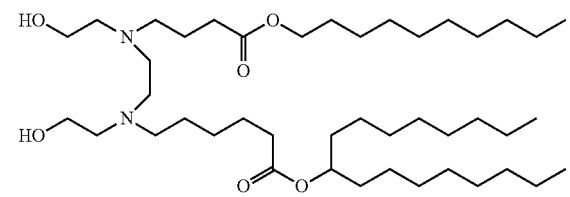
YK-405
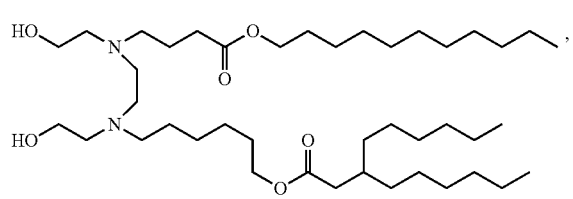
YK-406
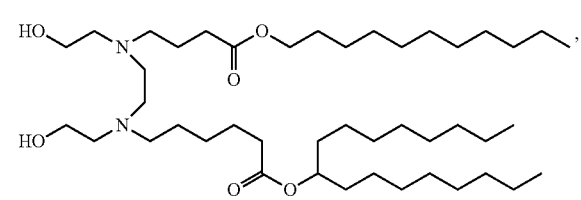
YK-407

-continued
YK-408
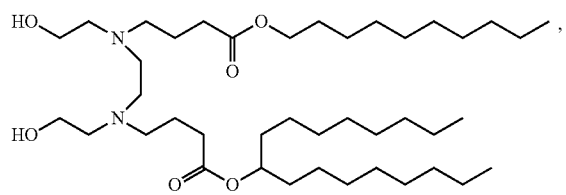
YK-409
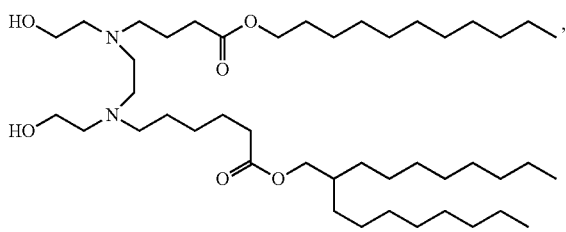
YK-410
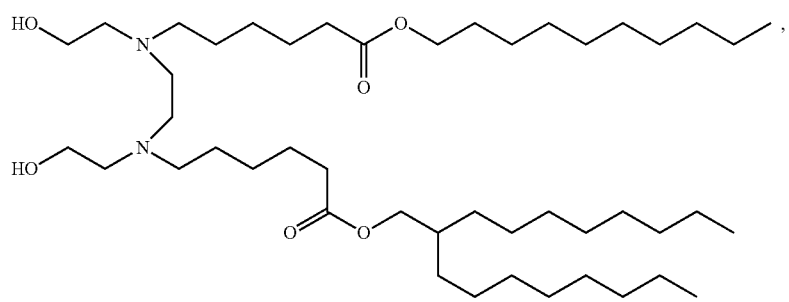
YK-411
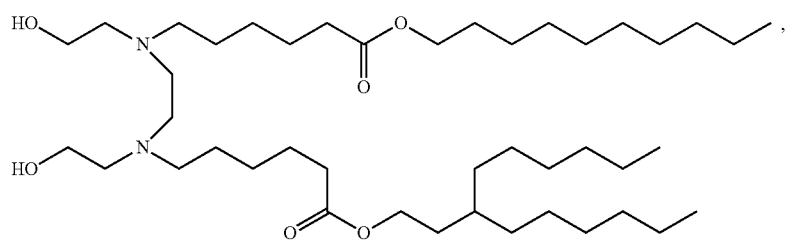
YK-412
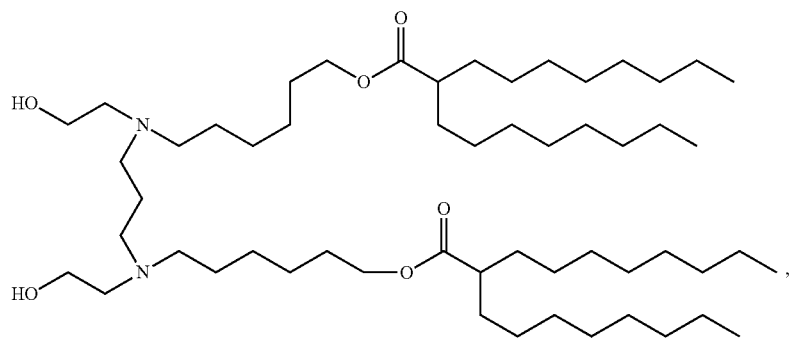
YK-413
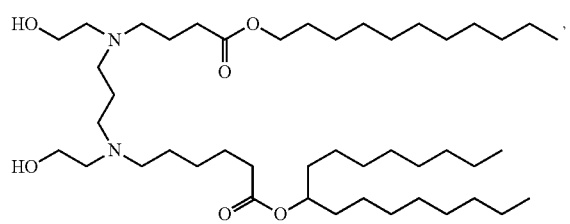
YK-414
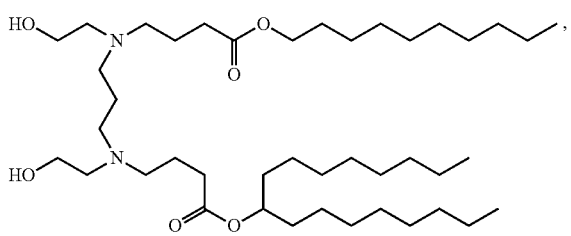

-continued
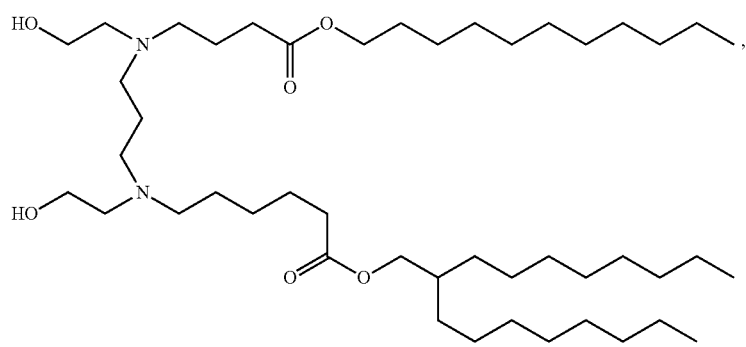
YK-415
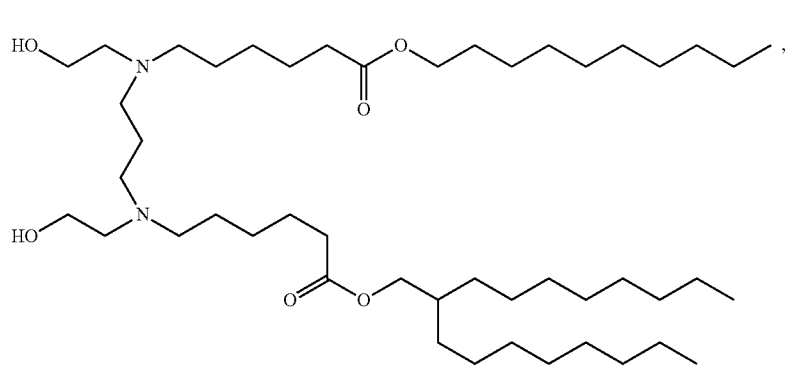
YK-416
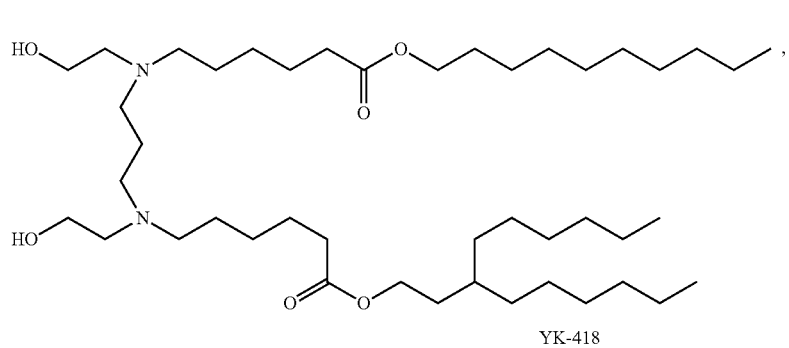
YK-417
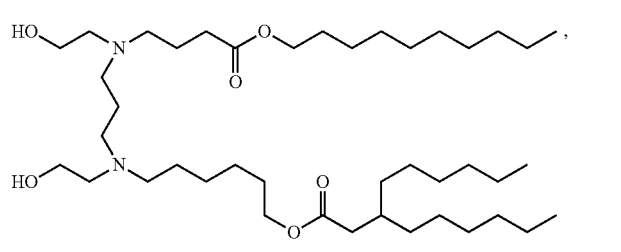
YK-418
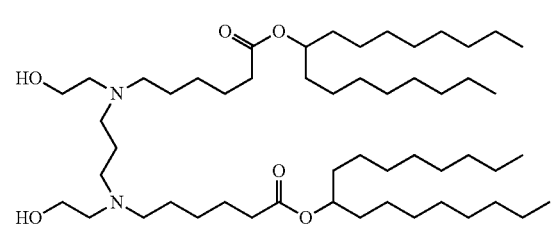
YK-419
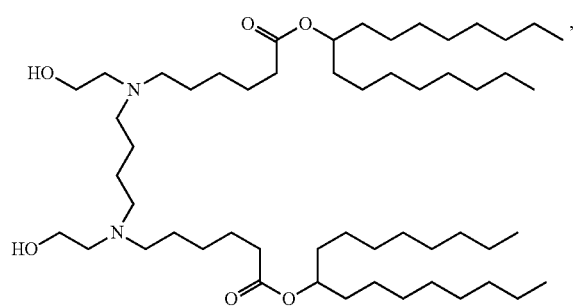
YK-420
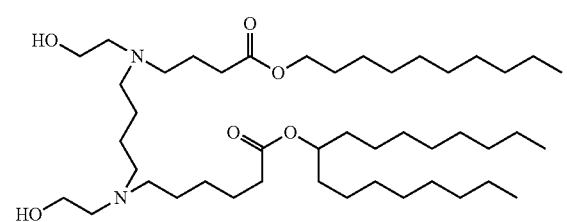
YK-421

-continued

YK-422
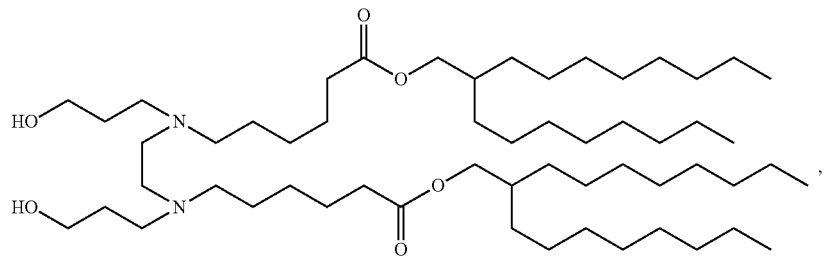

YK-423
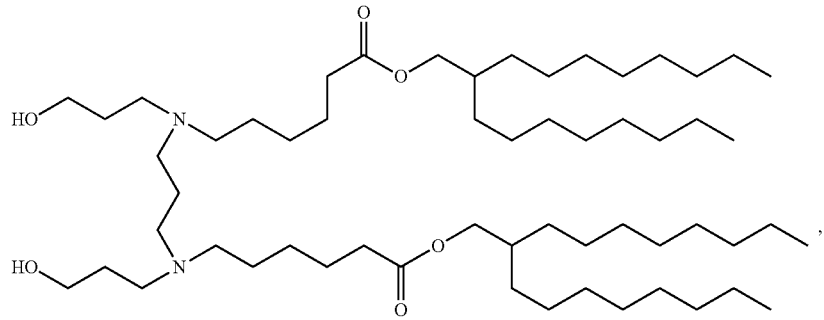

YK-424
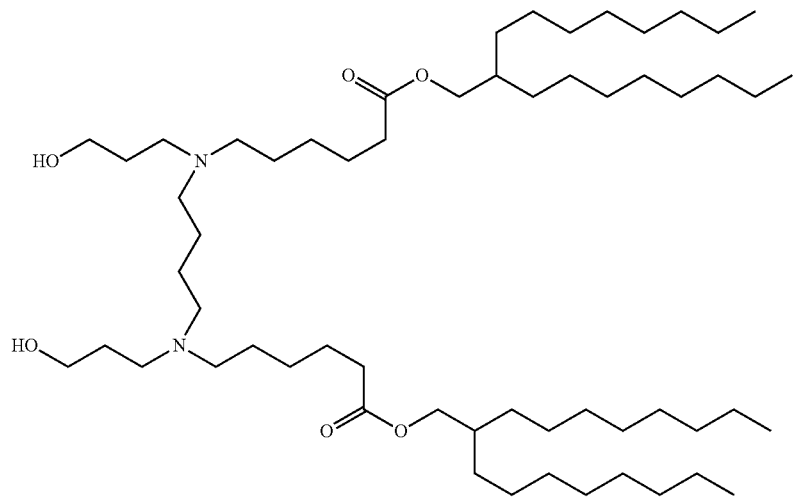

Another aspect of the present disclosure is to provide a composition comprising a carrier, wherein the carrier comprises a cationic lipid, and the cationic lipid includes the above compound of formula (I) or an N-oxide, solvate, pharmaceutically acceptable salt or stereoisomer thereof.

In one embodiment, the composition is a nanoparticle formulation, wherein the nanoparticle formulation has an average size of 10 nm to 300 nm, preferably 90 nm to 280 nm; and the nanoparticle formulation has a polydispersity coefficient of ≤50%, preferably ≤40%, more preferably ≤30%.

Cationic Lipid

In one embodiment of the composition/carrier of the present disclosure, the cationic lipid is one or more selected from the above compound of formula (I) or an N-oxide, solvate, pharmaceutically acceptable salt or stereoisomer thereof. In one embodiment, the cationic lipid is selected from the compounds of formula (I) described above. For example, the cationic lipid is compound YK-401, YK-402, YK-403, YK-404, YK-405, YK-406, YK-407, YK-408, YK-409, YK-410, YK-411, YK-412, YK-413, YK-414, YK-415, YK-416, YK-417, YK-418, YK-419, YK-420, YK-421, YK-422, YK-423, or YK-424. In a preferred embodiment, the cationic lipid is compound YK-407. In another preferred embodiment, the cationic lipid is compound YK-401. In another preferred embodiment, the cationic lipid is compound YK-402. In another preferred embodiment, the cationic lipid is compound YK-403. In another preferred embodiment, the cationic lipid is compound YK-422. In another preferred embodiment, the cationic lipid is compound YK-423.

In another embodiment of the composition/carrier of the present disclosure, the cationic lipid includes: (a) one or more selected from the above compound of formula (I) or an N-oxide, solvate, pharmaceutically acceptable salt or stereoisomer thereof; and (b) one or more other ionizable lipid compound(s) different from (a). The cationic lipid compound (b) can be a commercially available cationic lipid, or a cationic lipid compound reported in literatures. For example, the cationic lipid compound (b) can be SM-102 (compound 25 in WO2017049245A2), compound 21 and compound 23 in WO2021055833, or HHMA (compound 1 in CN112979483B).

In one embodiment, the molar ratio of the cationic lipid to the carrier is 25%-75%, such as 30%, 40%, 49%, 55%, 60%, 65% or 70%.

The carrier can be used to deliver an active ingredient such as a therapeutic or prophylactic agent. The active ingredient can be sealed within the carrier or bound to the carrier.

For example, the therapeutic or prophylactic agent includes one or more of nucleic acid molecules, small molecule compounds, polypeptides or proteins. Such nucleic acids include, but are not limited to, single-stranded DNA, double-stranded DNA, and RNA. Suitable RNAs include, but are not limited to, small interfering RNA (siRNA), asymmetric interfering RNA (aiRNA), microRNA (miRNA), Dicer-substrate RNA (dsRNA), small hairpin RNA (shRNA), messenger RNA (mRNA) and mixtures thereof.

Neutral Lipid

The carrier may comprise a neutral lipid. Neutral lipid in this disclosure refers to an auxiliary lipid that is uncharged or exists in a zwitterionic form at a selected pH value. The neutral lipid may regulate the flow of nanoparticles into a lipid bilayer structure and improve efficiency by promoting lipid phase transition, while also possibly affecting target organ specificity.

In one embodiment, the molar ratio of the cationic lipid to the neutral lipid is about 1:1~15:1, for example about 14:1, 13:1, 12:1, 11:1, 10:1, 9:1, 8:1, 7:1, 6:1, 5:1, 4:1, 3:1 or 2:1. In a preferred embodiment, the molar ratio of the cationic lipid to the neutral lipid is about 4:1. In another preferred embodiment, the molar ratio of the cationic lipid to the neutral lipid is about 4.9:1.

For example, neutral lipids may include one or more of phosphatidylcholine, phosphatidylethanolamine, sphingomyelin, ceramide, sterol, and derivatives thereof.

The carrier component of a composition comprising the cationic lipid may comprise one or more neutral lipid-phospholipids, such as one or more (poly) unsaturated lipids. Phospholipids can be assembled into one or more lipid bilayers. In general, a phospholipid can comprise a phospholipid moiety and one or more fatty acid moieties.

The neutral lipid moiety may be selected from the non-limiting group consisting of phosphatidylcholine, phosphatidylethanolamine, phosphatidylglycerol, phosphatidylserine, phosphatidic acid, 2-lysophosphatidylcholine, and sphingomyelin. The fatty acid moiety may be selected from the non-limiting group consisting of lauric acid, myristic acid, myristoleic acid, palmitic acid, palmitoleic acid, stearic acid, oleic acid, linoleic acid, alpha-linolenic acid, erucic acid, phytanic acid, arachidic acid, arachidonic acid, eicosapentaenoic acid, behenic acid, docosapentaenoic acid, and docosahexaenoic acid. Also contemplated are non-natural species which include natural species with modifications and substitutions such as branching, oxidation, cyclization and alkynes. For example, a phospholipid can be functionalized with or cross-linked with one or more alkynes (e.g., an alkenyl group in which one or more double bonds are replaced by a triple bond). Under appropriate reaction conditions, alkynyl groups may undergo copper-catalyzed cycloaddition reactions when exposed to azides. These reactions can be used to functionalize the lipid bilayer of the composition to facilitate membrane penetration or cell recognition, or to couple the composition to useful components such as targeting or imaging moieties (e.g., dyes).

Neutral lipids useful in these compositions can be selected from the non-limiting group consisting of: 1,2-dilinoleoyl-sn-glycero-3-phosphocholine (DLPC), 1,2-dimyristoyl-sn-glycero-phosphocholine (DMPC), 1,2-dioleoyl-sn-glycero-3-phosphocholine (DOPC), 1,2-dipalmitoyl-sn-glycero-3-phosphocholine (DPPC), 1,2-distearoyl-sn-glycero-3-phosphocholine (DSPC), 1,2-diundecanoyl-sn-glycero-phosphocholine (DUPC), 1-palmitoyl-2-oleoyl-sn-glycero-3-phosphocholine (POPC), 1,2-di-O-octadecenyl-sn-glycero-3-phosphocholine (18:0 Diether PC), 1-oleoyl-2-cholesterylhemisuccinoyl-sn-glycero-3-phosphocholine (OChemsPC), 1-hexadecyl-sn-glycero-3-phosphocholine (C16 Lyso PC), 1,2-dilinolenoyl-sn-glycero-3-phosphocholine, 1,2-diarachidonoyl-sn-glycero-3-phosphocholine, 1,2-didocosahexaenoyl-sn-glycero-3-phosphocholine, 1,2-dioleoyl-sn-glycero-3-phosphoethanolamine (DOPE), 1,2-diphytanoyl-sn-glycero-3-phosphoethanolamine (ME 16.0 PE), 1,2-distearoyl-sn-glycero-3-phosphoethanolamine, 1,2-dilinoleoyl-sn-glycero-3-phosphoethanolamine, 1,2-dilinolenoyl-sn-glycero-3-phosphoethanolamine, 1,2-diarachidonoyl-sn-glycero-3-phosphoethanolamine, 1,2-didocosahexaenoyl-sn-glycero-3-phosphoethanolamine, 1,2-dioleoyl-sn-glycero-3-phospho-rac-(1-glycerol) sodium salt (DOPG), dipalmitoyl phosphatidylglycerol (DPPG), palmitoyl oleoyl phosphatidylethanolamine (POPE), distearoyl-phosphatidyl-ethanolamine (DSPE), dipalmitoyl phosphatidylethanolamine (DPPE), dimyristoyl phosphoethanolamine (DMPE), 1-stearyl-2-oleoyl-stearoylethanolamine (SOPE), 1-stearoyl-2-oleoyl-phosphatidylcholine (SOPC), sphingomyelin, phosphatidylcholine, phosphatidylethanolamine, phosphatidylserine, phosphatidylinositol, phosphatidic acid, palmitoyl oleoyl phosphatidylcholine, lysophosphatidylcholine, lysophosphatidylethanolamine (LPE), and mixtures thereof.

In some embodiments, the neutral lipid comprises DSPC. In certain embodiments, the neutral lipid comprises DOPE. In some embodiments, the neutral lipid comprises both DSPC and DOPE.

Structured Lipid

The carrier of the composition comprising the cationic lipid may also include one or more structured lipid(s). Structured lipids in this disclosure refer to lipids that enhance the stability of nanoparticles by filling the gaps between lipids.

In one embodiment, the molar ratio of the cationic lipid to the structured lipid is about 0.6:1~3:1, for example, about 1.0:1, 1.1:1, 1.2:1, 1.3:1, 1.4:1, 1.5:1, 1.6:1, 1.7:1, 1.8:1, 1.9:1, or 2.0:1.

Structured lipids may be selected from, but are not limited to, the group consisting of cholesterol, nonsterol, sitosterol, ergosterol, campesterol, stigmasterol, brassicasterol, tomatine, ursolic acid, alpha-tocopherol, corticosteroid and mixtures thereof. In some embodiments, the structured lipid is cholesterol. In some embodiments, the structured lipid includes cholesterol, and corticosteroids (e.g., prednisolone, dexamethasone, prednisone, and hydrocortisone) or a combination thereof.

Polymer-Conjugated Lipid

The carrier of the composition comprising the cationic lipid may also include one or more polymer-conjugated lipid(s). Polymer-conjugated lipids mainly refer to lipids modified with polyethylene glycol (PEG). Hydrophilic PEG stabilizes LNPs, regulates nanoparticle size by limiting lipid fusion, and increases nanoparticle half-life by reducing nonspecific interactions with macrophages.

In one embodiment, the polymer-conjugated lipid is selected from one or more of PEG-modified phosphatidylethanolamine, PEG-modified phosphatidic acid, PEG-modified ceramide, PEG-modified dialkylamine, PEG-modified diacylglycerol, and PEG-modified dialkylglycerol. The molecular weight of PEG for the PEG modification is usually 350-5000 Da.

For example, the polymer-conjugated lipid is selected from one or more of distearoyl phosphatidylethanolamine polyethylene glycol 2000 (DSPE-PEG2000), dimyristoylglycero-3-methoxy polyethylene glycol 2000 (DMG-PEG2000) and methoxypolyethylene glycol ditetradecylacetamide (ALC-0159).

In one embodiment of the composition/carrier of the present disclosure, the polymer-conjugated lipid is DMG-PEG2000.

In one embodiment of the composition/carrier of the present disclosure, the carrier includes a neutral lipid, a structured lipid and a polymer-conjugated lipid, wherein the molar ratio of the cationic lipid, the neutral lipid, the structured lipid, and the polymer-conjugated lipids is (25~75):(5~25):(15~65):(0.5~10), for example (35~49):(7.5~15):(35~55):(1~5).

In one embodiment of the composition/carrier of the present disclosure, the carrier includes a neutral lipid, a structured lipid and a polymer-conjugated lipid, wherein the molar ratio of the cationic lipid, the neutral lipid, the structured lipid, and the polymer-conjugated lipid is 49:10:39.5:1.5 or 40:10:48.5:1.5 or 35:10:53.5:1.5.

Therapeutic and/or Prophylactic Agent

The composition may include one or more therapeutic and/or prophylactic agent(s). In one embodiment, the mass ratio of the carrier to the therapeutic or prophylactic agent is from 10:1 to 30:1, for example 12:1, 13:1, 14:1, 15:1, 16:1, 17:1, 18:1, 19:1, 20:1, 21:1, 22:1, 23:1, 24:1, 25:1.

In one embodiment, the mass ratio of the carrier to the therapeutic or prophylactic agent is 12.5:1 to 20:1, preferably 15:1.

The therapeutic or prophylactic agent includes, but is not limited to, one or more of a nucleic acid molecule, a small molecule compound, a polypeptide or a protein.

For example, the therapeutic or prophylactic agent is a vaccine or compound capable of eliciting an immune response.

The carriers of the present disclosure can deliver therapeutic and/or prophylactic agents to mammalian cells or organs, and thus the present disclosure also provides a method of treating a disease or condition in mammals in need thereof, which comprises administering to the mammal a composition comprising a therapeutic and/or prophylactic agent and/or contacting mammalian cells with the composition.

Therapeutic and/or prophylactic agents include biologically active substances and are referred to alternatively as "active agents." A therapeutic and/or prophylactic agent may be a substance that, after delivery to a cell or organ, causes a desired change in the cell or organ or in other tissues or systems of the body. Such species can be used to treat one or more diseases, disorders or conditions. In some embodiments, the therapeutic and/or prophylactic agent is a small molecule drug useful in the treatment of a particular disease, disorder or condition. Examples of drugs that can be used in the composition include, but are not limited to, antineoplastic agents (e.g., vincristine, doxorubicin, mitoxantrone, camptothecin, cisplatin, bleomycin, cyclophosphamide, methotrexate, and streptozotocin), antitumor agents (e.g., actinomycin D, vincristine, vinblastine, cytosine arabinoside, anthracycline, alkylating agents, platinum compounds, antimetabolites, and nucleoside analogs such as methotrexate and purine and pyrimidine analogs), anti-infectives, local anesthetics (e.g., dibucaine and chlorpromazine), beta-adrenergic blockers (e.g., propranolol, timolol and labetalol), antihypertensives (e.g., clonidine and hydralazine), antidepressants (e.g., imipramine, amitriptyline, and doxepin), anticonvulsants (e.g., phenytoin), antihistamines (e.g., diphenhydramine, chlorpheniramine, and promethazine), antibiotics/antibacterials (e.g., gentamycin, ciprofloxacin, and cefoxitin), antifungals (e.g., miconazole, terconazole, econazole, isoconazole, butaconazole, clotrimazole, itraconazole, nystatin, naftifine, and amphotericin B), antiparasitic agents, hormones, hormone antagonists, immunomodulators, neurotransmitter antagonists, antiglaucoma drugs, vitamins, sedatives, and imaging agents.

In some embodiments, the therapeutic and/or prophylactic agent is a cytotoxin, a radioactive ion, a chemotherapeutic agent, a vaccine, a compound that elicits an immune response, and/or another therapeutic agent and/or prophylactic agent. A cytotoxin or cytotoxic agent includes any agent that is harmful to cells. Examples include, but are not limited to, taxol, cytochalasin B, gramicidin D, ethidium bromide, emetine, mitomycin, etoposide, teniposide, vincristine, vinblastine, colchicine, doxorubicin, daunorubicin, dihydroxy anthracin dione, mitoxantrone, mithramycin, actinomycin D, 1-dehydrotestosterone, glucocorticoid, procaine, tetracaine, lidocaine, propranolol, puromycin, maytansinoids such as maytansinol, rachelmycin (CC-1065), and their analogs or homologues. Radioactive ions include, but are not limited to, iodine (e.g., iodine 125 or iodine 131), strontium 89, phosphorus, palladium, cesium, iridium, phosphate, cobalt, yttrium 90, samarium 153, and praseodymium. Vaccines include compounds and formulations that confer immunity against one or more conditions associated with infectious diseases such as influenza, measles, human papillomavirus (HPV), rabies, meningitis, pertussis, tetanus, plague, hepatitis and tuberculosis, and may include mRNA encoding infectious disease-derived antigens and/or epitopes. Vaccines may also include compounds and formulations that lead to an immune response against cancer cells and may include mRNA encoding tumor cell-derived antigens, epitopes and/or neo-epitopes. Compounds that elicit an immune response may include vaccines, corticosteroids (e.g., dexamethasone), and other species. In some embodiments, vaccines and/or compounds capable of eliciting an immune response are administered by intramuscular administration of a composition comprising a compound according to formula (I), (IA), (IB), (II), (IIa), (IIb), (IIc), (IId), (IIe), (IIf), (IIg) or (III) (e.g., compound 3, 18, 20, 25, 26, 29, 30, 60, 108-112 or 122). Other therapeutic and/or prophylactic agents include, but are not limited to, antimetabolites (e.g., methotrexate, 6-mercaptopurine, 6-thioguanine, cytarabine, 5-fluorouracil, and dacarbazine), alkanes (e.g., mechlorethamine, thiotepa, chlorambucil, lazithromycin (CC-1065), melphalan, carmustine (BSNU), lomustine (CCNU), cyclophosphamide, busulfan, dibromomannitol, streptozotocin, mitomycin C, and cis-dichlorodiamino platinum (II) (DDP), cisplatin), anthracyclines (e.g., daunorubicin (formerly known as daunomycin) and doxorubicin), antibiotics (e.g., dactinomycin (formerly known as actinomycin), bleomycin, mithramycin, and anthramycin (AMC)) and antimitotic agents (e.g., vincristine, vinblastine, paclitaxel, and maytansinoids).

In other embodiments, the therapeutic and/or prophylactic agent is a protein. Therapeutic proteins that can be used in the nanoparticles of the present disclosure include, but are not limited to, gentamicin, amikacin, insulin, erythropoietin (EPO), granulocyte colony stimulating factor (G-CSF), granulocyte-macrophage colony stimulating factor (GM-CSF), factor VIR, luteinizing hormone-releasing hormone (LHRH) analogs, interferon, heparin, hepatitis B surface antigen, typhoid vaccines and cholera vaccines.

In some embodiments, the therapeutic agent is a polynucleotide or nucleic acid (e.g., ribonucleic acid or deoxyribonucleic acid). The term "polynucleotide" in its broadest sense includes any compound and/or substance which is an oligonucleotide chain or can be incorporated into an oligonucleotide chain. Exemplary polynucleotides for use in accordance with the present disclosure include, but are not limited to, one or more of deoxyribonucleic acid (DNA); ribonucleic acid (RNA), including messenger mRNA (mRNA), hybrids thereof; RNAi-inducing factors; RNAi factors; siRNA; shRNA; miRNA; antisense RNA; ribozyme; catalytic DNA; RNA that induces triple helix formation; aptamer, etc. In some embodiments, the therapeutic and/or prophylactic agent is RNA. RNAs useful in the compositions and methods described herein can be selected from, but not limited to, the group consisting of shortmer, antagomir, antisense RNA, ribozymes, small interfering RNA (siRNA), asymmetric interfering RNA (aiRNA), microRNA (miRNA), Dicer-substrate RNA (dsRNA), small hairpin RNA (shRNA), transfer RNA (tRNA), messenger RNA (mRNA) and mixtures thereof. In certain embodiments, the RNA is mRNA.

In certain embodiments, the therapeutic and/or prophylactic agent is mRNA. The mRNA can encode any polypeptide of interest, including any naturally or non-naturally occurring or otherwise modified polypeptide. The polypeptide encoded by the mRNA can be of any size and can have any secondary structure or activity. In some embodiments, the polypeptide encoded by an mRNA may have a therapeutic effect when expressed in a cell.

In other embodiments, the therapeutic and/or prophylactic agent is siRNA. The siRNA can selectively reduce the expression of a gene of interest or downregulate the expression of the gene. For example, the siRNA can be selected such that a gene associated with a particular disease, disorder or condition is silenced upon administration of a composition comprising the siRNA to a subject in need thereof. siRNA can comprise a sequence that is complementary to an mRNA sequence encoding a gene or protein of interest. In some embodiments, the siRNA can be an immunomodulatory siRNA.

In certain embodiments, the therapeutic and/or prophylactic agent is sgRNA and/or cas9 mRNA. sgRNA and/or cas9 mRNA can be used as gene editing tools. For example, sgRNA-cas9 complexes can affect mRNA translation of cellular genes.

In some embodiments, the therapeutic and/or prophylactic agent is shRNA or a vector or plasmid encoding shRNA. shRNA can be produced inside a target cell after an appropriate construct is delivered into the nucleus. The constructs and mechanisms associated with shRNA are well known in the related art.

Disease or Condition

The composition/carrier of the present disclosure can deliver a therapeutic or prophylactic agent to a subject or patient. The therapeutic or prophylactic agent includes, but is not limited to, one or more of nucleic acid molecules, small molecular compounds, polypeptides or proteins. Therefore, the composition of the present disclosure can be used to prepare nucleic acid medicine, gene vaccine, small molecule medicine, polypeptide or protein medicine. Due to the wide variety of therapeutic or prophylactic agents described above, the composition of the present disclosure can be used to treat or prevent a variety of diseases or conditions.

In one embodiment, the disease or condition is characterized by dysfunctional or abnormal protein or polypeptide activity.

For example, the disease or condition is selected from the group consisting of infectious diseases, cancer and proliferative diseases, genetic diseases, autoimmune diseases, diabetes, neurodegenerative diseases, cardiovascular and renovascular diseases, and metabolic diseases.

In one embodiment, the infectious disease is selected from diseases caused by coronavirus, influenza virus, or HIV virus, infantile pneumonia, Rift Valley fever, yellow fever, rabies, and various herpes.

Other Components

The composition may comprise one or more component (s) other than those described in the preceding sections. For example, the composition may comprise one or more small hydrophobic molecules, such as vitamins (e.g., vitamin A or vitamin E) or sterols.

The composition may also comprise one or more permeability enhancing molecules, carbohydrates, polymers, surface-altering agents or other components. The permeability enhancing molecule can be, for example, molecules described in US Patent Application Publication No. 2005/0222064. The carbohydrates can include simple sugars such as glucose and polysaccharides such as glycogen and derivatives and analogs thereof.

Surface-altering agents may include, but are not limited to, anionic proteins such as bovine serum albumin, surfactants for example cationic surfactants such as dimethyldioctadecylammonium bromide, sugars or sugar derivatives (e.g., cyclodextrins), nucleic acids, polymers (e.g., heparin, polyethylene glycol, and poloxamers), mucolytics (e.g., acetylcysteine, mugwort, bromelain, papain, clerodendrum, bromhexine, carbocisteine, eprazinone, mesna, ambroxol, sobrerol, domiodol, letosteine, stepronin, tiopronin, gelsolin, thymosin β4, dornase alfa, neltenexine and erdosteine) and DNases (e.g., rhDNase). Surface-altering agents can be disposed within and/or on the surface of the nanoparticles of the composition (e.g., by coating, adsorption, covalent attachment, or other methods).

The composition may also comprise one or more functionalized lipids. For example, lipids can be functionalized with alkyne groups that may undergo cycloaddition reactions when exposed to azide under appropriate reaction conditions. Specifically, lipid bilayers can be functionalized in this way with one or more groups that can effectively facilitate membrane penetration, cell recognition, or imaging. The surface of the composition may also be coupled to one or more useful antibodies. Functional groups and conjugates useful for targeted cell delivery, imaging and membrane penetration are well known in the art.

In addition to these components, the composition may comprise any material that can be used in pharmaceutical compositions. For example, a composition may comprise one or more pharmaceutically acceptable excipients or auxiliary ingredients, such as, but not limited to, one or more of solvents, dispersion media, diluents, dispersion aids, suspension aids, granulation aids, disintegrants, fillers, glidants, liquid vehicles, binders, surfactants, isotonic agents, thickeners or emulsifiers, buffering agents, lubricants, oils, preservatives, flavoring agents, colorants, etc. Excipients are, for example, starch, lactose or dextrin. Pharmaceutically acceptable excipients are well known in the art (see for example Remington's The Science and Practice of Pharmacy, 21st Edition, A. R. Gennaro; Lippincott, Williams & Wilkins, Baltimore, MD, 2006).

Examples of diluents may include, but are not limited to, calcium carbonate, sodium carbonate, calcium phosphate, dicalcium phosphate, calcium sulfate, calcium hydrogen phosphate, sodium phosphate, lactose, sucrose, cellulose, microcrystalline cellulose, kaolin, mannitol, sorbitol, inositol, sodium chloride, dry starch, corn starch, powdered sugar and/or a combination thereof.

In some embodiments, compositions comprising one or more lipids described herein may also comprise one or more adjuvants, such as glucopyranosyl lipid adjuvant (GLA), CpG oligodeoxyribonucleotide (e.g., class A or class B), poly(I:C), aluminum hydroxide, and Pam3CSK4.

The compositions of the present disclosure can be formulated in solid, semi-solid, liquid or gaseous form, such as tablets, capsules, ointments, elixirs, syrups, solutions, emulsions, suspensions, injections, and aerosols. The compositions of the present disclosure can be prepared by methods well known in the field of pharmacy. For example, sterile injectable solutions can be prepared by incorporating the therapeutic or prophylactic agent in the required amount into an appropriate solvent such as sterile distilled water with various other components enumerated above as required and then sterilization by filtration. Surfactants may also be added to promote the formation of a uniform solution or suspension.

For example, compositions of the present disclosure may be administered intravenously, intramuscularly, intradermally, subcutaneously, intranasally, or by inhalation. In one embodiment, the composition is administered subcutaneously.

The compositions of the present disclosure are administered in therapeutically effective amounts which may vary not only with the particular agent chosen, but also with the route of administration, the nature of the disease being treated, and the age and condition of the patient, and may ultimately be at the discretion of the attending physician or clinician. For example, a dose of about 0.001 mg/kg to about 10 mg/kg of the therapeutic or prophylactic agent can be administered to a mammal (e.g., a human).

EXAMPLE

The present disclosure will be further described below in conjunction with examples. However, the present disclosure is not limited to the following examples. The implementation conditions used in the examples can be further adjusted according to different requirements for specific use. Unspecified implementation conditions are conventional conditions in the industry. In the specific examples of the present disclosure, the raw materials used are all commercially available. Unless otherwise stated, percentages in this context are by weight and all temperatures are given in degrees Celsius. The technical features involved in the various embodiments of the present disclosure can be combined with each other as long as they do not conflict with each other.

Example 1: Synthesis of Cationic Lipid Compounds

Synthesis of YK-401

The synthesis route is as follows:

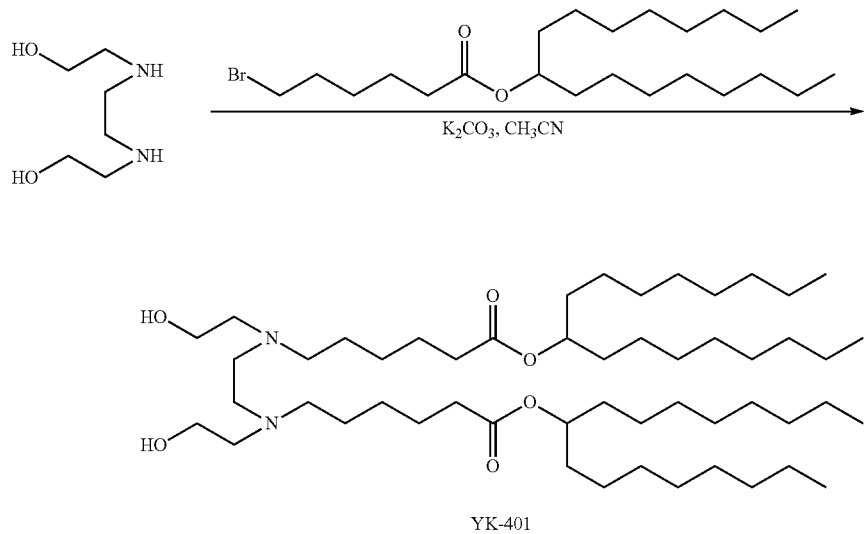

YK-401

Synthesis of di(heptadecan-9-yl) 6,6'-(ethane-1,2-diyl-bis((2-hydroxyethyl)azanediyl))dihexanoate (YK-401)

N,N'-bis(hydroxyethyl)ethylenediamine (28 mg, 0.19 mmol) and heptadecan-9-yl 6-bromohexanoate (200 mg, 0.48 mmol) were dissolved in acetonitrile (3 mL). Potassium carbonate (79 mg, 0.57 mmol) was added to the above system, and the mixture was heated to 75° C. and stirred to react for 5 hours. After the reaction was completed, 20 mL of water was added to the reaction solution, and the mixture was then extracted with ethyl acetate (20 mL×2). The organic phases were combined and then washed with brine (20 mL×2), dried over anhydrous sodium sulfate, and filtered. The filtrate was concentrated under reduced pressure in vacuo to remove the solvent. The residue was purified by silica gel chromatography (dichloromethane/methanol) to obtain the target compound (62 mg, 0.07 mmol, 38.2%). $C_{52}H_{104}N_2O_6$, MS(ES): m/z (M+H$^+$) 853.8.

$^1$H NMR (400 MHz, chloroform-d) δ 4.86 (p, J=6.1 Hz, 2H), 3.66 (s, 4H), 2.71 (s, 12H), 2.29 (t, J=7.4 Hz, 4H), 1.67-1.46 (m, 16H), 1.26 (s, 52H), 0.88 (t, J=6.7 Hz, 12H).

Synthesis of YK-402
The synthesis route is as follows:

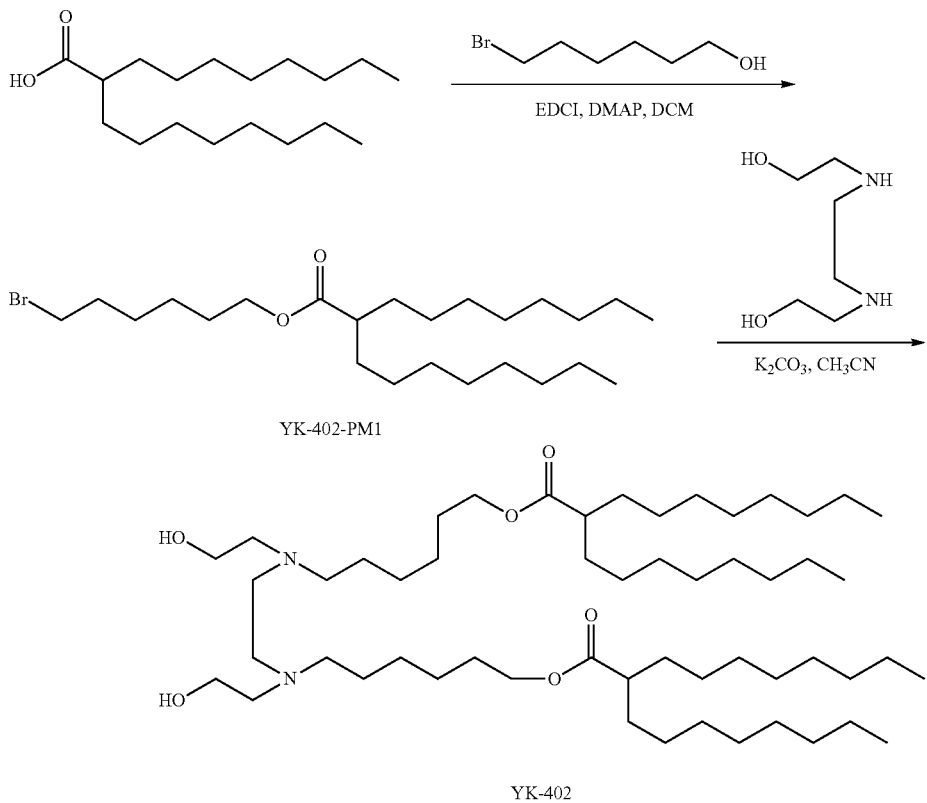

Step 1: Synthesis of 6-bromohexyl 2-octyldecanoate (YK-402-PM1)

2-Octyldecanoic acid (300 mg, 1.05 mmol) and 6-bromohexanol (202.5 mg, 1.12 mmol) were dissolved in dichloromethane (5 mL), and 1-(3-dimethyl aminopropyl)-3-ethylcarbodiimide hydrochloride (404.4 mg, 2.11 mmol) and 4-dimethylaminopyridine (64.4 mg, 0.53 mmol) were added to the above solution, and the mixture was stirred to react at 30-35° C. for 5 hours. After the reaction was completed, the reaction solution was washed with saturated sodium bicarbonate, saturated brine, and dried over anhydrous sodium sulfate. The mixture was filtered and the filtrate was concentrated under reduced pressure in vacuum. The residue was purified by silica gel chromatography (ethyl acetate/n-hexane) to obtain YK-402-PM1 (478.2 mg, 1.06 mmol, 100%).

Step 2: Synthesis of (ethane-1,2-diyl-bis((2-hydroxyethyl)azanediyl))bis(hexane-6, 1-diyl)bis(2-octyldecanoate))(YK-402)

According to the method for preparing YK-401, YK-402-PM1(447.5 mg, 0.67 mmol) and N,N'-bis(hydroxyethyl) ethylenediamine (39.7 mg, 0.27 mmol) were used as raw materials to give YK-402(53.10 mg, 0.06 mmol, 22.3%), $C_{14}H_{108}N_2O_6$, MS(ES): m/z (M+H$^+$) 881.8.

$^1$H NMR (400 MHz, chloroform-d) δ 4.06 (t, J=6.7 Hz, 4H), 3.68 (s, 4H), 2.74 (s, 12H), 2.31 (tt, J=8.8, 5.3 Hz, 2H), 1.59 (dq, J=22.3, 6.8 Hz, 12H), 1.25 (s, 60H), 0.88 (t, J=6.7 Hz, 12H).

Synthesis of YK-403

The synthesis route is as follows.

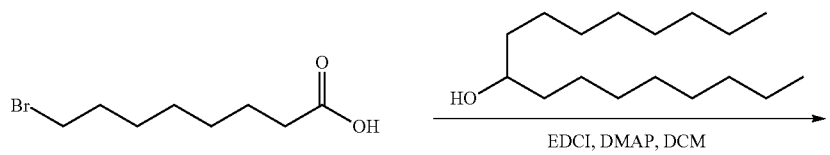

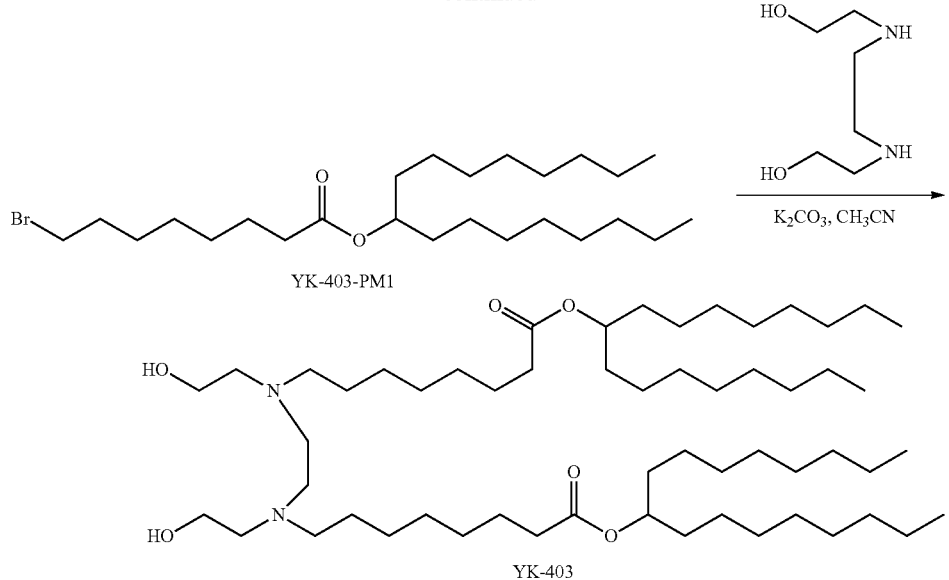

Step 1: Synthesis of heptadecan-9-yl 8-bromooctanoate (YK-403-PM1)

According to the method for preparing YK-402-PM1, 9-heptadecanol (3.73 g, 14.53 mmol) and 8-bromooctanoic acid (2.70 g, 12.11 mmol) were used as raw materials to give YK-403-PM1(4.43 g, 9.60 mmol, 79.3%).

Step 2: Synthesis of di(heptadecan-9-yl) 8, 8'-(ethane-1,2-diyl-bis((2-hydroxyethyl)azanediyl))dioctanoate (YK-403)

According to the method for preparing YK-401, YK-403-PM1(233.6 mg, 0.51 mmol) and N,N'-bis(hydroxyethyl) ethylenediamine (30.0 mg, 0.20 mmol) were used as raw materials to give YK-403(98.7 mg, 0.11 mmol, 54.3%), $C_{56}H_{112}N_2O_6$, MS(ES): m/z (M+H$^+$) 909.8.

$^1$H NMR (400 MHz, chloroform-d) δ 4.86 (p, J=6.2 Hz, 2H), 3.64-3.57 (m, 4H), 2.61 (dd, J=9.9, 5.1 Hz, 8H), 2.55-2.47 (m, 4H), 2.27 (t, J=7.5 Hz, 4H), 1.65-1.57 (m, 4H), 1.55-1.44 (m, 12H), 1.28 (d, J=16.0 Hz, 62H), 0.88 (t, J=6.8 Hz, 12H).

Synthesis of YK-404

The synthesis route is as follows:

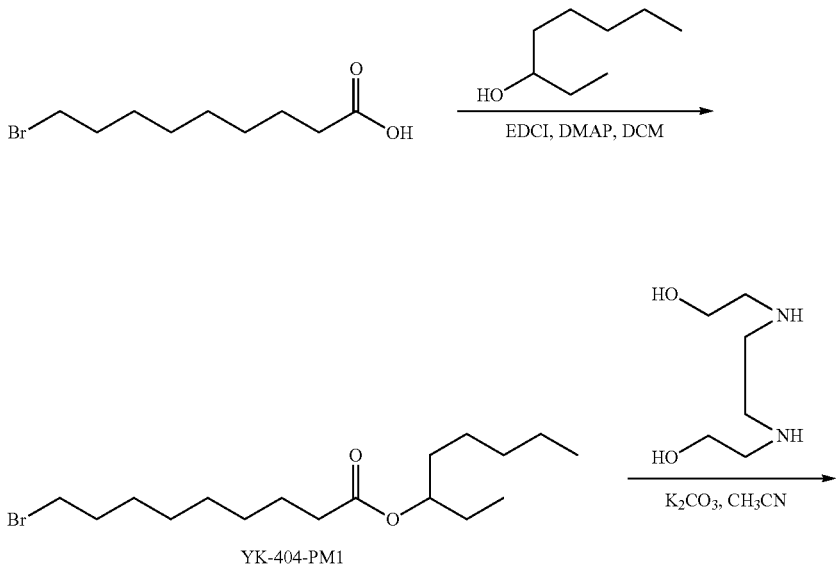

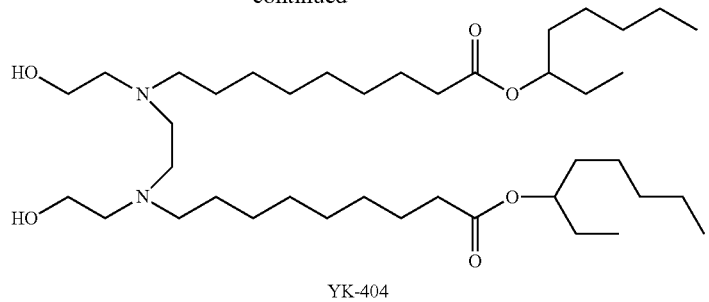

YK-404

Step 1: Synthesis of octan-3-yl 9-bromononanoate (YK-404-PM1)

According to the method for preparing YK-402-PM1, octane-3-ol (65.9 mg, 0.51 mmol) and 9-bromononanoic acid (100 mg, 0.42 mmol) were used as raw materials to give YK-404-PM1(114.9 mg, 0.33 mmol, 78.3%).

Step 2: Synthesis of di(octan-3-yl) 9, 9'-(ethane-1, 2-diyl-bis((2-hydroxyethyl)azanediyl))dinonanoate (YK-404)

According to the method for preparing YK-401, YK-404-PM1(114.9 mg, 0.33 mmol) and N,N'-bis(hydroxyethyl) ethylenediamine (19.5 mg, 0.13 mmol) were used as raw materials to give YK-404(30.9 mg, 0.05 mmol, 34.7%), $C_{40}H_{80}N_2O_6$, MS(ES): m/z (M+H$^+$) 685.6.

$^1$H NMR (400 MHz, chloroform-d) δ 4.85 (p, J=6.5 Hz, 2H), 3.79 (s, 4H), 2.87 (s, 12H), 2.32 (t, J=7.5 Hz, 4H), 1.73-1.53 (m, 16H), 1.35-1.29 (m, 28H), 0.94-0.89 (m, 12H).

Synthesis of YK-405
The synthesis route is as follows.

Step 1: Synthesis of decyl 4-((2-hydroxyethyl)(2-((2-hydroxyethyl)amino)ethyl)amino)butyrate (YK-405-PM1)

N,N'-bis(hydroxyethyl)ethylenediamine (434.1 mg, 2.93 mmol) and n-decyl 4-bromobutyrate (300 mg, 0.98 mmol) were dissolved in acetonitrile (4 mL), and potassium carbonate (404.8 mg, 2.93 mmol) was added to the above system. The mixture was heated to 70° C. and stirred for 4 hours. After the reaction was completed, 20 mL of water was added to the reaction solution, and the mixture was then extracted with dichloromethane (20 mL×2). The organic phases were combined, washed with saturated aqueous sodium bicarbonate solution (20 mL×2), dried over anhydrous sodium sulfate, and filtered. The filtrate was concentrated under reduced pressure in vacuum to remove the solvent. The residue was purified by silica gel chromatography (dichloromethane/methanol (with 2% triethylamine)) to obtain YK-405-PM1(179.5 mg, 0.48 mmol, 48.9%). $C_{20}H_{42}N_2O_4$, MS(ES): m/z (M+H$^+$) 375.3.

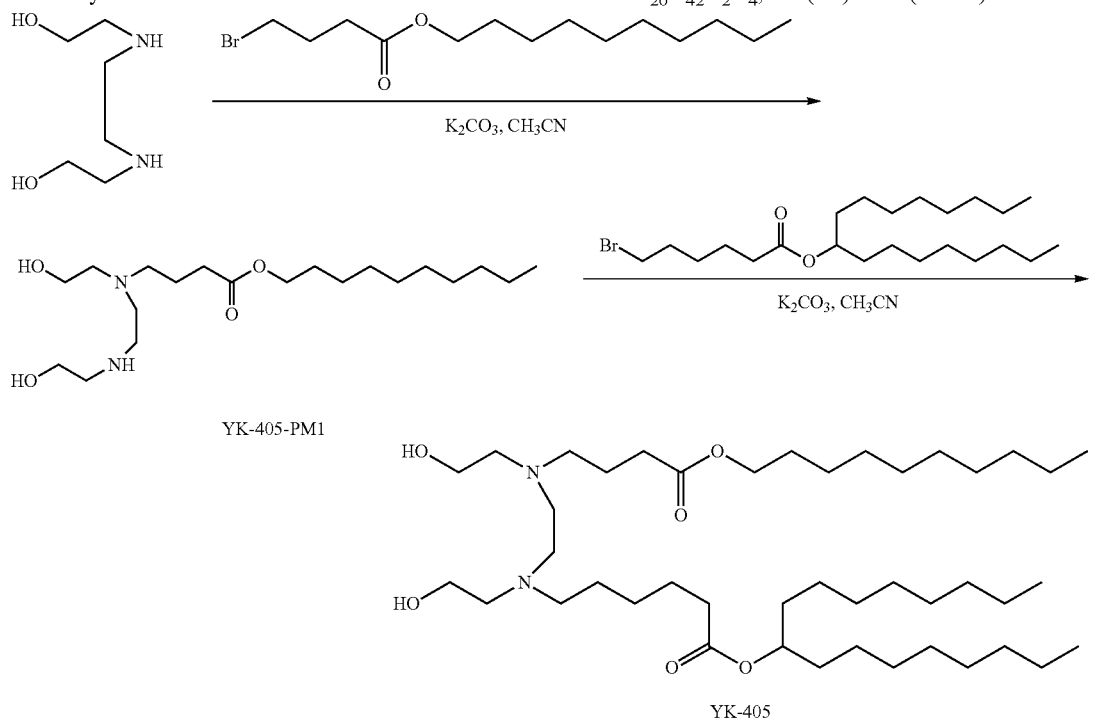

YK-405-PM1

YK-405

Step 2: Synthesis of Heptadecan-9-yl 6-((2-hydroxyethyl)(2-((2-hydroxyethyl)(4-(decyloxy)-4-oxobutyl)amino)ethyl)amino)hexanoate (YK-405)

According to the method for preparing YK-401, YK-405-PM1(160 mg, 0.43 mmol) and heptadecan-9-yl 6-bromohexanoate(215.0 mg, 0.52 mmol) were used as raw materials to give YK-405(42.5 mg, 0.06 mmol, 13.6%), $C_{43}H_{86}N_2O_6$, MS(ES): m/z (M+H$^+$) 727.6.

$^1$H NMR (400 MHz, chloroform-d) δ 4.96-4.69 (m, 1H), 4.06 (t, J=6.8 Hz, 2H), 3.78-3.72 (m, 2H), 3.72-3.65 (m, 2H), 3.45 (s, 4H), 2.88-2.79 (m, 6H), 2.78-2.64 (m, 4H), 2.32 (dt, J=19.1, 7.2 Hz, 4H), 1.84 (p, J=7.1 Hz, 2H), 1.63 (dq, J=13.9, 7.4 Hz, 6H), 1.53-1.44 (m, 4H), 1.26 (s, 40H), 0.88 (t, J=6.6 Hz, 9H).

Synthesis of YK-406

The synthesis route is as follows:

mmol) and 6-bromohexyl 3-hexylnonanoate (200 mg, 0.49 mmol) were used as raw materials to give YK-406-PM1 (134.7 mg, 0.28 mmol, 58.1%). $C_{27}H_{56}N_2O_4$, MS(ES): m/z (M+H$^+$) 473.4.

Step 2: Synthesis of 6-((2-hydroxyethyl) (2-((2-hydroxyethyl)(4-(undecyloxy)-4-oxobutyl)amino) ethyl)amino)hexyl 3-hexylnonanoate (YK-406)

According to the method for preparing YK-401, YK-406-PM1(134.7 mg, 0.28 mmol) and n-decyl 4-bromobutyrate (149.9 mg, 0.49 mmol) were used as raw materials to give YK-406(41.5 mg, 0.06 mmol, 20.8%), $C_{42}H_{54}N_2O_6$, MS(ES): m/z (M+H$^+$) 713.6.

$^1$H NMR (400 MHz, chloroform-d) δ 4.05 (q, J=6.5 Hz, 4H), 3.68-3.50 (m, 4H), 2.76-2.48 (m, 12H), 2.32 (t, J=7.1

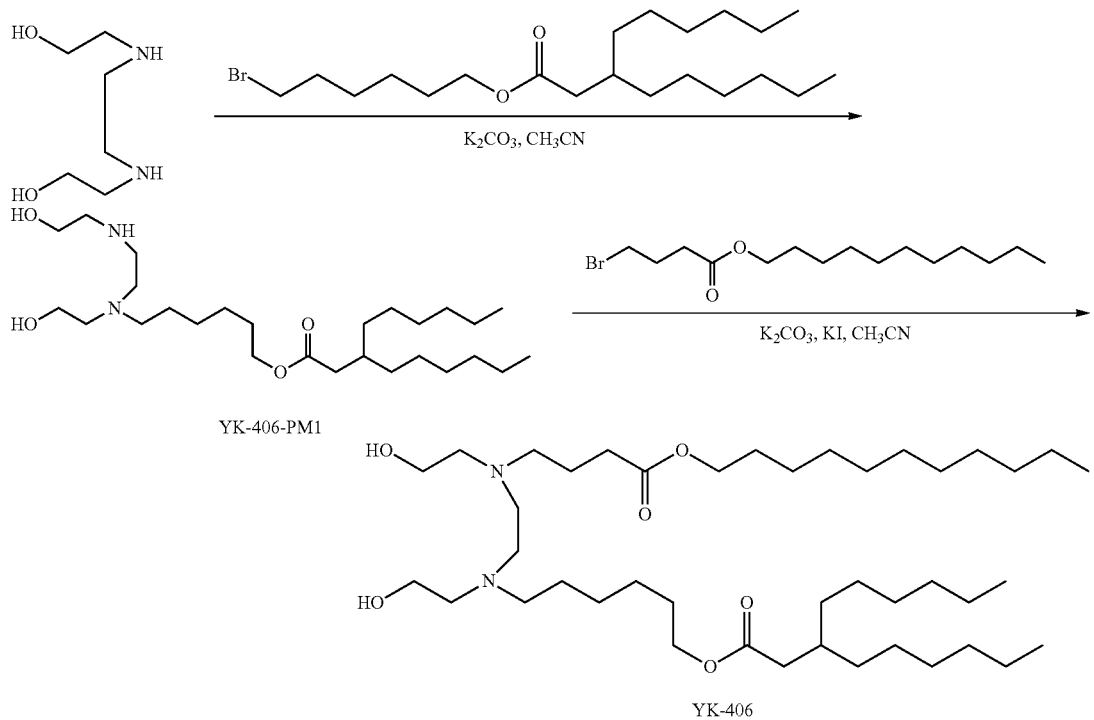

YK-406-PM1

YK-406

Step 1: Synthesis of 6-((2-hydroxyethyl)(2-((2-hydroxyethyl)amino)ethyl)amino)hexyl 3-hexylnonanoate (YK-406-PM1)

According to the method for preparing YK-405-PM1, N,N'-bis(hydroxyethyl)ethylenediamine (183.7 mg, 1.24

Hz, 2H), 2.22 (d, J=6.9 Hz, 2H), 1.81 (dt, J=15.0, 7.2 Hz, 3H), 1.68-1.56 (m, 4H), 1.50 (d, J=7.3 Hz, 2H), 1.28 (d, J=15.8 Hz, 40H), 0.88 (t, J=6.6 Hz, 9H).

Synthesis of YK-407

The synthesis route is as follows:

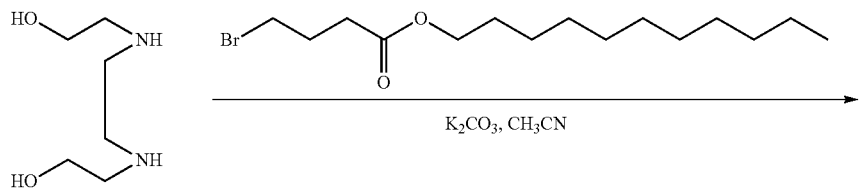

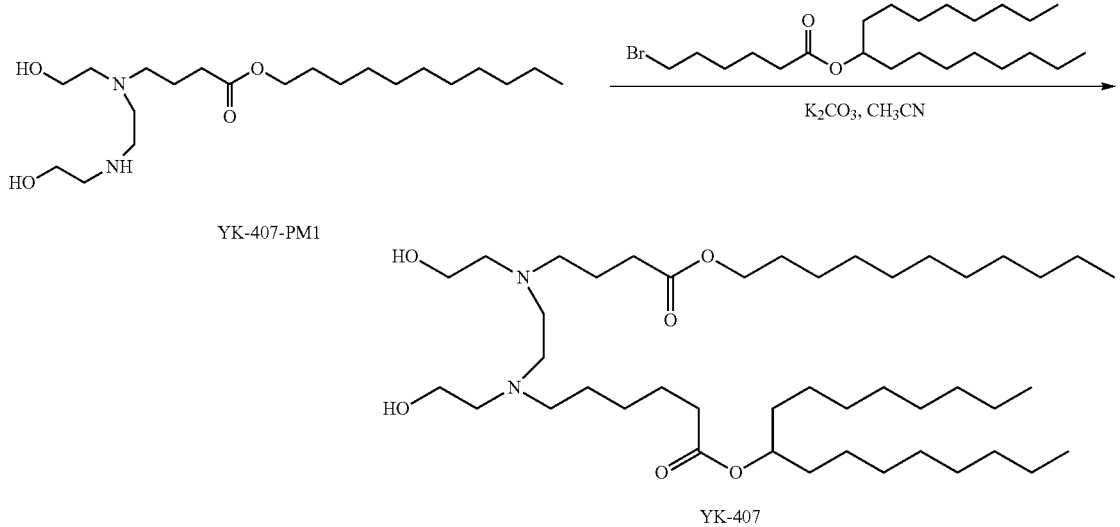

YK-407

Step 1: Synthesis of undecyl 4-((2-hydroxyethyl)(2-((2-hydroxyethyl)amino)ethyl)amino)butyrate (YK-407-PM1)

According to the method for preparing YK-405-PM1, N,N'-bis(hydroxyethyl)ethylenediamine (691.9 mg, 4.67 mmol) and undecyl 4-bromobutyrate (500 mg, 1.56 mmol) were used as raw materials to give YK-407-PM1(271 mg, 0.70 mmol, 44.7%). $C_{21}H_{44}N_2O_4$, MS(ES): m/z (M+H$^+$) 389.4.

Step 2: Synthesis of heptadecan-9-yl 6-((2-hydroxyethyl)(2-(2-hydroxyethyl)(4-oxo-4-(undecyloxy)butyl)amino)ethyl)amino)hexanoate (YK-407)

According to the method for preparing YK-401, YK-407-PM1(271 mg, 0.70 mmol) and heptadecan-9-yl 6-bromohexanoate (453.5 mg, 1.05 mmol) were used as raw materials to give YK-407(129 mg, 0.17 mmol, 24.3%), $C_{44}H_{88}N_2O_6$, MS(ES): m/z (M+H$^+$) 741.7.

$^1$H NMR (400 MHz, CDCl$_3$) δ 4.93-4.84 (m, 1H), 4.09 (t, J=6.8 Hz, 2H), 3.74 (s, 4H), 2.80 (s, 10H), 2.39-2.30 (m, 4H), 1.89 (s, 2H), 1.67 (dt, J=14.9, 7.6 Hz, 6H), 1.54 (d, J=5.3 Hz, 4H), 1.29 (s, 44H), 0.92 (d, J=6.5 Hz, 9H).

Synthesis of YK-408

The synthesis route is as follows:

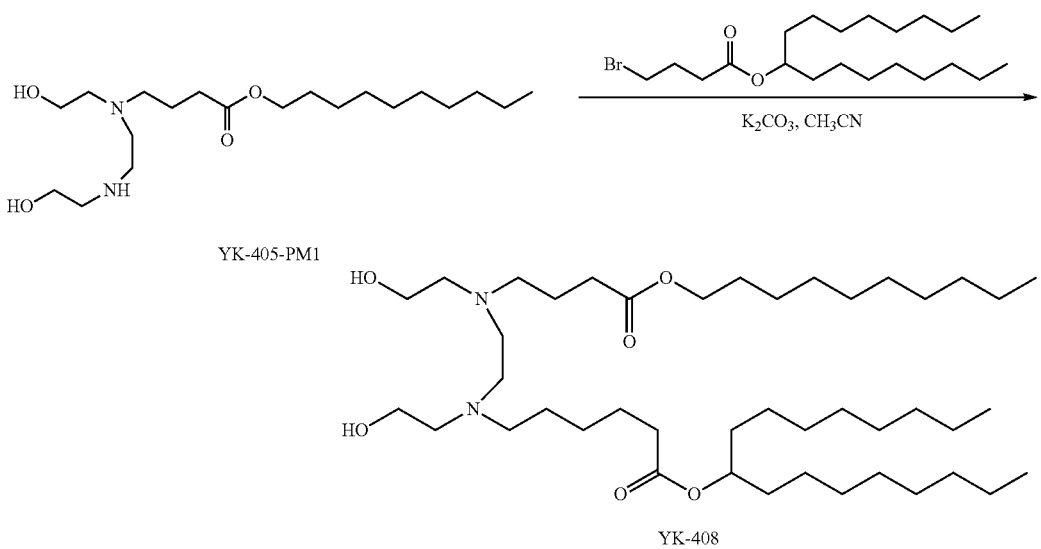

YK-408

Synthesis of heptadecan-9-yl 4-((2-hydroxyethyl)(2-((2-hydroxyethyl)(4-(decyloxy)-4-oxobutyl)amino)ethyl)amino)butyrate (YK-408)

According to the method for preparing YK-401, YK-405-PM1(276 mg, 0.74 mmol) and heptadecan-9-yl 4-bromobutyrate (537.8 mg, 1.33 mmol) were used as raw materials to give YK-408(80 mg, 0.11 mmol, 15.5%), $C_{41}H_{82}N_2O_6$, MS(ES): m/z (M+H$^+$) 699.6.

$^1$H NMR (400 MHz, chloroform-d) δ 5.89 (s, 2H), 5.57-5.34 (m, 1H), 4.65 (t, J=6.7 Hz, 2H), 4.19 (t, J=4.4 Hz, 4H), 3.20 (td, J=15.1, 13.0, 6.2 Hz, 12H), 2.90 (q, J=7.0 Hz, 4H), 2.40 (p, J=7.1 Hz, 4H), 2.25-2.17 (m, 2H), 2.15-2.06 (m, 4H), 1.85 (s, 36H), 1.47 (t, J=6.4 Hz, 9H).

Synthesis of YK-409

The synthesis route is as follows:

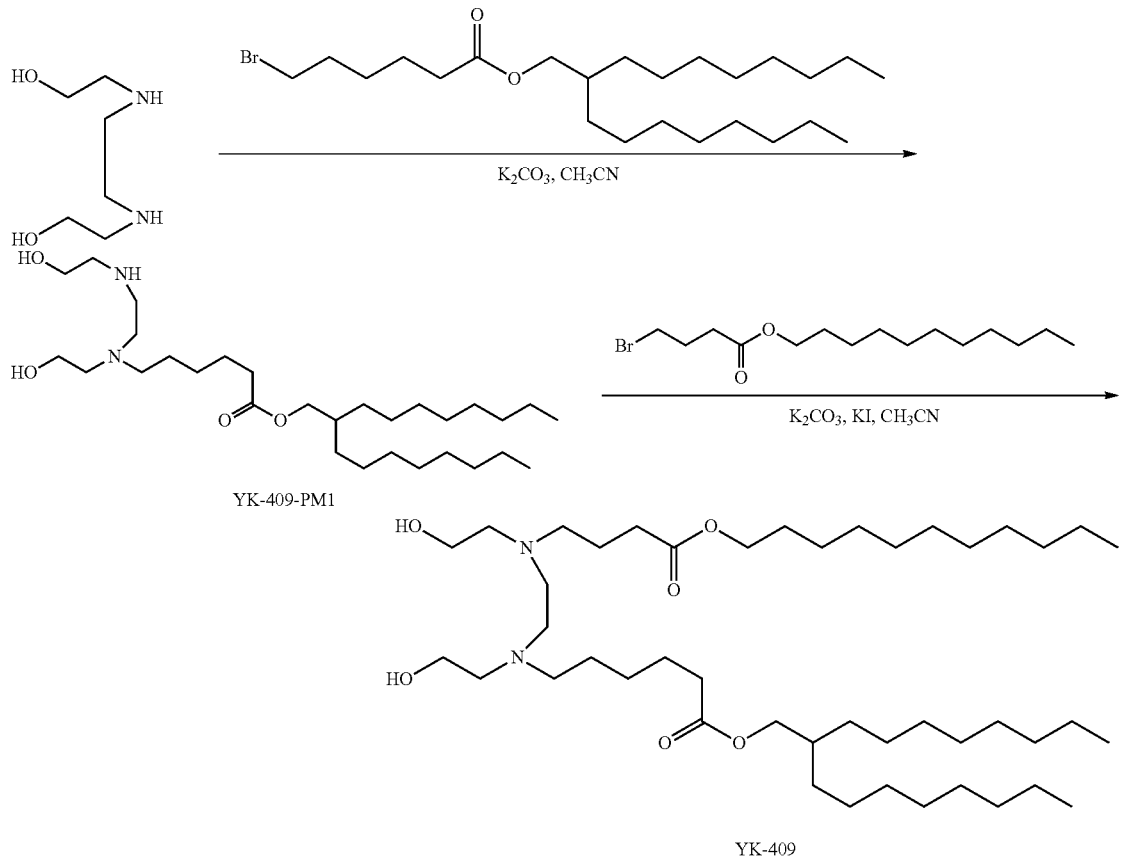

Step 1: Synthesis of 2-octyldecyl 6-(2-hydroxy-ethyl)(2-((2-hydroxyethyl)amino)ethyl)amino) hexanoate (YK-409-PM1)

According to the method for preparing YK-405-PM1, N,N'-bis(hydroxyethyl)ethylenediamine (298.0 mg, 2.01 mmol) and 2-octyldecyl 6-bromohexanoate(300 mg, 0.67 mmol) were used as raw materials to give YK-409-PM1 (144.7 mg, 0.28 mmol, 41.9%). $C_{30}H_{62}N_2O_4$, MS(ES): m/z (M+H$^+$) 515.4.

Step 2: Synthesis of 2-octyldecyl 6-((2-hydroxy-ethyl)(2-((2-hydroxyethyl)(4-(undecyloxy)-4-oxobutyl)amino)ethyl)amino) hexanoate (YK-409)

According to the method for preparing YK-401, YK-409-PM1(144.7 mg, 0.28 mmol) and undecyl 4-bromobutyrate (108.4 mg, 0.34 mmol) were used as raw materials to give YK-409(54.6 mg, 0.07 mmol, 25.8%), $C_{45}H_{90}N_2O_6$, MS(ES): m/z (M+H$^+$) 755.7.

$^1$H NMR (400 MHz, chloroform-d) δ 4.06 (t, J=6.8 Hz, 2H), 3.96 (d, J=5.8 Hz, 2H), 3.65-3.56 (m, 4H), 2.70-2.46 (m, 12H), 2.31 (td, J=7.3, 3.7 Hz, 4H), 1.81 (p, J=7.3 Hz, 2H), 1.70-1.56 (m, 5H), 1.51 (p, J=7.7 Hz, 2H), 1.28 (d, J=15.2 Hz, 46H), 0.88 (t, J=6.7 Hz, 9H).

Synthesis of YK-410
The synthesis route is as follows:

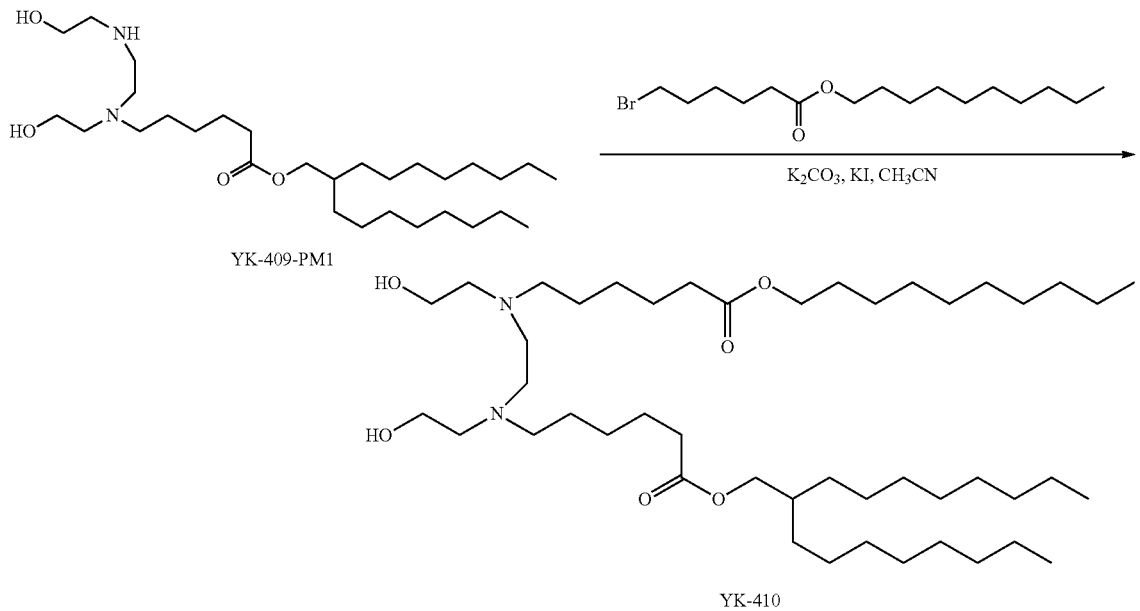

Synthesis of 2-octyldecyl 6-((2-hydroxyethyl)(2-((2-hydroxyethyl)(6-(decyloxy)-6-oxohexyl)amino)ethyl)amino)hexanoate (YK-410)

According to the method for preparing YK-401, YK-409-PM1(195.0 mg, 0.38 mmol) and n-decyl 6-bromohexanoate (190.5 mg, 0.57 mmol) were used as raw materials to give YK-410(141 mg, 0.18 mmol, 48.2%), $C_{46}H_{92}N_2O_6$, MS(ES): m/z (M+H$^+$) 769.7.

$^1$H NMR (400 MHz, chloroform-d) δ 4.05 (t, J=6.4 Hz, 2H), 3.96 (d, J=5.4 Hz, 2H), 3.61 (s, 4H), 2.63 (d, J=9.0 Hz, 8H), 2.58-2.50 (m, 4H), 2.30 (s, 4H), 1.77-1.57 (m, 8H), 1.55-1.46 (m, 4H), 1.26 (s, 44H), 0.87 (d, J=6.3 Hz, 9H).

Synthesis of YK-411
The synthesis route is as follows:

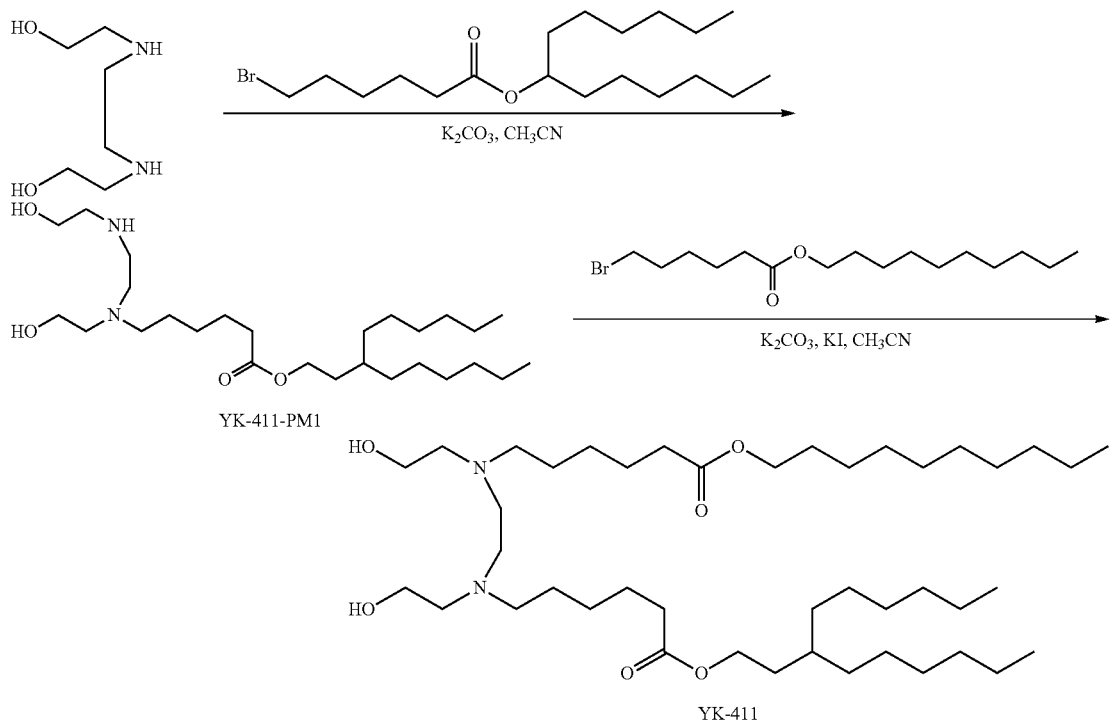

Step 1: Synthesis of 3-hexylnonyl 6-(2-hydroxyethyl)(2-((2-hydroxyethyl)amino)ethyl)amino)hexanoate (YK-411-PM1)

According to the method for preparing YK-405-PM1, N,N'-bis(hydroxyethyl)ethylenediamine (329.0 mg, 2.22 mmol) and 3-hexylnonyl 6-bromohexanoate (300 mg, 0.74 mmol) were used as raw materials to give YK-411-PM1 (103.1 mg, 0.22 mmol, 29.4%). $C_{27}H_{56}N_2O_4$, MS(ES): m/z (M+H$^+$) 473.4.

Step 2: Synthesis of 3-hexylnonyl 6-((2-hydroxyethyl)(2-((2-hydroxyethyl)(6-(decyloxy)-6-oxobutyl)amino)ethyl)amino)hexanoate (YK-411)

According to the method for preparing YK-401, YK-411-PM1 (103.1 mg, 0.22 mmol) and n-decyl 6-bromohexanoate (76.6 mg, 0.23 mmol) were used as raw materials to give YK-411 (68.6 mg, 0.09 mmol, 42.9%), $C_{43}H_{86}N_2O_6$, MS(ES): m/z (M+H$^+$) 727.7.

$^1$H NMR (400 MHz, chloroform-d) δ 4.07 (q, J=7.0 Hz, 4H), 3.64 (t, J=6.3 Hz, 4H), 2.69 (s, 8H), 2.30 (t, J=7.0 Hz, 4H), 1.58 (ddp, J=32.0, 15.4, 7.2 Hz, 13H), 1.28 (d, J=15.0 Hz, 42H), 0.88 (t, J=6.4 Hz, 9H).

Synthesis of YK-412

The synthesis route is as follows:

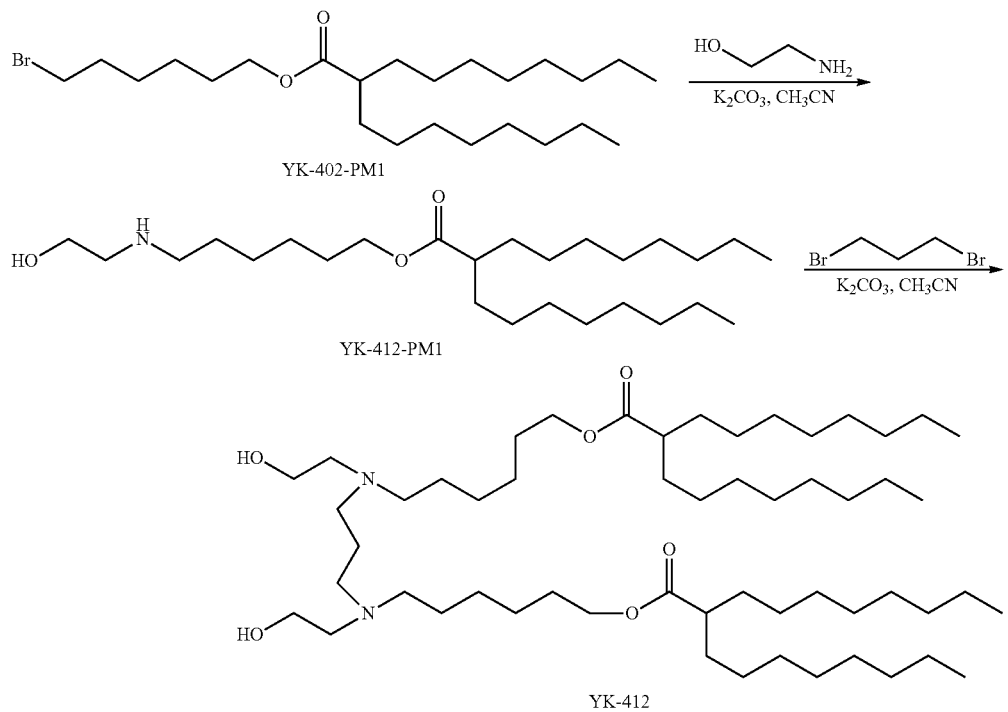

Step 1: Synthesis of 6-(2-hydroxyethyl-amino)hexyl 2-octyldecanoate (YK-412-PM1)

According to the method for preparing YK-401, 6-bromohexyl 2-octyldecanoate (YK-412-PM1) (250.0 mg, 0.56 mmol) and ethanolamine (136.5 mg, 2.23 mmol) were used as raw materials to give YK-412-PM1 (165 mg, 0.39 mmol, 68.9%). $C_{26}H_{53}NO_3$, MS(ES): m/z (M+H$^+$) 428.4.

Step 2: Synthesis of (propane-1,3-diyl-bis((2-hydroxyethyl)azanediyl))-bis(hexane-6,1-diyl)bis(2-octyldecanoate)(YK-412)

According to the method for preparing YK-401, YK-412-PM1 (165 mg, 0.39 mmol) and 1,3-dibromopropane (42.8 mg, 0.21 mmol) were used as raw materials to give YK-412 (94 mg, 0.10 mmol, 53.8%), $C_{55}H_{110}N_2O_6$, MS(ES): m/z (M+H$^+$) 895.8.

$^1$H NMR (400 MHz, chloroform-d) δ 4.06 (t, J=6.6 Hz, 4H), 3.61 (s, 4H), 2.60 (d, J=15.9 Hz, 8H), 2.51 (s, 4H), 2.32 (dt, J=9.9, 5.1 Hz, 2H), 1.61 (tt, J=14.4, 7.0 Hz, 12H), 1.25 (s, 62H), 0.88 (t, J=6.6 Hz, 12H).

Synthesis of YK-413
The synthesis route is as follows:
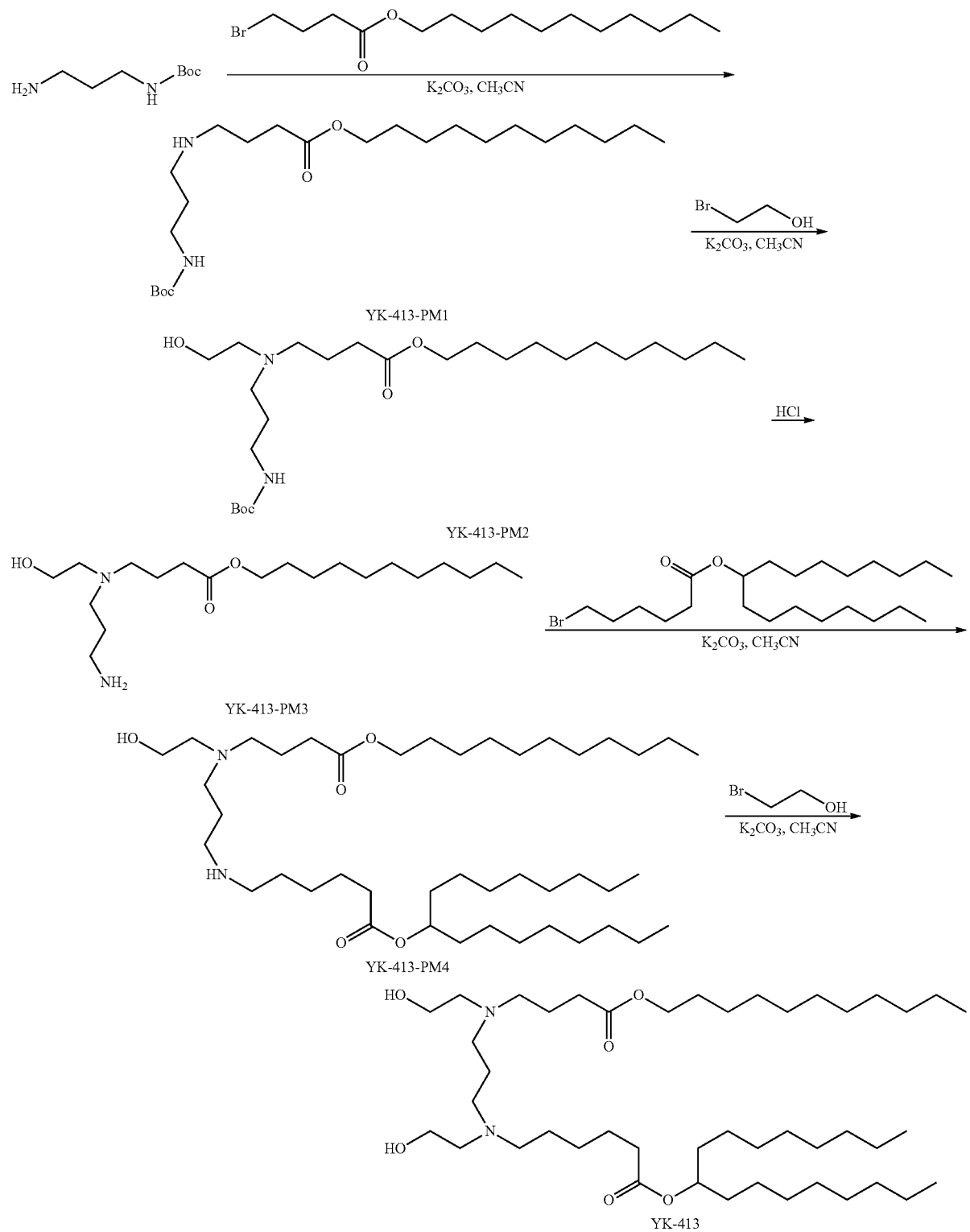

Step 1: Synthesis of undecyl 4-((3-(tert-butoxycarbonyl)amino)propyl)aminobutyrate (YK-413-PM1)

According to the method for preparing YK-401, tert-butyl (3-aminopropyl)aminoformate (4.88 g, 28.01 mmol) and undecyl 4-bromobutyrate (3.00 g, 9.34 mmol) were used as raw materials to give YK-413-PM1(2.00 g, 4.81 mmol, 51.5%). $C_{23}H_{46}N_2O_4$, MS(ES): m/z (M+H$^+$) 415.5.

Step 2: Synthesis of undecyl 4-((3-(tert-butoxycarbonyl)amino)propyl)(2-hydroxyethyl)amino)butyrate (YK-413-PM2)

According to the method for preparing YK-401, YK-413-PM1(2.00 g, 4.81 mmol) and bromoethanol (1.80 g, 14.40 mmol) were used as raw materials to give YK-413-PM2 (2.20 g, 4.80 mmol, 99.8%). $C_{25}H_{50}N_2O_5$, MS(ES): m/z (M+H$^+$) 459.4.

Step 3: Synthesis of undecyl 4-(3-aminopropyl)((2-hydroxyethyl)amino)butyrate (YK-413-PM3)

YK-413-PM2 (2.20 g, 4.80 mmol) was dissolved in tetrahydrofuran (10 mL), and the temperature of the system was controlled at 0° C. A solution of 4M hydrogen chloride in dioxane (12 mL) was slowly added dropwise, and the mixture was slowly heated to room temperature and reacted for 2 hours. After the reaction was completed, the mixture was adjusted to pH of 7-8 by dropwise addition of saturated sodium bicarbonate solution. The aqueous phase was washed with dichloromethane (20 mL×2), and the layers were separated. The organic phase was dried over anhydrous sodium sulfate, and filtered. The filtrate was concentrated under reduced pressure in vacuum to remove the solvent to obtain YK-413-PM3(1.09 g, 3.05 mmol, 63.5%). $C_{20}H_{42}N_2O_3$, MS(ES): m/z (M+H$^+$) 359.3.

Step 4: Synthesis of heptadecan-9-yl 6-((3-(2-hydroxyethyl)(4-oxo-4-(undecyloxy)butyl)amino)propyl)amino)hexanoate (YK-413-PM4)

According to the method for preparing YK-401, YK-413-PM3(480 mg, 1.34 mmol) and heptadecan-9-yl 6-bromohexanoate (580.3 mg, 1.34 mmol) were used as raw materials to give YK-413-PM4 (398.9 mg, 0.56 mmol, 41.8%). $C_{43}H_{86}N_2O_5$, MS(ES): m/z (M+H$^+$) 711.7.

Step 5: Synthesis of heptadecan-9-yl 6-((2-hydroxyethyl)(3-((2-hydroxyethyl)(4-oxo-4-(undecyloxy)butyl)amino)propyl)amino)hexanoate (YK-413)

According to the method for preparing YK-401, YK-413-PM4(398.9 mg, 0.56 mmol) and bromoethanol (310.2 mg, 2.48 mmol) were used as raw materials to give YK-413 (104.8 mg, 0.14 mmol, 24.8%). $C_{45}H_{90}N_2O_6$, MS(ES): m/z (M+H$^+$) 755.8.

$^1$H NMR (400 MHz, CDCl$_3$) δ 4.90-4.81 (m, 1H), 4.06 (t, J=6.8 Hz, 2H), 3.67 (s, 4H), 2.70 (s, 12H), 2.37-2.28 (m, 4H), 1.85-1.79 (m, 2H), 1.68-1.58 (m, 6H), 1.50 (d, J=5.3 Hz, 4H), 1.26 (s, 44H), 0.88 (t, J=6.6 Hz, 9H).

Synthesis of YK-414

The synthesis route is as follows:

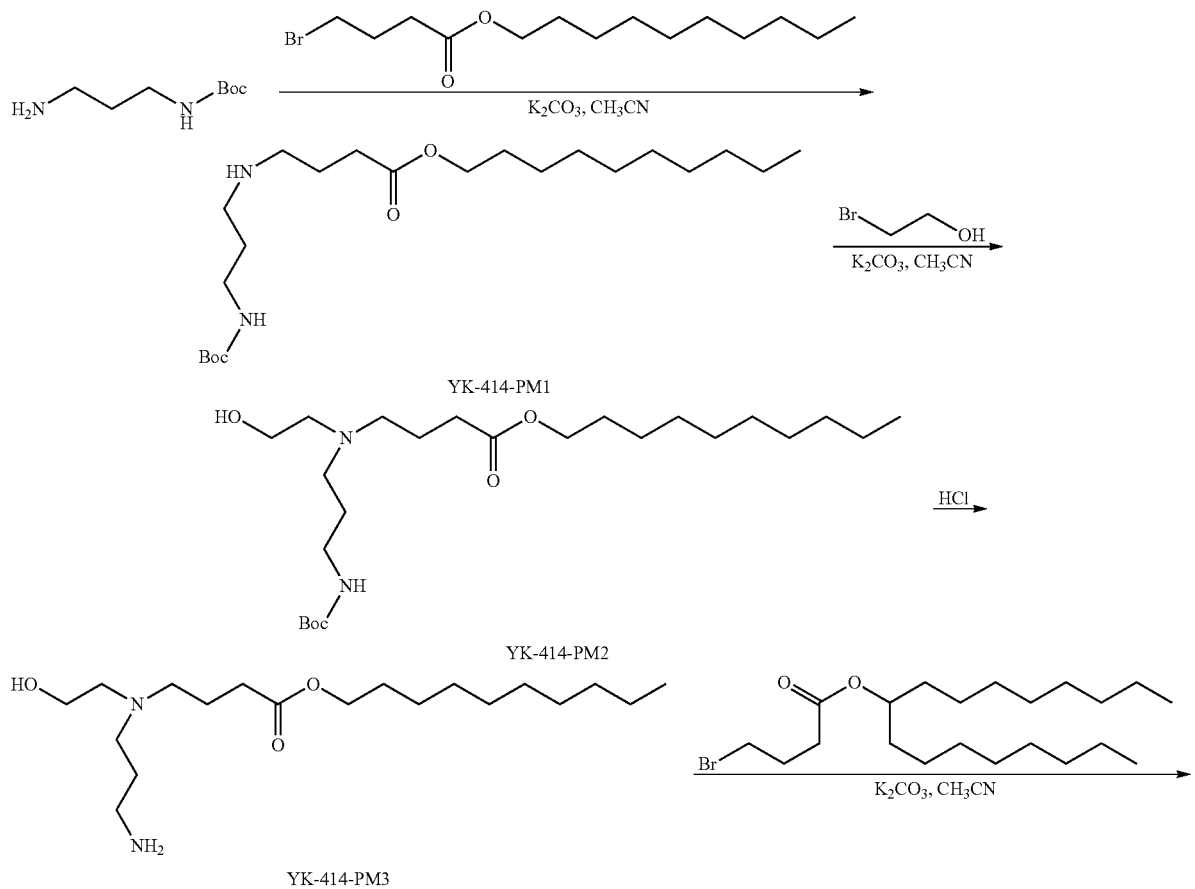

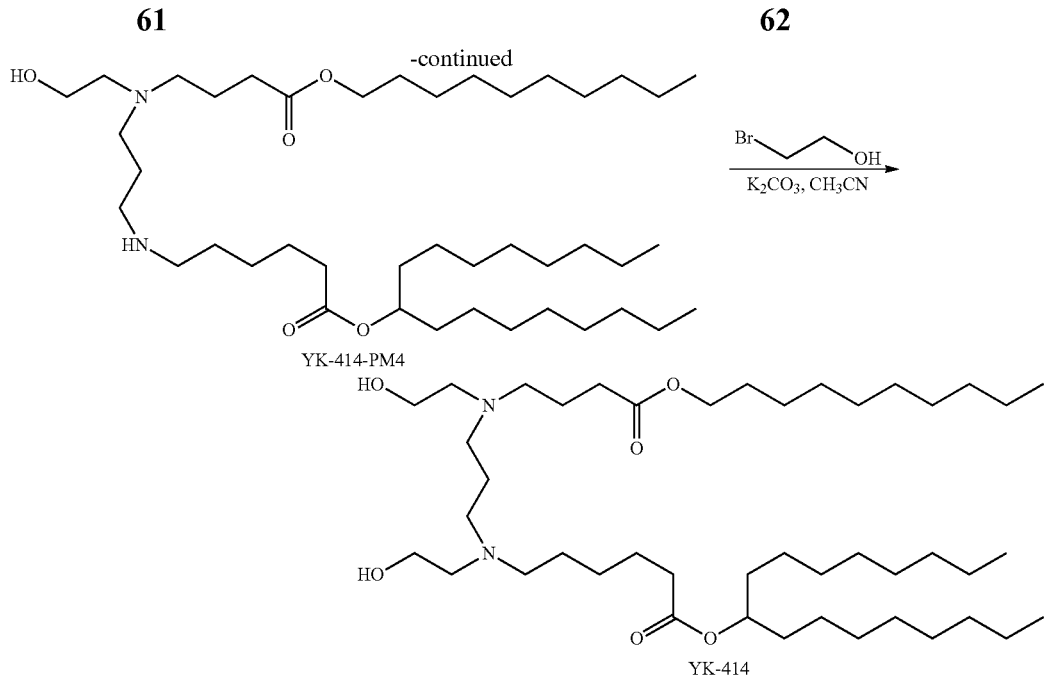

Step 1: Synthesis of decyl 4-((3-(tert-butoxycarbonyl)amino)propyl)aminobutyrate (YK-414-PM1)

According to the method for preparing YK-401, tert-butyl (3-aminopropyl)carbamate (577.8 mg, 3.32 mmol) and n-decyl 4-bromobutyrate (1.00 g, 3.25 mmol) were used as raw materials to give YK-414-PM1(760 mg, 1.90 mmol, 58.4%). $C_{22}H_{44}N_2O_4$, MS(ES): m/z (M+H$^+$) 401.4.

Step 2: Synthesis of decyl 4-((3-(tert-butoxycarbonyl)amino)propyl)(2-hydroxyethyl)amino) butyrate (YK-414-PM2)

According to the method for preparing YK-401, YK-414-PM1(760 mg, 1.90 mmol) and bromoethanol (284.0 mg, 2.27 mmol) were used as raw materials to give YK-414-PM2(600 mg, 1.35 mmol, 71.0%). $C_{24}H_{48}N_2O_5$, MS(ES): m/z (M+H$^+$) 445.3.

Step 3: Synthesis of decyl 4-((3-aminopropyl)(2-hydroxyethyl)amino)butyrate (YK-414-PM3)

According to the method for preparing YK-413-PM3, YK-414-PM2 (600 mg, 1.35 mmol) was used as raw material to give YK-414-PM3(465 mg, 1.35 mmol, 100%). $C_{19}H_{40}N_2O_3$, MS(ES): m/z (M+H$^+$) 345.3.

Step 4: Synthesis of decyl 4-((3-(heptadecan-9-yloxy)-4-oxobutyl)amino)propyl)(2-hydroxyethyl) amino)butyrate (YK-414-PM4)

According to the method for preparing YK-401, YK-414-PM3(344.5 mg, 1.00 mmol) and heptadecan-9-yl 4-bromobutyrate (405.5 mg, 1.00 mmol) were used as raw materials to give YK-414-PM4(308.0 mg, 0.46 mmol, 46.0%). $C_{40}H_{80}N_2O_5$, MS(ES): m/z (M+H$^+$) 669.6.

Step 5: Synthesis of decyl 4-(3-((4-(heptadecan-9-yloxy)-4-oxobutyl)(2-hydroxyethyl)amino)propyl) (2-hydroxyethyl)aminobutyrate (YK-414)

According to the method for preparing YK-401, YK-414-PM4(308.0 mg, 0.46 mmol) and bromoethanol (172.4 mg, 1.38 mmol) were used as raw materials to give YK-414(80.0 mg, 0.11 mmol, 23.9%). $C_{42}H_{84}N_2O_6$, MS(ES): m/z (M+H$^+$) 713.6.

$^1$H NMR (400 MHz, CDCl$_3$) δ 4.94-4.84 (m, 1H), 4.09 (t, J=6.8 Hz, 2H), 3.74 (s, 4H), 2.79 (s, 12H), 2.38 (d, J=6.5 Hz, 4H), 1.88 (s, 4H), 1.71-1.60 (m, 4H), 1.54 (s, 4H), 1.31 (d, J=16.1 Hz, 38H), 0.91 (t, J=6.6 Hz, 9H).

Synthesis of YK-415

The synthesis route is as follows:

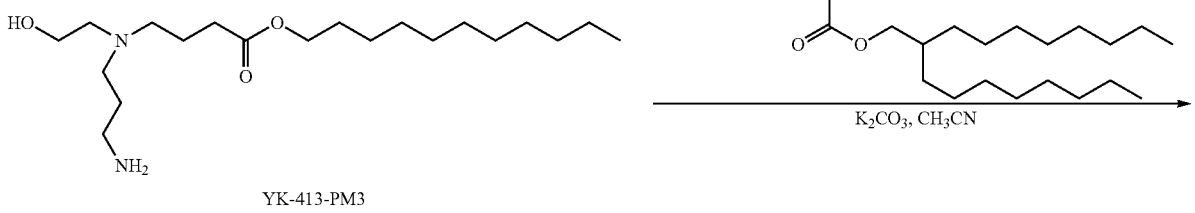

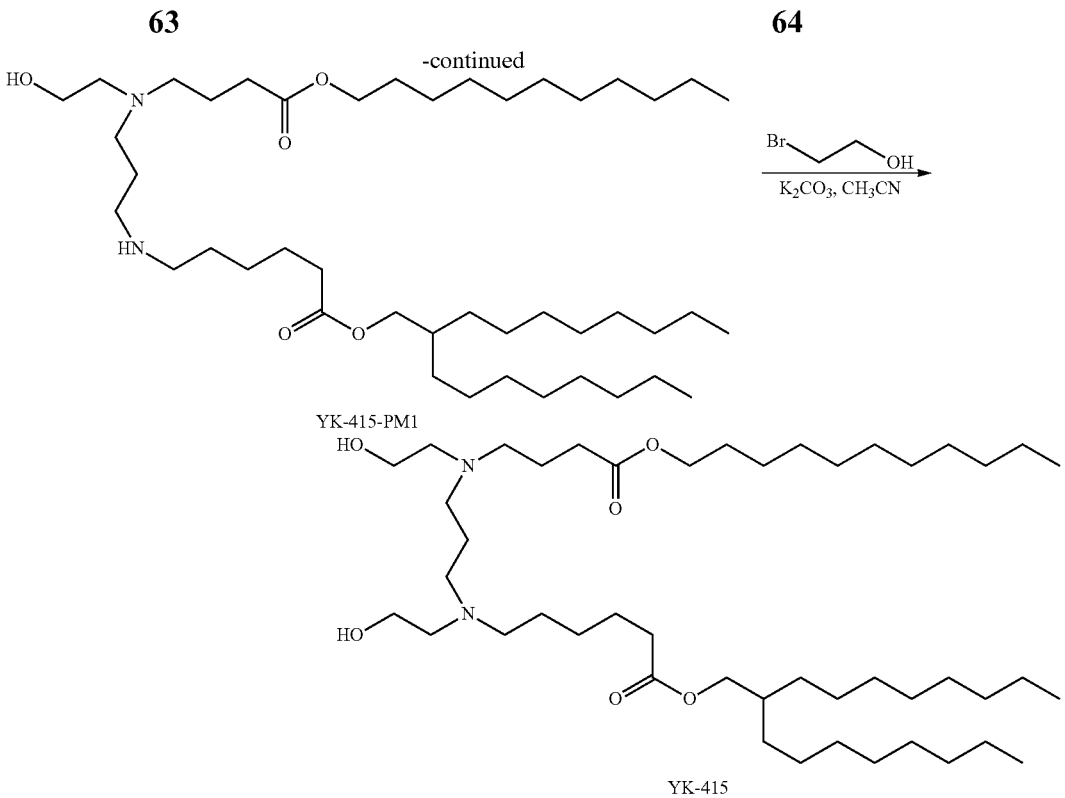

YK-415-PM1

YK-415

Step 1: Synthesis of 2-octyldecyl 6-((3-(2-hydroxyethyl)(4-oxo-4-(undecyloxy)butyl)amino)propyl)amino)hexanoate (YK-415-PM1)

According to the method for preparing YK-401, YK-413-PM3(300 mg, 0.84 mmol) and 2-octyldecyl 6-bromohexanoate(374.0 mg, 0.84 mmol) were used as raw materials to give YK-415-PM1(320.0 mg, 0.44 mmol, 52.4%). $C_{44}H_{88}N_2O_5$, MS(ES): m/z (M+H$^+$) 725.7.

Step 2: Synthesis of 2-octyldecyl 6-((2-hydroxyethyl)(3-((2-hydroxyethyl)(4-oxo-4-(undecyloxy)butyl)amino)propyl)amino)hexanoate (YK-415)

According to the method for preparing YK-401, YK-415-PM1(320.0 mg, 0.44 mmol) and bromoethanol (200.0 mg, 1.60 mmol) were used as raw materials to give YK-415(37.0 mg, 0.05 mmol, 10.9%). $C_{46}H_{92}N_2O_6$, MS(ES): m/z (M+H$^+$) 769.8.

$^1$H NMR (400 MHz, CDCl$_3$) δ 4.07 (t, J=6.5 Hz, 4H), 3.96 (d, J=5.6 Hz, 2H), 3.30 (s, 4H), 3.16 (s, 2H), 2.48 (s, 2H), 2.33 (t, J=7.0 Hz, 2H), 2.25-2.18 (m, 2H), 2.02 (s, 2H), 1.90 (s, 3H), 1.62 (s, 8H), 1.43 (s, 4H), 1.28 (d, J=15.2 Hz, 48H), 0.87 (d, J=7.0 Hz, 9H).

Synthesis of YK-416

The synthesis route is as follows:

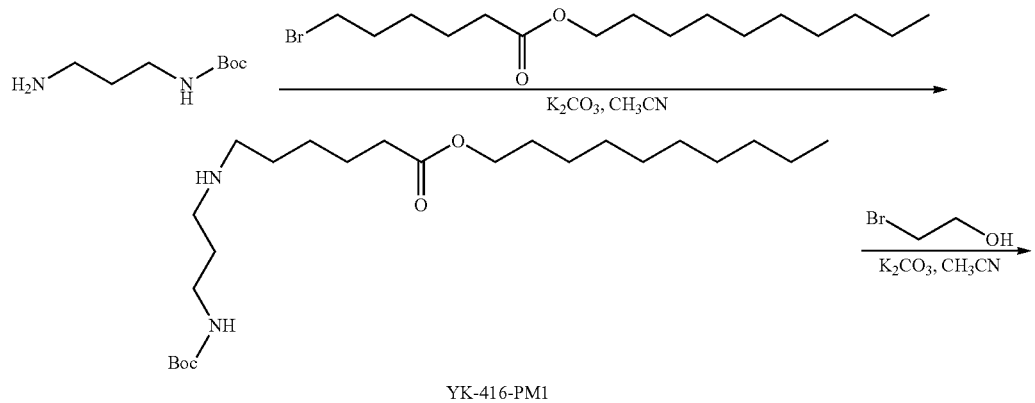

YK-416-PM1

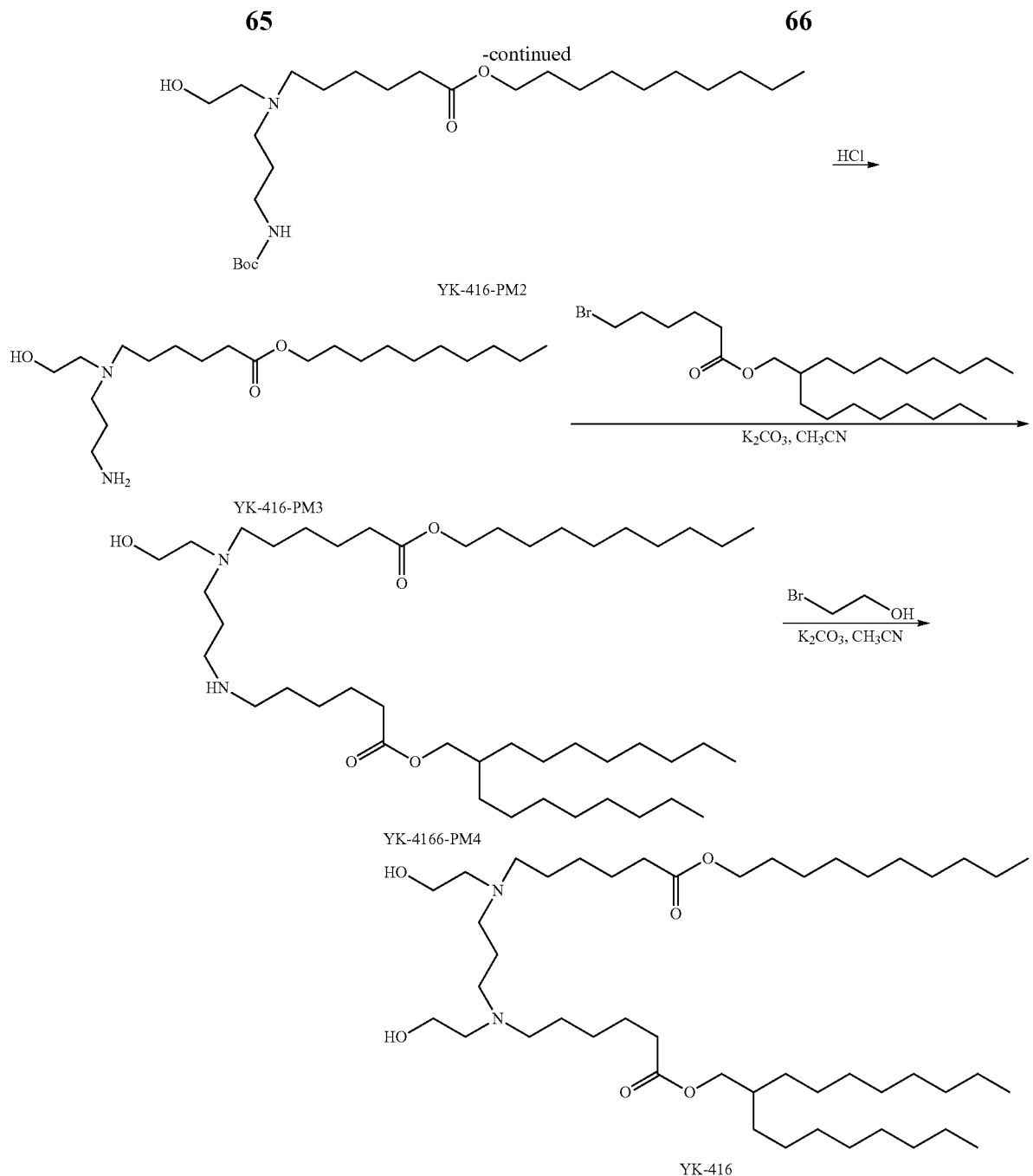

Step 1: Synthesis of decyl 6-(3-(tert-butoxycarbonyl)amino)propyl)aminohexanoate (YK-416-PM1)

According to the method for preparing YK-401, tert-butyl (3-aminopropyl)carbamate (1.14 g, 6.54 mmol) and n-decyl 6-bromohexanoate (2.20 g, 6.56 mmol) were used as raw materials to give YK-416-PM1(754 mg, 1.76 mmol, 26.9%). $C_{24}H_{48}N_2O_4$, MS(ES): m/z (M+H$^+$) 429.3.

Step 2: Synthesis of decyl 6-((3-((tert-butoxycarbonyl)amino)propyl)(2-hydroxyethyl)amino)hexanoate (YK-416-PM2)

According to the method for preparing YK-401, YK-416-PM1(754 mg, 1.76 mmol) and bromoethanol (284.0 mg, 2.27 mmol) were used as raw materials to give YK-416-PM2(620 mg, 1.31 mmol, 74.5%). $C_{26}H_{52}N_2O_5$, MS(ES): m/z (M+H$^+$) 473.4.

Step 3: Synthesis of decyl 6-((3-aminopropyl)(2-hydroxyethyl)amino)hexanoate (YK-416-PM3)

According to the method for preparing YK-413-PM3, YK-416-PM2 (620 mg, 1.31 mmol) was used as material to give YK-416-PM3(488 mg, 1.31 mmol, 100%). $C_{21}H_{44}N_2O_3$, MS(ES): m/z (M+H$^+$) 373.3.

Step 4: Synthesis of decyl 6-((2-hydroxyethyl)(3-((6-((2-octyldecyl)oxy)-6-oxohexyl)amino)propyl) amino)hexanoate (YK-416-PM4)

According to the method for preparing YK-401, YK-416-PM3(244 mg, 0.65 mmol) and 2-octyldecyl 6-bromo-hexanoate(278.5 mg, 0.62 mmol) were used as raw materials to give YK-416-PM4(58 mg, 0.08 mmol, 12.6%). $C_{45}H_{90}N_2O_5$, MS(ES): m/z (M+H$^+$) 739.7.

Step 5: Synthesis of decyl 6-((2-hydroxyethyl)(3-((2-hydroxyethyl)(6-((2-octyldecyl)oxy)-6-oxo-hexyl)amino)propyl) amino)hexanoate (YK-416)

According to the method for preparing YK-401, YK-416-PM4(58 mg, 0.08 mmol) and bromoethanol (19.6 mg, 0.16 mmol) were used as raw materials to give YK-416(30 mg, 0.04 mmol, 48.8%). $C_{47}H_{94}N_2O_6$, MS(ES): m/z (M+H$^+$) 783.7.

$^1$H NMR (400 MHz, CDCl$_3$) δ 4.05 (t, J=6.8 Hz, 2H), 3.96 (d, J=5.8 Hz, 2H), 3.90 (s, 2H), 3.14 (s, 2H), 3.06 (s, 2H), 2.95 (s, 2H), 2.32 (t, J=7.3 Hz, 4H), 2.26-2.16 (m, 2H), 2.02 (s, 1H), 1.73 (s, 4H), 1.69-1.59 (m, 8H), 1.44-1.36 (m, 4H), 1.28 (d, J=14.6 Hz, 48H), 0.88 (t, J=6.7 Hz, 9H).

Synthesis of YK-417
The synthesis route is as follows:

Step 1: Synthesis of decyl 6-((3-((6-((3-hexyl)oxy)-6-oxohexyl)amino)propyl)(2-hydroxyethyl)amino) hexanoate (YK-417-PM1)

According to the method for preparing YK-401, YK-416-PM3(81.1 mg, 0.22 mmol) and 3-hexylnonyl 6-bromo-hexanoate (83.9 mg, 0.21 mmol) were used as raw materials to give YK-417-PM1(44.3 mg, 0.06 mmol, 30.3%). $C_{42}H_{84}N_2O_5$, MS(ES): m/z (M+H$^+$) 697.6.

Step 2: Synthesis of decyl 6-((3-((6-((3-hexyl)oxy)-6-oxohexyl)(2-hydroxyethyl)amino)propyl)(2-hydroxyethyl)amino)hexanoate (YK-417)

According to the method for preparing YK-401, YK-417-PM1(44.3 mg, 0.06 mmol) and bromoethanol (15.9 mg, 0.13 mmol) were used as raw materials to give YK-417(26.3 mg, 0.04 mmol, 59.1%). $C_{44}H_{88}N_2O_6$, MS(ES): m/z (M+H$^+$) 741.7.

$^1$H NMR (400 MHz, CDCl$_3$) δ 4.06 (dd, J=15.3, 8.1 Hz, 4H), 3.82 (s, 2H), 2.94 (d, J=17.7 Hz, 6H), 2.82 (s, 2H), 2.36-2.26 (m, 4H), 2.03 (d, J=11.7 Hz, 4H), 1.61 (ddd, J=21.2, 14.6, 7.3 Hz, 12H), 1.43-1.20 (m, 43H), 0.88 (t, J=6.4 Hz, 9H).

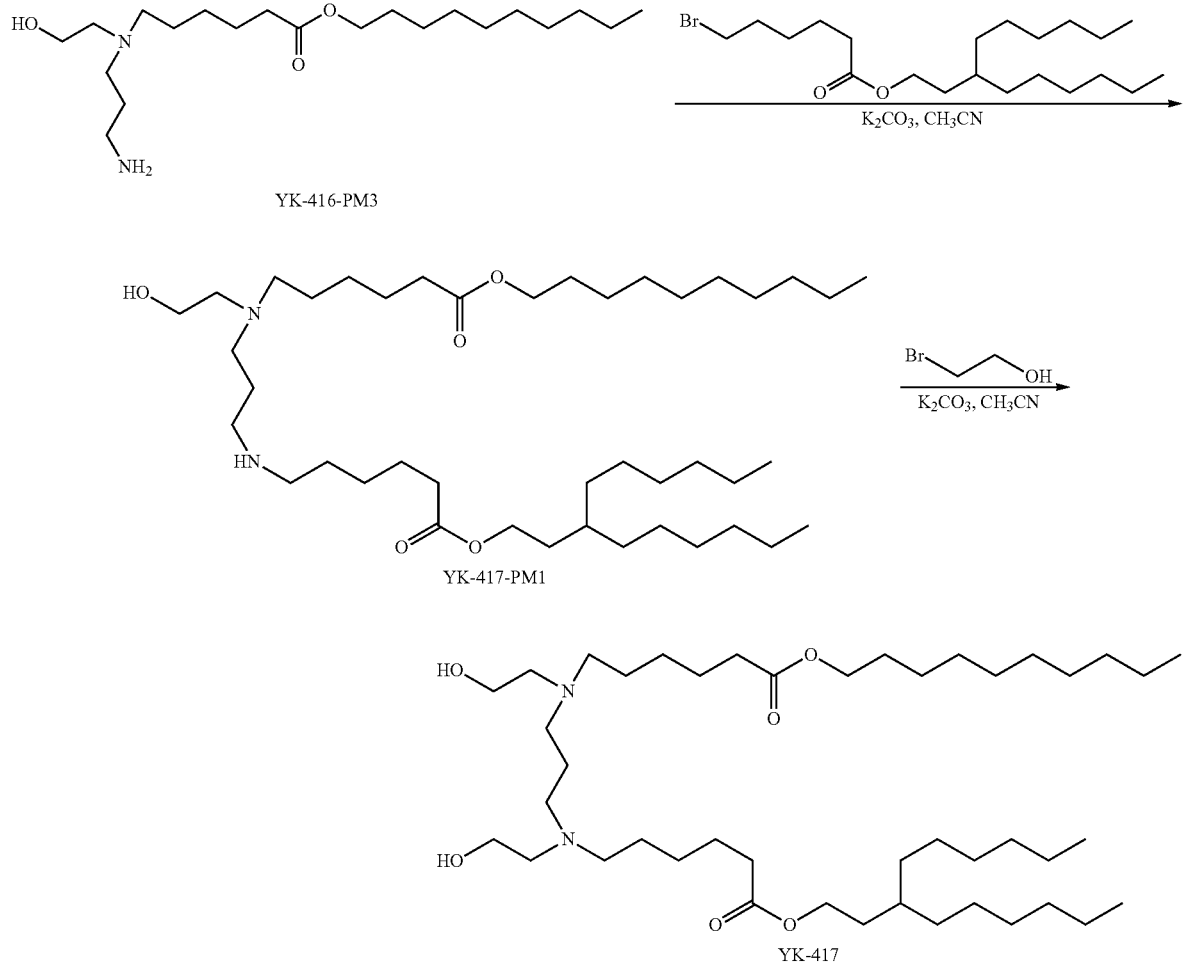

Synthesis of YK-418
The synthesis route is as follows:

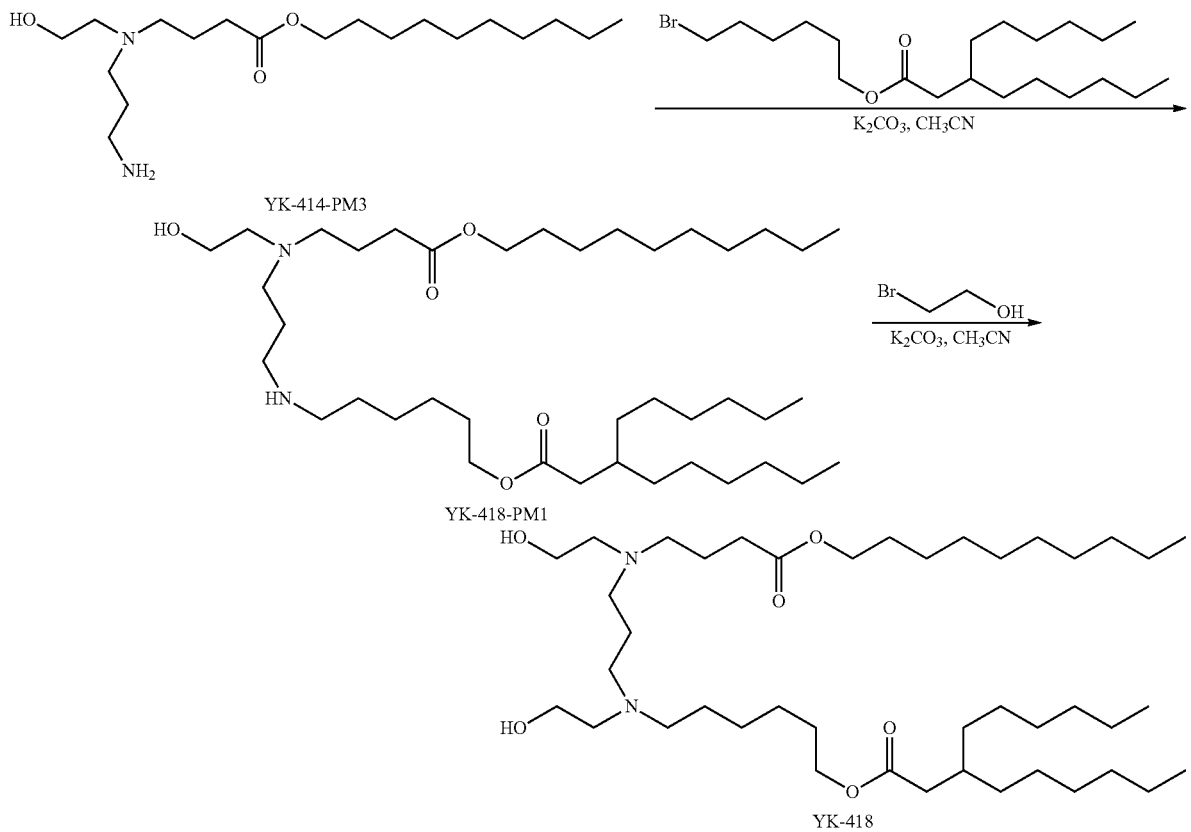

Step 1: Synthesis of 6-((3-((4-(decyloxy)-4-oxobutyl)(2-hydroxyethyl)amino)propyl)amino) hexyl 3-hexylnonanoate (YK-418-PM1)

According to the method for preparing YK-401, YK-414-PM3(231.7 mg, 0.67 mmol) and 6-bromohexyl 3-hexylnonanoate (258.4 mg, 0.64 mmol) were used as raw materials to give YK-418-PM1(111.5 mg, 0.17 mmol, 26.0%). $C_{40}H_{80}N_2O_5$, MS(ES): m/z (M+H$^+$) 669.6.

Step 2: Synthesis of 6-((3-((4-(decyloxy)-4-oxobutyl)(2-hydroxyethyl)amino)propyl)(2-hydroxyethyl)amino)hexyl 3-hexylnonanoate (YK-418)

According to the method for preparing YK-401, YK-418-PM1(111.5 mg, 0.17 mmol) and bromoethanol (25.0 mg, 0.20 mmol) were used as raw materials to give YK-418(26.3 mg, 0.04 mmol, 21.7%). $C_{42}H_{84}N_2O_6$, MS(ES): m/z (M+H$^+$) 713.6.

$^1$H NMR (400 MHz, chloroform-d) δ 4.05 (q, J=6.5 Hz, 4H), 3.68-3.50 (m, 4H), 2.76-2.48 (m, 12H), 2.32 (t, J=7.1 Hz, 2H), 2.22 (d, J=6.9 Hz, 2H), 1.81 (dt, J=15.0, 7.2 Hz, 3H), 1.68-1.56 (m, 6H), 1.50 (d, J=7.3 Hz, 2H), 1.28 (d, J=15.8 Hz, 38H), 0.88 (t, J=6.6 Hz, 9H).

Synthesis of YK-419
The synthesis route is as follows:

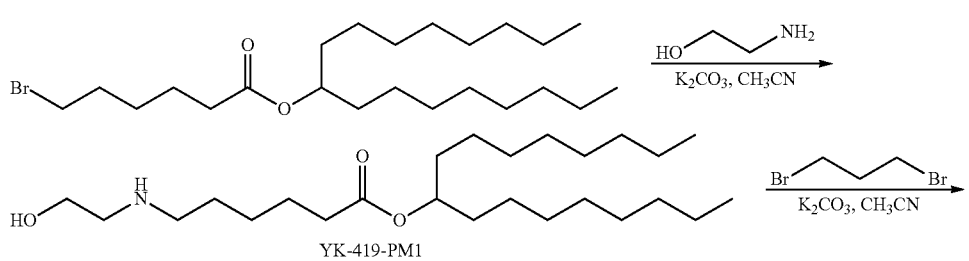

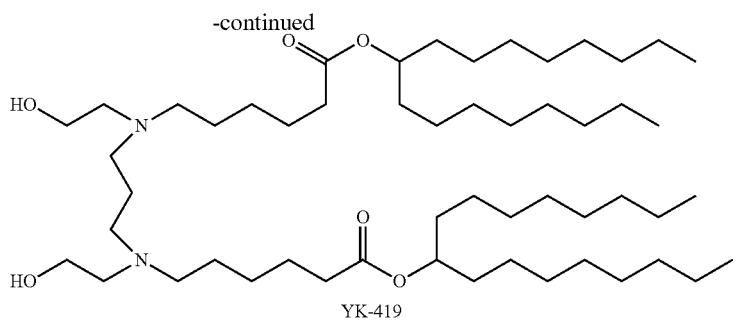

YK-419

Step 1: Synthesis of heptadecan-9-yl 6-((2-hydroxyethyl)amino)hexanoate (YK-419-PM1)

According to the method for preparing YK-401, heptadecan-9-yl 6-bromohexanoate (500 mg, 1.19 mmol) and ethanolamine (291.2 mg, 4.77 mmol) were used as raw materials to give YK-419-PM1(459.1 mg, 1.11 mmol, 93.3%). $C_{25}H_{51}NO_3$, MS(ES): m/z (M+H$^+$) 414.4.

Step 2: Synthesis of di(heptadecan-9-yl) 6,6'-(propane-1,3-diyl-bis((2-hydroxyethyl)azanediyl))dihexanoate (YK-419)

YK-419-PM1 (300.0 mg, 0.73 mmol) and potassium carbonate (302.7 mg, 2.19 mmol) were dissolved in acetonitrile (3 mL), and 1,3-dibromopropane (73.2 mg, 0.36 mmol) was slowly added to the system. The mixture was heated to 50° C. and stirred to react for 6 hours. After the reaction was completed, 20 mL of saturated aqueous sodium bicarbonate solution was added to the reaction solution, and the mixture was then extracted with dichloromethane (20 mL×2). The organic phases were combined and then washed with brine (20 mL×2), dried over anhydrous sodium sulfate, and filtered. The filtrate was concentrated under reduced pressure in vacuum to remove the solvent. The residue was purified by silica gel chromatography (dichloromethane/methanol) to give YK-419(47.5 mg, 0.05 mmol, 15.2%), $C_{53}H_{106}N_2O_6$, MS(ES): m/z (M+H$^+$) 867.8.

$^1$H NMR (400 MHz, chloroform-d) δ 4.86 (p, J=6.2 Hz, 2H), 3.69 (s, 4H), 2.73 (s, 8H), 2.67-2.60 (m, 4H), 2.29 (t, J=7.3 Hz, 4H), 1.84-1.75 (m, 2H), 1.64 (q, J=7.6 Hz, 4H), 1.55-1.47 (m, 10H), 1.26 (s, 56H), 0.88 (t, J=6.6 Hz, 12H).

Synthesis of YK-420

The synthesis route is as follows:

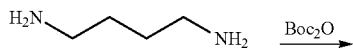

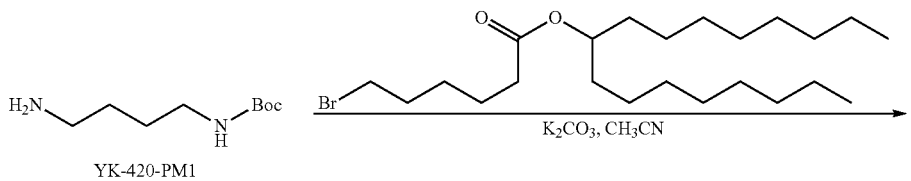

YK-420-PM1

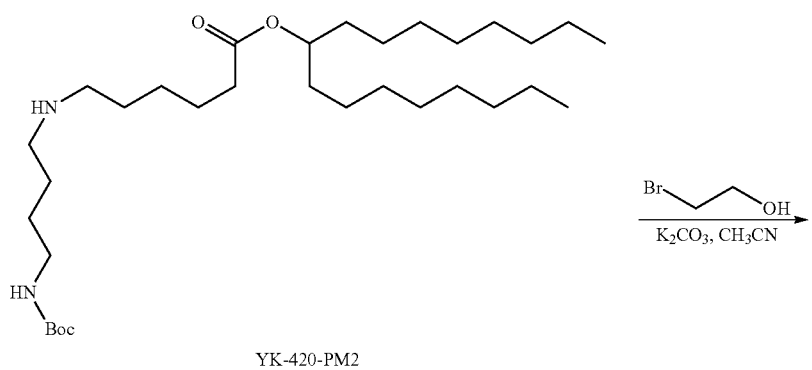

YK-420-PM2

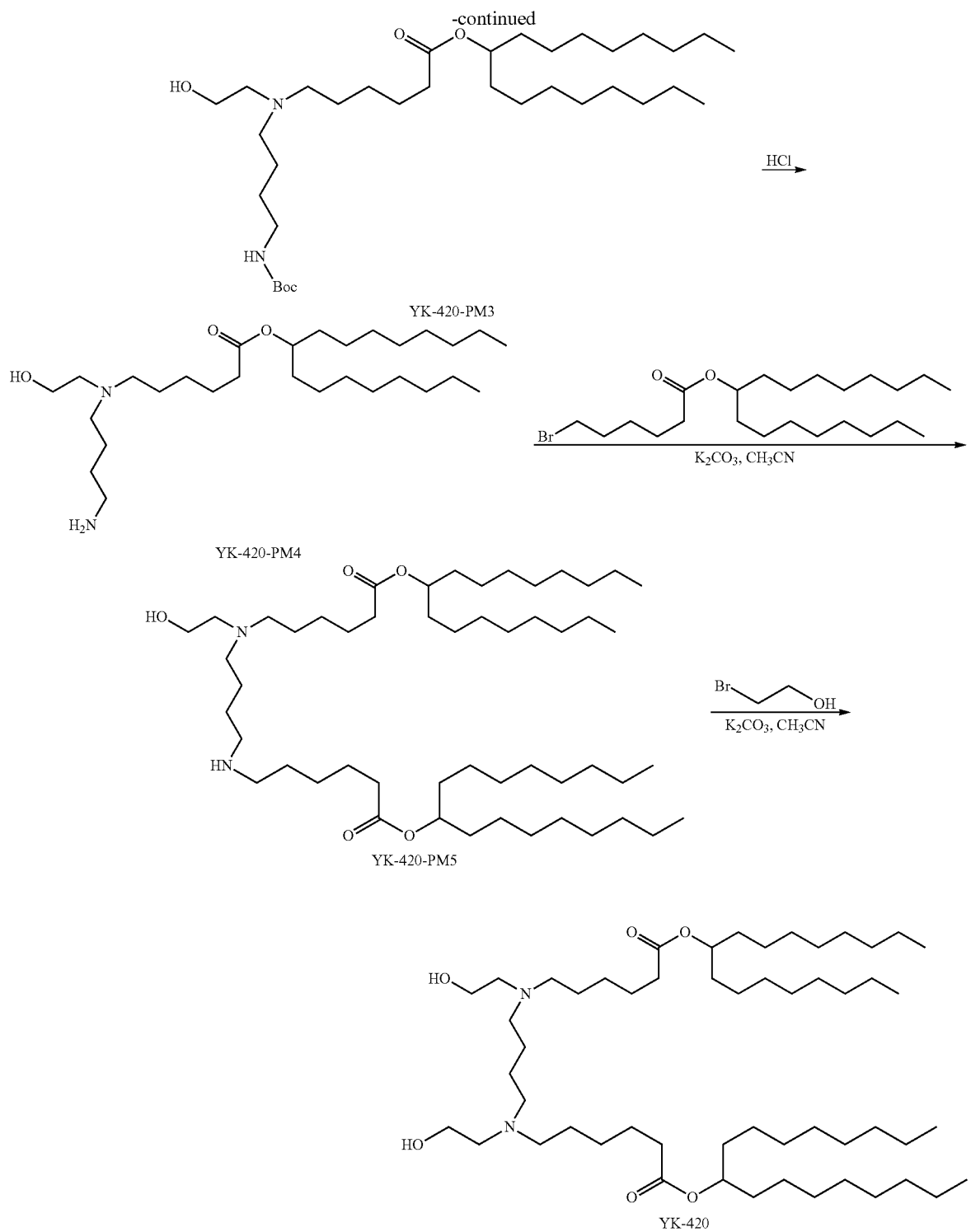

Step 1: Synthesis of tert-butyl (4-aminobutyl)-carbamate (YK-420-PM1)

1,4-Butanediamine (10.00 g, 113.44 mmol) was dissolved in dichloromethane (100 mL), and potassium carbonate (15.67 g, 113.44 mmol) was added. The temperature of the system was controlled at 15° C., and di-tert-butyl dicarbonate (6.20 g, 28.36 mmol) was slowly added dropwise. The mixture was slowly heated to room temperature and reacted for 2 hours. After the reaction was completed, the mixture was filtered through diatomaceous earth and the mother liquor was washed twice with saturated brine (100 mL×2). The layers were separated. The organic phase was dried over anhydrous sodium sulfate, and filtered. The filtrate was concentrated under reduced pressure in vacuum to remove the solvent to give YK-420-PM1(4616.4 mg, 24.52 mmol, 21.6%). $C_9H_{20}N_2O_2$, MS(ES). m/z (M+H$^+$) 189.2.

Step 2: Synthesis of heptadecan-9-yl 6-((4-(tert-butoxycarbonyl)amino)butyl)amino)hexanoate (YK-420-PM2)

According to the method for preparing YK-401, YK-420-PM1(1.04 g, 5.52 mmol) and heptadecan-9-yl 6-bromohexanoate(2.00 g, 4.77 mmol) were used as raw materials to give YK-420-PM2 (1.26 g, 2.33 mmol, 52.1%). $C_{32}H_{64}N_2O_4$, MS(ES): m/z (M+H$^+$) 541.5.

Step 3: Synthesis of heptadecan-9-yl 6-(((4-(tert-butoxycarbonyl)amino)butyl)(2-hydroxyethyl)amino)hexanoate (YK-420-PM3)

According to the method for preparing YK-401, YK-420-PM2(1.26 g, 2.33 mmol) and bromoethanol (0.35 g, 2.80 mmol) were used as raw materials to give YK-420-PM3 (980.4 mg, 1.68 mmol, 72.1%). $C_{34}H_{68}N_2O_5$, MS(ES): m/z (M+H$^+$) 585.5.

Step 4: Synthesis of heptadecan-9-yl 6-((4-aminobutyl)(2-hydroxyethyl)amino)hexanoate (YK-420-PM4)

According to the method for preparing YK-413-PM3, YK-420-PM3 (980.4 mg, 1.68 mmol) was used as raw material to give YK-420-PM4(814.5 mg, 1.68 mmol, 100%). $C_{29}H_{60}N_2O_3$, MS(ES): m/z (M+H$^+$) 485.5.

Step 5: Synthesis of heptadecan-9-yl 6-((4-((6-(heptadecan-9-yloxy)-6-oxohexyl)(2-hydroxyethyl)amino)butyl)amino)hexanoate (YK-420-PM5)

According to the method for preparing YK-401, YK-420-PM4(814.5 mg, 1.68 mmol) and heptadecan-9-yl 6-bromohexanoate(740.4 mg, 1.76 mmol) were used as raw materials to give YK-420-PM5(306.0 mg, 0.37 mmol, 22.0%). $C_{52}H_{104}N_2O_5$, MS(ES): m/z (M+H$^+$) 837.9.

Step 6: Synthesis of di(heptadecan-9-yl) 6,6'-(butane-1,4-diyl bis((2-hydroxyethyl)azanediyl))dihexanoate (YK-420)

According to the method for preparing YK-401, YK-420-PM5(306.0 mg, 0.37 mmol) and bromoethanol (54.8 mg, 0.44 mmol) were used as raw materials to give YK-420 (130.5 mg, 0.15 mmol, 40.5%). $C_{54}H_{108}N_2O_6$, MS(ES): m/z (M+H$^+$) 881.8.

$^1$H NMR (400 MHz, CDCl$_3$) δ 4.93-4.83 (m, 2H), 3.84 (s, 4H), 2.94 (d, J=24.3 Hz, 9H), 2.33 (t, J=7.4 Hz, 4H), 1.82 (s, 4H), 1.68 (dd, J=15.3, 7.6 Hz, 9H), 1.53 (d, J=5.5 Hz, 8H), 1.43-1.37 (m, 5H), 1.29 (s, 51H), 0.91 (t, J=6.7 Hz, 12H).

Synthesis of YK-421

The synthesis route is as follows:

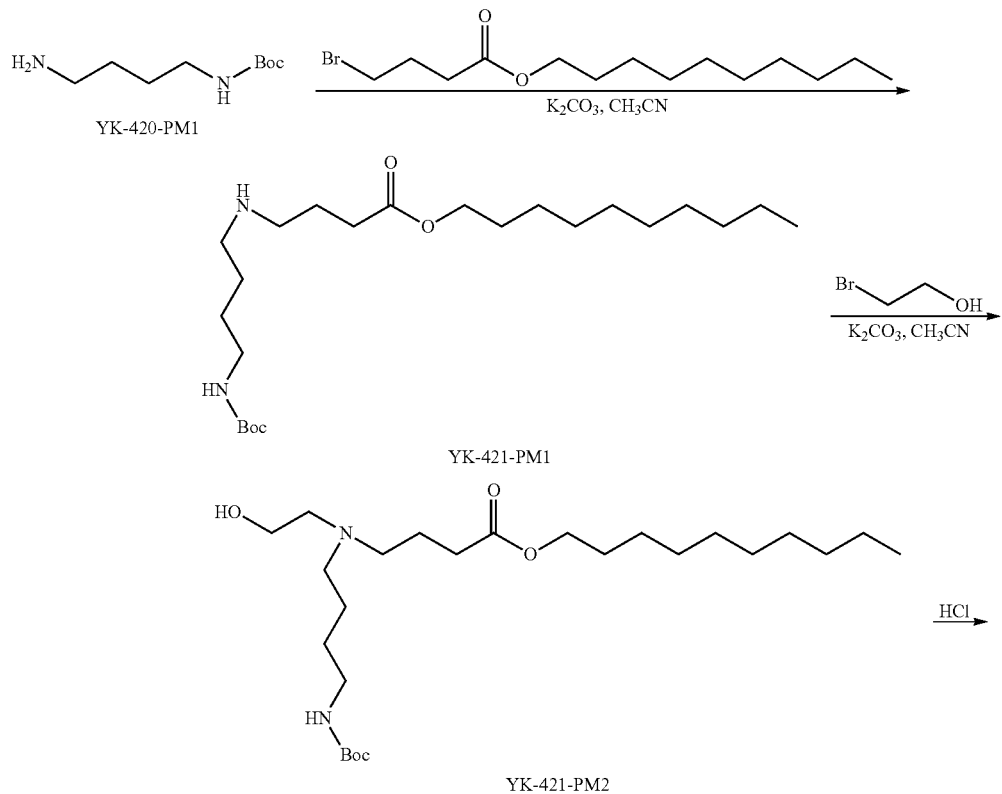

-continued

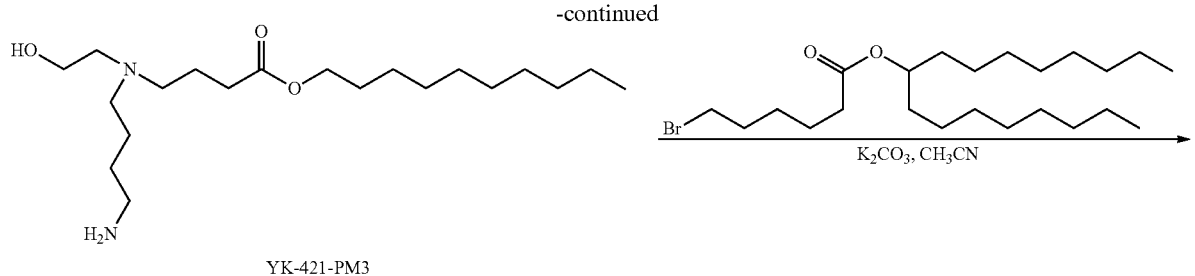
YK-421-PM3

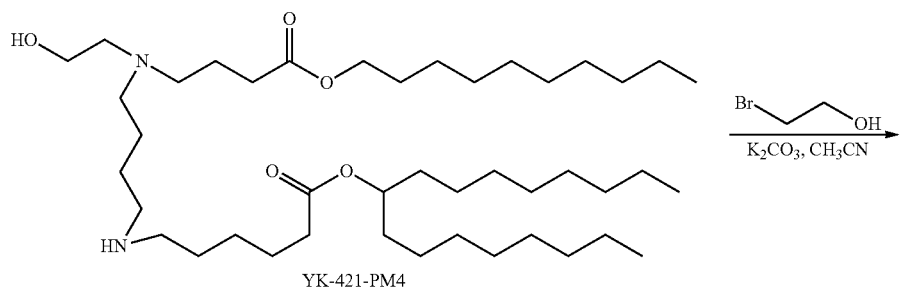
YK-421-PM4

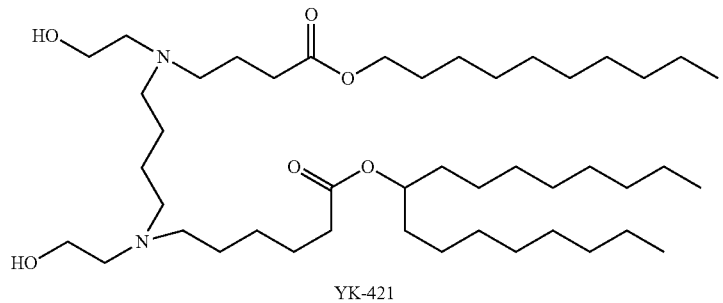
YK-421

Step 1: Synthesis of decyl 4-((4-((tert-butoxycarbonyl)amino)butyl)amino)butyrate (YK-421-PM1)

According to the method for preparing YK-401, YK-420-PM1(2.00 g, 10.62 mmol) and decyl 4-bromobutyrate (3.20 g, 10.41 mmol) were used as raw materials to give YK-421-PM1 (1300 mg, 3.14 mmol, 30.1%). $C_{23}H_{46}N_2O_4$, MS(ES): m/z (M+H$^+$) 415.4.

Step 2: Synthesis of decyl 4-((4-((tert-butoxycarbonyl)amino)butyl)(2-hydroxyethyl)amino)butyrate (YK-421-PM2)

According to the method for preparing YK-401, YK-421-PM1(1.30 g, 3.14 mmol) and bromoethanol (469 mg, 3.75 mmol) were used as raw materials to give YK-421-PM2 (1.20 g, 2.62 mmol, 83.3%). $C_{25}H_{50}N_2O_5$, MS(ES): m/z (M+H$^+$) 459.4.

Step 3: Synthesis of decyl 4-((4-aminobutyl)(2-hydroxyethyl)amino)butyrate (YK-421-PM3)

According to the method for preparing YK-413-PM3, YK-421-PM2 (1.20 g, 2.62 mmol) was used as raw material to give YK-421-PM3(720 mg, 2.01 mmol, 76.6%). $C_{20}H_{42}N_2O_3$, MS(ES): m/z (M+H$^+$) 359.3.

Step 4: Synthesis of heptadecan-9-yl 6-((4-((4-(decyloxy)-4-oxobutyl)(2-hydroxyethyl)amino) butyl)amino)hexanoate (YK-421-PM4)

According to the method for preparing YK-401, YK-421-PM3(580 mg, 1.62 mmol) and heptadecan-9-yl 6-bromohexanoate(664.2 mg, 1.53 mmol) were used as raw materials to give YK-421-PM4(106 mg, 0.15 mmol, 9.7%). $C_{43}H_{86}N_2O_5$, MS(ES): m/z (M+H$^+$) 711.7.

Step 5: Synthesis of heptadecan-9-yl 6-((4-((4-(decyloxy)-4-oxobutyl)(2-hydroxyethyl)amino) butyl)(2-hydroxyethyl)amino)hexanoate (YK-421)

According to the method for preparing YK-401, YK-421-PM4(106 mg, 0.15 mmol) and bromoethanol (37.5 mg, 0.30 mmol) were used as raw materials to give YK-421(23.1 mg, 0.03 mmol, 20.4%). $C_{45}H_{90}N_2O_6$, MS(ES): m/z (M+H$^+$) 755.7.

$^1$H NMR (400 MHz, CDCl$_3$) δ 4.95-4.72 (m, 1H), 4.07 (t, J=6.8 Hz, 2H), 3.92 (d, J=24.6 Hz, 2H), 3.08 (d, J=46.2 Hz, 6H), 2.42 (t, J=6.3 Hz, 2H), 2.37-2.25 (m, 2H), 2.26-2.16 (m, 2H), 2.02 (s, 4H), 1.96-1.88 (m, 2H), 1.83 (s, 2H), 1.65 (dd, J=14.3, 7.6 Hz, 8H), 1.50 (s, 4H), 1.26 (s, 42H), 0.88 (t, J=6.6 Hz, 9H).

Synthesis of YK-422
The synthesis route is as follows:

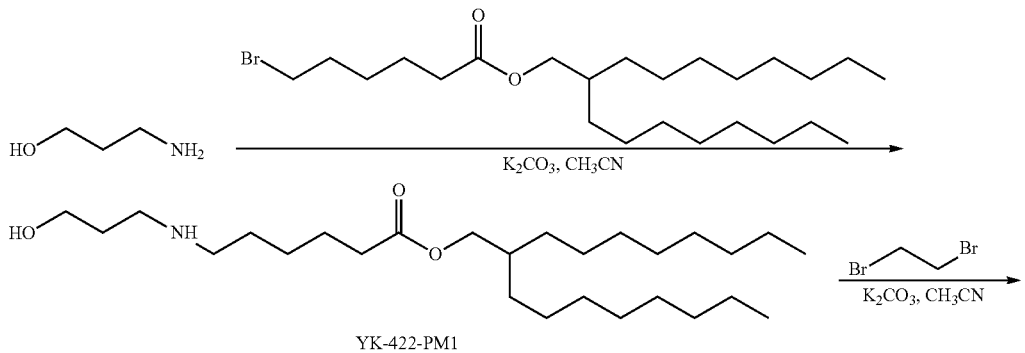

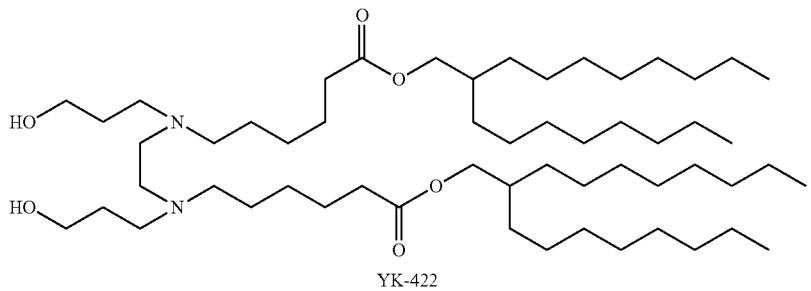

Step 1: Synthesis of 2-octyldecyl 6-((3-hydroxypropyl)amino)hexanoate (YK-422-PM1)

According to the method for preparing YK-401, 2-octyldecyl 6-bromohexanoate(200 mg, 0.46 mmol) and 3-aminopropan-1-ol (174.6 mg, 2.24 mmol) were used as raw materials to give YK-422-PM1(91 mg, 0.21 mmol, 46.1%). $C_{27}H_{55}NO_3$, MS(ES): m/z (M+H$^+$) 442.4.

Step 2: Synthesis of di(2-octyldecyl) 6,6'-(ethane-1,2-diyl-bis((3-hydroxypropyl)azanediyl))dihexanoate (YK-422)

According to the method for preparing YK-419, YK-422-PM1(71 mg, 0.16 mmol) and 1,2-dibromoethane (15.1 mg, 0.08 mmol) were used as raw materials to give YK-422(25.1 mg, 0.03 mmol, 34.5%). $C_{56}H_{112}N_2O_6$, MS(ES): m/z (M+H$^+$) 909.8.

$^1$H NMR (400 MHz, chloroform-d) δ 3.96 (d, J=5.8 Hz, 4H), 3.76 (t, J=5.1 Hz, 4H), 3.54 (q, J=7.2 Hz, 2H), 3.45 (s, 4H), 3.19 (t, J=6.7 Hz, 4H), 3.03-2.93 (m, 4H), 2.32 (t, J=7.2 Hz, 4H), 1.98-1.87 (m, 4H), 1.80-1.54 (m, 12H), 1.26 (s, 58H), 0.87 (d, J=7.0 Hz, 12H).

Synthesis of YK-423
The synthesis route is as follows:

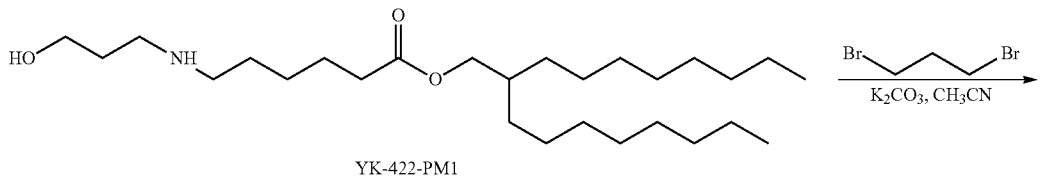

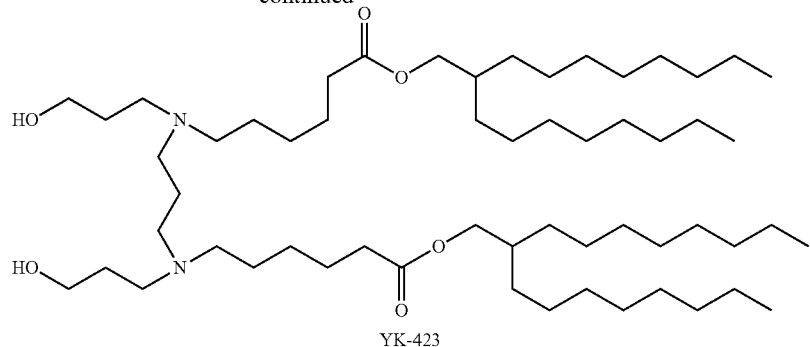
YK-423

Synthesis of di(2-octyldecyl) 6,6'-(propan-1,3-diyl-bis((3-hydroxypropyl)azanediyl))dihexanoate (YK-423)

According to the method for preparing YK-419, YK-422-PM1 (200 mg, 0.45 mmol) and 1,3-dibromopropane (45.6 mg, 0.23 mmol) were used as raw materials to give YK-423 (59.9 mg, 0.06 mmol, 28.2%). $C_{57}H_{114}N_2O_6$, MS(ES): m/z (M+H$^+$) 923.8.

$^1$H NMR (400 MHz, chloroform-d) δ 3.96 (d, J=5.7 Hz, 4H), 3.78 (t, J=5.1 Hz, 4H), 2.75 (s, 4H), 2.57 (s, 8H), 2.31 (t, J=7.4 Hz, 4H), 1.78 (d, J=22.1 Hz, 4H), 1.66-1.55 (m, 8H), 1.27 (s, 64H), 0.88 (t, J=6.7 Hz, 12H).

Synthesis of YK-424
The synthesis route is as follows:

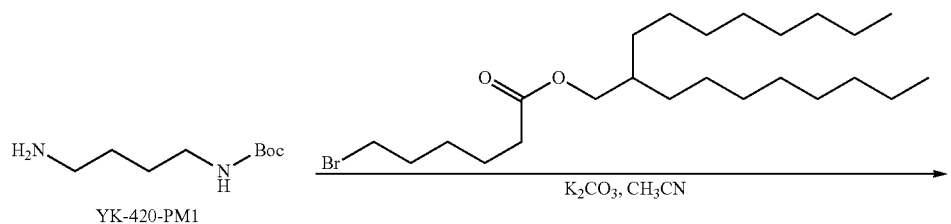
YK-420-PM1

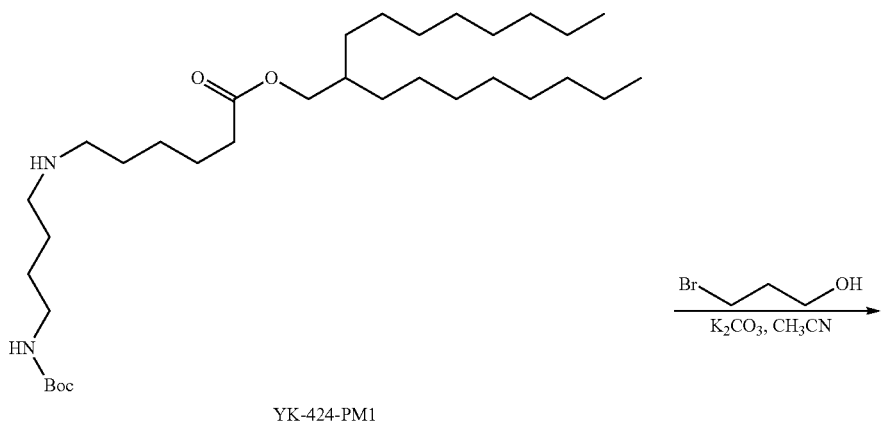
YK-424-PM1

-continued
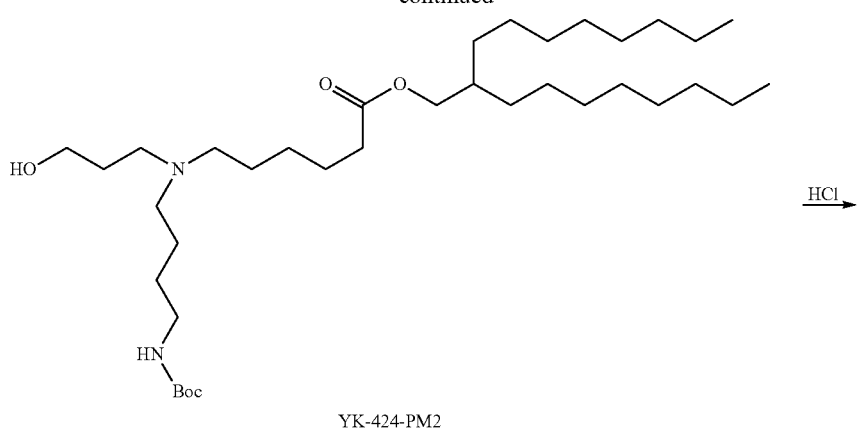
YK-424-PM2
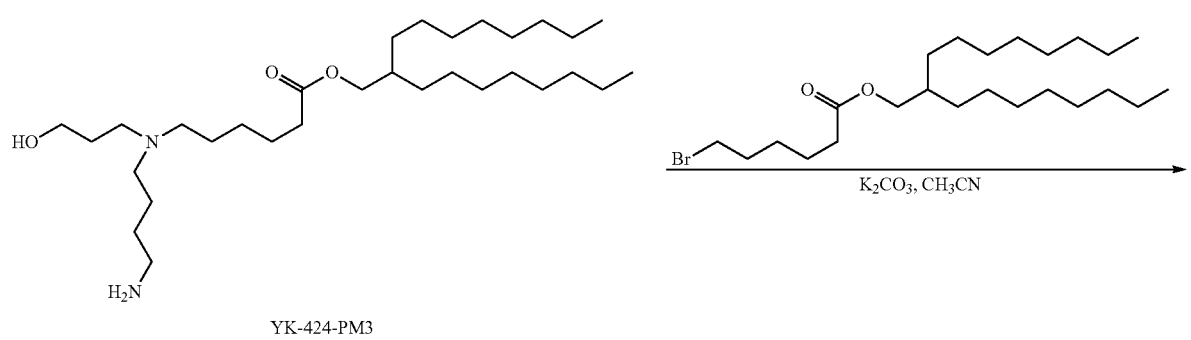
YK-424-PM3
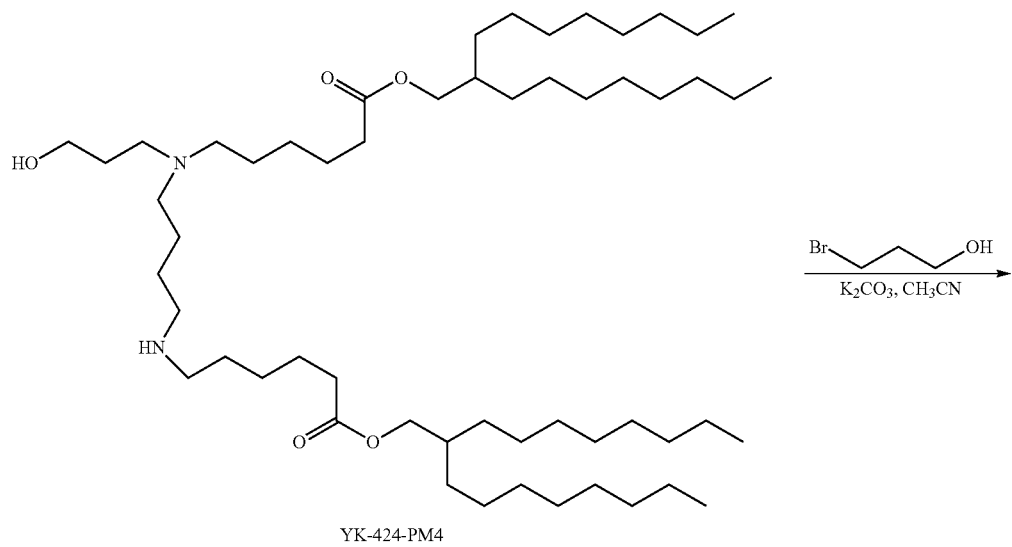
YK-424-PM4

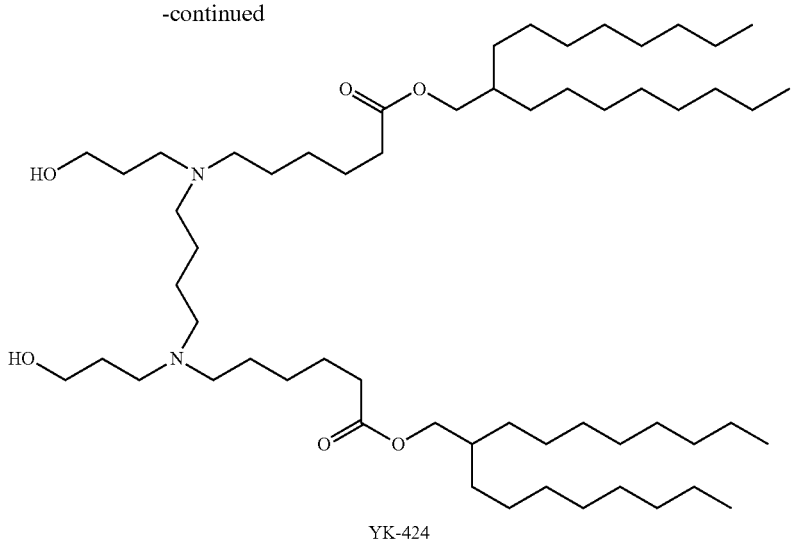

YK-424

Step 1: Synthesis of 2-octyldecyl 6-(((4-(tert-butoxy-carbonyl)amino)butyl)amino)hexanoate (YK-424-PM1)

According to the method for preparing YK-401, YK-420-PM1(200 mg, 1.06 mmol) and 2-octyldecyl 6-bromo-hexanoate(475.5 mg, 1.06 mmol) were used as raw materials to give YK-424-PM1(141.8 mg, 0.26 mmol, 24.5%). $C_{33}H_{66}N_2O_4$, MS(ES): m/z (M+H$^+$) 555.6.

Step 2: Synthesis of 2-octyldecyl 6-((4-(tert-butoxy-carbonyl)amino)butyl)(3-hydroxypropyl)amino-hexanoate (YK-424-PM2)

According to the method for preparing YK-401, YK-424-PM1(141.8 mg, 0.26 mmol) and 3-bromo-1-propanol (78.1 mg, 0.56 mmol) were used as raw materials to give YK-424-PM2(137.1 mg, 0.22 mmol, 84.6%). $C_{36}H_{72}N_2O_5$, MS(ES): m/z (M+H$^+$) 613.5.

Step 3: Synthesis of 2-octyldecyl 6-((4-aminobutyl)(3-hydroxypropyl)amino)hexanoate (YK-424-PM3)

According to the method for preparing YK-413-PM3, YK-424-PM2(137.1 mg, 0.22 mmol) was used as raw material to give YK-424-PM3(103.3 mg, 0.20 mmol, 90.9%). $C_{31}H_{64}N_2O_3$, MS(ES): m/z (M+H$^+$) 513.4.

Step 4: Synthesis of 2-octyldecyl 6-((3-hydroxypro-pyl)(4-((6-(2-octyldecyl)oxy)-6-oxohexyl)amino) butyl)amino)hexanoate (YK-424-PM4)

According to the method for preparing YK-401, YK-424-PM3(103.3 mg, 0.20 mmol) and 2-octyldecyl 6-bromo-hexanoate(85.5 mg, 0.19 mmol) were used as raw materials to give YK-424-PM4(46.7 mg, 0.05 mmol, 27.9%). $C_{55}H_{110}N_2O_5$, MS(ES): m/z (M+H$^+$) 879.9.

Step 5: Synthesis of bis(2-octyldecyl) 6,6'-(butane-1,4-diylbis((3-hydroxypropyl)azanediyl))dihexano-ate (YK-424)

According to the method for preparing YK-401, YK-424-PM4(46.7 mg, 0.05 mmol) and 3-bromo-1-propanol (7.2 mg, 0.05 mmol) were used as raw materials to give YK-424 (23.6 mg, 0.03 mmol, 50.0%). $C_{58}H_{116}N_2O_6$ MS(ES): m/z (M+H$^+$) 937.9.

$^1$H NMR (400 MHz, chloroform-d) δ 3.96 (d, J=5.8 Hz, 4H), 3.76 (t, J=5.1 Hz, 4H), 3.54 (q, J=7.2 Hz, 2H), 3.45 (s, 4H), 3.19 (t, J=6.7 Hz, 4H), 3.03-2.93 (m, 4H), 2.32 (t, J=7.2 Hz, 4H), 1.98-1.87 (m, 4H), 1.80-1.54 (m, 16H), 1.26 (s, 58H), 0.87 (d, J=7.0 Hz, 12H).

Synthesis of YK-009

According to the method in CN114044741B, 162 mg of YK-009 was obtained.

Synthesis of heptadecan-9-yl 8-(8-((3-hexylnonyl) oxy)-8-oxooctyl)-((2-hydroxyethyl)amino)octanoate (compound 21)

The synthesis route is as follows:

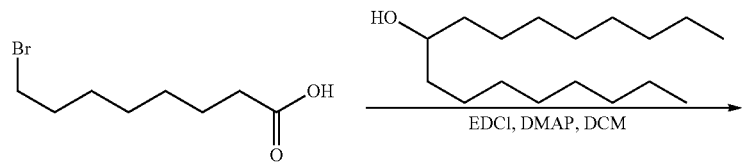

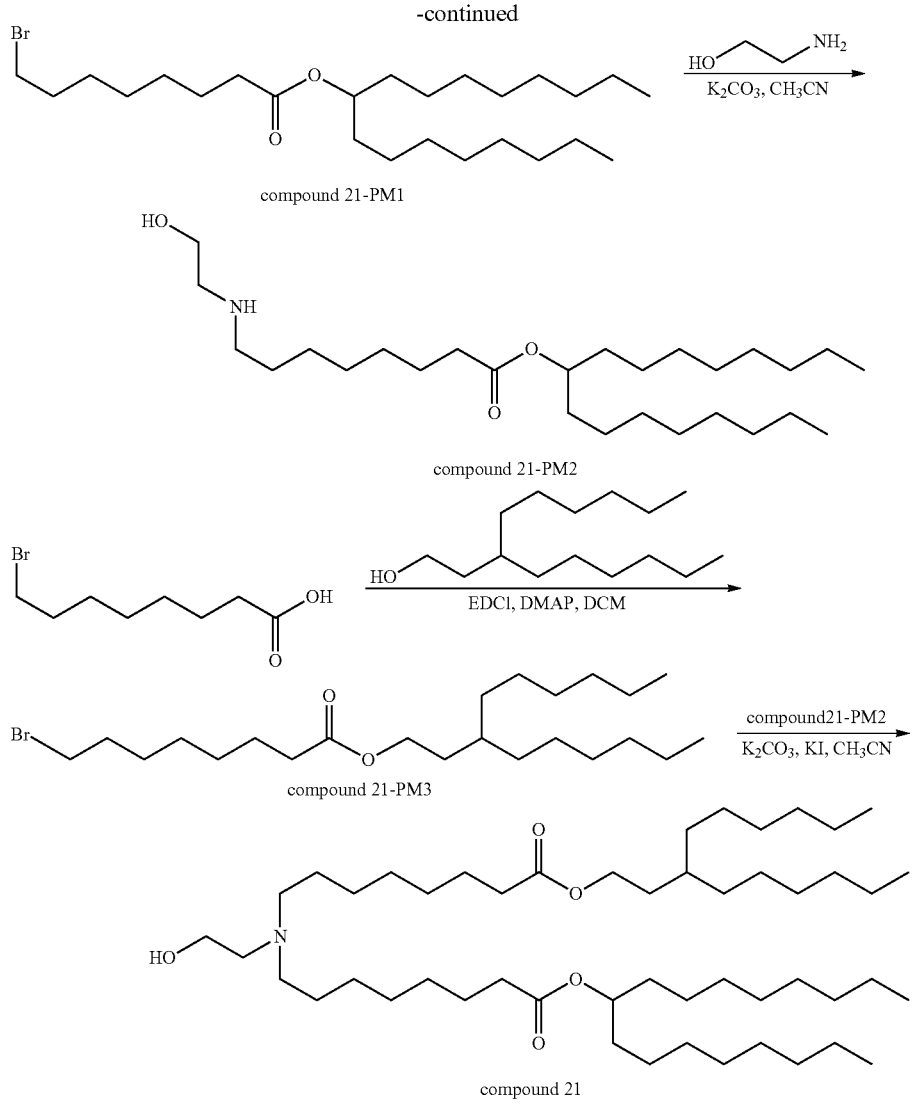

Step 1: Synthesis of heptadecan-9-yl 8-bromooctanoate (compound 21-PM1)

9-Heptadecanol (1.00 g, 3.90 mmol) and 8-bromooctanoic acid (1.04 g, 4.66 mmol) were dissolved in dichloromethane (10 mL), and 1-(3-dimethylaminopropyl)-3-ethylcarbodiimide hydrochloride (0.90 g, 4.68 mmol) and 4-dimethylaminopyridine (24 mg, 0.20 mmol) were added. The mixture was stirred and reacted at 30-35° C. for 8 hours. After the reaction was completed, the reaction solution was washed with saturated sodium carbonate, saturated brine, and dried over $Na_2SO_4$. The mixture was filtered. The filtrate was concentrated under reduced pressure in vacuum and purified by silica gel chromatography (ethyl acetate/n-hexane) to obtain heptadecan-9-yl 8-bromooctanoate (1.28 g, 2.77 mmol, 71.0%).

Step 2: Synthesis of heptadecan-9-yl 8-((2-hydroxyethyl)amino)octanoate (compound 21-PM2)

Heptadecan-9-yl 8-bromooctanoate (500 mg, 1.08 mmol) and ethanolamine (119 mg, 3.25 mmol) were dissolved in acetonitrile (5 mL), and potassium carbonate (149 mg, 1.08 mmol) was added. The mixture was heated to 70° C. and stirred to react for 2 hours. After the reaction was completed, the reaction solution was cooled to room temperature and then filtered. The filtrate was concentrated under reduced pressure in vacuum to remove the solvent. The residue was purified by silica gel chromatography (methanol/dichloromethane) to give heptadecan-9-yl 8-((2-hydroxyethyl)amino)octanoate (365 mg, 0.83 mmol, 76.9%), $C_{27}H_{55}NO_3$, MS(ES): m/z (M+H$^+$) 442.3.

Step 3: Synthesis of 3-hexylnonyl 8-bromooctanoate (compound 21-PM3)

According to the method for preparing compound 21-PM1, 3-hexylnonanol (1.00 g, 4.38 mmol) and 8-bromooctanoic acid (1.17 g, 5.25 mmol) were used as raw materials and purified by silica gel chromatography (ethyl acetate/n-hexane) to give 3-hexylnonyl 8-bromooctanoate (1.57 g, 3.62 mmol, 82.6%).

Step 4: Synthesis of heptadecan-9-yl 8-(8-((3-hex-ylnonyl)oxy)-8-oxooctyl)-((2-hydroxyethyl)amino) octanoate (compound 21)

Heptadecan-9-yl 8-((2-hydroxyethyl)amino)octanoate (200 mg, 0.46 mmol) and 3-hexylnonyl 8-bromooctanoate (336 mg, 0.82 mmol) were dissolved in acetonitrile (6 mL), and potassium carbonate (254 mg, 1.84 mmol) and potassium iodide (8.3 mg, 0.05 mmol) were added. The mixture was heated to 70° C. and stirred to react for 20 hours. The reaction solution was cooled to room temperature and then filtered. The filtrate was concentrated under reduced pressure in vacuum to remove the solvent. The residue was purified by silica gel chromatography (ethyl acetate/n-hexane) to obtain the target compound (220 mg, 0.28 mmol, 60.9%). $C_{50}H_{99}NO_5$, MS(ES): m/z (M+H$^+$) 794.8.

$^1$H NMR (400 MHz, CDCl$_3$) δ 4.90 (p, J=6.3 Hz, 1H), 4.21-4.02 (m, 2H), 3.66 (s, 2H), 2.73 (s, 2H), 2.60 (s, 4H), 2.43-2.20 (m, 4H), 2.12-1.99 (m, 1H), 1.75-1.49 (m, 13H), 1.48-1.39 (m, 2H), 1.42-1.15 (m, 56H), 0.92 (td, J=6.8, 2.2 Hz, 12H).

Synthesis of bis(3-hexylnonyl) 8,8'-((2-hydroxy-ethyl) azanediyl)dioctanoate (compound 23)

The synthesis route is as follows:

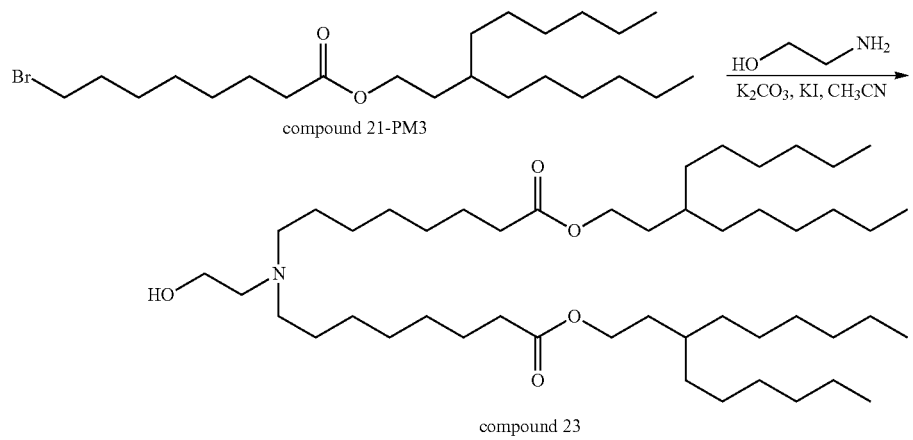

compound 21-PM3 compound 23

3-Hexylnonyl 8-bromooctanoate (710 mg, 1.64 mmol) and ethanolamine (40 mg, 0.66 mmol) were dissolved in acetonitrile (10 mL), and potassium carbonate (1.09 g, 7.92 mmol) and potassium iodide (66 mg, 0.39 mmol) were added to the above system. The mixture was heated to 70° C. and stirred to react for 20 hours. After the reaction was completed, the reaction solution was cooled to room temperature and then filtered. The filtrate was concentrated under reduced pressure in vacuum to remove the solvent. The residue was purified by silica gel chromatography (methanol/dichloromethane) to give bis(3-hexylnonyl) 8,8'-((2-hydroxyethyl)azanediyl)dioctanoate (160 mg, 0.21 mmol, 31.8%), $C_{48}H_{95}NO_5$, MS(ES): m/z (M+H$^+$) 766.5.

$^1$H NMR (400 MHz, CDCl$_3$) δ 4.12 (t, J=7.1 Hz, 4H), 3.62 (s, 2H), 2.68 (s, 2H), 2.51 (d, J=25.8 Hz, 4H), 2.32 (t, J=7.5 Hz, 4H), 1.72-1.57 (m, 8H), 1.55-1.40 (m, 6H), 1.40-1.17 (m, 55H), 0.92 (t, J=6.8 Hz, 12H).

Example 2: Optimization of Preparation Conditions for Lipid Nanoparticles (LNP Formulations)

1. Optimization of the Ratio of Carrier (Liposome) to mRNA

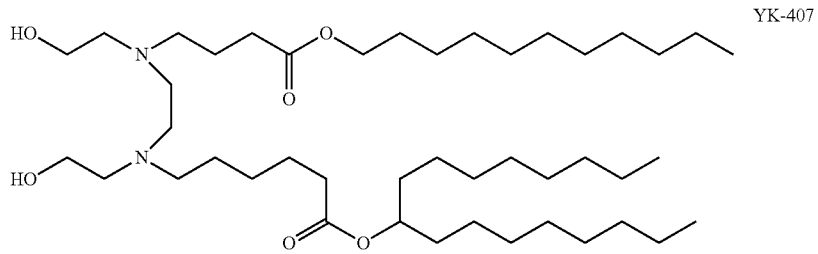 [SMILES: CCCCCCCCCCCOC(=O)CCCN(CCO)CCN(CCO)CCCCCC(=O)OC(CCCCCCCC)CCCCCCCC]

YK-407

The cationic lipid compound YK-407 synthesized in Example 1 was dissolved in ethanol with DSPC (AVT (Shanghai) Pharmaceutical Technology Co., Ltd.), cholesterol (AVT (Shanghai) Pharmaceutical Technology Co., Ltd.) and DMG-PEG2000 according to a molar ratio of 49:10:39.5:1.5, respectively, to prepare an ethanol lipid solution. The ethanol lipid solution was quickly added to citrate buffer (pH=4-5) by ethanol injection method, and vortexed for 30s for later use. eGFP-mRNA was diluted in citrate buffer (pH=4-5) to give an aqueous mRNA solution. A certain volume of liposome solution and mRNA aqueous solution were used to prepare liposomes at weight ratios of total lipids to mRNA of 5:1, 10:1, 15:1, 20:1, 30:1 and 35:1, respectively. The mixtures were sonicated at 25° C. for 15 min (with an ultrasonic frequency of 40 kHz and an ultrasonic power of 800 W). The resulted liposomes were diluted to 10 times volume with PBS, and then ultrafiltered with a 300KDa ultrafiltration tube to remove ethanol. Then the volume was fixed to a certain volume with PBS to give an LNP formulation encapsulating eGFP-mRNA using cationic lipid YK-407/DSPC/cholesterol/DMG-PEG2000 (49:10: 39.5:1.5 in molar percentage).

The results of the cell transfection test showed that when the weight ratio of carrier to mRNA was in the range of 10:1-30:1, all the transfection effects were good, wherein the ratio of 15:1 had the best transfection effect, and when the weight ratio of carrier to mRNA was 5:1 or 35:1, the transfection effect was poor, and could not be used to carry mRNA. (FIG. 1)

The same results were obtained with LNP formulations prepared from YK-401, YK-402, YK-403, YK 422 and YK-423, which are not shown in the figures.

2. Optimization of the Ratio of Cationic Lipid to Neutral Lipid

The LNP formulation encapsulating eGFP-mRNA was prepared according to the method in 1, wherein the molar ratios of cationic lipid YK-407 to neutral lipid DSPC were 1:1, 3:1, 3.5:1, 4:1, 4.5:1, 4.9:1, 10:1, 15:1 and 20:1.

Figure 2:
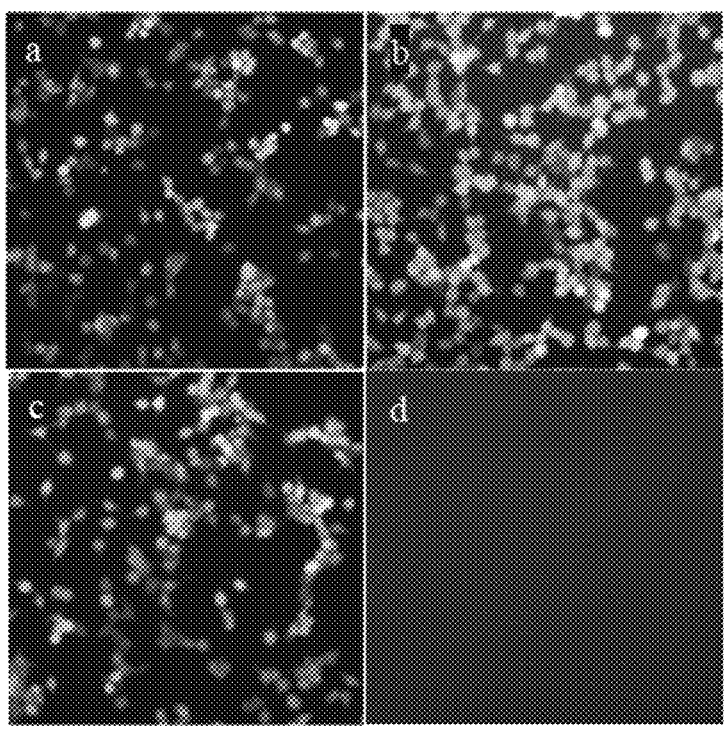
FIG. 2 shows the results of cell transfection tests with different molar ratios of the cationic lipid to the neutral lipid DSPC used in the preparation of LNP formulations, wherein a is 3.5:1, b is 4:1, c is 4.9:1, and d is a blank control.

It can be seen from the cell transfection test that when the molar ratio of cationic lipid to neutral lipid was from 1:1 to 15:1, the transfection effect could be achieved, wherein the transfection efficiency was the highest at the molar ratio of cationic lipid to neutral lipid of 4:1, and the ratios of 3.5:1 and 4.9:1 also had good transfection efficiency. (FIG. 2)

The same results were obtained with LNP formulations prepared from YK-401, YK-402, YK-403, YK 422 and YK-423, which are not shown in the figures.

3. Optimization of the Ratio of Polymer-Conjugated Lipid to Carrier (Liposome)

The LNP formulation encapsulating eGFP-mRNA was prepared according to the method in 1, wherein the cationic lipid in the carrier was YK-407, and the molar ratios of the polymer-conjugated lipid DMG-PEG2000 to the carrier were 0.5%, 1.5%, 3.5%, 5%, 10% and 15%, respectively.

Figure 3:
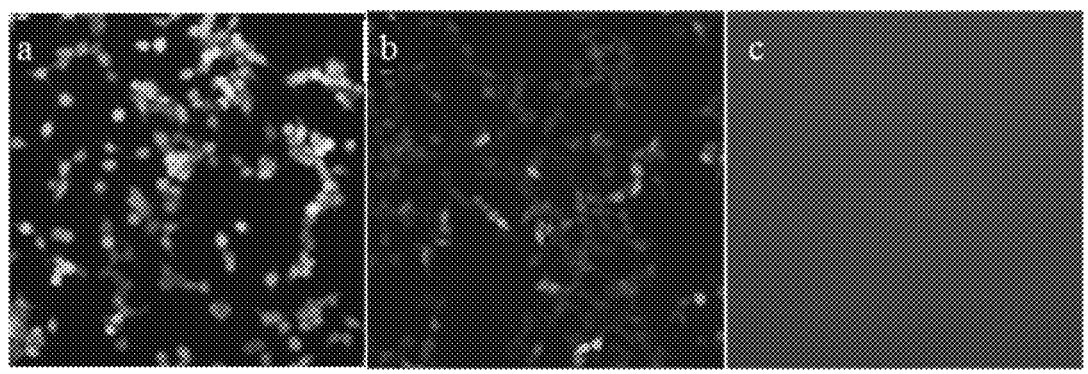
FIG. 3 shows the results of cell transfection tests with different molar ratios of polymer-conjugated lipid to carrier in the preparation of LNP formulations, wherein a is 1.5%, b is 10%, and c is a blank control.

The results of the cell transfection test showed that when the molar ratio of the polymer-conjugated lipid to the carrier was in the range from 0.5% to 10%, the transfection effect could be achieved, wherein the transfection efficiency was the highest when the molar ratio was 1.5%, and the lowest when the molar ratio was 10%. (FIG. 3)

The same results were obtained with LNP formulations prepared from YK-401, YK-402, YK-403, YK 422 and YK-423, which are not shown in the figures.

4. Optimization of the Proportion of Components in the Carrier (Liposome)

The LNP formulation encapsulating eGFP-mRNA was prepared according to the method in 1, wherein the molar ratios of cationic lipid YK-407, neutral lipid DSPC, structured lipid cholesterol and polymer-conjugated lipid DMG-PEG2000 were 75:5:15:5, 49:10:39.5:1.5, 45:10:43.5:1.5, 45:25:20:10, 40:10:48.5:1.5, 35:10:53.5:1.5 and 25:5:65:5, respectively.

Figure 4:
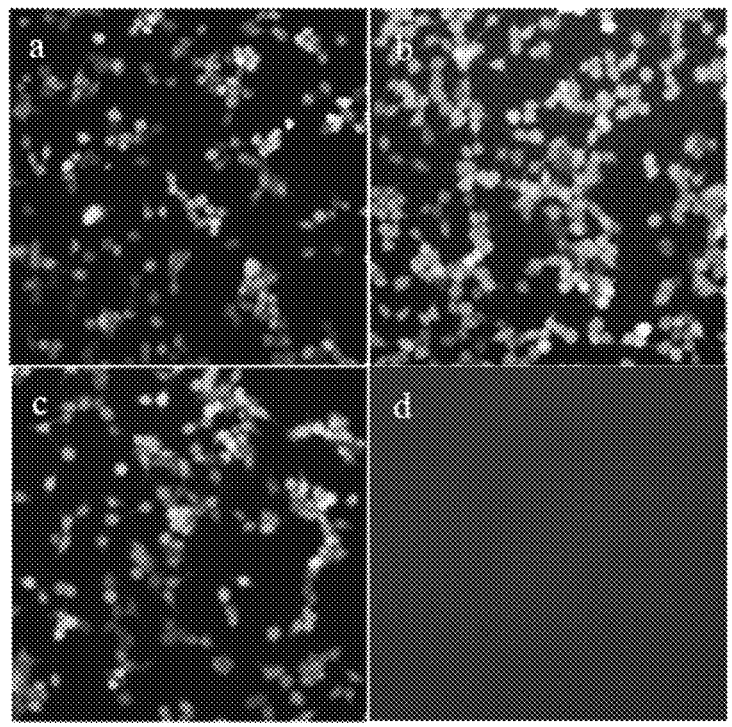
FIG. 4 shows the results of cell transfection tests with different ratios of the cationic lipid, the neutral lipid DSPC, the structural lipid cholesterol and the polymer-conjugated lipid DMG-PEG2000 in the carrier in the preparation of LNP formulations, wherein a is 35:10:53.5:1.5, b is 40:10:48.5:1.5, c is 49:10:39.5:1.5, d is a blank control.

It can be seen from the cell transfection test that transfection was achieved when the molar ratios of cationic lipid, neutral lipid, structured lipid and polymer-conjugated lipid were 75:5:15:5, 49:10:39.5:1.5, 45:10:43.5:1.5, 45:25:20:10, 40:10:48.5:1.5, 35:10:53.5:1.5 and 25:5:65:5. Good transfection effects were achieved within the ratio range of (35~49):(7.5~15):(35~55):(1~5), and the transfection effect was the best when the ratio was 40:10:48.5:1.5 (FIG. 4). This illustrates that LNP formulations can be prepared when the molar ratio of cationic lipid, neutral lipid, structured lipid and polymer-conjugated lipid is within the range of (25~75): (5~25):(15~65):(0.5~10), and the preferred ratio is (35~49): (7.5~15):(35~55):(1~5), among which the optimal ratio is 40:10:48.5:1.5.

The same results were obtained with LNP formulations prepared from YK-401, YK-402, YK-403, YK 422 and YK-423, which are not shown in the figures.

Examples 3: Cell Transfection Test of LNP Formulation of eGFP-mRNA

Cell recovery and passage: 293T cells were recovered, cultured in a culture dish, and passaged to the required number of cells.

Seeding plate: The cells in the culture dish were digested and counted. Cells were spread in a 96-well plate at 10,000 cells per well and in a 12-well plate at 150,000 cells per well. Cells were cultured overnight until the cells adhered to the wall.

Cell transfection test: The LNP formulation containing 1.5 μg of eGFP-mRNA prepared in Example 2 (the cationic lipid in the carrier was YK-407) and the Lipofectamin 3000 formulation of eGFP-mRNA were added respectively to the cell culture medium of the 12-well plate, and further incubated for 24 hours. The transfection efficiency of different samples was then investigated according to the fluorescence intensity by observing with a fluorescence microscope.

According to the results of the test, the preparation conditions of lipid nanoparticles (LNP formulation) were finally determined: the weight ratio of carrier to mRNA was 15:1; the molar ratio of cationic lipid to neutral lipid was 4.9:1; the molar ratio of polymer-conjugated lipid to liposome was 1.5%; the molar ratio of cationic lipid, neutral lipid, structured lipid and polymer-conjugated lipid was 49:10:39.5:1.5. At this ratio, various cationic lipids designed in this application and the cationic lipids used in the prior art all had good transfection effects (determined by Example 2, some test results are not shown). This condition was used to prepare lipid nanoparticles (LNP formulation) in subsequent tests.

Example 4: Preparation of Lipid Nanoparticles (LNP Formulation)
TABLE 1
The structure of cationic lipids
| Name | Structure | Note |
|---|---|---|
| YK-401 | 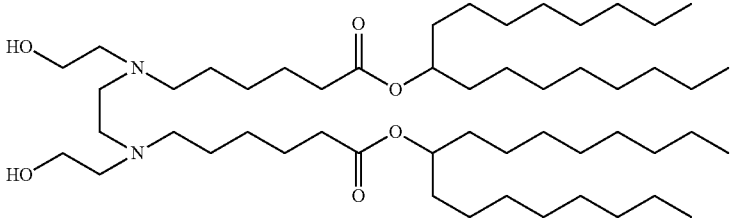 [SMILES: CCCCCCCCC(CCCCCCCC)OC(=O)CCCCCN(CCO)CCN(CCO)CCCCCC(=O)OC(CCCCCCCC)CCCCCCCC] YK-401 | Synthesized in Example 1 |
| YK-402 | 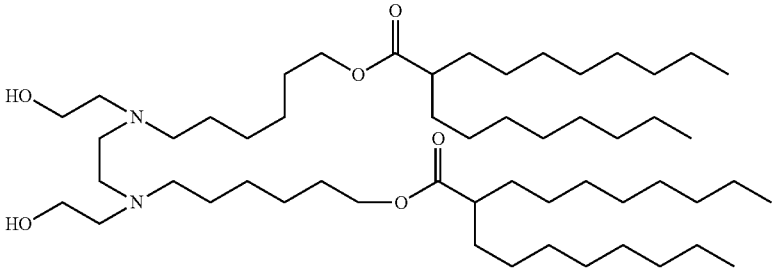 [SMILES: CCCCCCCCC(CCCCCCCC)C(=O)OCCCCCCN(CCO)CCN(CCO)CCCCCCOC(=O)C(CCCCCCCC)CCCCCCCC] YK-402 | Synthesized in Example 1 |
| YK-403 | 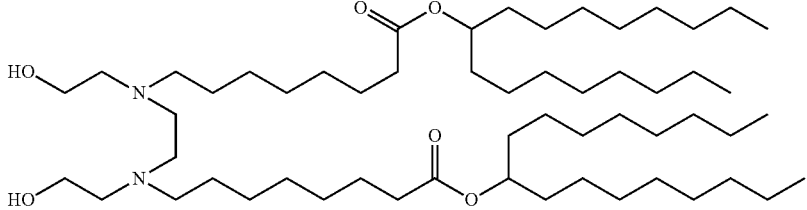 [SMILES: CCCCCCCCC(CCCCCCCC)OC(=O)CCCCCCCN(CCO)CCN(CCO)CCCCCCCC(=O)OC(CCCCCCCC)CCCCCCCC] YK-403 | Synthesized in Example 1 |
| YK-404 | 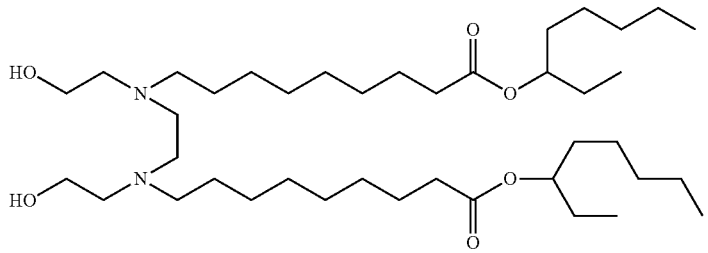 [SMILES: CCCCCC(CC)OC(=O)CCCCCCCCN(CCO)CCN(CCO)CCCCCCCCC(=O)OC(CC)CCCCC] YK-404 | Synthesized in Example 1 |
| YK-405 | 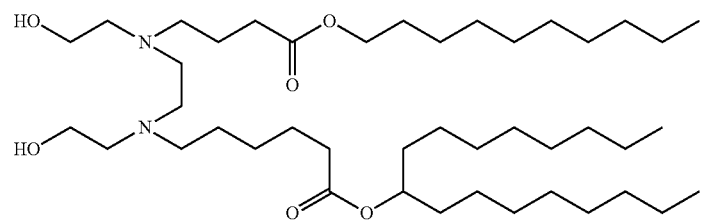 [SMILES: CCCCCCCCCCOC(=O)CCCN(CCO)CCN(CCO)CCCCCC(=O)OC(CCCCCCCC)CCCCCCCC] YK-405 | Synthesized in Example 1 |

TABLE 1-continued

The structure of cationic lipids

| Name | Structure | Note |
|---|---|---|
| YK-406 | YK-406 | Synthesized in Example 1 |
| YK-407 | YK-407 | Synthesized in Example 1 |
| YK-408 | YK-408 | Synthesized in Example 1 |
| YK-409 | YK-409 | Synthesized in Example 1 |
| YK-410 | YK-410 | Synthesized in Example 1 |

TABLE 1-continued
The structure of cationic lipids
| Name | Structure | Note |
|---|---|---|
| YK-411 | 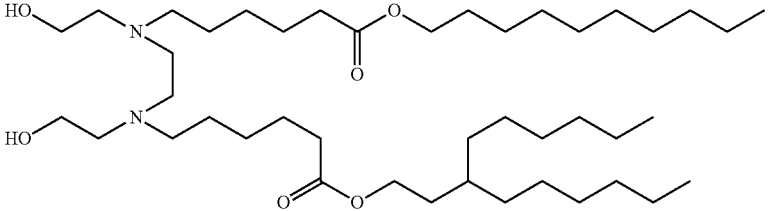 [SMILES: CCCCCCCCCCOC(=O)CCCCCN(CCO)CCN(CCO)CCCCCC(=O)OCCC(CCCCCC)CCCCCC] YK-411 | Synthesized in Example 1 |
| YK-412 | 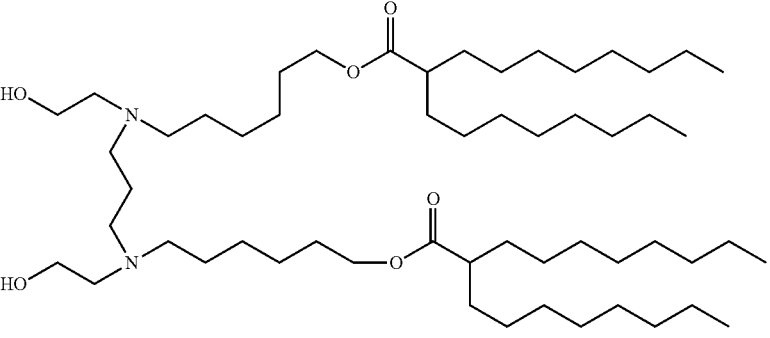 [SMILES: CCCCCCCCC(CCCCCCCC)C(=O)OCCCCCCN(CCO)CCCN(CCO)CCCCCCOC(=O)C(CCCCCCCC)CCCCCCCC] YK-412 | Synthesized in Example 1 |
| YK-413 | 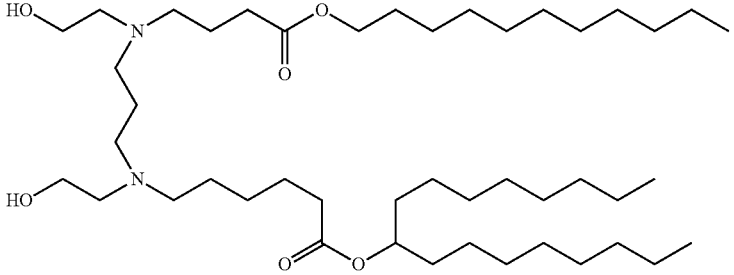 [SMILES: CCCCCCCCCCCOC(=O)CCCN(CCO)CCCN(CCO)CCCCCC(=O)OC(CCCCCCCC)CCCCCCCC] YK-413 | Synthesized in Example 1 |
| YK-414 | 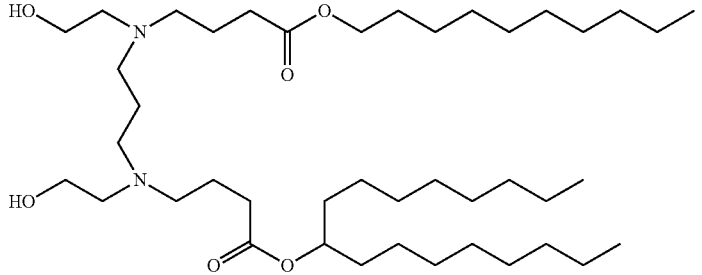 [SMILES: CCCCCCCCCCOC(=O)CCCN(CCO)CCCN(CCO)CCCC(=O)OC(CCCCCCCC)CCCCCCCC] YK-414 | Synthesized in Example 1 |

TABLE 1-continued
The structure of cationic lipids
| Name | Structure | Note |
|---|---|---|
| YK-415 | 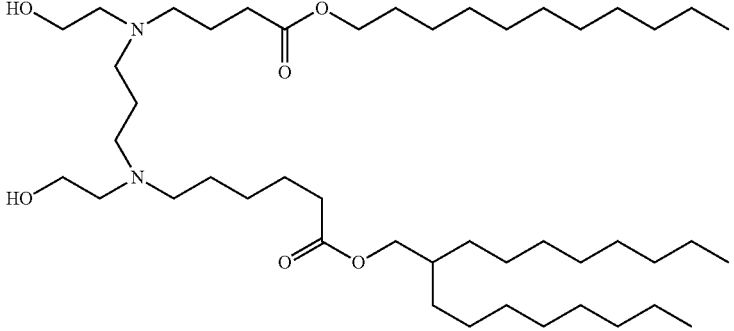 [SMILES: CCCCCCCCCCCOC(=O)CCCN(CCO)CCCN(CCO)CCCCCC(=O)OCC(CCCCCCCC)CCCCCCCC]<br>YK-415 | Synthesized in Example 1 |
| YK-416 | 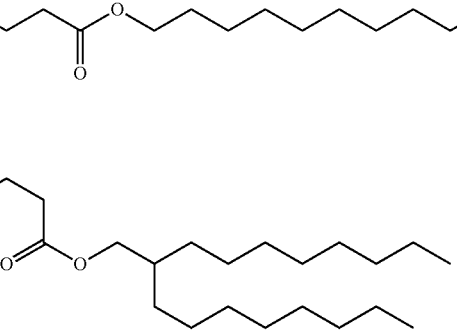<br>YK-416 | Synthesized in Example 1 |
| YK-417 | 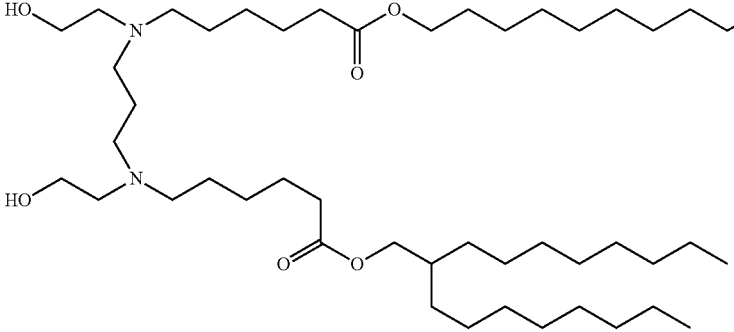<br>YK-417 | Synthesized in Example 1 |
| YK-418 | 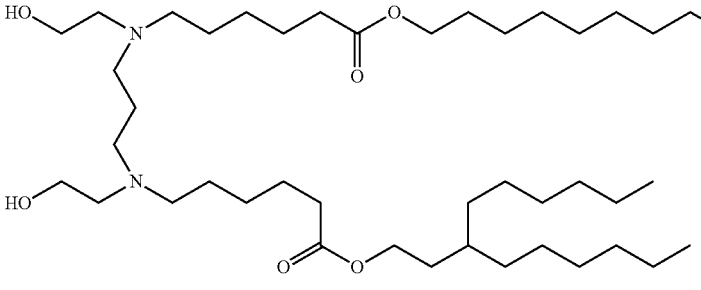<br>YK-418 | Synthesized in Example 1 |

TABLE 1-continued
The structure of cationic lipids
| Name | Structure | Note |
|---|---|---|
| YK-419 | 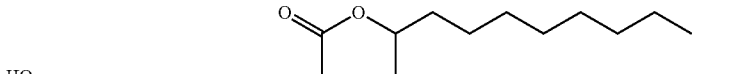 | Synthesized in Example 1 |
| YK-420 | 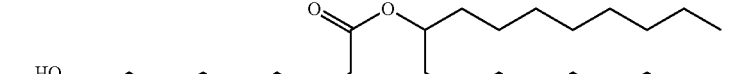 | Synthesized in Example 1 |
| YK-421 | 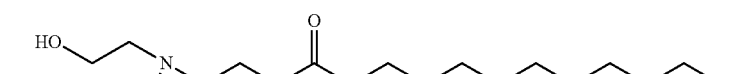 | Synthesized in Example 1 |
| YK-422 | 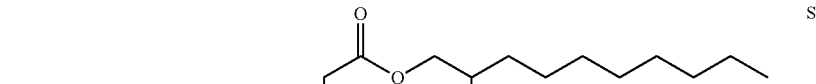 | Synthesized in Example 1 |

TABLE 1-continued

The structure of cationic lipids

| Name | Structure | Note |
|---|---|---|
| YK-423 | YK-423 | Synthesized in Example 1 |
| YK-424 | YK-424 | Synthesized in Example 1 |
| YK-009 | YK-009 | Synthesized in Example 1, which is YK-009 in CN114044741B |
| Compound 21 | compound 21 | Synthesized in Example 1, which is compound 21 in WO2021055833A1 |

TABLE 1-continued

The structure of cationic lipids

| Name | Structure | Note |
| --- | --- | --- |
| Compound 23 | compound 23 | Synthesized in Example 1, which is compound 23 in WO2021055833A1 |
| SM-102 | SM-102 | purchased from XiaMen Sinopeg Biotech Co., LTD, which is compound 25 in WO2017049245A2 |
| ALC-0315 | ALC-0315 | purchased from XiaMen Sinopeg Biotech Co., LTD, which is compound 3 in CN108368028B |
| HHMA | HHMA | purchased from XiaMen Sinopeg Biotech Co., LTD, which is compound 1 in CN112979483B |

The cationic lipids listed in Table 1 were dissolved in ethanol with DSPC (AVT (Shanghai) Pharmaceutical Technology Co., Ltd.), cholesterol (AVT (Shanghai) Pharmaceutical Technology Co. Ltd.) and DMG-PEG2000 according to a molar ratio of 49:10:39.5:1.5, respectively, to prepare ethanol lipid solution. The ethanol lipid solution was quickly added to citrate buffer (pH=4-5) by ethanol injection method, and vortexed for 30s for later use. eGFP-mRNA (from Shanghai Biohub International Trade Co., Ltd) or Fluc-mRNA (from Shanghai Biohub International Trade Co., Ltd) was diluted in citrate buffer (pH=4-5) to give an aqueous mRNA solution. A certain volume of liposome solution and mRNA aqueous solution were used to prepare liposomes at a weight ratio of total lipids to mRNA of 15:1. The mixture was sonicated at 25° C. for 15 min (with an ultrasonic frequency of 40 kHz and an ultrasonic power of 800 W). The resulted liposomes were diluted to 10 times volume with PBS, and then ultrafiltered with a 300KDa ultrafiltration tube to remove ethanol. Then the volume was fixed to a certain volume with PBS to give an LNP formulation encapsulating eGFP-mRNA or Fluc-mRNA using cationic lipid/DSPC/cholesterol/DMG-PEG2000 (49:10:39.5:1.5 in molar percentage).

Lipofectamine 3000 transfection reagent is currently widely used for cell transfection. It has very good transfection performance and excellent transfection efficiency, which can improve cell survival rate, and is suitable for difficult-to-transfect cell types. Lipofectamine 3000 transfection reagent was selected as a control, and prepared Lipofectamin 3000 formulations of eGFP-mRNA or Fluc-mRNA were prepared according to the instructions of Lipofectamine 3000 (Invitrogen (Shanghai) Trading Co., Ltd.).

Example 5: Determination of Particle Size and Polydispersity Index (PDI) of Lipid Nanoparticles The particle size and polydispersity index (PDI) were determined by dynamic light scattering using Malvern laser particle size analyzer.

10 μL of the liposome solution was weighed, diluted to 1 mL with RNase-free deionized water, and added to the sample pool. Each sample was measured in triplicate. The measurement conditions were: 900 scattering angle, and 25° C. The test results were as follows:

TABLE 2

Particle size and polydispersity index (PDI)

| Name | Particle size (nm) | PDI (%) |
|---|---|---|
| YK-401 | 152 | 17.7 |
| YK-402 | 155 | 17.1 |
| YK-403 | 163 | 16.5 |
| YK-404 | 142 | 4.2 |
| YK-405 | 141 | 4.3 |
| YK-406 | 154 | 15.8 |
| YK-407 | 162 | 16.6 |
| YK-408 | 136 | 16.2 |
| YK-409 | 155 | 13.7 |
| YK-410 | 163 | 15.5 |
| YK-411 | 150 | 5.2 |
| YK-412 | 143 | 5.0 |
| YK-413 | 160 | 16.1 |
| YK-414 | 155 | 23.9 |
| YK-415 | 178 | 15.6 |
| YK-416 | 190 | 19.7 |
| YK-417 | 128 | 17.7 |
| YK-418 | 149 | 17.2 |
| YK-419 | 169 | 11.2 |
| YK-420 | 169 | 14.2 |
| YK-421 | 148 | 17.4 |
| YK-422 | 146 | 13.9 |
| YK-423 | 175 | 11.7 |
| YK-424 | 170 | 16.1 |
| YK-009 | 189 | 16.0 |
| SM-102 | 154 | 22.3 |
| ALC-0315 | 205 | 18.2 |
| Compound 21 | 160 | 16.9 |
| Compound 23 | 147 | 12.1 |
| HHMA | 144 | 16.6 |

The particle size of the lipid nanoparticles prepared in Example 4 was between 120 and 210 nm, and they can all be used to deliver mRNA. Among them, the particles prepared from YK-417 had the smallest particle size, which was 128 nm, and the particles prepared from ALC-0315 had the largest particle size, which was 205 nm. The polydispersity index of all lipid nanoparticles ranged from 4% to 25%, among which the smallest was 4.2% for YK-404, and the largest was 23.9% for YK-414.

Example 6: Detection of Encapsulation Efficiency, Drug Loading Concentration and Total RNA Concentration Encapsulation efficiency is a key quality attribute of liposomes, which refers to the percentage of drug content encapsulated in the lipid bimolecular layer accounting for the total drug dose and can reflect the degree of drug encapsulation in liposomes. The Chinese Pharmacopoeia stipulates that the encapsulation efficiency should generally not be less than 80%.

The drug loading amount is the ratio of the amount of drug in the liposome to the total amount of drug and carrier in the liposome. The drug loading amount directly affects the clinical application dose of the drug. Therefore, the larger the drug loading amount, the better it can meet clinical needs. The drug loading concentration is proportional to the drug loading amount, and the relative proportion of the drug loading concentrations can represent the relative proportion of the drug loading amounts. The relative ratio of the total RNA concentrations may represent the relative ratio of the amounts of mRNA carried by the LNP formulations.

Reagent Preparation:

1×TE buffer, 0.1% Triton X-100 buffer, RiboGreen reagent (1: 200) and mRNA standard stock solution were prepared.

Sample Testing:

An appropriate amount of the sample was added to an appropriate amount of 1×TE buffer, and the mixture was diluted to obtain a solution containing approximately 2.8 g sample per 1 mL. Then the sample was added to a 96-well plate, and 50 μL of the diluted test sample or the mRNA standard stock solution was added to each well, then 1×TE buffer and 0.1% Triton X-100 buffer were added. The sample was incubated at 37° C. for 10 minutes, and 100 μL RiboGreen reagent (1:200) was added to each well of the test sample in the 96-well plate. The sample was centrifugated, and the data were read using a microplate reader, and processed. See Table 3 and Table 4 for specific data.

Test Results:

(1) LNP formulations prepared from YK-407, YK-401, YK-402, YK-403, YK-422 or YK-423 had significantly improved encapsulation efficiency, drug loading concentration and total RNA concentration compared with cationic lipids in the prior art. For example, the encapsulation efficiency of YK-407 could be 29.0% higher than that of compound 23, the drug loading concentration of YK-407 could reach 1.78 times that of compound 23, and the total RNA concentration of YK-407 could reach 1.41 times that of compound 21.

TABLE 3

Test results 1 of encapsulation efficiency, drug loading concentration and total RNA concentration

| Serial No. | Name | Encapsulation efficiency (%) | Drug loading concentration (μg/ml) | Total RNA concentration (μg/ml) |
|---|---|---|---|---|
| 1 | YK-407 | 85.2 | 35.67 | 40.77 |
| 2 | YK-401 | 83.6 | 37.16 | 41.71 |
| 3 | YK-402 | 91.0 | 37.67 | 40.09 |
| 4 | YK-403 | 87.9 | 34.21 | 40.53 |
| 5 | YK-422 | 92.4 | 45.05 | 45.76 |

TABLE 3-continued

Test results 1 of encapsulation efficiency, drug loading concentration and total RNA concentration

| Serial No. | Name | Encapsulation efficiency (%) | Drug loading concentration (μg/ml) | Total RNA concentration (μg/ml) |
|---|---|---|---|---|
| 6 | YK-423 | 89.7 | 37.47 | 41.00 |
| 7 | YK-009 | 63.4 | 27.52 | 38.50 |
| 8 | SM-102 | 62.9 | 26.53 | 36.04 |
| 9 | ALC-0315 | 63.3 | 26.88 | 37.86 |
| 10 | Compound 21 | 58.0 | 21.97 | 28.89 |
| 11 | Compound 23 | 56.2 | 20.01 | 31.05 |
| 12 | HMMA | 60.2 | 32.65 | 36.44 |

As can be seen from Table 3, the encapsulation efficiencies of LNP formulations prepared from different compounds varied greatly. YK-407, YK-401, YK-402, YK-403, YK-422 and YK-423 had significantly improved encapsulation efficiencies compared with SM-102, ALC-0315, compound 21, compound 23, HIMA and YK-009.

The encapsulation efficiency of YK-407 was 85.2%, which was 22.3% higher than SM-102, 21.9% higher than ALC-0315, 27.2% higher than compound 21, 29.0% higher than compound 23, 25.0% higher than HIMA, and 21.8% higher than YK-009.

The encapsulation efficiency of YK-401 was 83.6%, which was 20.7% higher than SM-102, 20.3% higher than ALC-0315, 25.6% higher than compound 21, 27.4% higher than compound 23, 23.4% higher than HIMA, and 20.2% higher than YK-009.

The encapsulation efficiency of YK-402 was 91.0%, which was 28.1% higher than SM-102, 27.7% higher than ALC-0315, 33.0% higher than compound 21, 34.8% higher than compound 23, 30.8% higher than HIMA, and 27.6% higher than YK-009.

The encapsulation efficiency of YK-403 was 87.9%, which was 25.0% higher than SM-102, 24.6% higher than ALC-0315, 29.9% higher than compound 21, 31.7% higher than compound 23, 27.7% higher than HIMA, and 24.4% higher than YK-009.

The encapsulation efficiency of YK-422 was 92.4%, which was 29.5% higher than SM-102, 29.1% higher than ALC-0315, 34.4% higher than compound 21, 36.2% higher than compound 23, 32.2% higher than HIMA, and 29.0% higher than YK-009.

The encapsulation efficiency of YK-423 was 89.7%, which was 26.8% higher than SM-102, 26.4% higher than ALC-0315, 31.7% higher than compound 21, 33.5% higher than compound 23, 29.5% higher than HIMA, and 26.3% higher than YK-009.

Moreover, the drug loading concentrations and total RNA concentrations of LNP formulations prepared from different compounds were also very different, wherein YK-407, YK-401, YK-402, YK-403, YK-422 and YK-423 had significantly improved drug loading concentrations and total RNA concentrations compared with SM-102, ALC-0315, compound 21, compound 23 and YK-009.

The drug loading concentration of YK-407 was 35.67 μg/mL, and the total RNA concentration of YK-407 was 40.77 μg/mL, which were 1.34 times and 1.13 times that of SM-102, 1.33 times and 1.08 times that of ALC-0315, 1.62 times and 1.41 times that of compound 21, 1.78 times and 1.31 times that of compound 23, 1.09 times and 1.12 times that of HIMA, and 1.30 times and 1.06 times that of YK-009, respectively.

The drug loading concentration of YK-401 was 37.16 μg/mL, and the total RNA concentration of YK-401 was 41.71p g/mL, which were 1.40 times and 1.16 times that of SM-102, 1.38 times and 1.10 times that of ALC-0315, 1.69 times and 1.44 times that of compound 21, 1.86 times and 1.34 times that of compound 23, 1.14 times and 1.14 times that of HIMA, and 1.35 times and 1.08 times that of YK-009, respectively.

The drug loading concentration of YK-402 was 37.67 μg/mL, and the total RNA concentration of YK-402 was 40.09 μg/mL, which were 1.42 times and 1.11 times that of SM-102, 1.40 times and 1.06 times that of ALC-0315, 1.71 times and 1.39 times that of compound 21, 1.88 and 1.29 times that of compound 23, 1.15 times and 1.10 times that of HIMA, and 1.37 times and 1.04 times that of YK-009, respectively.

The drug loading concentration of YK-403 was 34.21 μg/mL, and the total RNA concentration of YK-403 was 40.53p g/mL, which were 1.29 times and 1.12 times that of SM-102, 1.27 times and 1.07 times that of ALC-0315, 1.56 times and 1.40 times that of compound 21, 1.71 times and 1.31 times that of compound 23, 1.05 times and 1.11 times that of HIMA, and 1.24 times and 1.05 times that of YK-009, respectively.

The drug loading concentration of YK-422 was 45.05p g/mL, and the total RNA concentration of YK-422 was 45.76 μg/mL, which were 1.70 times and 1.27 times that of SM-102, 1.68 times and 1.21 times that of ALC-0315, 2.05 times and 1.58 times that of compound 21, 2.25 times and 1.47 times that of compound 23, 1.38 times and 1.26 times that of HIMA, and 1.64 times and 1.19 times that of YK-009, respectively.

The drug loading concentration of YK-423 was 37.47 μg/mL, and the total RNA concentration of YK-423 was 41.00 μg/mL, which were 1.41 times and 1.14 times that of SM-102, 1.39 times and 1.08 times that of ALC-0315, 1.71 times and 1.42 times that of compound 21, 1.87 times and 1.32 times that of compound 23, 1.15 times and 1.13 times that of HIMA, and 1.36 times and 1.06 times that of YK-009, respectively.

The data were analyzed using GraphPad Prism software. Any one of YK-407, YK-401, YK-402, YK-403, YK-422 and YK-423 was significantly different from SM-102, ALC-0315, compound 21, compound 23, HHMA and YK-009, and had significantly improved encapsulation efficiency, drug loading concentration and total RNA concentration.

Brief Summary

LNP formulations prepared from some of the compounds designed in this application including YK-407, YK-401, YK-402, YK-403, YK-422 and YK-423 had significantly improved encapsulation efficiencies, drug loading concentrations and total RNA concentrations, compared with cationic lipids in the prior art such as SM-102, ALC-0315, compound 21, compound 23, HHMA and YK-009. For example, YK-407 could have an encapsulation efficiency 29.0% higher than compound 23, a drug loading concentration 1.78 times that of compound 23, and a total RNA concentration 1.41 times that of compound 21.

(2) The encapsulation efficiencies and drug loadings of LNP formulations prepared from different designed compounds varied greatly. The encapsulation efficiencies ranged from 70% to 95%, the drug loading concentrations ranged from 20 to 50 μg/mL, and the total RNA concentrations ranged from 25~55pg/mL for different compounds.

TABLE 4

[Test results 2 of encapsulation efficiency, drug loading concentration and total RNA concentration

| Serial No. | Name | Encapsulation efficiency (%) | Drug loading concentration (μg/ml) | Total RNA concentration (μg/ml) |
|---|---|---|---|---|
| 1 | YK-401 | 83.6 | 37.16 | 41.71 |
| 2 | YK-402 | 91.0 | 37.67 | 40.09 |
| 3 | YK-403 | 87.9 | 34.21 | 40.53 |
| 4 | YK-404 | 75.3 | 28.45 | 33.41 |
| 5 | YK-405 | 83.2 | 33.42 | 40.19 |
| 6 | YK-406 | 87.8 | 30.19 | 34.41 |
| 7 | YK-407 | 85.2 | 35.67 | 40.77 |
| 8 | YK-408 | 86.6 | 45.42 | 52.46 |
| 9 | YK-409 | 86.9 | 34.14 | 39.27 |
| 10 | YK-410 | 88.2 | 29.48 | 33.42 |
| 11 | YK-411 | 86.3 | 36.72 | 42.57 |
| 12 | YK-412 | 85.7 | 28.63 | 33.39 |
| 13 | YK-413 | 83.3 | 23.63 | 28.36 |
| 14 | YK-414 | 77.1 | 30.02 | 38.96 |
| 15 | YK-415 | 87.8 | 31.08 | 35.39 |
| 16 | YK-416 | 79.6 | 25.16 | 31.62 |
| 17 | YK-417 | 74.8 | 25.02 | 33.46 |
| 18 | YK-418 | 75.6 | 24.96 | 33.01 |
| 19 | YK-419 | 88.3 | 30.40 | 34.44 |
| 20 | YK-420 | 94.9 | 35.87 | 37.81 |
| 21 | YK-421 | 83.1 | 33.93 | 40.83 |
| 22 | YK-422 | 92.4 | 45.05 | 45.76 |
| 23 | YK-423 | 89.7 | 37.47 | 41.00 |
| 24 | YK-424 | 92.8 | 32.84 | 35.39 |

As can be seen from Table 4, this series of designed compounds had encapsulation efficiencies ranged from 70% to 95%, drug loading concentrations ranged from 20 to 50 μg/mL, and total RNA concentrations ranged from 25 to 55 μg/mL. The compounds differed greatly, wherein YK-420 had the highest encapsulation efficiency of 94.900, and YK-417 had the lowest encapsulation efficiency of 74.8%; YK-408 had the highest drug loading concentration of 45.42 μg/mL, and YK-413 had the lowest drug loading concentration of only 23.63 μg/mL; YK-408 had the highest total RNA concentration of 52.46 μg/mL, and YK-413 had the lowest total RNA concentration of only 28.36 μg/mL.

Brief Summary

The encapsulation efficiencies and drug loadings of LNP formulations prepared from different designed compounds varied greatly. The encapsulation efficiencies of different compounds ranged from 70% to 9500, the drug loading concentrations ranged from 20 to 50 μg/mL, and the total RNA concentration ranged from 25 to 55 μg/mL. It can be seen that LNP formulations prepared from compounds with similar structures do not necessarily have similar encapsulation efficiencies and drug loadings.

Summary

LNP formulations prepared from some of the compounds designed in this application including YK-407, YK-401, YK-402, YK-403, YK-422 and YK-423 had significantly improved encapsulation efficiencies, drug loading concentrations and total RNA concentrations, compared with cationic lipids in the prior art such as SM-102, ALC-0315, compound 21, compound 23, HHMA and YK-009. For example, YK-407 could have an encapsulation efficiency 29.0% higher than compound 23, a drug loading concentration 1.78 times that of compound 23, and a total RNA concentration 1.41 times that of compound 21.

It can be seen that using YK-407, YK-401, YK-402, YK-403, YK-422 and YK-423 to prepare carriers for delivering mRNA significantly improved the encapsulation efficiencies and drug loadings. Therefore, the amount of LNP can be significantly reduced, and LNP-mRNA formulation products with more uniform distribution and more controllable quality in the application of multivalent mRNA vaccines can be provided.

The encapsulation efficiencies and drug loadings of LNP formulations prepared from different designed compounds varied greatly. For different compounds, the encapsulation efficiencies ranged from 70% to 95%, the drug loading concentrations ranged from 20 to 50 μg/mL, and the total RNA concentrations ranged from 25 to 55 μg/mL. It can be seen that LNP formulations prepared from compounds with similar structures do not necessarily have similar encapsulation efficiencies and drug loadings. On the contrary, the encapsulation efficiencies and drug loadings are very likely to be significantly different, so the encapsulation efficiencies and drug loadings of LNP formulations cannot be predicted based on the structure of compounds from which they are prepared.

Example 7: In Vitro Verification of the Performance of LNP Delivery Carriers

Cell recovery and passage: the method was the same as in Example 3.

Seeding plate: the method was the same as in Example 3.

1. Fluorescent Detection of Fluc-mRNA

An LNP formulation containing 0.3 μg of Fluc-mRNA (prepared according to Example 4, and the carrier components of the LNP formulation were cationic lipid, neutral lipid, structured lipid and polymer-conjugated lipid at a molar ratio of 49:10:39.5:1.5, wherein the cationic lipid was listed in Table 1) was added to the cell culture medium of a 96-well plate, and further incubated for 24 hours. The corresponding reagents were added according to the instructions of the *Gaussia* Luciferase Assay Kit, and the fluorescence expression intensity of each well was detected by an IVIS fluorescence detection system. This test verified the transfection efficiencies of LNP formulations in cells, see Tables 6-9 for test results.

Test Results:

(1) The compounds of the present application, including YK-407, YK-401, YK-402, YK-403, 422 and YK-423, were significantly different in chemical structure from the cationic lipids in the prior art.

A series of compounds designed in this application, including YK-407, YK-401, YK-402, YK-403, 422 and YK-423, were significantly different in chemical structure from the cationic lipids in the prior art. For example, these compounds differ a lot in the structure from HIMA; these compounds have significantly different head structures including $G_3$, $G_4$ and L groups and significantly different $G_1$, $L_1$, $R_1$, $G_2$, $L_2$ and $R_2$ groups from SM-102, ALC-0315, compound 21, compound 23 and YK-009. See Table 5 for structural comparison.

TABLE 5

Structural Comparison of the designed compounds and representative cationic lipids in the prior art

| Name | Structure |
|---|---|
| YK-407 | |
| YK-401 | |
| YK-402 | |
| YK-403 | |
| YK-422 | |

TABLE 5-continued

Structural Comparison of the designed compounds and representative cationic lipids in the prior art

| Name | Structure |
|---|---|
| YK-423 | YK-423 |
| YK-009 | YK-009 |
| SM-102 | SM-102 |
| ALC-0315 | ALC-0315 |
| Compound 21 | compound 21 |

TABLE 5-continued

Structural Comparison of the designed compounds and representative cationic lipids in the prior art

| Name | Structure |
|---|---|
| Compound 23 | compound 23 |
| HHMA | HHMA |

As can be seen from Table 5, this series of designed compounds, including YK-407, YK-401, YK-402, YK-403, YK-422 and YK-423, have significant different chemical structures compared with the representative cationic lipids in the prior art. YK-009 is disclosed in CN114044741B (claim 1), SM-102 is compound 25 disclosed in WO2017049245A2 (page 29 of the specification), ALC-0315 is compound 3 disclosed in CN108368028B (page 24 of the specification), compound 21 and compound 23 are disclosed in WO2021055833A1 (page 22 of the specification), and HHMA is compound 1 disclosed in CN112979483B (page 12 of the specification).

This series of designed compounds in the present application are compared with the representative cationic lipids in the prior art.

1) This series of designed compounds have the biggest structural difference from HHMA. It can be seen from the chemical structure that only one side chain in the groups connected to the central N atom of HHMA is similar to one side chain in this series of compounds, and the other parts are significantly different.

2) This series of designed compounds have significantly different head structure compared with SM-102, ALC-0315, compound 21, compound 23 and YK-009. The head structures of this series of designed compound include two tertiary amine groups, an L group connected to the nitrogen atoms of the two tertiary amine groups, and $G_3$ and $G_4$ groups connected to the nitrogen atoms of the two tertiary amine groups respectively, while the head structures of SM-102, ALC-0315, compound 21, compound 23 and YK-009 only include one tertiary amine group and a $HO(CH_2)_2$— group connected to the nitrogen atom of the tertiary amine group. In addition, the $G_1$, $L_1$, $R_1$, $G_2$, $L_2$ and $R_2$ groups of this series of designed compounds are also significantly different from those of SM-102, ALC-0315, compound 21, compound 23 and YK-009. Due to the very large differences of the head structure, this series of designed compounds are also significantly different in polarity, acidity and alkalinity and hydrophilicity from SM-102, ALC-0315, compound 21, compound 23, HHMA and YK-009.

The details are as follows:

I. YK-407

YK-407 has significant structural differences compared with the cationic lipids in the prior art such as SM-102, ALC-0315, Compound 21, Compound 23, YK-009 and HHMA.

Compared with SM-102, YK-407 has a significantly different head group. There are two tertiary amine groups in the head group of YK-407. The L group connected to the nitrogen atoms of the two tertiary amines in YK-407 is —$(CH_2)_2$—, and $G_3$ and $G_4$ groups in YK-407 are both $HO(CH_2)_2$—. In contrast, there is one tertiary amine group in the head group of SM-102, and the group connected to the nitrogen atom of the tertiary amine in SM-102 is $HO(CH_2)_2$—. In addition, the $G_1$ group of YK-407 has 2 more C than that of SM-102; the $G_2$ group of YK-407 has 2 less C than that of SM-102.

Compared with ALC-0315, YK-407 has a significantly different head group. There are two tertiary amine groups in the head group of YK-407. The L group connected to the nitrogen atoms of the two tertiary amines in YK-407 is —$(CH_2)_2$—, and the $G_3$ and $G_4$ groups in YK-407 are both $HO(CH_2)_2$—. In contrast, there is one tertiary amine group in the head group of ALC-0315, and the group connected to the nitrogen atom of the tertiary amine in ALC-0315 is $HO(CH_2)_4$— group. In addition, the $G_1$ group of YK-407 has 3 less C than that of ALC-0315; the $L_1$ group of YK-407 is —C(O)O—, while the $L_1$ group of ALC-0315 is —OC(O)—; the $R_1$ group in YK-407 is a linear structure, while the $R_1$ group in ALC-0315 is a branched chain structure; the $L_2$ group in YK-407 is —C(O)O—, while the $L_2$ group in ALC-0315 is —OC(O)—; the $G_2$ group of YK-407 has one less C than that of ALC-0315; the $R_2$ group of YK-407 has 2 more C in one single chain of the double chain than that of ALC-0315.

Compared with compound 21, YK-407 has a significantly different head group. There are two tertiary amine groups in the head group of YK-407, the L group connected to the nitrogen atoms of the two tertiary amines in YK-407 is —$(CH_2)_2$—, and the $G_3$ and $G_4$ groups of YK-407 are $HO(CH_2)_2$—. In contrast, there is one tertiary amine group in the head group of compound 21, and the group connected to the nitrogen atom of the tertiary amine in compound 21 is both $HO(CH_2)_2$—. In addition, the $G_1$ group of YK-407 has 4 less C than that of compound 21; the $R_1$ group in YK-407 is of a linear chain structure, while the $R_1$ group in compound 21 is a branched chain structure; and the $G_2$ group of YK-407 has 2 less C than that of compound 21.

Compared with compound 23, YK-407 has a significantly different head group. There are two tertiary amine groups in the head group of YK-407. The L group connected to the nitrogen atoms of the two tertiary amines in YK-407 is —$(CH_2)_2$—, and the $G_3$ and $G_4$ groups in YK-407 are both $HO(CH_2)_2$—. In contrast, there is one tertiary amine group in the head group of compound 23, and the group connected to the nitrogen atom of the tertiary amine in compound 23 is $HO(CH_2)_2$—. In addition, the $G_1$ group of YK-407 has 4 less C than that of compound 23; the $R_1$ group in YK-407 is of a straight-chain structure, while the $R_1$ group in compound 23 is a branched chain structure; the $G_2$ group of YK-407 has 2 less C than that of compound 23; the $R_2$ group of YK-407 has 2 less C in the single chain and 2 more C in each single chain of the double chain compared with compound 23.

Compared with YK-009, YK-407 has a significantly different head group. There are two tertiary amine groups in the head group of YK-407. The L group connected to the nitrogen atoms of the two tertiary amines in YK-407 is —$(CH_2)_2$—, and the $G_3$ and $G_4$ groups in YK-407 are both $HO(CH_2)_2$—. In contrast, there is one tertiary amine group in the head group of YK-009, and the group connected to the nitrogen atom of the tertiary amine in YK-009 is $HO(CH_2)_2$—. In addition, the $R_1$ group of YK-407 has 1 more C than that of YK-009; the $R_2$ group of YK-407 has 1 less C in the single chain than that of YK-009.

Compared with HHMA, YK-407 has a significantly different structure. Only one side chain connected to the N atom in HHMA is similar in structure to one side chain of YK-407, and other parts are significantly different.

II. YK-401

YK-401 has significant structural differences compared with the cationic lipids in the prior art such as SM-102, ALC-0315, Compound 21, Compound 23, YK-009 and HHMA.

Compared with SM-102, YK-401 has a significantly different head group. There are two tertiary amine groups in the head group of YK-401. The L group connected to the nitrogen atoms of the two tertiary amines in YK-401 is —$(CH_2)_2$—, and the $G_3$ and $G_4$ groups in YK-401 are both $HO(CH_2)_2$—. In contrast, there is one tertiary amine group in the head group of SM-102, and the group connected to the nitrogen atom of the tertiary amine in SM-102 is $HO(CH_2)_2$—. In addition, the $R_1$ group in YK-401 is a branched chain structure, while the $R_1$ group in SM-102 is a linear structure; the $G_2$ group of YK-401 has 2 less C than that of SM-102.

Compared with ALC-0315, YK-401 has a significantly different head group. There are two tertiary amine groups in the head group of YK-401. The L group connected to the nitrogen atoms of the two tertiary amines in YK-401 is —$(CH_2)_2$—, and the $G_3$ and $G_4$ groups in YK-401 are both $HO(CH_2)_2$—. In contrast, there is one tertiary amine group in the head group of ALC-0315, and the group connected to the nitrogen atom of the tertiary amine in ALC-0315 is $HO(CH_2)_4$— group. In addition, the $G_1$ group of YK-401 has one less C than that of ALC-0315; the $L_1$ group of YK-401 is —C(O)O—, while the $L_1$ group of ALC-0315 is —OC(O)—; the $R_1$ group of YK-401 has 2 more C in one single chain of the double chain than that of ALC-0315; the $G_2$ group of YK-401 has 1 less C than that of ALC-0315; the $L_2$ group of YK-401 is —C(O)O—, while the $L_2$ group of ALC-0315 is —OC(O)—; the $R_2$ group of YK-401 has 2 more C in one single chain of the double chain than that of ALC-0315.

Compared with compound 21, YK-401 has a significantly different head group. There are two tertiary amine groups in the head group of YK-401. The L group connected to the nitrogen atoms of the two tertiary amines in YK-401 is —$(CH_2)_2$—, and the $G_3$ and $G_4$ groups in YK-401 are both $HO(CH_2)_2$—. In contrast, there is one tertiary amine group in the head group of compound 21, and the group connected to the nitrogen atom of the tertiary amine in compound 21 is $HO(CH_2)_2$—. In addition, the $G_1$ group of YK-401 has 2 less C than that of compound 21; the $R_1$ group of YK-401 has 2 less C in the single chain than that of compound 21, and has 2 more C in each single chain of the double chain than that of compound 21; the $G_2$ group of YK-401 has 2 less C than that of compound 21.

Compared with compound 23, YK-401 has a significantly different head group. There are two tertiary amine groups in the head group of YK-401. The L group connected to the nitrogen atoms of the two tertiary amines in YK-401 is —$(CH_2)_2$—, and the $G_3$ and $G_4$ groups in YK-401 are both $HO(CH_2)_2$—. In contrast, there is one tertiary amine group in the head group of compound 23, and the group connected to the nitrogen atom of the tertiary amine in compound 23 is $HO(CH_2)_2$—. In addition, the $G_1$ group of YK-401 has 2 less C than that of compound 23; the $R_1$ group of YK-401 has 2 less C in the single chain than that of compound 23, and has 2 more C in each single chain of the double chain than that of compound 23; the $G_2$ group of YK-401 has 2 less C than that of compound 23; the $R_2$ group of YK-401 has 2 less C in the single chain than that of compound 23, and has 2 more C in each single chain of the double chain than that of compound 23.

Compared with YK-009, YK-401 has a significantly different head group. There are two tertiary amine groups in the head group of YK-401. The L group connected to the nitrogen atoms of the two tertiary amines in YK-401 is —$(CH_2)_2$—, and the $G_3$ and $G_4$ groups in YK-401 are both $HO(CH_2)_2$—. In contrast, there is one tertiary amine group in the head group of YK-009, and the group connected to the nitrogen atom of the tertiary amine in YK-009 is $HO(CH_2)_2$—. In addition, the $G_1$ group of YK-401 has 2 more C than that of YK-009; the $R_1$ group in YK-401 is a branched chain structure, while the $R_1$ group in YK-009 is a linear structure; the $R_2$ group of YK-401 has 1 less C in the single chain than that of YK-009.

Compared with HHMA, YK-401 has a significantly different structure. Only one side chain connected to the N atom in HHMA is similar in structure to one side chain of YK-401, and other parts are significantly different.

III. YK-402

YK-402 has significant structural differences compared with the cationic lipids in the prior art such as SM-102, ALC-0315, Compound 21, Compound 23, YK-009 and HHMA.

Compared with SM-102, YK-402 has a significantly different head group. There are two tertiary amine groups in the head group of YK-402. The L group connected to the nitrogen atoms of the two tertiary amines in YK-402 is —(CH$_2$)$_2$—, and the G$_3$ and G$_4$ groups in YK-402 are both HO(CH$_2$)$_2$—. In contrast, there is one tertiary amine group in the head group of SM-102, and the group connected to the nitrogen atom of the tertiary amine in SM-102 is HO(CH$_2$)$_2$—. In addition, the G$_1$ group of YK-402 has 1 more C than that of SM-102; the L$_1$ group of YK-402 is —OC(O)—, while the L$_1$ group of SM-102 is —C(O)O—; the R$_1$ group of YK-402 is a branched chain structure, while the R$_1$ group of SM-102 is a linear structure; the G$_2$ group of YK-402 has 1 less C than that of SM-102; the L$_2$ group of YK-402 is —OC(O)—, while the L$_2$ group of SM-102 is —C(O)O—.

Compared with ALC-0315, YK-402 has a significantly different head group. There are two tertiary amine groups in the head group of YK-402. The L group connected to the nitrogen atoms of the two tertiary amines in YK-402 is —(CH$_2$)$_2$—, and the G$_3$ and G$_4$ groups in YK-402 are both HO(CH$_2$)$_2$—. In contrast, there is one tertiary amine group in the head group of ALC-0315, and the group connected to the nitrogen atom of the tertiary amine in ALC-0315 is HO(CH$_2$)$_4$— group. In addition, the R$_1$ group of YK-402 has 2 more C in one single chain of the double chain than that of ALC-0315; the R$_2$ group of YK-402 has 2 more C in one single chain of the double chain than that of ALC-0315.

Compared with compound 21, YK-402 has a significantly different head group. There are two tertiary amine groups in the head group of YK-402. The L group connected to the nitrogen atoms of the two tertiary amines in YK-402 is —(CH$_2$)$_2$—, and the G$_3$ and G$_4$ groups in YK-402 are both HO(CH$_2$)$_2$—. In contrast, there is one tertiary amine group in the head group of compound 21, and the group connected to the nitrogen atom of the tertiary amine in compound 21 is HO(CH$_2$)$_2$—. In addition, the G$_1$ group of YK-402 has 1 less C than that of compound 21; the L$_1$ group of YK-402 is —OC(O)—, while the L$_1$ group of compound 21 is —C(O)O—; the R$_1$ group of YK-402 has 2 less C in the single chain than that of compound 21, and has 2 more C in each single chain of the double chain than that of compound 21; the G$_2$ group of YK-402 has 1 less C than that of compound 21; the L$_2$ group of YK-402 is —OC(O)—, while the L$_2$ group of compound 21 is —C(O)O—.

Compared with compound 23, YK-402 has a significantly different head group. There are two tertiary amine groups in the head group of YK-402. The L group connected to the nitrogen atoms of the two tertiary amines in YK-402 is —(CH$_2$)$_2$—, and the G$_3$ and G$_4$ groups in YK-402 are both HO(CH$_2$)$_2$—. In contrast, there is one tertiary amine group in the head group of compound 23, and the group connected to the nitrogen atom of the tertiary amine in compound 23 is HO(CH$_2$)$_2$—. In addition, the G$_1$ group of YK-402 has 1 less C than that of compound 23; the L$_1$ group of YK-402 is —OC(O)—, while the L$_1$ group of compound 23 is —C(O)O—; the R$_1$ group of YK-402 has 2 less C in the single chain than that of compound 23, and has 2 more C in each single chain of the double chain than that of compound 23; the G$_2$ group of YK-402 has 1 less C than that of compound 23; the L$_2$ group of YK-402 is —OC(O)—, while the L$_2$ group of compound 23 is —C(O)O—; the R$_2$ group of YK-402 has 2 less C in the single chain than that of compound 23, and has 2 more C in each single chain of the double chain than that of compound 23.

Compared with YK-009, YK-402 has a significantly different head group. There are two tertiary amine groups in the head group of YK-402. The L group connected to the nitrogen atoms of the two tertiary amines in YK-402 is —(CH$_2$)$_2$—, and the G$_3$ and G$_4$ groups in YK-402 are both HO(CH$_2$)$_2$—. In contrast, there is one tertiary amine group in the head group of YK-009, and the group connected to the nitrogen atom of the tertiary amine in YK-009 is HO(CH$_2$)$_2$—. In addition, the G$_1$ group of YK-402 has 3 more C than that of YK-009; the L$_1$ group of YK-402 is —OC(O)—, while the L$_1$ group of YK-009 is —C(O)O—; the R$_1$ group of YK-402 is a branched chain structure, while the R$_1$ group of YK-009 is a linear structure; the G$_1$ group of YK-402 has one more C than that of YK-009; the L$_2$ group of YK-402 is —OC(O)—, while the L$_2$ group of YK-009 is —C(O)O—; the R$_2$ group of YK-402 has 1 less C in the single chain than that of YK-009.

Compared with HHMA, YK-402 has a significantly different structure. Only one side chain connected to the N atom in HHMA is similar in structure to one side chain of YK-402, and other parts are significantly different.

IV. YK-403

YK-403 has significant structural differences compared with the cationic lipids in the prior art such as SM-102, ALC-0315, Compound 21, Compound 23, YK-009 and HHMA.

Compared with SM-102, YK-403 has a significantly different head group. There are two tertiary amine groups in the head group of YK-403. The L group connected to the nitrogen atoms of the two tertiary amines in YK-403 is —(CH$_2$)$_2$—, and the G$_3$ and G$_4$ groups in YK-403 are both HO(CH$_2$)$_2$—. In contrast, there is one tertiary amine group in the head group of SM-102, and the group connected to the nitrogen atom of the tertiary amine in SM-102 is HO(CH$_2$)$_2$—. In addition, the G$_1$ group of YK-403 has 2 more C than that of SM-102; the R$_1$ group of YK-403 is a branched chain structure, while the R$_1$ group of SM-102 is a linear structure.

Compared with ALC-0315, YK-403 has a significantly different head group. There are two tertiary amine groups in the head group of YK-403. The L group connected to the nitrogen atoms of the two tertiary amines in YK-403 is —(CH$_2$)$_2$—, and the G$_3$ and G$_4$ groups in YK-403 are both HO(CH$_2$)$_2$—. In contrast, there is one tertiary amine group in the head group of ALC-0315, and the group connected to the nitrogen atom of the tertiary amine in ALC-0315 is HO(CH$_2$)$_4$— group. In addition, the G$_1$ group of YK-403 has one more C than that of ALC-0315; the L$_1$ group of YK-403 is —C(O)O—, while the L$_1$ group of ALC-0315 is —OC(O)—; One single chain in the double chain of the R$_1$ group of YK-403 has 2 more C than that of ALC-0315; the G$_2$ group of YK-403 has 1 more C than that of ALC-0315; the L$_2$ group of YK-403 is —C(O)O—, while the L$_2$ group of ALC-0315 is —OC(O)—.

Compared with compound 21, YK-403 has a significantly different head group. There are two tertiary amine groups in the head group of YK-403. The L group connected to the nitrogen atoms of the two tertiary amines in YK-403 is —(CH$_2$)$_2$—, and the G$_3$ and G$_4$ groups in YK-403 are both HO(CH$_2$)$_2$—. In contrast, there is one tertiary amine group in the head group of compound 21, and the group connected to the nitrogen atom of the tertiary amine in compound 21 is HO(CH$_2$)$_2$—. In addition, the R$_1$ group of YK-403 has 2 less C in the single chain than that of compound 21, and has 2 more C in each single chain of the double chain than that of compound 21.

Compared with compound 23, YK-403 has a significantly different head group. There are two tertiary amine groups in the head group of YK-403. The L group connected to the nitrogen atoms of the two tertiary amines in YK-403 is —(CH$_2$)$_2$—, and the G$_3$ and G$_4$ groups in YK-403 are both HO(CH$_2$)$_2$—. In contrast, there is one tertiary amine group in the head group of compound 23, and the group connected to the nitrogen atom of the tertiary amine in compound 23 is HO(CH$_2$)$_2$—. In addition, the R$_1$ group of YK-403 has 2 less C in the single chain than that of compound 23, and has 2 more C in each single chain of the double chain than that of compound 23; the R$_2$ group of YK-403 has 2 less C in the single chain than that of compound 23, and has 2 more C in each single chain of the double chain than that of compound 23.

Compared with YK-009, YK-403 has a significantly different head group. There are two tertiary amine groups in the head group of YK-403. The L group connected to the nitrogen atoms of the two tertiary amines in YK-403 is —(CH$_2$)$_2$—, and the G$_3$ and G$_4$ groups in YK-403 are both HO(CH$_2$)$_2$—. In contrast, there is one tertiary amine group in the head group of YK-009, and the group connected to the nitrogen atom of the tertiary amine in YK-009 is HO(CH$_2$)$_2$—. In addition, the G$_1$ group of YK-403 has 4 more C than that of YK-009; the R$_1$ group of YK-403 is a branched chain structure, while the R$_1$ group in YK-009 is a linear structure; the G$_2$ group of YK-403 has 2 more C than that of YK-009; the R$_2$ group of YK-403 has 1 less C in the single chain than that of YK-009.

Compared with HHMA, YK-403 has a significantly different structure. Only one side chain connected to the N atom in HHMA is similar in structure to one side chain of YK-403, and other parts are significantly different.

V. YK-422

YK-422 has significant structural differences compared with the cationic lipids in the prior art such as SM-102, ALC-0315, Compound 21, Compound 23, YK-009 and HHMA.

Compared with SM-102, the head group of YK-422 is significantly different. There are two tertiary amine groups in the head group of YK-422. The L group connected to the nitrogen atoms of the two tertiary amines in YK-422 is —(CH$_2$)$_2$—, and the G$_3$ and G$_4$ groups in YK-422 are both HO(CH$_2$)$_3$—. In contrast, there is one tertiary amine group in the head group of SM-102, and the group connected to the nitrogen atom of the tertiary amine in SM-102 is HO(CH$_2$)$_2$—. In addition, the R$_1$ group of YK-422 is a branched chain structure, while the R$_1$ group in SM-102 is a linear structure; the G$_2$ group of YK-422 has 2 less C than that of SM-102; the R$_2$ group of YK-422 has 1 more C in the single chain than that of SM-102.

Compared with ALC-0315, the head group of YK-422 is significantly different. There are two tertiary amine groups in the head group of YK-422. The L group connected to the nitrogen atoms of the two tertiary amines in YK-422 is —(CH$_2$)$_2$—, and the G$_3$ and G$_4$ groups in YK-422 are both HO(CH$_2$)$_3$—. In contrast, there is one tertiary amine group in the head group of ALC-0315, and the group connected to the nitrogen atom of the tertiary amine in ALC-0315 is HO(CH$_2$)$_2$—. In addition, the G$_1$ group of YK-422 has one less C than that of ALC-0315; the L$_1$ group of YK-422 is —C(O)O—, while the L$_1$ group of ALC-0315 is —OC(O)—; One single chain in the double chain of the R$_1$ group of YK-422 has 2 more C than that of ALC-0315; the G$_2$ group of YK-422 has 1 less C than that of ALC-0315; the L$_2$ group of YK-422 is —C(O)O—, while the L$_2$ group of ALC-0315 is —OC(O)—; the R$_2$ group of YK-422 has 2 more C in one single chain of the double chain than that of ALC-0315.

Compared with compound 21, the head group of YK-422 is significantly different. There are two tertiary amine groups in the head group of YK-422. The L group connected to the nitrogen atoms of the two tertiary amines in YK-422 is —(CH$_2$)$_2$—, and the G$_3$ and G$_4$ groups in YK-422 are both HO(CH$_2$)$_3$—. In contrast, there is one tertiary amine group in the head group of compound 21, and the group connected to the nitrogen atom of the tertiary amine in compound 21 is HO(CH$_2$)$_2$—. In addition, the G$_1$ group of YK-422 has 2 less C than that of compound 21; the R$_1$ group of YK-422 has 1 less C in the single chain than that of compound 21, and has 2 more C in each single chain of the double chain than that of compound 21; the G$_2$ group of YK-422 has 2 less C than that of compound 21; the R$_2$ group of YK-422 has 1 more C in the single chain than that of compound 21.

Compared with compound 23, the head group of YK-422 is significantly different. There are two tertiary amine groups in the head group of YK-422. The L group connected to the nitrogen atoms of the two tertiary amines in YK-422 is —(CH$_2$)$_2$—, and the G$_3$ and G$_4$ groups in YK-422 are both HO(CH$_2$)$_3$—. In contrast, there is one tertiary amine group in the head group of compound 23, and the group connected to the nitrogen atom of the tertiary amine in compound 23 is HO(CH$_2$)$_2$—. In addition, the G$_1$ group of YK-422 has 2 less C than that of compound 23; the R$_1$ group of YK-422 has 1 less C in the single chain than that of compound 23, and has 2 more C in each single chain of the double chain than that of compound 23; the G$_2$ group of YK-422 has 2 less C than that of compound 23; the R$_2$ group of YK-422 has 1 less C in the single chain than that of compound 23, and has 2 more C in each single chain of the double chain than that of compound 23.

Compared with YK-009, the head group of YK-422 is significantly different. There are two tertiary amine groups in the head group of YK-422. The L group connected to the nitrogen atoms of the two tertiary amines in YK-422 is —(CH$_2$)$_2$—, and the G$_3$ and G$_4$ groups in YK-422 are both HO(CH$_2$)$_3$—. In contrast, there is one tertiary amine group in the head group of YK-009, and the group connected to the nitrogen atom of the tertiary amine in YK-009 is HO(CH$_2$)$_2$—. In addition, the G$_1$ group of YK-422 has 2 more C than that of YK-009; the R$_1$ group in YK-422 is a branched chain structure, while the R$_1$ group in YK-009 is a linear structure.

Compared with HHMA, YK-422 has a significantly different structure. Only one side chain connected to the N atom in HHMA is similar in structure to one side chain of YK-422, and other parts are significantly different.

VI. YK-423

YK-423 has significant structural differences compared with the cationic lipids in the prior art such as SM-102, ALC-0315, Compound 21, Compound 23, YK-009 and HHMA.

Compared with SM-102, the head group of YK-423 is significantly different. There are two tertiary amine groups in the head group of YK-423. The L group connected to the nitrogen atoms of the two tertiary amines in YK-423 is —(CH$_2$)$_3$—, and the G$_3$ and G$_4$ groups in YK-423 are HO(CH$_2$)$_3$—. In contrast, there is one tertiary amine group in the head group of SM-102, and the group connected to the nitrogen atom of the tertiary amine in SM-102 is HO(CH$_2$)$_2$—. In addition, the R$_1$ group in YK-423 is a branched chain structure, while the R$_1$ group in SM-102 is a linear structure; the G$_2$ group of YK-423 has 2 less C than that of SM-102; the R$_2$ group of YK-423 has 1 more C in the single chain than that of SM-102.

Compared with ALC-0315, the head group of YK-423 is significantly different. There are two tertiary amine groups in the head group of YK-423. The L group connected to the nitrogen atoms of the two tertiary amines in YK-423 is —(CH$_2$)$_3$—, and the G$_3$ and G$_4$ groups in YK-423 are both HO(CH$_2$)$_3$—. In contrast, there is one tertiary amine group in the head group of ALC-0315, and the group connected to the nitrogen atom of the tertiary amine in ALC-0315 is HO(CH$_2$)$_2$—. In addition, the G$_1$ group of YK-423 has 1 less C than that of ALC-0315; the L$_1$ group of YK-423 is —C(O)O—, while the L$_1$ group of ALC-0315 is —OC(O)—; the R$_1$ group of YK-423 has 1 more C in the single chain than that of ALC-0315, and has 2 more C in one single chain of the double chain than that of ALC-0315; the G$_2$ group of YK-423 has 1 more C than that of ALC-0315; the L$_2$ group of YK-423 is —C(O)O—, while the L$_2$ group of ALC-0315 is —OC(O)—; the R$_2$ group of YK-423 has 1 more C in the single chain than that of ALC-0315 and has 2 more C in one single chain of the double chain than that of ALC-0315.

Compared with compound 21, the head group of YK-423 is significantly different. There are two tertiary amine groups in the head group of YK-423. The L group connected to the nitrogen atoms of the two tertiary amines in YK-423 is —(CH$_2$)$_3$—, and the G$_3$ and G$_4$ groups in YK-423 are both HO(CH$_2$)$_3$—. In contrast, there is one tertiary amine group in the head group of compound 21, and the group connected to the nitrogen atom of the tertiary amine in compound 21 is HO(CH$_2$)$_2$—. In addition, the G$_1$ group of YK-423 has 2 less C than that of compound 21; the R$_1$ group of YK-423 has 1 less C in the single chain than that of compound 21, and has 2 more C in each single chain of the double chain than that of compound 21; the G$_2$ group of YK-423 has 2 less C than that of compound 21; the R$_2$ group of YK-423 has 1 more C in the single chain than that of compound 21.

Compared with compound 23, the head group of YK-423 is significantly different. There are two tertiary amine groups in the head group of YK-423. The L group connected to the nitrogen atoms of the two tertiary amines in YK-423 is —(CH$_2$)$_3$—, and the G$_3$ and G$_4$ groups in YK-423 are both HO(CH$_2$)$_3$—. In contrast, there is one tertiary amine group in the head group of compound 23, and the group connected to the nitrogen atom of the tertiary amine in compound 23 is HO(CH$_2$)$_2$—. In addition, the G$_1$ group of YK-423 has 2 less C than that of compound 23; the R$_1$ group of YK-423 has 1 less C in the single chain than that of compound 23, and has 2 more C in each single chain of the double chain than that of compound 23; the G$_2$ group of YK-423 has 2 less C than that of compound 23; the R$_2$ group of YK-423 has 1 less C in the single chain than that of compound 23, and has 2 more C in each single chain of the double chain than that of compound 23.

Compared with YK-009, the head group of YK-423 is significantly different. There are two tertiary amine groups in the head group of YK-423. The L group connected to the nitrogen atoms of the two tertiary amines in YK-423 is —(CH$_2$)$_3$—, and the G$_3$ and G$_4$ groups in YK-423 are both HO(CH$_2$)$_3$—. In contrast, there is one tertiary amine group in the head group of YK-009, and the group connected to the nitrogen atom of the tertiary amine in YK-009 is HO(CH$_2$)$_2$—. In addition, the G$_1$ group of YK-423 has 2 more C than that of YK-009; the R$_1$ group in YK-423 is a branched chain structure, while the R$_1$ group in YK-009 is a linear structure.

Compared with HHMA, YK-423 has a significantly different structure. Only one side chain connected to the N atom in HHMA is similar in structure to one side chain of YK-423, and other parts are significantly different.

From the above comparison, it can be seen that this series of designed compounds, including YK-407, YK-401, YK-402, YK-403, YK-422 and YK-423, are very different in chemical structure from the cationic lipid compounds in the prior art, such as SM-102, ALC-0315, compound 21, compound 23, HHMA and YK-009. The structures of this series of compounds are significantly different from HHMA; and are significantly different from SM-102, ALC-0315, compound 21, compound 23 and YK-009, in terms of the head groups including G$_3$, G$_4$ and L groups, as well as in terms of G$_1$, L$_1$, R$_1$, G$_2$, L$_2$ and R$_2$ groups.

Due to the significant differences in chemical structure, there are also significant differences in terms of the physical and chemical properties of this series of compounds, such as polarity, acidity and alkalinity and hydrophilicity, from those of SM-102, ALC-0315, compound 21, compound 23, HHMA and YK-009. Therefore, it is impossible to speculate on the cell transfection efficiencies, cytotoxicities, and in vivo expressions in animals of LNP formulations prepared from this series of compounds on the basis of the cationic lipid compounds described above in the prior art.

(2) Among a series of designed compounds, LNP formulations prepared from YK-407, YK-401, YK-402, YK-422 and YK-423 had the highest cell transfection efficiencies, which were significantly higher than those of the representative cationic lipids in the prior art. For example, the cell transfection efficiency of YK-407 could reach 12 times that of SM-102, 13 times that of compound 21, and 15 times that of compound 23.

TABLE 6

Fluorescence detection results 1 of Fluc-mRNA

| Serial No. | Name | Relative light unit (RLU) | Ratio relative to SM-102 | Multiple of YK-407 | Multiple of YK-401 | Multiple of YK-402 | Multiple of YK-403 | Multiple of YK-422 | Multiple of YK-423 |
|---|---|---|---|---|---|---|---|---|---|
| 1 | YK-407 | 20385506 | 11.96 | 1.00 | 0.28 | 0.25 | 0.26 | 0.32 | 0.31 |
| 2 | YK-401 | 5609550 | 3.29 | 3.63 | 1.00 | 0.90 | 0.94 | 1.15 | 1.11 |
| 3 | YK-402 | 5044102 | 2.96 | 4.04 | 1.11 | 1.00 | 1.04 | 1.28 | 1.23 |
| 4 | YK-403 | 5249304 | 3.08 | 3.88 | 1.07 | 0.96 | 1.00 | 1.23 | 1.19 |
| 5 | YK-422 | 6432971 | 3.77 | 3.17 | 0.87 | 0.78 | 0.82 | 1.00 | 0.97 |
| 6 | YK-423 | 6227115 | 3.65 | 3.27 | 0.90 | 0.81 | 0.84 | 1.03 | 1.00 |
| 7 | YK-009 | 5146376 | 3.02 | 3.96 | 1.09 | 0.98 | 1.02 | 1.25 | 1.21 |
| 8 | SM-102 | 1704121 | 1.00 | 11.96 | 3.29 | 2.96 | 3.08 | 3.77 | 3.65 |
| 9 | ALC-0315 | 2189470 | 1.28 | 9.31 | 2.56 | 2.30 | 2.40 | 2.94 | 2.84 |
| 10 | Compound 21 | 1511024 | 0.89 | 13.49 | 3.71 | 3.34 | 3.47 | 4.26 | 4.12 |

TABLE 6-continued

Fluorescence detection results 1 of Fluc-mRNA

| Serial No. | Name | Relative light unit (RLU) | Ratio relative to SM-102 | Multiple of YK-407 | Multiple of YK-401 | Multiple of YK-402 | Multiple of YK-403 | Multiple of YK-422 | Multiple of YK-423 |
|---|---|---|---|---|---|---|---|---|---|
| 11 | Compound 23 | 1402597 | 0.82 | 14.53 | 4.00 | 3.60 | 3.74 | 4.59 | 4.44 |
| 12 | HHMA | 2078940 | 1.22 | 9.81 | 2.70 | 2.43 | 2.52 | 3.09 | 3.00 |
| 13 | Lipofectamine 3000 | 1200541 | 0.70 | 16.98 | 4.67 | 4.20 | 4.37 | 5.36 | 5.19 |

Differences in Cell Transfection Efficiency

Table 6 lists the fluorescence detection results of LNP formulations containing Fluc-mRNA prepared from different cationic lipids. Wherein, YK-009 is disclosed in CN114044741B (claim 1), compound 21 and compound 23 are disclosed in WO2021055833A1 (page 22 of the specification), SM-102 is compound 25 disclosed in WO2017049245A2 (page 29 of the specification), ALC-0315 is compound 3 disclosed in CN108368028B (page 24 of the specification), and HHMA is compound 1 disclosed in CN112979483B (page 12 of the specification); Lipofectamine 3000 is currently a widely used cell transfection reagent with good transfection performance.

Figure 5:
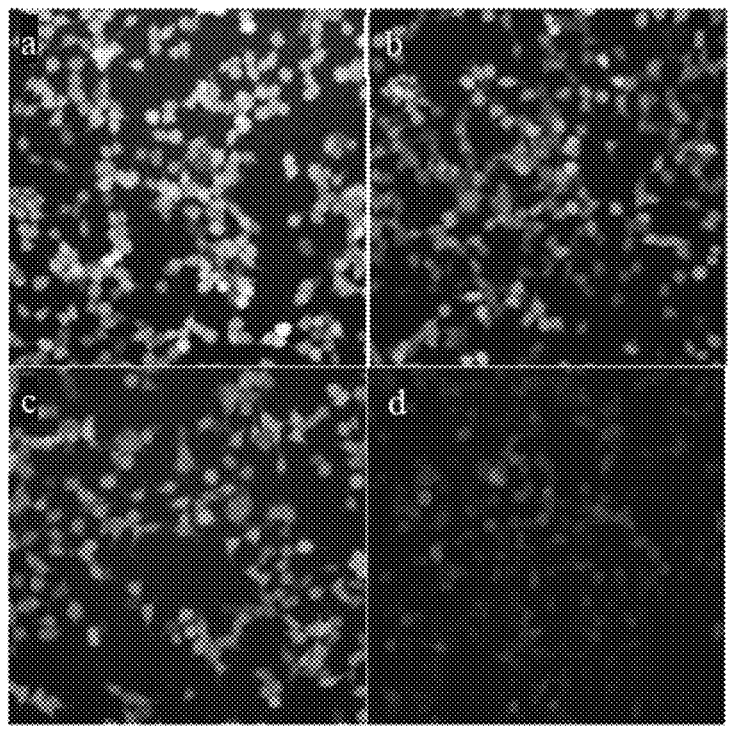
FIG. 5 shows the fluorescence absorption intensity of LNP formulations of Fluc-mRNA prepared from different cationic lipids (a: YK-407; b: YK-401; c: YK-423; d: SM-102).

It can be seen from Table 6 and FIG. 5 that the LNP formulations containing Fluc-mRNA prepared from YK-407, YK-401, YK-402, YK-403, YK-422 and YK-423 had the strongest fluorescence absorption with RLU values being 20385506, 5609550, 5044102, 5249304, 6432971 and 6227115, respectively.

RLU value of YK-407 could reach 11.96 times that of SM-102, 9.31 times that of ALC-0315, 13.49 times that of compound 21, 14.53 times that of compound 23, 9.81 times that of HHMA, 16.98 times that of Lipofectamine 3000 and 3.96 times that of YK-009.

RLU value of YK-401 could reach 3.29 times that of SM-102, 2.56 times that of ALC-0315, 3.71 times that of compound 21, 4.00 times that of compound 23, 2.70 times that of HHMA, 4.67 times that of Lipofectamine 3000 and 1.09 times that of YK-009.

RLU value of YK-402 could reach 2.96 times that of SM-102, 2.30 times that of ALC-0315, 3.34 times that of compound 21, 3.60 times that of compound 23, 2.43 times that of HHMA, 4.20 times that of Lipofectamine 3000 and 0.98 times that of YK-009.

RLU value of YK-403 could reach 3.08 times that of SM-102, 2.40 times that of ALC-0315, 3.47 times that of compound 21, 3.74 times that of compound 23, 2.52 times that of HHMA, 4.37 times that of Lipofectamine 3000 and 1.02 times that of YK-009.

RLU value of YK-422 could reach 3.77 times that of SM-102, 2.94 times that of ALC-0315, 4.26 times that of compound 21, 4.59 times that of compound 23, 3.09 times that of HHMA, 5.36 times that of Lipofectamine 3000 and 1.25 times that of YK-009.

RLU value of YK-423 could reach 3.65 times that of SM-102, 2.84 times that of ALC-0315, 4.12 times that of compound 21, 4.44 times that of compound 23, 3.00 times that of HHMA, 5.19 times that of Lipofectamine 3000 and 1.21 times that of YK-009.

The data were analyzed using GraphPad Prism software. Any one of YK-407, YK-401, YK-402, YK-403, YK-422 and YK-423 was significant different from SM-102, ALC-0315, compound 21, compound 23, HHMA, and Lipofectamine 300. YK-407 was significant different from YK-009 with significantly improved transfection efficiency.

Brief Summary

In terms of chemical structure, a series of designed compounds, including YK-407, YK-401, YK-402, YK-403, YK-422 and YK-423, are very different from the cationic lipids in the prior art. For example, compared with SM-102, ALC-0315, compound 21, compound 23 and YK-009, the head structures of this series of designed compounds, including $G_3$, $G_4$ and L groups, are significantly different, wherein, there are two tertiary amine groups in the head structures of this series of compounds; the nitrogen atoms of the two tertiary amine groups in this series of compounds are connected by the L group; the head structures in this series of compounds also have two hydroxyl-containing groups $G_3$ and $G_4$, which are $HO(CH_2)_2$— or $HO(CH_2)_3$—, connected to the nitrogen atoms of the two tertiary amine respectively, while the head groups of SM-102, ALC-0315, compound 21, compound 23 and YK-009 only contain one tertiary amine group and one hydroxyl-containing group $HO(CH_2)_2$—. Moreover, the $G_1$, $L_1$, $R_1$, $G_2$, $L_2$ and $R_2$ groups of this series of compounds are also very different from those of SM-102, ALC-0315, compound 21, compound 23 and YK-009. The structures of this series of compounds differ greatly from that of HHMA.

LNP formulations prepared from YK-407, YK-401, YK-402, YK-403, YK-422 and YK-423 had the highest cell transfection efficiencies, which were significantly improved in activity compared with the representative cationic lipids in the prior art. For example, the cell transfection efficiency of YK-407 could reach 12 times that of SM-102, 13 times that of compound 21 and 15 times that of compound 23.

At the same time, we found that it is not only compounds similar in chemical structure to the cationic lipids in the prior art that have cell transfection activity. On the contrary, LNP formulations prepared from compounds with greatly different structures may have significantly improved transfection efficiency, and have very strong cell transfection activity.

(3) YK-407, YK-401, YK-402, YK-403, YK-422 and YK-423 had the highest cell transfection efficiencies compared with structurally similar compounds designed in this application where the $G_3$ and $G_4$ groups were both $HO(CH_2)_2$— and the L group was —$(CH_2)_2$—. For example, the cell transfection efficiency of YK-407 could reach 2500 times that of YK-404 and YK-411.

In order to determine whether compounds with similar structures have similar transfection efficiency, the compounds designed in this application with both $G_3$ and $G_4$ groups being $HO(CH_2)_2$—, L being —$(CH_2)_2$—, and other groups being slightly different were compared with YK-407, YK-401, YK-402, YK-403, YK-422, and YK-423. The results show that the activities of this series of compounds varied greatly. Among them, YK-407, YK-401, YK-402, YK-403, YK-422 and YK-423 had the highest cell transfection efficiencies. The transfection efficiency of YK-407 could reach 2500 times that of YK-404 and YK-411. The transfection efficiencies of YK-401, YK-402, YK-403, YK-422 and YK-423 could all reach more than 600 times that of YK-404 and YK-411. The transfection efficiencies were significantly improved.

TABLE 7

Chemical structures of designed compounds

| Name | Structure |
|---|---|
| YK-407 | 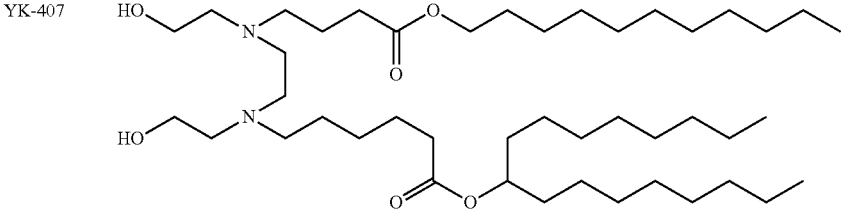 YK-407 |
| YK-401 | 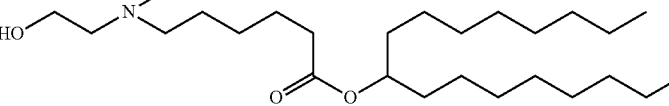 YK-401 |
| YK-402 | 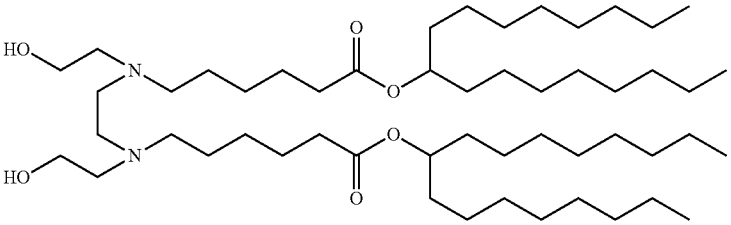 [SMILES: CCCCCCCCC(CCCCCCCC)OC(=O)CCCCCN(CCO)CCN(CCO)CCCCCC(=O)OC(CCCCCCCC)CCCCCCCC] YK-402 |
| YK-403 | 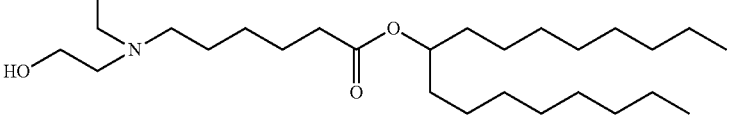 YK-403 |
| YK-422 | 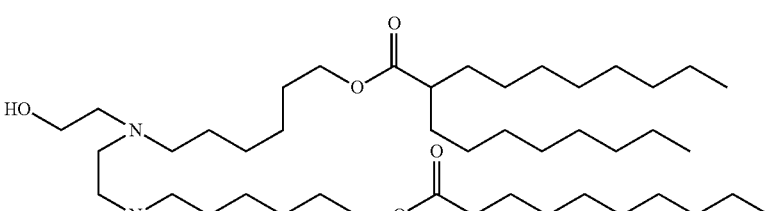 YK-422 |

TABLE 7-continued
Chemical structures of designed compounds
| Name | Structure |
|---|---|
| YK-423 | 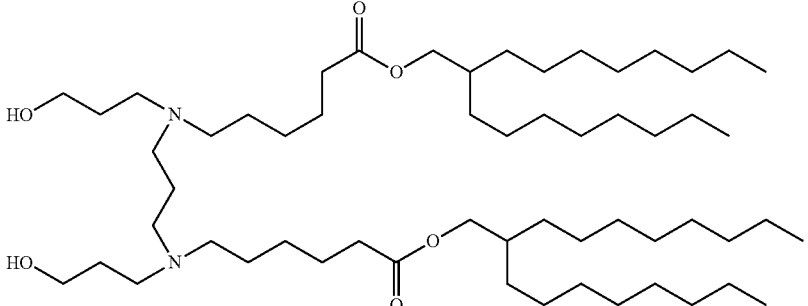 YK-423 |
| YK-404 | 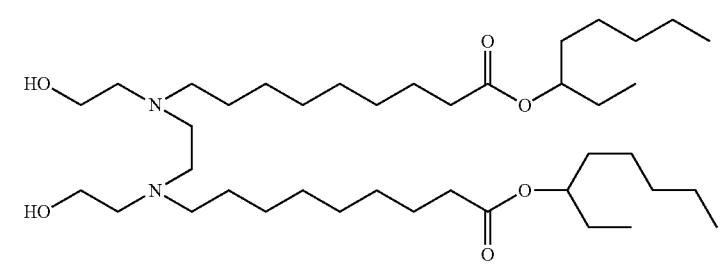 [SMILES: CCCCCC(CC)OC(=O)CCCCCCCCN(CCO)CCN(CCO)CCCCCCCCC(=O)OC(CC)CCCCC] YK-404 |
| YK-405 | 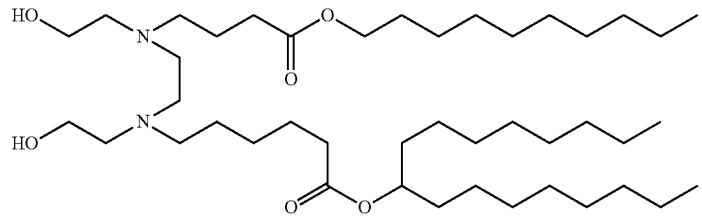 [SMILES: CCCCCCCCCCOC(=O)CCCN(CCO)CCN(CCO)CCCCCC(=O)OC(CCCCCCCC)CCCCCCCC] YK-405 |
| YK-406 | 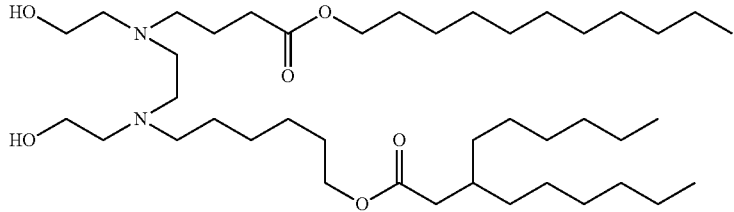 [SMILES: CCCCCCCCCCCOC(=O)CCCN(CCO)CCN(CCO)CCCCCCOC(=O)CC(CCCCCC)CCCCCC] YK-406 |
| YK-408 | 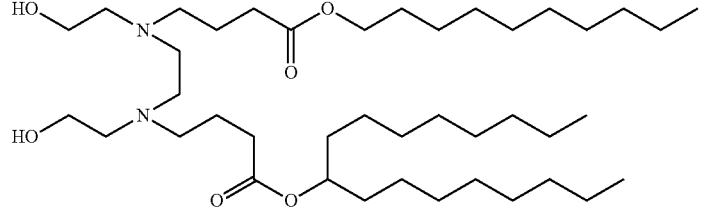 [SMILES: CCCCCCCCCCOC(=O)CCCN(CCO)CCN(CCO)CCCC(=O)OC(CCCCCCCC)CCCCCCCC] YK-408 |

TABLE 7-continued

Chemical structures of designed compounds

| Name | Structure |
|------|-----------|
| YK-409 | YK-409 |
| YK-410 | YK-410 |
| YK-411 | YK-411 |

TABLE 8

Fluorescence detection results 2 of Fluc-mRNA

| Serial No. | Name | Relative light unit (RLU) | Ratio relative to SM-102 | Multiple of YK-407 | Multiple of YK-401 | Multiple of YK-402 | Multiple of YK-403 | Multiple of YK-422 | Multiple of YK-423 |
|---|---|---|---|---|---|---|---|---|---|
| 1 | YK-407 | 20385506 | 11.96 | 1.00 | 0.28 | 0.25 | 0.26 | 0.32 | 0.31 |
| 2 | YK-401 | 5609550 | 3.29 | 3.63 | 1.00 | 0.90 | 0.94 | 1.15 | 1.11 |
| 3 | YK-402 | 5044102 | 2.96 | 4.04 | 1.11 | 1.00 | 1.04 | 1.28 | 1.23 |
| 4 | YK-403 | 5249304 | 3.08 | 3.88 | 1.07 | 0.96 | 1.00 | 1.23 | 1.19 |
| 5 | YK-422 | 6432971 | 3.77 | 3.17 | 0.87 | 0.78 | 0.82 | 1.00 | 0.97 |
| 6 | YK-423 | 6227115 | 3.65 | 3.27 | 0.90 | 0.81 | 0.84 | 1.03 | 1.00 |
| 7 | YK-404 | 7543 | 0.004 | 2702.57 | 743.68 | 668.71 | 695.92 | 852.84 | 825.55 |
| 8 | YK-405 | 3197780 | 1.88 | 6.37 | 1.75 | 1.58 | 1.64 | 2.01 | 1.95 |
| 9 | YK-406 | 78251 | 0.05 | 260.51 | 71.69 | 64.46 | 67.08 | 82.21 | 79.58 |
| 10 | YK-408 | 1474136 | 0.87 | 13.83 | 3.81 | 3.42 | 3.56 | 4.36 | 4.22 |
| 11 | YK-409 | 669807 | 0.39 | 30.43 | 8.37 | 7.53 | 7.84 | 9.60 | 9.30 |
| 12 | YK-410 | 407868 | 0.24 | 49.98 | 13.75 | 12.37 | 12.87 | 15.77 | 15.27 |
| 13 | YK-411 | 7976 | 0.005 | 2555.78 | 703.28 | 632.39 | 658.12 | 806.52 | 780.71 |
| 14 | SM-102 | 1704121 | 1.00 | 11.96 | 3.29 | 2.96 | 3.08 | 3.77 | 3.65 |
| 15 | ALC-0315 | 2189470 | 1.28 | 9.31 | 2.56 | 2.30 | 2.40 | 2.94 | 2.84 |
| 16 | Compound 21 | 1511024 | 0.89 | 13.49 | 3.71 | 3.34 | 3.47 | 4.26 | 4.12 |
| 17 | Compound 23 | 1402597 | 0.82 | 14.53 | 4.00 | 3.60 | 3.74 | 4.59 | 4.44 |
| 18 | HHMA | 2078940 | 1.22 | 9.81 | 2.70 | 2.43 | 2.52 | 3.09 | 3.00 |

TABLE 8-continued

Fluorescence detection results 2 of Fluc-mRNA

| Serial No. | Name | Relative light unit (RLU) | Ratio relative to SM-102 | Multiple of YK-407 | Multiple of YK-401 | Multiple of YK-402 | Multiple of YK-403 | Multiple of YK-422 | Multiple of YK-423 |
|---|---|---|---|---|---|---|---|---|---|
| 19 | Lipofectamine 3000 | 1200541 | 0.70 | 16.98 | 4.67 | 4.20 | 4.37 | 5.36 | 5.19 | a. Differences in Cell Transfection Efficiency

Figure 6:
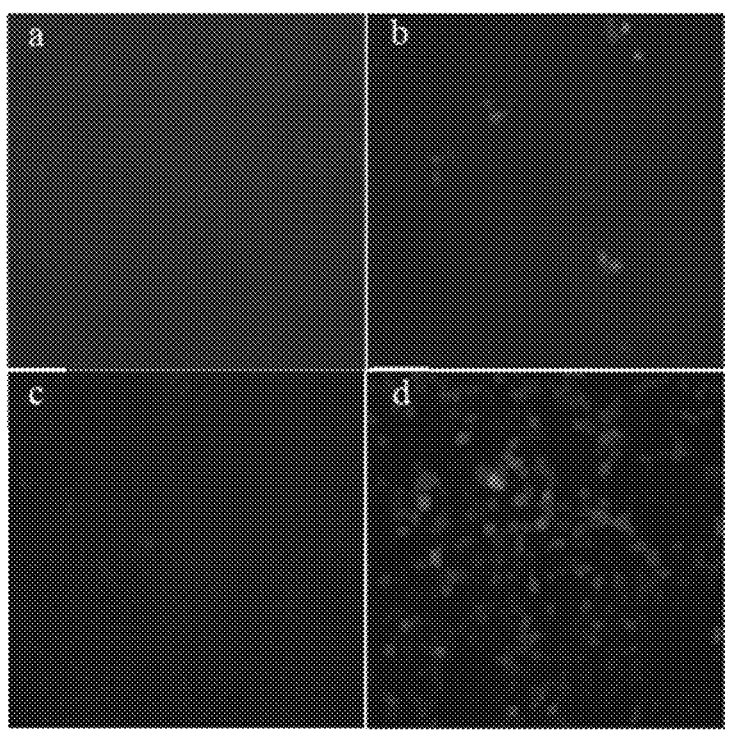
FIG. 6 shows the fluorescence absorption intensity of LNP formulations of Fluc-mRNA prepared from different cationic lipids (a: YK-404; b: YK-406; c: YK-411; d: SM-102).

As can be seen from Table 8 and FIG. 6, the RLU values of LNP formulations prepared from these compounds were very different from those of YK-407, YK-401, YK-402, YK-403, YK-422 and YK-423.

Specifically, YK-404 and YK-411 had the lowest RLU values of 7543 and 7976 respectively, which differed greatly from those of YK-407, YK-401, YK-402, YK-403, YK-422 and YK-423.

The RLU value of YK-407 could reach 2702.57 times and 2555.78 times that of YK-404 and YK-411.

The RLU value of YK-401 could reach 743.68 times and 703.28 times that of YK-404 and YK-411.

The RLU value of YK-402 could reach 668.71 times and 632.39 times that of YK-404 and YK-411.

The RLU value of YK-403 could reach 695.92 times and 658.12 times that of YK-404 and YK-411.

The RLU value of YK-422 could reach 852.84 times and 806.52 times that of YK-404 and YK-411.

The RLU value of YK-423 could reach 825.55 times and 780.71 times that of YK-404 and YK-411.

The RLU value of YK-406 was 78251, which was also very different from YK-407, YK-401, YK-402, YK-403, YK-422 and YK-423.

The RLU values of YK-407, YK-401, YK-402, YK-403, YK-422 and YK-423 were 260.51 times, 71.69 times, 64.46 times, 67.08 times, 82.21 times and 79.58 times that of YK-406 respectively.

The RLU values of YK-405, YK-408, YK-409 and YK-410 were 3197780, 1474136, 669807 and 407868 respectively, which were quite different from those of YK-407, YK-401, YK-402, YK-403, YK-422 and YK-423.

The RLU value of YK-407 could reach 6.37 times that of YK-405, 13.83 times that of YK-408, 30.43 times that of YK-409 and 49.98 times that of YK-410.

The RLU value of YK-401 could reach 1.75 times that of YK-405, 3.81 times that of YK-408, 8.37 times that of YK-409 and 13.75 times that of YK-410.

The RLU value of YK-402 could reach 1.58 times that of YK-405, 3.42 times that of YK-408, 7.53 times that of YK-409 and 12.37 times that of YK-410.

The RLU value of YK-403 could reach 1.64 times that of YK-405, 3.56 times that of YK-408, 7.84 times that of YK-409, and 12.87 times that of YK-410.

The RLU value of YK-422 could reach 2.01 times that of YK-405, 4.36 times that of YK-408, 9.60 times that of YK-409 and 15.77 times that of YK-410.

The RLU value of YK-423 could reach 1.95 times that of YK-405, 4.22 times that of YK-408, 9.30 times that of YK-409 and 15.27 times that of YK-410.

There were also large differences in activity between YK-404, YK-405, YK-406, YK-408, YK-409, YK-410 and YK-411. For cell transfection efficiency, YK-405 was greater than that of SM-102, which was 1.88 times that of SM-102; YK-408 was not much different from SM-102, which was 0.87 times that of SM-102; YK-406 was only 0.05 times that of SM-102; YK-404 and YK-411 were the lowest, which were only 0.004 times and 0.005 times that of SM-102 respectively.

The data were analyzed using GraphPad Prism software, wherein any one of YK-407, YK-401, YK-402, YK-403, YK-422 and YK-423 was significant different from YK-404, YK-405, YK-406, YK-408, YK-409, YK-410 and YK-411, and the transfection efficiency was significantly improved.

b. Differences in Chemical Structure

The structures of this series of compounds are very similar, with only slight differences in some groups. YK-407, YK-401, YK-402, YK-403, YK-422 and YK-423 are very close in structure to other compounds, and other compounds are also very similar to each other.

I. Differences in Structure from YK-407

Compared with YK-407, YK-404 only has differences in: the $G_1$ group of YK-404 has 5 more C; the $R_1$ group in YK-404 is a branched chain structure, while the $R_1$ group in YK-407 is a linear structure; the $G_2$ group of YK-404 has 3 more C; the $R_2$ group of YK-404 has 3 less C in one single chain and 6 less C in another single chain of the double-chain. The other structures are the same, but the cell transfection efficiency of YK-407 reached 2702.57 times that of YK-404.

Compared with YK-407, YK-411 only has differences in: the $G_1$ group of YK-411 has 2 more C; the $R_1$ group of YK-411 has 1 less C; the $R_2$ group of YK-411 has 2 more C in the single chain, and 2 less C in each single chain of the double chain. The other structures are completely the same, but the cell transfection efficiency of YK-407 reached 2555.78 times that of YK-411.

Compared with YK-407, YK-406 only has differences in: the $G_2$ group of YK-406 has one more C; the $L_2$ group of YK-406 is —OC(O)—, while the $L_2$ group of YK-407 is —C(O)O—; the $R_2$ group of YK-406 has one more C in the single chain, and has 2 less C in each single chain of the double chain. The other structures are completely the same, but the cell transfection efficiency of YK-407 reached 260.51 times that of YK-406.

II. Differences in Structure from YK-401

Compared with YK-401, YK-404 only has differences in: the $G_1$ and $G_2$ groups of YK-404 each have 3 more C; the $R_1$ and $R_2$ groups of YK-404 have 3 less C in one single chain, and 6 less C in another single chain of the double chain. The other structures are completely the same, but the cell transfection efficiency of YK-401 reached 743.68 times that of YK-404.

Compared with YK-401, YK-411 only has differences in: the $R_1$ group of YK-411 is a linear structure, while the $R_1$ group of YK-401 is a branched chain structure; the $R_2$ group of YK-411 has 2 more C in the single chain, and 2 less C in each single chain of the double chain. The other structures are completely the same, but the cell transfection efficiency of YK-401 reached 703.28 times that of YK-411.

Compared with YK-401, YK-410 only has differences in: the $R_1$ group of YK-410 is a linear structure, while the $R_1$ group of YK-401 is a branched chain structure; the $R_2$ group of YK-410 has 1 more C in the single chain. The other structures are the same, but the cell transfection efficiency of YK-401 reached 13.75 times that of YK-410.

III. Differences in Structure from YK-402

Compared with YK-402, YK-404 only has differences in: the $G_1$ and $G_2$ groups of YK-404 each have 2 more C; the $L_1$ and $L_2$ groups of YK-404 are —C(O)O—, while the $L_1$ and $L_2$ groups of YK-402 are —OC(O)—; the $R_1$ and $R_2$ groups of YK-404 have 3 less C in one single chain, and 6 less C in another single chain of the double chain. The other structures are completely the same, but the cell transfection efficiency of YK-402 reached 668.71 times that of YK-404.

Compared with YK-402, YK-411 only has differences in: the $G_1$ and $G_2$ groups of YK-411 each have 1 less C; the $R_1$ group in YK-411 is a linear structure, while the $R_1$ group in YK-402 is a branched chain structure; the $R_2$ group of YK-411 has 2 more C in the single chain, and has 2 less C in each single chain of the double chain; the $L_1$ and $L_2$ groups of YK-411 are —C(O)O—, while the $L_1$ and $L_2$ groups of YK-402 are —OC(O)—. The other structures are completely the same, but the cell transfection efficiency of YK-402 reached 632.39 times that of YK-411.

Compared with YK-402, YK-406 only has differences in: the $G_1$ group of YK-406 has 3 less C; the $L_1$ group of YK-406 is —C(O)O—, while the $L_1$ group of YK-402 is —OC(O)—; the $R_1$ group in YK-406 is a linear structure, while the $R_1$ group in YK-402 is a branched chain structure; the $R_2$ group of YK-406 has 1 more C in the single chain, and has 2 less C in each single chain of the double chain. The other structures are the same, but the cell transfection efficiency of YK-402 reached 64.46 times that of YK-406.

IV. Differences in Structure from YK-403

Compared with YK-403, YK-404 only has differences in: the $G_1$ and $G_2$ groups of YK-404 each have only 1 more C; the $R_1$ and $R_2$ groups of YK-404 have 3 less C in one single chain, and have 6 less C in another single chain of the double chain. The other structures are completely the same, but the cell transfection efficiency of YK-403 reached 695.92 times that of YK-404.

Compared with YK-403, YK-411 only has differences in: the $G_1$ and $G_2$ groups of YK-411 each have 2 less C; the $R_1$ group in YK-411 is a linear structure, while the $R_1$ group in YK-403 is a branched chain structure; the $R_2$ group of YK-411 has 2 more C in the single chain, and 2 less C in each single chain of the double chain. The other structures are the same, but the cell transfection efficiency of YK-403 reached 658.12 times that of YK-411.

Compared with YK-403, YK-406 only has differences in: the $G_1$ group of YK-406 has 4 less C; the $R_1$ group in YK-406 is a linear structure, while the $R_1$ group in YK-403 is a branched chain structure; the $G_2$ group of YK-406 has 1 less C; the $L_2$ group of YK-406 is —OC(O)—, while the $L_2$ group of YK-403 is —C(O)O—; the $R_2$ group of YK-406 has 1 more C in the single chain, and has 2 less C in each single chain of the double chain. The other structures are completely the same, but the cell transfection efficiency of YK-403 reached 67.08 times that of YK-406.

V. Differences in Structure from YK-422

Compared with YK-422, YK-404 only has differences in: the $G_1$ and $G_2$ groups of YK-404 each have only 3 more C; the $G_3$ and $G_4$ groups of YK-404 each have 1 less C; the $R_1$ and $R_2$ groups of YK-404 have 1 less C in the single chain, and have 3 less C in one single chain and 6 less C in another single chain of the double chain. The other structures are completely the same, but the cell transfection efficiency of YK-422 reached 852.84 times that of YK-404.

Compared with YK-422, YK-411 only has differences in: the $G_3$ and $G_4$ groups of YK-411 each have 1 less C; the $R_1$ group of YK-411 is a linear structure, while the $R_1$ group in YK-422 is a branched chain structure; the $R_2$ group of YK-411 has 1 more C in the single chain, and 2 less C in each single chain of the double chain. The other structures are the same, but the cell transfection efficiency of YK-422 reached 806.52 times that of YK-411.

Compared with YK-422, YK-406 only has differences in: the $G_1$ group of YK-406 has 2 less C; the $G_3$ and $G_4$ groups of YK-406 each have 1 less C; the $R_1$ group in YK-406 is a linear structure, while the $R_1$ group in YK-422 is a branched chain structure; the $G_2$ group of YK-406 has 1 more C; the $L_2$ group of YK-406 is —OC(O)—, while the $L_2$ group in YK-422 is —C(O)O—; the $R_2$ group of YK-406 has 2 less C in each single chain of the double chain. The other structures are completely the same, but the cell transfection efficiency of YK-422 reached 82.21 times that of YK-406.

VI. Differences in Structure from YK-423

Compared with YK-423, YK-404 only has differences in: the $G_1$ and $G_2$ groups of YK-404 each have only 3 more C; the $G_3$ and $G_4$ groups of YK-404 each have 1 less C; the $R_1$ and $R_2$ groups of YK-404 have 1 less C in the single chain, and have 3 less C in one single chain and 6 less C in another single chain of the double chain. The other structures are the same, but the cell transfection efficiency of YK-423 reached 825.55 times that of YK-404.

Compared with YK-423, YK-411 only has differences in: the $G_3$ and $G_4$ groups of YK-411 each have 1 less C; the $R_1$ group in YK-411 is a linear structure, while the $R_1$ group in YK-423 is a branched chain structure; the $R_2$ group of YK-411 has 1 more C in the single chain, and 2 less C in each single chain of the double chain. The other structures are completely the same, but the cell transfection efficiency of YK-423 reached 780.71 times that of YK-411.

Compared with YK-423, YK-406 only has differences in: the $G_1$ group of YK-406 has 2 less C; the $G_3$ and $G_4$ groups of YK-406 each have 1 less C; the $R_1$ group in YK-406 is a linear structure, while the $R_1$ group in YK-422 is a branched chain structure; the $G_2$ group of YK-406 has 1 more C; the $L_2$ group of YK-406 is —OC(O)—, while the $L_2$ group in YK-423 is —C(O)O—; the $R_2$ group of YK-406 has 2 less C in each single chain of the double chain. The other structures are completely the same, but the cell transfection efficiency of YK-423 reached 79.58 times that of YK-406.

Brief Summary

Compared with structurally similar compounds with $G_3$ and $G_4$ groups being HO(CH$_2$)$_2$— and the L group being —(CH$_2$)$_2$—, YK-407, YK-401, YK-402, YK-403, YK-422 and YK-423 had the highest cell transfection efficiencies. For example, the cell transfection efficiency of YK-407 could reach 2,500 times that of YK-404 and YK-411, while YK-401, YK-402, YK-403, YK-422 and YK-423 could reach more than 600 times that of YK-404 and YK-411. The transfection efficiencies were significantly improved.

At the same time, it was found that there is no corresponding relationship between the structure of a compound and intracellular transfection efficiency. Compounds, even if they have very similar structures, are likely to have very large differences in cell transfection efficiency.

Therefore, it is very difficult and requires a lot of creative work to screen out cationic lipid compounds with high transfection efficiencies from compounds with very similar structures.

(4) Compared with structurally similar compounds with $G_3$ and $G_4$ groups being $HO(CH_2)_2$— or $HO(CH_2)_3$— and the L group being —$(CH_2)_2$—, —$(CH_2)_3$— or —$(CH_2)_4$—, YK-407, YK-401, YK-402, YK-403, YK-422 and YK-423 had the highest cell transfection efficiencies. For example, the transfection efficiency of YK-407 could reach 170 times that of YK-417 and 180 times that of YK-418.

Furthermore, structurally similar compounds with $G_3$ and $G_4$ groups being $HO(CH_2)_2$— or $HO(CH_2)_3$— and the L group being —$(CH_2)_2$—, —$(CH_2)_3$— or —$(CH_2)_4$— were compared with YK-407, YK-401, YK-402, YK-403, YK-422 and YK-423. The results show that the activities of this series of compounds varied greatly, among which YK-407, YK-401, YK-402, YK-403, YK-422 and YK-423 had the highest cell transfection efficiencies. For example, the transfection efficiency of YK-407 could reach 170 times that of YK-417 and 180 times that of YK-418. The transfection efficiencies were significantly improved.

TABLE 9

Chemical structures of designed compounds

| Name | Structure |
|---|---|
| YK-407 | YK-407 |
| YK-401 | YK-401 |
| YK-402 | YK-402 |
| YK-403 | YK-403 |

TABLE 9-continued
Chemical structures of designed compounds
| Name | Structure |
|---|---|
| YK-422 | 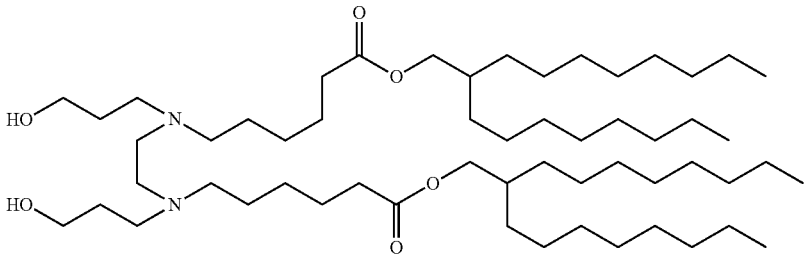 [SMILES: CCCCCCCCC(CCCCCCCC)COC(=O)CCCCCN(CCCO)CCN(CCCO)CCCCCC(=O)OCC(CCCCCCCC)CCCCCCCC]<br>YK-422 |
| YK-423 | 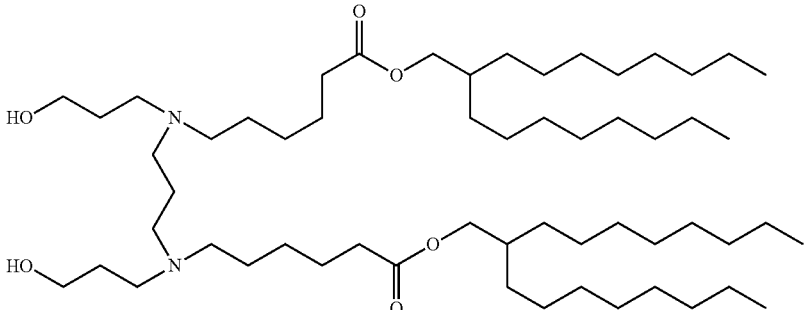<br>YK-423 |
| YK-412 | 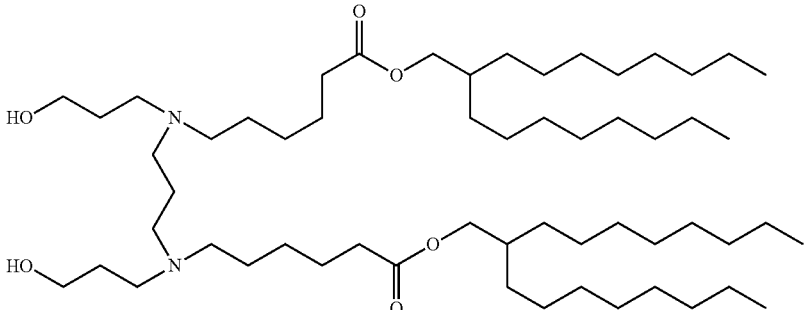<br>YK-412 |
| YK-413 | 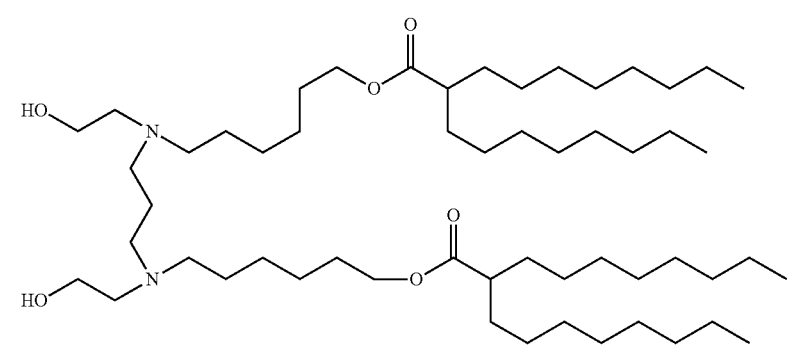 [SMILES: CCCCCCCCC(CCCCCCCC)C(=O)OCCCCCCN(CCO)CCCN(CCO)CCCCCCOC(=O)C(CCCCCCCC)CCCCCCCC]<br>YK-413 |

TABLE 9-continued

Chemical structures of designed compounds

| Name | Structure |
|---|---|
| YK-414 | YK-414 |
| YK-415 | YK-415 |
| YK-416 | YK-416 |
| YK-417 | YK-417 |

TABLE 9-continued
Chemical structures of designed compounds
| Name | Structure |
|---|---|
| YK-418 | 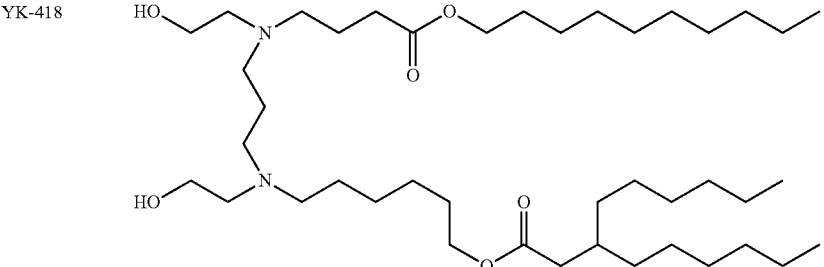 |
| YK-419 | 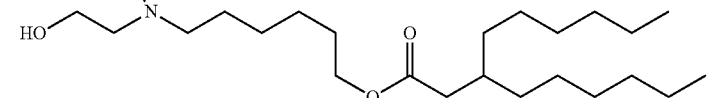 |
| YK-420 | 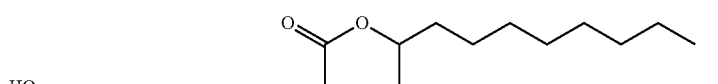 |
| YK-421 | 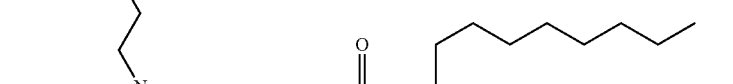 |

TABLE 9-continued

Chemical structures of designed compounds

| Name | Structure |
|---|---|
| YK-424 | YK-424 (structure shown) |

TABLE 10

Fluorescence detection results 3 of Fluc-mRNA

| No. | Name | Relative light unit (RLU) | Ratio relative to SM-102 | Multiple of YK-407 | Multiple of YK-401 | Multiple of YK-402 | Multiple of YK-403 | Multiple of YK-422 | Multiple of YK-423 |
|---|---|---|---|---|---|---|---|---|---|
| 1 | YK-407 | 20385506 | 11.96 | 1.00 | 0.28 | 0.25 | 0.26 | 0.32 | 0.31 |
| 2 | YK-401 | 5609550 | 3.29 | 3.63 | 1.00 | 0.90 | 0.94 | 1.15 | 1.11 |
| 3 | YK-402 | 5044102 | 2.96 | 4.04 | 1.11 | 1.00 | 1.04 | 1.28 | 1.23 |
| 4 | YK-403 | 5249304 | 3.08 | 3.88 | 1.07 | 0.96 | 1.00 | 1.23 | 1.19 |
| 5 | YK-422 | 6432971 | 3.77 | 3.17 | 0.87 | 0.78 | 0.82 | 1.00 | 0.97 |
| 6 | YK-423 | 6227115 | 3.65 | 3.27 | 0.90 | 0.81 | 0.84 | 1.03 | 1.00 |
| 7 | YK-412 | 3371352 | 1.98 | 6.05 | 1.66 | 1.50 | 1.56 | 1.91 | 1.85 |
| 8 | YK-413 | 1377048 | 0.81 | 14.80 | 4.07 | 3.66 | 3.81 | 4.67 | 4.52 |
| 9 | YK-414 | 444089 | 0.26 | 45.90 | 12.63 | 11.36 | 11.82 | 14.49 | 14.02 |
| 10 | YK-415 | 298021 | 0.17 | 68.40 | 18.82 | 16.93 | 17.61 | 21.59 | 20.89 |
| 11 | YK-416 | 3975264 | 2.33 | 5.13 | 1.41 | 1.27 | 1.32 | 1.62 | 1.57 |
| 12 | YK-417 | 117287 | 0.07 | 173.81 | 47.83 | 43.01 | 44.76 | 54.85 | 53.09 |
| 13 | YK-418 | 111251 | 0.07 | 183.24 | 50.42 | 45.34 | 47.18 | 57.82 | 55.97 |
| 14 | YK-419 | 3167322 | 1.86 | 6.44 | 1.77 | 1.59 | 1.66 | 2.03 | 1.97 |
| 15 | YK-420 | 4019330 | 2.36 | 5.07 | 1.40 | 1.25 | 1.31 | 1.60 | 1.55 |
| 16 | YK-421 | 466616 | 0.27 | 43.69 | 12.02 | 10.81 | 11.25 | 13.79 | 13.35 |
| 17 | YK-424 | 2883414 | 1.69 | 7.07 | 1.95 | 1.75 | 1.82 | 2.23 | 2.16 |
| 18 | SM-102 | 1704121 | 1.00 | 11.96 | 3.29 | 2.96 | 3.08 | 3.77 | 3.65 |
| 19 | ALC-0315 | 2189470 | 1.28 | 9.31 | 2.56 | 2.30 | 2.40 | 2.94 | 2.84 |
| 20 | Compound 21 | 1511024 | 0.89 | 13.49 | 3.71 | 3.34 | 3.47 | 4.26 | 4.12 |
| 21 | Compound 23 | 1402597 | 0.82 | 14.53 | 4.00 | 3.60 | 3.74 | 4.59 | 4.44 |
| 22 | HHMA | 2078940 | 1.22 | 9.81 | 2.70 | 2.43 | 2.52 | 3.09 | 3.00 |
| 23 | Lipofectamine 3000 | 1200541 | 0.70 | 16.98 | 4.67 | 4.20 | 4.37 | 5.36 | 5.19 | a. Differences in Cell Transfection Efficiency

Other compounds only have minor differences in some groups as compared with YK-407, YK-401, YK-402, YK-403, YK-422 and YK-423, but have very large impact on cell transfection efficiency, with a difference of 180 times.

Specifically, as can be seen from Table 10, YK-417 and YK-418 were very different from YK-407, YK-401, YK-402, YK-403, YK-422 and YK-423 in cell transfection efficiency.

The cell transfection efficiency of YK-407 could reach 173.81 times that of YK-417 and 183.24 times that of YK-418.

The cell transfection efficiency of YK-401 could reach 47.83 times that of YK-417 and 50.42 times that of YK-418.

The cell transfection efficiency of YK-402 could reach 43.01 times that of YK-417 and 45.34 times that of YK-418.

The cell transfection efficiency of YK-403 could reach 44.76 times that of YK-417 and 47.18 times that of YK-418.

The cell transfection efficiency of YK-422 could reach 54.85 times that of YK-417 and 57.82 times that of YK-418.

The cell transfection efficiency of YK-423 could reach 53.09 times that of YK-417 and 55.97 times that of YK-418.

YK-413, YK-414, YK-415 and YK-421 were very different from YK-407, YK-401, YK-402, YK-403, YK-422 and YK-423 in activity.

The cell transfection efficiency of YK-407 could reach 14.80 times that of YK-413, 45.90 times that of YK-414, 68.40 times that of YK-415 and 43.69 times that of YK-421.

The cell transfection efficiency of YK-401 could reach 4.07 times that of YK-413, 12.63 times that of YK-414, 18.82 times that of YK-415 and 12.02 times that of YK-421.

The cell transfection efficiency of YK-402 could reach 3.66 times that of YK-413, 11.36 times that of YK-414, 16.93 times that of YK-415 and 10.81 times that of YK-421.

The cell transfection efficiency of YK-403 could reach 3.81 times that of YK-413, 11.82 times that of YK-414, 17.61 times that of YK-415 and 11.25 times that of YK-421.

The cell transfection efficiency of YK-422 could reach 4.67 times that of YK-413, 14.49 times that of YK-414, 21.59 times that of YK-415 and 13.79 times that of YK-421.

The cell transfection efficiency of YK-423 could reach 4.52 times that of YK-413, 14.02 times that of YK-414, 20.89 times that of YK-415 and 13.35 times that of YK-421.

The five compounds YK-412, YK-416, YK-419, YK-420 and YK-424 were also quite different from YK-407, YK-401, YK-402, YK-403, YK-422 and YK-423 in activity.

The cell transfection efficiency of YK-407 could reach 6.05 times that of YK-412, 5.13 times that of YK-416, 6.44 times that of YK-419, 5.07 times that of YK-420 and 7.07 times that of YK-424.

The cell transfection efficiency of YK-401 could reach 1.66 times that of YK-412, 1.41 times that of YK-416, 1.77 times that of YK-419, 1.40 times that of YK-420 and 1.95 times that of YK-424.

The cell transfection efficiency of YK-402 could reach 1.50 times that of YK-412, 1.27 times that of YK-416, 1.59 times that of YK-419, 1.25 times that of YK-420 and 1.75 times that of YK-424.

The cell transfection efficiency of YK-403 could reach 1.56 times that of YK-412, 1.32 times that of YK-416, 1.66 times that of YK-419, 1.31 times that of YK-420 and 1.82 times that of YK-424.

The cell transfection efficiency of YK-422 could reach 1.91 times that of YK-412, 1.62 times that of YK-416, 2.03 times that of YK-419, 1.60 times that of YK-420 and 2.23 times that of YK-424.

The cell transfection efficiency of YK-423 could reach 1.85 times that of YK-412, 1.57 times that of YK-416, 1.97 times that of YK-419, 1.55 times that of YK-420 and 2.16 times that of YK-424.

The data were analyzed using GraphPad Prism software. Any one of YK-407, YK-401, YK-402, YK-403, YK-422 and YK-423 was significant different from other compounds and had significantly improved cell transfection efficiency.

b. Differences in Chemical Structure

Compared with YK-407, YK-401, YK-402, YK-403, YK-422 and YK-423, this series of compounds only have slight differences in some groups. YK-407, YK-401, YK-402, YK-403, YK-422 and YK-423 are very close in structure to other compounds, and other compounds are also very similar to each other.

I. Differences in Structure from YK-407

Compared with YK-407, YK-417 only has differences in: the L group of YK-417 has 1 more C; the $G_1$ group of YK-417 has 2 more C; the $R_1$ group of YK-417 has 1 less C; the $R_2$ group of YK-417 has 2 more C in the single chain, and has 2 less C in each single chain of the double chain. The other structures are completely the same, but the cell transfection efficiency of YK-407 reached 173.81 times that of YK-417.

Compared with YK-407, YK-418 only has differences in: the L group of YK-418 has 1 more C; the $R_1$ group of YK-418 has 1 less C; the $G_2$ group of YK-418 has 1 more C; the $L_2$ group of YK-418 is —OC(O)—, while the $L_2$ group in YK-407 is —C(O)O—; the $R_2$ group of YK-418 has 1 more C in the single chain, and has 2 less C in each single chain of the double chain. The other structures are completely the same, but the cell transfection efficiency of YK-407 reached 183.24 times that of YK-418.

Compared with YK-407, YK-415 only has differences in: the L group of YK-415 has 1 more C; the $R_2$ group of YK-415 has 1 more C in the single chain. The other structures are the same, but the cell transfection efficiency of YK-407 reached 68.40 times that of YK-415.

II. Differences in Structure from YK-401

Compared with YK-401, YK-417 only has differences in: the L group of YK-417 has 1 more C; the $R_1$ group in YK-417 is a linear structure, while the $R_1$ group in YK-401 is a branched chain structure; the $R_2$ group of YK-417 has 2 more C in the single chain, and has 2 less C in each single chain of the double chain. The other structures are completely the same, but the cell transfection efficiency of YK-401 reached 47.83 times that of YK-417.

Compared with YK-401, YK-418 only has differences in: the L group of YK-418 has 1 more C; the $G_1$ group of YK-418 has 2 less C; the $R_1$ group in YK-418 is a linear structure, while the $R_1$ group in YK-401 is a branched chain structure; the $G_2$ group of YK-418 has 1 more C; the $L_2$ group of YK-418 is —OC(O)—, while the $L_2$ group in YK-401 is —C(O)O—; the $R_2$ group of YK-418 has 1 more C in the single chain, and has 2 less C in each single chain of the double chain. The other structures are completely the same, but the cell transfection efficiency of YK-401 reached 50.42 times that of YK-418.

Compared with YK-401, YK-415 only has differences in: the L group of YK-415 has 1 more C; the $G_1$ group of YK-415 has 2 less C; the $R_1$ group in YK-415 is a linear structure, while the $R_1$ group in YK-401 is a branched chain structure; the $R_2$ group of YK-415 has 1 more C in the single chain. The other structures are completely the same, but the cell transfection efficiency of YK-401 reached 18.82 times that of YK-415.

III. Differences in Structure from YK-402

Compared with YK-402, YK-417 only has differences in: the L group has 1 more C; the $G_1$ and $G_2$ groups each have 1 less C; the $L_1$ and $L_2$ groups are —C(O)O—, while in YK-402 they are —OC(O)—; the $R_1$ group is a linear structure, while the $R_1$ group in YK-402 is a branched chain structure; the $R_2$ group has 2 more C in the single chain, and 2 less C in each single chain of the double chain. The other structures are the same, but the cell transfection efficiency of YK-402 reached 43.01 times that of YK-417.

Compared with YK-402, YK-418 only has differences in: the L group has 1 more C; the $G_1$ group has 3 less C; the $L_1$ group is —C(O)O—, while in YK-402 it is —OC(O)—; the $R_1$ group is a linear structure, while the $R_1$ group in YK-402 is a branched chain structure; the $R_2$ group has 1 more C in the single chain, and 2 less C in each single chain of the double chain. The other structures are completely the same, but the cell transfection efficiency of YK-402 reached 45.34 times that of YK-418.

Compared with YK-402, YK-415 only has differences in: the L group has 1 more C; the $G_1$ group has 3 less C; the $L_1$ and $L_2$ groups are —C(O)O—, while in YK-402 they are —OC(O)—; the $R_1$ group is a linear structure, while the $R_1$ group in YK-402 is a branched chain structure; the $R_2$ group has 1 more C in the single chain. The other structures are completely the same, but the cell transfection efficiency of YK-402 reached 16.93 times that of YK-415.

IV. Differences in Structure from YK-403

Compared with YK-403, YK-417 only has differences in: the L group has 1 more C; the $G_1$ and $G_2$ groups each have 2 less C; the $R_1$ group is a linear structure, while the $R_1$ group in YK-403 is a branched chain structure; the $R_2$ group has 2 more C in the single chain, and 2 less C in each single chain of the double chain. The other structures are completely the same, but the cell transfection efficiency of YK-403 reached 44.76 times that of YK-417.

Compared with YK-403, YK-418 only has differences in: the L group has 1 more C; the $G_1$ group has 4 less C; the $R_1$ group is a linear structure, while the $R_1$ group in YK-403 is a branched chain structure; the $G_2$ group has 1 less C; the $L_2$ group is —OC(O)—, while in YK-403 it is —C(O)O—; the $R_2$ group has 1 more C in the single chain, and 2 less C in each single chain of the double chain. The other structures are completely the same, but the cell transfection efficiency of YK-403 reached 47.18 times that of YK-418.

Compared with YK-403, YK-414 only has differences in: the L group has 1 more C; the $G_1$ and $G_2$ groups each have 4 less C; the $R_1$ group is a linear structure, while the $R_1$ group in YK-401 it is a branched chain structure. The other structures are completely the same, but the cell transfection efficiency of YK-403 reached 11.82 times that of YK-414.

V. Differences in Structure from YK-422

Compared with YK-422, YK-417 only has differences in: the L group of YK-417 has 1 more C; the $G_3$ and $G_4$ groups of YK-417 each have 1 less C; the $R_1$ group of YK-417 is a linear structure, while the $R_1$ group in YK-422 is a branched chain structure; the $R_2$ group of YK-417 has 1 more C in the single chain, and has 2 less C in each single chain of the double chain. The other structures are completely the same, but the cell transfection efficiency of YK-422 reached 54.85 times that of YK-417.

Compared with YK-422, YK-418 only has differences in: the L group of YK-418 has 1 more C; the $G_3$ and $G_4$ groups of YK-418 each have 1 less C; the $G_1$ group of YK-418 has 2 less C; the $R_1$ group in YK-418 is a linear structure, while the $R_1$ group in YK-422 is a branched chain structure; the $G_2$ group of YK-418 has 1 more C; the $L_2$ group of YK-418 is —OC(O)—, while the $L_2$ group in YK-422 is —C(O)O—; the $R_2$ group of YK-418 has 2 less C in each single chain of the double chain. The other structures are completely the same, but the cell transfection efficiency of YK-422 reached 57.82 times that of YK-418.

Compared with YK-422, YK-414 only has differences in: The L group of YK-414 has 1 more C; the $G_3$ and $G_4$ groups of YK-414 each have 1 less C; the $G_1$ and $G_2$ groups of YK-414 each have 2 less C; the $R_1$ group in YK-414 is a linear structure, while the $R_1$ group in YK-422 is a branched chain structure; the $R_2$ group of YK-414 has 1 less C in the single chain. The other structures are completely the same, but the cell transfection efficiency of YK-422 reached 14.49 times that of YK-414.

VI. Differences in Structure from YK-423

Compared with YK-423, YK-417 only has differences in: the $G_3$ and $G_4$ groups of YK-417 each have 1 less C; the $R_1$ group in YK-417 is a linear structure, while the $R_1$ group in YK-423 is a branched chain structure; the $R_2$ group of YK-417 has 1 more C in the single chain, and has 2 less C in each single chain of the double chain. The other structures are the same, but the cell transfection efficiency of YK-423 reached 53.09 times that of YK-417.

Compared with YK-423, YK-418 only has differences in: the $G_3$ and $G_4$ groups of YK-418 each have 1 less C; the $G_1$ group of YK-418 has 2 less C; the $R_1$ group in YK-418 is a linear structure, while the $R_1$ group in YK-423 is a branched chain structure; the $G_2$ group of YK-418 has 1 more C; the $L_2$ group in YK-418 is —OC(O)—, while the $L_2$ group in YK-423 is —C(O)O—; the $R_2$ group of the $L_2$ group has 2 less C in each single chain of the double chain. The other structures are completely the same, but the cell transfection efficiency of YK-423 reached 55.97 times that of YK-418.

Compared with YK-423, YK-415 only has differences in: the $G_3$ and $G_4$ groups of YK-415 each have 1 less C; the $G_1$ group of YK-415 has 2 less C; the $R_1$ group in YK-415 is a linear structure, while the $R_1$ group in YK-423 is a branched chain structure. The other structures are completely the same, but the cell transfection efficiency of YK-423 reached 20.89 times that of YK-415.

Moreover, the cell transfection efficiency of compounds having very small structural differences among this series of compounds may vary greatly. For example, compared with YK-417, YK-416 only has differences in: the $R_2$ group of YK-416 has 1 less C in the single chain, and has 2 more C in each single chain of the double chain. The other structures are completely the same, but the cell transfection efficiency of YK-416 reached 34 times that of YK-417.

Brief Summary

Compared with a series of structurally similar compounds with $G_3$ and $G_4$ being HO(CH$_2$)$_2$— or HO(CH$_2$)$_3$—, and the L group being —(CH$_2$)$_2$—, —(CH$_2$)$_3$— or —(CH$_2$)$_4$—, YK-407, YK-401, YK-402, YK-403, YK-422 and YK-423 had the highest cell transfection efficiencies. For example, YK-407 could reach 170 times that of YK417 and 180 times that of YK-418. The transfection efficiencies were significantly improved.

At the same time, we found that there is no corresponding relationship between the structure of a compound and intracellular transfection efficiency. Compounds, even if they have very similar structures, are likely to have very large differences in cell transfection efficiency.

Therefore, it is very difficult and requires a lot of creative work to screen out cationic lipid compounds with high transfection efficiencies from a series of compounds, with structures of very small difference.

Summary

1) Through various designs of compound structures and a lot of creative work, we designed and screened cationic lipid compounds with high cell transfection efficiency, such as YK-407, YK-401, YK-402, YK-403, YK-422 and YK-423.

The chemical structures of this series of designed compounds are significantly different from those of representative cationic lipids in the prior art, such as SM-102, ALC-0315, compound 21, compound 23, HHMA and YK-009. Among them, this series of designed compounds have the biggest structural differences from HHMA. HHMA has only one side chain connected to the central N atom that is similar in structure to one side chain of this series of compounds, while other parts are significantly different. The head structures of this series of designed compounds are significantly different from those of SM-102, ALC-0315, compound 21, compound 23 and YK-009, wherein the head structures of this series of designed compounds comprise two tertiary amine groups, an L group connected to nitrogen atoms of the two tertiary amines, and the $G_3$ and $G_4$ groups both containing hydroxyl groups, while the head groups of SM-102, ALC-0315, compound 21, compound 23 and YK-009 comprise only one tertiary amine group and a HO(CH$_2$)$_2$— group connected to the nitrogen atom of the tertiary amine. Due to the very large structural differences, this series of compounds also have significant differences in polarity, acidity and alkalinity and hydrophilicity compared with SM-102, ALC-0315, compound 21, compound 23, HHMA and YK-009.

2) LNP formulations prepared from YK-407, YK-401, YK-402, YK-403, YK-422 or YK-423 had the highest cell transfection efficiencies, and had significantly improved activities compared with representative cationic lipids in the prior art. For example, the cell transfection efficiency of YK-407 could reach 12 times that of SM-102, 13 times that of compound 21, and 15 times that of compound 23.

Compared with structurally similar compounds with $G_3$ and $G_4$ groups being HO(CH$_2$)$_2$— and the L group being —(CH$_2$)$_2$—, YK-407, YK-401, YK-402, YK-403, YK-422 and YK-423 had the highest cell transfection efficiencies. For example, the cell transfection efficiency of YK-407 could reach 2,500 times that of YK-404 and YK-411, while the cell transfection efficiency of YK-401, YK-402, YK-403, YK-422 or YK-423 could reach more than 600 times that of YK-404 and YK-411. The transfection efficiencies were significantly improved.

Compared with a series of structurally similar compounds with $G_3$ and $G_4$ being HO(CH$_2$)$_2$— or HO(CH$_2$)$_3$—, and the L group being —(CH$_2$)$_2$—, —(CH$_2$)$_3$— or —(CH$_2$)$_4$—, YK-407, YK-401, YK-402, YK-403, YK-422 and YK-423 had the highest cell transfection efficiencies. For example, the cell transfection efficiency of YK-407 could reach 170 times that of YK-417 and 180 times that of YK-418. The transfection efficiencies were significantly improved.

3) There is no corresponding relationship between the structure of a compound and intracellular transfection efficiency. Compounds, even if they have very small structural differences, are likely to have very large differences in transfection efficiency. Therefore, it requires multiple designs and a lot of creative work to screen out cationic lipid compounds with high transfection efficiencies.

2. Cell Survival Rate Assay

An LNP formulation containing 1.5 μg of Fluc-mRNA (prepared according to example 4, the carrier components of the LNP formulation were cationic lipid, neutral lipid, structured lipid and polymer-conjugated lipid at a molar ratio of 49:10:39.5:1.5, wherein the cationic lipid was listed in Table 1) and the formulation of Lipofectamine 3000 were added to the cell culture medium of a 96-well plate, and further cultivated for 24 hours. 10 μL of CCK-8 solution was then added to each well, and the culture plate was incubated in an incubator for 1 hour. The absorbance at 450 nm was measured by a microplate reader. The results are shown in Tables 13-16.

Test Results:

(1) Among a series of designed compounds, LNP formulations prepared from YK-407, YK-401, YK402, YK-403, YK-422 and YK-423 had significantly lower cytotoxicities than representative cationic lipids in the prior art. For example, the cell survival rate of YK-401 was 28.00% higher than ALC-0315, 4.31% higher than SM-102, and 10.94% higher than HHMA.

TABLE 11

| | Cell survival rate 1 | |
|---|---|---|
| No. | Cationic lipid | Cell survival rate (%) |
| 1 | YK-407 | 71.37 |
| 2 | YK-401 | 75.21 |
| 3 | YK-402 | 72.70 |
| 4 | YK-403 | 70.76 |
| 5 | YK-422 | 70.48 |
| 6 | YK-423 | 71.14 |
| 7 | YK-009 | 70.43 |
| 8 | SM-102 | 67.90 |
| 9 | ALC-0315 | 47.21 |
| 10 | Compound 21 | 67.84 |
| 11 | Compound 23 | 69.11 |
| 12 | HHMA | 64.27 |
| 13 | Lipofectamine 3000 | 21.66 | a. Difference in Cell Survival Rate

Table 11 lists the cytotoxicity test results of LNP formulations prepared from different cationic lipid compounds. Among them, YK-009 is disclosed in CN114044741B (claim 1), SM-102 is compound 25 disclosed in WO2017049245A2 (page 29 of the specification), ALC-0315 is compound 3 disclosed in CN108368028B (page 24 of the specification), compound 21 and compound 23 are disclosed in WO2021055833A1 (page 22 of the specification), and HHMNA is compound 1 disclosed in CN112979483B (page 12 of the specification); Lipofectamine 3000 is a currently widely used cell transfection reagent with good transfection performance.

It can be seen from Table 11 that the LNP formulations of Fluc-mRNA prepared from YK-407, YK-401, YK402, YK-403, YK-422 and YK-423 had the lowest cytotoxicities, and the cell survival rates thereof could reach 71.37%, 75.21%, 72.70%, 70.76%, 70.48% and 71.1400 respectively.

The cell survival rate of YK-407 was 3.47% higher than SM-102, 24.16% higher than ALC-0315, 3.53% higher than compound 21, 2.26% higher than compound 23, 7.10% higher than HIMA, and 49.71% higher than Lipofectamine 3000.

The cell survival rate of YK-401 was 7.31% higher than SM-102, 28.00% higher than ALC-0315, 7.37% higher than compound 21, 6.10% higher than compound 23, 10.94% higher than HIMA, and 53.55% higher than Lipofectamine 3000.

The cell survival rate of YK-402 was 4.80% higher than SM-102, 25.49% higher than ALC-0315, 4.86% higher than compound 21, 3.59% higher than compound 23, 8.43% higher than HIMA, and 51.04% higher than Lipofectamine 3000.

The cell survival rate of YK-403 was 2.86% higher than SM-102, 23.55% higher than ALC-0315, 2.92% higher than compound 21, 1.65% higher than compound 23, 6.49% higher than HIMA, and 49.10% higher than Lipofectamine 3000.

The cell survival rate of YK-422 was 2.58% higher than SM-102, 23.27% higher than ALC-0315, 2.64% higher than compound 21, 1.37% higher than compound 23, 6.21% higher than HIMA, and 48.82% higher than Lipofectamine 3000.

Figure 7:
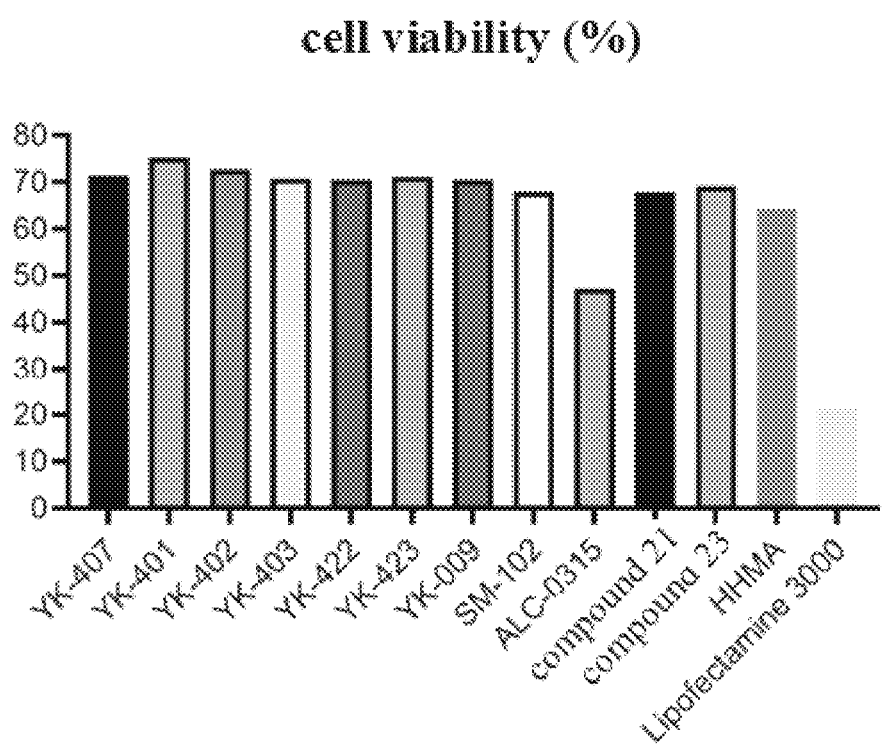
FIG. 7 shows the cell survival rate after introducing into the cell culture medium the LNP formulations of Fluc-mRNA prepared from different cationic lipids (YK-407, YK-401, YK-402, YK-403, YK-422, YK-423, YK-009, SM-102, ALC-0315, compound 21, compound 23 and HHMA) or a Lipofectamine 3000 formulation containing Fluc-mRNA and culturing for 24 hours.

The cell survival rate of YK-423 was 3.24% higher than SM-102, 23.93% higher than ALC-0315, 3.30% higher than compound 21, 2.03% higher than compound 23, 6.87% higher than HIMA, and 49.48% higher than Lipofectamine 3000. (FIG. 7)

The data were analyzed using GraphPad Prism software, wherein any one of YK-407, YK-401, YK402, YK-403, YK-422 and YK-423 was significantly different from SM-102, compound 21, compound 23, ALC-0315, HHMA and Lipofectamine 3000. The cytotoxicities were significantly reduced.

b. Differences in Chemical Structure

YK-407, YK-401, YK-402, YK-403, YK-422 and YK-423 are significantly different in chemical structure from the representative cationic lipids in the prior art. Among them, the biggest difference is with HHMA. It can be seen from the chemical structure that one side chain connected to the central N atom in HHMA is similar to one side chain of this series of compounds, and the other parts are significantly different.

The head structures of this series of designed compounds, including $G_3$, $G_4$ and L groups are significantly different from SM-102, ALC-0315, compound 21, compound 23 and YK-009. The head structures of this series of designed compounds comprise two tertiary amine groups, an L group connected to the nitrogen atoms of the two tertiary amine groups, and the $G_3$ and $G_4$ groups containing hydroxyl, while the head structures of SM-102, ALC-0315, compound 21, compound 23 and YK-009 only comprise one tertiary amine group and $HO(CH_2)_2$— connected to the nitrogen atom of the tertiary amine group. In addition, the $G_1$, $L_1$, $R_1$, $G_2$, $L_2$ and $R_2$ groups of this series of compounds are also significantly different from SM-102, ALC-0315, compound 21, compound 23 and YK-009.

Brief Summary

Among a series of designed compounds, LNP formulations prepared from YK-407, YK-401, YK402, YK-403, YK-422 and YK-423 had the lowest cytotoxicities and significantly improved cell survival rates compared with the representative cationic lipids in the prior art. For example, the cell survival rate of YK-401 was 28.00% higher than ALC-0315, 7.31% higher than SM-102, and 10.94% higher than HHMA.

Compared with representative cationic lipids in the prior art, YK-407, YK-401, YK402, YK-403, YK-422 and YK-423 have significantly different chemical structures and significantly different head groups, as well as significantly different $G_1$, $L_1$, $R_1$, $G_2$, $L_2$ and $R_2$ groups.

Therefore, it is not only LNP formulations prepared from compounds with structures similar to those of prior art cationic lipids that have lower cytotoxicities. In contrast, LNP formulations prepared from compounds with significantly different structures are likely to have significantly reduced cytotoxicities.

(2) Compared with structurally similar compounds in the present application with $G_3$ and $G_4$ groups being $HO(CH_2)_2$— and the L group being —$(CH_2)_2$—, YK-407, YK-401, YK-402, YK-403, YK-422 and YK-423 had the lowest cytotoxicities. For example, the cell survival rate of YK-401 was 58.88% higher than that of YK-411 and 50.25% higher than that of YK-406. The cell survival rate of YK-407 was 55.04% higher than that of YK-411 and 46.41% higher than that of YK-406.

In order to compare the differences in cytotoxicity between structurally similar compounds, the structurally similar compounds with $G_3$ and $G_4$ groups being $HO(CH_2)_2$— and the L group being —$(CH_2)_2$— were compared with YK-407, YK-401, YK-402, YK-403, YK-422 and YK-423 regarding cell survival rate. The results showed that the cytotoxicities of this series of compounds had very significant differences. YK-407, YK-401, YK-402, YK-403, YK-422 and YK-423 had the highest cell survival rate. For example, in terms of cell survival rate, YK-401 was 58.88% higher than YK-411 and 50.25% higher than YK-406; YK-407 was 55.0400 higher than YK-411 and 46.41% higher than YK-406.

TABLE 12

Cell survival rate 2

| No. | Cationic lipid | Cell survival rate (%) |
|---|---|---|
| 1 | YK-407 | 71.37 |
| 2 | YK-401 | 75.21 |
| 3 | YK-402 | 72.70 |
| 4 | YK-403 | 70.76 |
| 5 | YK-422 | 70.48 |
| 6 | YK-423 | 71.14 |
| 7 | YK-404 | 42.12 |
| 8 | YK-405 | 41.86 |
| 9 | YK-406 | 24.96 |
| 10 | YK-408 | 42.31 |
| 11 | YK-409 | 46.11 |
| 12 | YK-410 | 44.92 |
| 13 | YK-411 | 16.33 |
| 14 | SM-102 | 67.90 |
| 15 | ALC-0315 | 47.21 |
| 16 | Compound 21 | 67.84 |
| 17 | Compound 23 | 69.11 |
| 18 | HHMA | 64.27 |
| 19 | Lipofe ctamine 3000 | 21.66 | a. Difference in Cell Survival Rate

As can be seen from Table 12, the cytotoxicities of LNP formulations prepared from these compounds varied greatly. Among them, YK-407, YK-401, YK-402, YK-403, YK-422 and YK-423 had the lowest toxicities and the highest cell survival rates. YK-411 and YK-406 had the lowest cell survival rates of only 16.33% and 24.96%.

The cell survival rate of YK-407 was 55.04% higher than YK-411 and 46.41% higher than YK-406.

The cell survival rate of YK-401 was 58.88% higher than YK-411 and 50.25% higher than YK-406.

The cell survival rate of YK-402 was 56.37% higher than YK-411 and 47.74% higher than YK-406.

The cell survival rate of YK-403 was 54.43% higher than YK-411 and 45.80% higher than YK-406.

The cell survival rate of YK-422 was 54.15% higher than YK-411 and 45.52% higher than YK-406.

The cell survival rate of YK-423 was 54.81% higher than YK-411 and 46.18% higher than YK-406.

The cell survival rates of YK-404, YK-405, YK-408, YK 409 and YK-410 were 42.12%, 41.86%, 42.31%, 46.11% and 44.92% respectively.

The cell survival rate of YK-407 was 29.25% higher than YK-404, 29.51% higher than YK-405, 29.06% higher than YK-408, 25.26% higher than YK-409, and 26.45% higher than YK-410.

The cell survival rate of YK-401 was 33.09% higher than YK-404, 33.35% higher than YK-405, 32.90% higher than YK-408, 29.10% higher than YK-409, and 30.29% higher than YK-410.

The cell survival rate of YK-402 was 30.58% higher than YK-404, 30.84% higher than YK-405, 30.39% higher than YK-408, 26.59% higher than YK-409, and 27.78% higher than YK-410.

The cell survival rate of YK-403 was 28.64% higher than YK-404, 28.90% higher than YK-405, 28.45% higher than YK-408, 24.65% higher than YK-409, and 25.84% higher than YK-410.

The cell survival rate of YK-422 was 28.36% higher than YK-404, 28.62% higher than YK-405, 28.17% higher than YK-408, 24.37% higher than YK-409, and 25.56% higher than YK-410.

Figure 8:
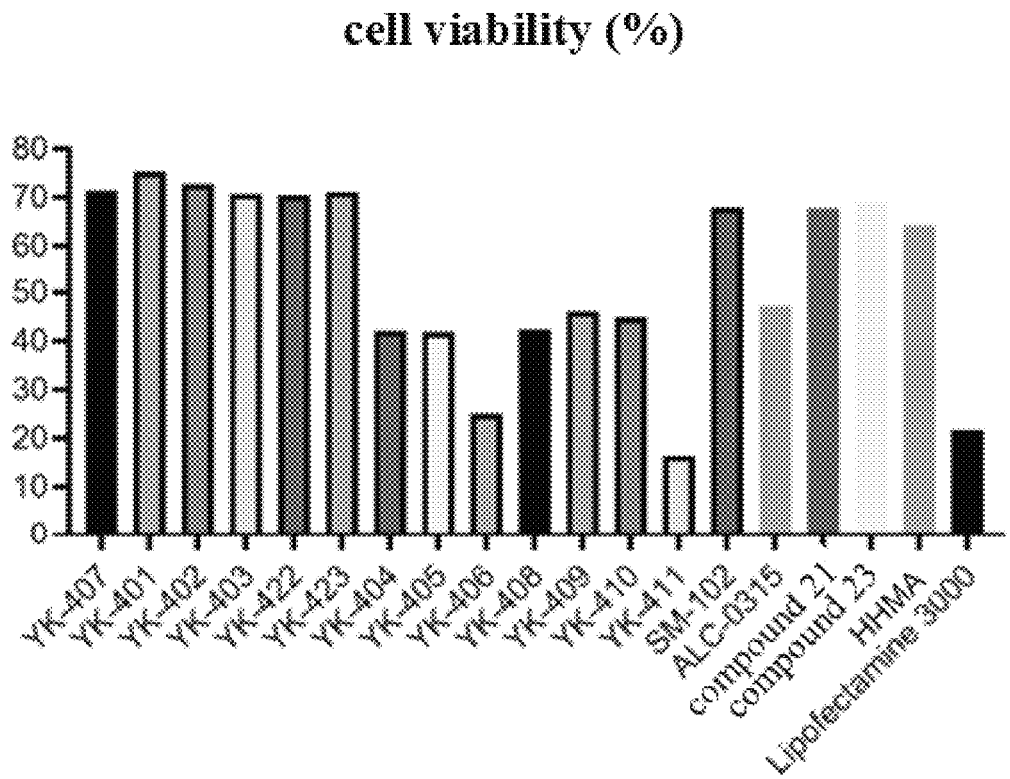
FIG. 8 shows the cell survival rate after introducing into the cell culture medium the LNP formulations of Fluc-mRNA prepared from different cationic lipids (YK-407, YK-401, YK-402, YK-403, YK-422, YK-423, YK-404, YK-405, YK-406, YK-408, YK-409, YK-410, YK-411, SM-102, ALC-0315, compound 21, compound 23 and HHMA) or a Lipofectamine 3000 formulation containing Fluc-mRNA and culturing for 24 hours.

The cell survival rate of YK-423 was 29.02% higher than YK-404, 29.28% higher than YK-405, 28.83% higher than YK-408, 25.03% higher than YK-409, and 26.22% higher than YK-410. (FIG. 8)

The data were analyzed using GraphPad Prism software. Any one of YK-407, YK-401, YK-402, YK-403, YK-422 and YK-423 had a significant difference in cytotoxicity from other compounds, and the cytotoxicity was significantly reduced.

b. Differences in Chemical Structure

The structures of this series of compounds are very similar, with only slight differences in some groups. YK-407, YK-401, YK-402, YK-403, YK-422 and YK-423 are very close in structure to other compounds, and other compounds are also very similar to each other.

Brief Summary

Compared with structurally similar compounds with $G_3$ and $G_4$ groups being $HO(CH_2)_2$— and the L group being —$(CH_2)_2$—, YK-407, YK-401, YK-402, YK-403, YK-422 and YK-423 had the lowest cytotoxicities and the highest cell survival rates. For example, the cell survival rate of YK-401 was 58.88% higher than that of YK-411 and 50.25% higher than that of YK-406; the cell survival rate of YK-407 was 55.04% higher than that of YK-411 and 46.41% higher than that of YK-406.

At the same time, we found that there is no correspondence between the structure of a compound and its cytotoxicity. Even compounds with the most similar structures may have very different cytotoxicities.

Therefore, it is very difficult and requires a lot of creative effort to screen out cationic lipid compounds with low cytotoxicity from compounds having only small differences in chemical structure.

(3) Compared with structurally similar compounds designed in this application with $G_3$ and $G_4$ being $HO(CH_2)_2$— or $HO(CH_2)_3$—, and the L group being —$(CH_2)_2$—, —$(CH_2)_3$— or —$(CH_2)_4$—, YK-407, YK-401, YK-402, YK-403, YK-422 and YK-423 had the lowest cytotoxicities. For example, the cell survival rate of YK-401 was 53.87% higher than YK-417 and 54.16% higher than YK-418, and the cell survival rate of YK-407 was 50.03% higher than YK-417 and 50.32% higher than YK-418.

The differences in cytotoxicity between YK-407, YK-401, YK-402, YK-403, YK-422 and YK-423 and other structurally similar compounds were further compared. This series of compounds had $G_3$ and $G_4$ being $HO(CH_2)_2$— or $HO(CH_2)_3$—, the L group being —$(CH_2)_2$—, —$(CH_2)_3$— or —$(CH_2)_4$—, and other groups being slightly different. The results showed that the cytotoxicities of this series of compounds were very different, wherein YK-407, YK-401, YK-402, YK-403, YK-422 and YK-423 had the highest cell survival rates. For example, the cell survival rate of YK-401 was 53.87 higher than YK-417 and 54.16 higher than YK-418; the cell survival rate of YK-407 is 50.03% higher than YK-417 and 50.32 higher than YK-418.

TABLE 13

| No. | Cationic lipid | Cell survival rate (%) |
|---|---|---|
| | Cell survival rate 3 | |
| 1 | YK-407 | 71.37 |
| 2 | YK-401 | 75.21 |
| 3 | YK-402 | 72.70 |
| 4 | YK-403 | 70.76 |
| 5 | YK-422 | 70.48 |
| 6 | YK-423 | 71.14 |
| 7 | YK-412 | 54.14 |
| 8 | YK-413 | 47.20 |
| 9 | YK-414 | 28.75 |
| 10 | YK-415 | 61.16 |
| 11 | YK-416 | 40.97 |
| 12 | YK-417 | 21.34 |
| 13 | YK-418 | 21.05 |
| 14 | YK-419 | 38.92 |
| 15 | YK-420 | 35.59 |
| 16 | YK-421 | 35.71 |
| 17 | YK-424 | 27.93 |
| 18 | SM-102 | 70.43 |
| 19 | ALC-0315 | 67.90 |
| 20 | Compound 21 | 47.21 |
| 21 | Compound 23 | 67.84 |
| 22 | HHMA | 69.11 |
| 23 | Lipofectamine 3000 | 64.27 | a. Difference in Cell Survival Rate

As can be seen from Table 13, YK-414, YK-417, YK-418 and YK-424 had the lowest cell survival rate, which were 28.75%, 21.34%, 21.05% and 27.93% respectively, all below 30%.

The cell survival rate of YK-407 was 42.62% higher than YK-414, 50.03% higher than YK-417, 50.32% higher than YK-418, and 43.44% higher than YK-424.

The cell survival rate of YK-401 was 46.46% higher than YK-414, 53.87% higher than YK-417, 54.16% higher than YK-418, and 47.28% higher than YK-424.

The cell survival rate of YK-402 was 43.95% higher than YK-414, 51.36% higher than YK-417, 51.65% higher than YK-418, and 44.77% higher than YK-424.

The cell survival rate of YK-403 was 42.01% higher than YK-414, 49.42% higher than YK-417, 49.71% higher than YK-418, and 42.83% higher than YK-424.

The cell survival rate of YK-422 was 41.73% higher than YK-414, 49.14% higher than YK-417, 49.43% higher than YK-418, and 42.55% higher than YK-424.

The cell survival rate of YK-423 was 42.39% higher than YK-414, 49.80% higher than YK-417, 50.09% higher than YK-418, and 43.21% higher than YK-424.

The cell survival rates of YK-412, YK-413, YK-415, YK-416, YK-419, YK-420 and YK-421 were 54.14%, 47.20%, 61.16%, 40.97%, 38.92%, 35.59% and 35.71%, respectively.

The cell survival rate of YK-407 was 17.23% higher than YK-412, 24.17% higher than YK-413, 10.21% higher than YK-415, 30.40% higher than YK-416, 32.45% higher than YK-419, and 35.78% higher than YK-420, 35.66% higher than YK-421.

The cell survival rate of YK-401 was 21.07% higher than YK-412, 28.01% higher than YK-413, 14.05% higher than YK-415, 34.24% higher than YK-416, 36.29% higher than YK-419, and 39.62% higher than YK-420, 39.50% higher than YK-421.

The cell survival rate of YK-402 was 18.56% higher than YK-412, 25.50% higher than YK-413, 11.54% higher than YK-415, 31.73% higher than YK-416, 33.78% higher than YK-419, and 37.11% higher than YK-420, 36.99% higher than YK-421.

The cell survival rate of YK-403 was 16.62% higher than YK-412, 23.56% higher than YK-413, 9.60% higher than YK-415, 29.79% higher than YK-416, 31.84% higher than YK-419, and 35.17% higher than YK-420, 35.05% higher than YK-421.

The cell survival rate of YK-422 was 16.34% higher than YK-412, 23.28% higher than YK-413, 9.32% higher than YK-415, 29.51% higher than YK-416, 31.56% higher than YK-419, and 34.89% higher than YK-420, 34.77% higher than YK-421.

Figure 9:
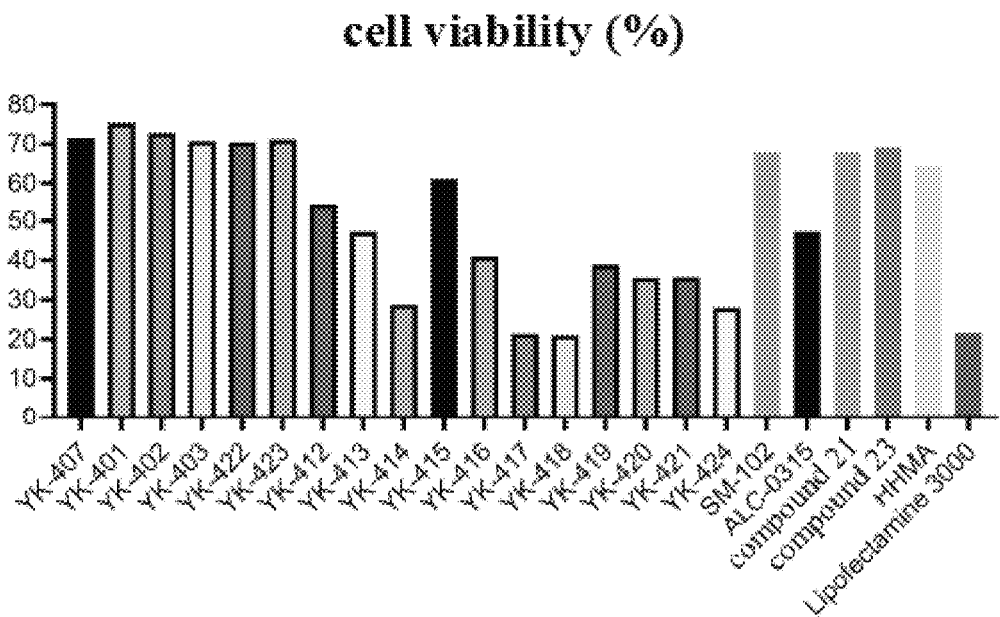
FIG. 9 shows the cell survival rate after introducing into the cell culture medium the LNP formulations of Fluc-mRNA prepared from different cationic lipids (YK-407, YK-401, YK-402, YK-403, YK-422, YK-423, YK-412, YK-413, YK-414, YK-415, YK-416, YK-417, YK-418, YK-419, YK-420, YK-421, YK-424, SM-102, ALC-0315, compound 21, compound 23 and HHMA) or a Lipofectamine 3000 formulation containing Fluc-mRNA and culturing for 24 hours.
Figure 10:
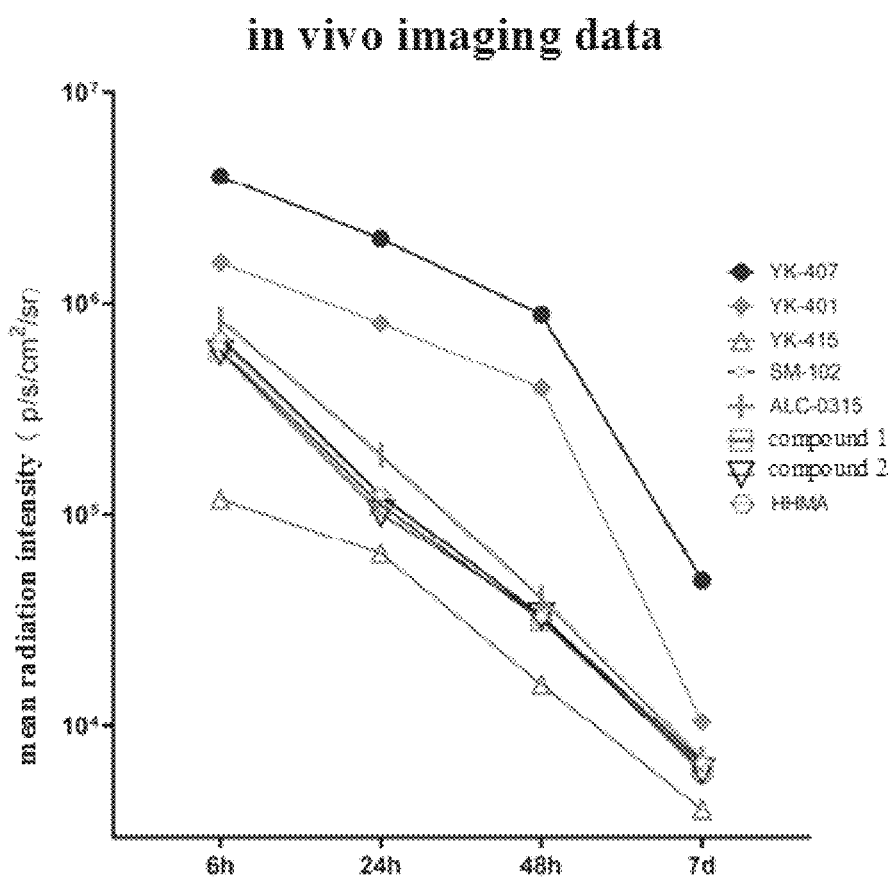
FIG. 10 shows the results of in vivo mouse imaging tests of LNP formulations of Fluc-mRNA prepared from different cationic lipids (YK-407, YK-401, YK-415, SM-102, ALC-0315, compound 21, compound 23 and HHMA).
Figure 11:
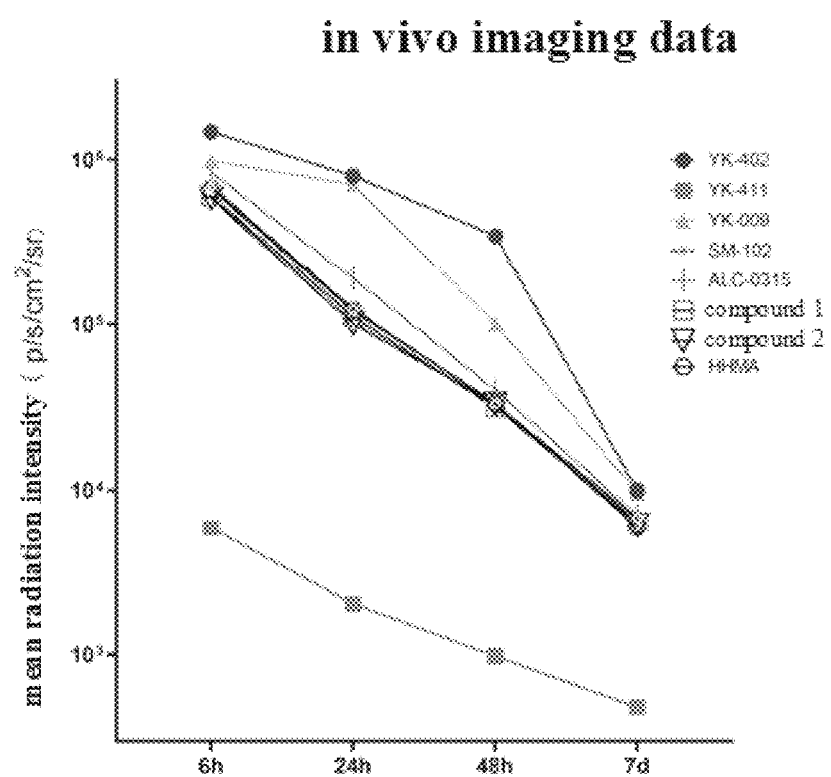
FIG. 11 shows the results of in vivo mouse imaging tests of LNP formulations of Fluc-mRNA prepared from different cationic lipids (YK-402, YK-411, YK-009, SM-102, ALC-0315, compound 21, compound 23 and HHMA).
Figure 12:
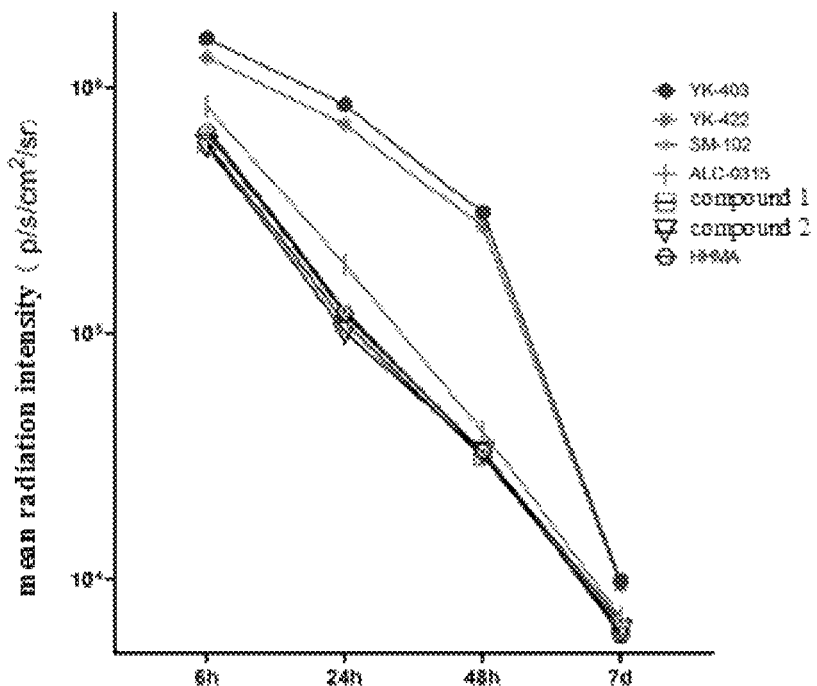
FIG. 12 shows the results of in vivo mouse imaging tests of LNP formulations of Fluc-mRNA prepared from different cationic lipids (YK-403, YK-422, SM-102, ALC-0315, compound 21, compound 23 and HHMA).
Figure 13:
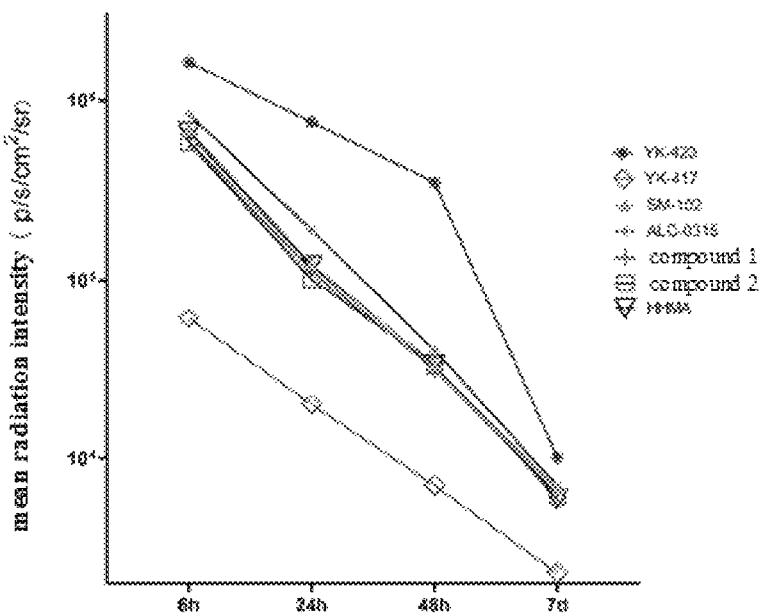
FIG. 13 shows the results of in vivo mouse imaging tests of LNP formulations of Fluc-mRNA prepared from different cationic lipids (YK-423, YK-417, SM-102, ALC-0315, compound 21, compound 23 and HHMA).

The cell survival rate of YK-423 was 17.00% higher than YK-412, 23.94% higher than YK-413, 9.98% higher than YK-415, 30.17% higher than YK-416, 32.22% higher than YK-419, and 35.55% higher than YK-420, 35.43% higher than YK-421. (FIG. 9)

The data were analyzed using GraphPad Prism software. Any one of YK-412, YK-413, YK-415, YK-416, YK-419, YK-420 and YK-421 had significant differences in cytotoxicity from other compounds. The cytotoxicities were significantly reduced.

b. Differences in Chemical Structure

The structures of this series of compounds were very similar, with only slight differences in some groups. YK-407, YK-401, YK-402, YK-403, YK-422 and YK-423 were very close in structure to other compounds, and other compounds were also very similar to each other.

Brief Summary

Compared with a series of structurally similar compounds with $G_3$ and $G_4$ being $HO(CH_2)_2-$ or $HO(CH_2)_3-$, and the L group being $-(CH_2)_2-$, $-(CH_2)_3-$ or $-(CH_2)_4-$, YK-407, YK-401, YK-402, YK-403, YK-422 and YK-423 had the lowest cytotoxicities. For example, the cell survival rate of YK-401 was 53.87% higher than YK-417 and 54.16% higher than YK-418, and the cell survival rate of YK-407 was 50.03% higher than YK-417 and 50.32% higher than YK-418.

At the same time, we found that there is no correspondence between the structure of the compounds and their cytotoxicities. Even if their structural differences are very small, their cytotoxicities are likely to vary significantly.

Therefore, it is very difficult and requires a lot of creative effort to screen out cationic lipid compounds with low cytotoxicity from compounds having only minor differences in some groups.

Summary

1) We performed cell survival rate assays on LNP preparations obtained from this series of designed compounds and screened out cationic lipid compounds with low cytotoxicity, such as YK-407, YK-401, YK402, YK-403, YK-422 and YK-423.

The chemical structures of this series of designed compounds are significantly different from those of representative cationic lipids in the prior art, such as SM-102, ALC-0315, compound 21, compound 23, HHMA and YK-009. Among them, this series of designed compounds have the biggest structural differences from HHMA. HHMA has only one side chain connected to the central N atom that is similar in structure to one side chain of this series of compounds, while other parts are significantly different. Compared with SM-102, ALC-0315, compound 21, compound 23 and YK-009, the head structures are significantly different and all other groups are also different. Due to the very large structural differences, polarity, acidity and alkalinity and hydrophilicity can also be significantly different.

2) LNP formulations prepared from YK-407, YK-401, YK402, YK-403, YK-422 and YK-423 had the lowest cytotoxicities and significantly improved cell survival rates compared with representative cationic lipids in the prior art. For example, the cell survival rate of YK-401 was 28.00% higher than that of ALC-0315, 7.31% higher than that of SM-102, and 10.94% higher than that of HHMA.

Compared with structurally similar compounds with $G_3$ and $G_4$ groups being $HO(CH_2)_2-$ and the L group being $-(CH_2)_2-$, YK-407, YK-401, YK-402, YK-403, YK-422 and YK-423 had the lowest cytotoxicities and the highest cell survival rate. For example, the cell survival rate of YK-401 was 58.88% higher than that of YK-411 and 50.25% higher than that of YK-406; the cell survival rate of YK-407 was 55.04% higher than that of YK-411 and 46.41% higher than that of YK-406.

Compared with a series of structurally similar compounds with $G_3$ and $G_4$ being $HO(CH_2)_2-$ or $HO(CH_2)_3-$, and the L group being $-(CH_2)_2-$, $-(CH_2)_3-$ or $-(CH_2)_4-$, YK-407, YK-401, YK-402, YK-403, YK-422 and YK-423 had the lowest cytotoxicities. For example, the cell survival rate of YK-401 was 53.87% higher than that of YK-417 and 54.16% higher than that of YK-418, and the cell survival rate of YK-407 was 50.03% higher than that of YK-417 and 50.32% higher than that of YK-418.

3) There is no correspondence between the structure of a compound and its cytotoxicity. Even compounds with small structural differences are likely to have very large differences in cytotoxicity. Therefore, their cytotoxicity cannot be predicted based on their chemical structure, and it is very difficult and requires a lot of creative work to screen out cationic lipid compounds with low cytotoxicity.

Example 8: In Vivo Validation of the Performance of Cationic Lipid Delivery Carriers In addition, we also verified the protein expression and duration of mRNA delivered through the designed cationic lipid in mice. In vivo tests further proved that our LNP delivery carriers can effectively deliver mRNA into the body and make the mRNA expression efficient and sustainable.

The LNP formulation (prepared according to Example 4) containing 10 g Fluc-mRNA was injected intramuscularly into female BALB/C mice aged 4-6 weeks and weighed 17-19 g, and the mice were intraperitoneally injected with fluorescent imaging substrate at specific time points after administration (6h, 24 h, 48h and 7d), where the mice were allowed to free move for 5 minutes, and then the average radiation intensity (corresponding to fluorescence expression intensity) of the protein expression of the mRNA carried by the LNP in the mice was detected by the IVIS Spectrum small animal in vivo imaging system.

Test Results:

a. Expression of mRNA in Mice

The average radiation intensity detection results of proteins expressed in mice by mRNA in LNP formulations are shown in Table 14-16 and FIG. 10 to FIG. 13. Among this series of designed compounds, LNP formulations prepared from YK-407, YK-401, YK-402, YK-403, YK-422 and YK-423 had high and sustained expressions of mRNA in mice, which were significantly improved compared with those of the representative cationic lipids in the prior art. For example, an mRNA expression in mice of YK-407 could reach 27 times that of SM-102, 22 times that of ALC-0315, 28 times that of compound 21, 27 times that of compound 23, and 27 times that of HHMA. The mRNA expression in mice was consistent with the cell transfection activity.

TABLE 14

Test data 1 of the in vivo imaging in mice

| Serial No. | Cationic lipid | 6 h | 24 h | 48 h | 7 d |
|---|---|---|---|---|---|
| 1 | YK-407 | 4001500 | 2015870 | 885288 | 48410 |
| 2 | YK-401 | 1557640 | 806240 | 393020 | 10512 |
| 3 | YK-402 | 1470100 | 798408 | 345740 | 9940 |
| 4 | YK-403 | 1588400 | 855204 | 308540 | 9857 |
| 5 | YK-422 | 1329410 | 708120 | 271372 | 9476 |
| 6 | YK-423 | 1627420 | 756472 | 350120 | 10093 |
| 7 | YK-009 | 981240 | 705470 | 100560 | 9555 |
| 8 | SM-102 | 691480 | 123380 | 32871 | 6723 |
| 9 | ALC-0315 | 841020 | 189740 | 40125 | 7014 |
| 10 | Compound 21 | 600500 | 111040 | 31540 | 6378 |
| 11 | Compound 23 | 581400 | 100970 | 32917 | 6105 |
| 12 | HHMA | 661080 | 120010 | 33346 | 5958 | a. Expression Differences in Mice

Table 14 lists the mRNA expression intensities of LNP formulations containing Fluc-mRNA prepared from different cationic lipids at different times in mice. Among them, YK-009 is disclosed in CN114044741B (claim 1), SM-102 is compound 25 disclosed in WO2017049245A2 (page 29 of the specification), ALC-0315 is compound 3 disclosed in CN108368028B (page 24 of the specification), and compound 21 and compound 23 are disclosed in WO2021055833A1 (page 22 of the specification), and HHMA is compound 1 disclosed in CN112979483B (page 12 of the specification). These cationic lipids can be used to prepare carriers for delivering mRNA.

It can be seen from Table 14 that the LNP formulations containing Fluc-mRNA prepared from YK-407, YK-401, YK-402, YK-403, YK-422 and YK-423 had high and sustained expressions of mRNA in mice.

The average radiation intensity of YK-407 was 4001500 at 6 h, which was 5.79 times that of SM-102, 4.76 times that of ALC-0315, 6.66 times that of compound 21, 6.88 times that of compound 23, and 6.05 times that of HHMA. The average radiation intensity of YK-407 was 2015870 at 24 h, which was 16.34 times that of SM-102, 10.62 times that of ALC-0315, 18.15 times that of compound 21, 19.97 times that of compound 23, and 16.80 times that of HHMA. The average radiation intensity of YK-407 was 885288 at 48 h, which was 26.93 times that of SM-102, 22.06 times that of ALC-0315, 28.07 times that of compound 21, 26.89 times that of compound 23, and 26.55 times that of HHMA. The average radiation intensity of YK-407 was 48410 at 7d, which was 7.20 times that of SM-102, 6.90 times that of ALC-0315, 7.59 times that of compound 21, 7.93 times that of compound 23, and 8.13 times that of HHMA.

The average radiation intensity of YK-401 was 1557640 at 6 h, which was 2.25 times that of SM-102, 1.85 times that of ALC-0315, 2.59 times that of compound 21, 2.68 times that of compound 23, and 2.36 times that of HHMA. The average radiation intensity of YK-401 was 806240 at 24h, which was 6.53 times that of SM-102, 4.25 times that of ALC-0315, 7.26 times that of compound 21, 7.98 times that of compound 23, and 6.72 times that of HHMA. The average radiation intensity of YK-401 was 393020 at 48h, which was 11.96 times that of SM-102, 9.79 times that of ALC-0315, 12.46 times that of compound 21, 11.94 times that of compound 23, and 11.79 times that of HHMA. The average radiation intensity of YK-401 was 10512 at 7d, which was 1.56 times that of SM-102, 1.50 times that of ALC-0315, 1.65 times that of compound 21, 1.72 times that of compound 23, and 1.76 times that of HHMA.

The average radiation intensity of YK-402 was 1470100 at 6 h, which was 2.13 times that of SM-102, 1.75 times that of ALC-0315, 2.45 times that of compound 21, 2.53 times that of compound 23, and 2.22 times that of HHMA. The average radiation intensity of YK-402 was 798408 at 24h, which was 6.47 times that of SM-102, 4.21 times that of ALC-0315, 7.19 times that of compound 21, 7.91 times that of compound 23, and 6.65 times that of HHMA. The average radiation intensity of YK-402 was 345740 at 48h, which was 10.52 times that of SM-102, 8.62 times that of ALC-0315, 10.96 times that of compound 21, 10.50 times that of compound 23, and 10.37 times that of HHMA. The average radiation intensity of YK-402 was 9940 at 7d, which was 1.48 times that of SM-102, 1.42 times that of ALC-0315, 1.56 times that of compound 21, 1.63 times that of compound 23, and 1.67 times that of HHMA.

The average radiation intensity of YK-403 was 1588400 at 6 h, which was 2.30 times that of SM-102, 1.89 times that of ALC-0315, 2.65 times that of compound 21, 2.73 times that of compound 23, and 2.40 times that of HHMA. The average radiation intensity of YK-403 was 855204 at 24h, which was 6.93 times that of SM-102, 4.51 times that of ALC-0315, 7.70 times that of compound 21, 8.47 times that of compound 23, and 7.13 times that of HHMA. The average radiation intensity of YK-403 was 308540 at 48h, which was 9.39 times that of SM-102, 7.69 times that of ALC-0315, 9.78 times that of compound 21, 9.37 times that of compound 23, and 9.25 times that of HHMA. The average radiation intensity of YK-403 was 9857 at 7d, which was 1.47 times that of SM-102, 1.41 times that of ALC-0315, 1.55 times that of compound 21, 1.61 times that of compound 23, and 1.65 times that of HHMA.

The average radiation intensity of YK-422 was 1329410 at 6 h, which was 1.92 times that of SM-102, 1.58 times that of ALC-0315, 2.21 times that of compound 21, 2.29 times that of compound 23, and 2.01 times that of HHMA. The average radiation intensity of YK-422 was 708120 at 24h, which was 5.74 times that of SM-102, 3.73 times that of ALC-0315, 6.38 times that of compound 21, 7.01 times that of compound 23, and 5.90 times that of HHMA. The average radiation intensity of YK-422 was 271372 at 48h, which was 8.26 times that of SM-102, 6.76 times that of ALC-0315, 8.60 times that of compound 21, 8.24 times that of compound 23, and 8.14 times that of HIMA. The average radiation intensity of YK-422 was 9476 at 7d, which was 1.41 times that of SM-102, 1.35 times that of ALC-0315, 1.49 times that of compound 21, 1.55 times that of compound 23, and 1.59 times that of HIMA.

The average radiation intensity of YK-423 was 1627420 at 6 h, which was 2.35 times that of SM-102, 1.94 times that of ALC-0315, 2.71 times that of compound 21, 2.80 times that of compound 23, and 2.46 times that of HIMA. The average radiation intensity of YK-423 was 756472 at 24h, which was 6.13 times that of SM-102, 3.99 times that of ALC-0315, 6.81 times that of compound 21, 7.49 times that of compound 23, and 6.30 times that of HIMA. The average radiation intensity of YK-423 was 350120 at 48h, which was 10.65 times that of SM-102, 8.73 times that of ALC-0315, 11.10 times that of compound 21, 10.64 times that of compound 23, and 10.50 times that of HIMA. The average radiation intensity of YK-423 was 10093 at 7d, which was 1.50 times that of SM-102, 1.44 times that of ALC-0315, 1.58 times that of compound 21, 1.65 times that of compound 23, and 1.69 times that of HIMA.

The data were analyzed using GraphPad Prism software. Any one of YK-407, YK-401, YK-402, YK-403, YK-422 and YK-423 was significantly different from SM-102, ALC- 0315, compound 21, compound 23 and HIMA at each time. The expression amount and duration were significantly improved.

b. Differences in Chemical Structure

YK-407, YK-401, YK-402, YK-403, YK-422 and YK-423 are significantly different in chemical structure from the representative cationic lipids in the prior art. Among them, the biggest difference is with HIMA. It can be seen from the chemical structure that only one side chain of the group connected to the central N atom in HIMA is similar to one side chain of this series of compounds, and the other parts are significantly different. Compared with SM-102, ALC-0315, compound 21, compound 23 and YK-009, this series of compounds has significantly different head structures. The head structures of this series of compounds comprise two tertiary amine groups, an L group connected to nitrogen atoms of the two tertiary amines, and the $G_3$ and $G_4$ groups both containing hydroxyl, while the head groups of SM-102, ALC-0315, compound 21 compound 23 and YK-009 only comprise one tertiary amine group and $HO(CH_2)_2$— connected to the nitrogen atom of the tertiary amine. Moreover, the $G_1$, $L_1$, $R_1$, $G_2$, $L_2$ and $R_2$ groups of this series of compounds are also significantly different from those of SM-102, ALC-0315, compound 21, compound 23 and YK-009.

Brief Summary

Among this series of designed compounds, LNP formulations prepared from YK-407, YK-401, YK-402, YK-403, YK-422 and YK-423 had the highest and sustained expressions of mRNA in mice, which were significantly improved compared with those of the representative cationic lipids in the prior art at 6 h, 24h, 48h and 7d. For example, an mRNA expression in mice of YK-407 could reach 27 times that of SM-102, 22 times that of ALC-0315, 28 times that of compound 21, 27 times that of compound 23, and 27 times that of HHMA. The mRNA expression in mice was consistent with the results of the cell transfection tests in Example 7.

Moreover, YK-407, YK-401, YK402, YK-403, YK-422 and YK-423 have significant differences in chemical structure compared with the representative cationic lipids in the prior art, wherein the head groups including $G_3$, $G_4$ and L groups are significantly different, and $G_1$, $L_1$, $R_1$, $G_2$, $L_2$ and $R_2$ groups are also significantly different.

Therefore, it is not only LNP formulations prepared from compounds with similar structures to the cationic lipids in the prior art that have high expression in mice. On the contrary, LNP formulations prepared from compounds with significantly different structures are also highly likely to have high and sustained expression of mRNA.

(1) Compared with structurally similar compounds with $G_3$ and $G_4$ groups being $HO(CH_2)_2$— and the L group being —$(CH_2)_2$—, YK-407, YK-401, YK-402, YK-403, YK-422 and YK-423 had the highest amount and the longest duration of mRNA expression in mice. The expression amount of YK-407 could reach 1000 times that of other compounds such as YK-411. The mRNA expression in mice was consistent with the cell transfection activity.

In order to compare the differences in expression intensity and duration of delivered mRNA in mice using delivery carriers prepared from compounds with similar structures, the designed compounds with $G_3$ and $G_4$ groups being $HO(CH_2)_2$—, the L group being —$(CH_2)_2$— and other groups being slightly different were compared with YK-407, YK-401, YK-402, YK-403, YK-422 and YK-423 in terms of cell survival rate. The results showed that the differences in cytotoxicities of this series of compounds were very significant. LNP preparations prepared from different compounds had very different expression levels in mice. Among them, YK-407, YK-401, YK-402, YK-403, YK-422 and YK-423 had the highest amount and the longest duration of mRNA expressions in mice. The expression amount of YK-407 could reach 1000 times that of YK-411.

TABLE 15

Test data 2 of the in vivo imaging in mice

| Serial No. | Cationic lipid | 6 h | 24 h | 48 h | 7 d |
|---|---|---|---|---|---|
| 1 | YK-407 | 4001500 | 2015870 | 885288 | 48410 |
| 2 | YK-401 | 1557640 | 806240 | 393020 | 10512 |
| 3 | YK-402 | 1470100 | 798408 | 345740 | 9940 |
| 4 | YK-403 | 1588400 | 855204 | 308540 | 9857 |
| 5 | YK-422 | 1329410 | 708120 | 271372 | 9476 |
| 6 | YK-423 | 1627420 | 756472 | 350120 | 10093 |
| 7 | YK-411 | 5850 | 2022 | 975 | 480 |
| 8 | YK-009 | 981240 | 705470 | 100560 | 9555 |
| 9 | SM-102 | 691480 | 123380 | 32871 | 6723 |
| 10 | ALC-0315 | 841020 | 189740 | 40125 | 7014 |
| 11 | Compound 21 | 600500 | 111040 | 31540 | 6378 |
| 12 | Compound 23 | 581400 | 100970 | 32917 | 6105 |
| 13 | HHMA | 661080 | 120010 | 33346 | 5958 | a. Expression Differences in Mice

It can be seen from Table 1S that compared with structurally similar compounds in which $G_3$ and $G_4$ are $HO(CH_2)_2$— and L is —$(CH_2)_2$—, LNP formulations prepared from YK-407, YK-401, and YK-402, YK-403, YK-422 and YK-423 had the highest amount and the longest duration of mRNA expressions in mice.

The mRNA expression in mice of YK-407 could reach 684.02 times at 6 h, 996.97 times at 24 h, 907.99 times at 48h, and 100.85 times at 7d that of YK-411.

The mRNA expression in mice of YK-401 could reach 266.26 times at 6 h, 398.73 times at 24 h, 403.10 times at 48h, and 21.90 times at 7d that of YK-411.

The mRNA expression in mice of YK-402 could reach 251.30 times at 6 h, 394.86 times at 24 h, 354.61 times at 48h, and 20.71 times at 7d that of YK-411.

The mRNA expression in mice of YK-403 could reach 271.52 times at 6 h, 422.95 times at 24 h, 316.45 times at 48h, and 20.54 times at 7d that of YK-411.

The mRNA expression in mice of YK-422 could reach 227.25 times at 6 h, 350.21 times at 24 h, 278.33 times at 48h, and 19.74 times at 7d that of YK-411.

The mRNA expression in mice of YK-423 could reach 278.19 times at 6 h, 374.12 times at 24 h, 359.10 times at 48h, and 21.03 times at 7d that of YK-411.

The data were analyzed using GraphPad Prism software. Any one of YK-407, YK-401, YK-402, YK-403, YK-422 and YK-423 had significant differences from other compounds at each time. The expression amount and duration were significantly improved.

b. Differences in Chemical Structure

This series of compounds with $G_3$ and $G_4$ groups being $HO(CH_2)_2$—, the L group being —$(CH_2)_2$— and other groups being slightly different are very similar in structure to YK-407, YK-401, YK-402, YK-403, YK-422 and YK-423.

Brief Summary

Compared with compounds with $G_3$ and $G_4$ being $HO(CH_2)_2$—, the L group being —$(CH_2)_2$— and other groups being slightly different, LNP formulations prepared from YK-407, YK-401, YK-402, YK-403, YK-422 and YK-423 had the highest intensity and longest duration of mRNA expressions in mice. For example, the mRNA expression in mice of YK-407 could reach more than 600 times at 6 hours, 1000 times at 24 hours, and still 100 times at 7 days that of YK-411. The mRNA expression in mice was consistent with the results of the cell transfection tests in Example 7.

It was also found that there is no correspondence between the mRNA expressions in mice and the structure of cationic lipids. LNP formulations, even if prepared from a group of compounds with very similar structures (that is, only the $G_3$, $G_4$ and L groups differ by 1-2 C, and the other groups are slightly different) are very likely to have very different level and duration of mRNA expressions in mice.

Therefore, it is very difficult and requires a lot of creative work to screen out cationic lipid compounds with high and sustained expressions in animals from a series of compounds having very similar structures.

(2) Compared with structurally similar compounds with $G_3$ and $G_4$ being $HO(CH_2)_2$— or $HO(CH_2)_3$—, and the L group being —$(CH_2)_2$—, —$(CH_2)_3$— or —$(CH_2)_4$—, YK-407, YK-401, YK-402, YK-403, YK-422 and YK-423 had the highest amount and longest duration of mRNA expressions in mice. For example, the mRNA expression amount of YK-407 could reach 120 times that of YK-417. The mRNA expression in mice was consistent with the cell transfection activity.

LNP formulations containing mRNA prepared from YK-407, YK-401, YK-402, YK-403, YK-422 and YK-423 were further compared with structurally similar compounds with $G_3$ and $G_4$ being $HO(CH_2)_2$— or $HO(CH_2)_3$—, the L group being —$(CH_2)_2$—, —$(CH_2)_3$— or —$(CH_2)_4$—, in terms of expression in mice. This series of compounds only have minor differences in some groups. For example, the $G_3$, $G_4$ or L group differs by 1-2 C, and other structures are slightly different. The results showed that YK-407, YK-401, YK-402, YK-403, YK-422 and YK-423 had the highest amount and the longest duration, which is significantly higher than other compounds. For example, the expression amount of YK-407 could reach 120 times that of YK-417.

TABLE 16

Test data 3 of the in vivo imaging in mice

| Serial No. | Cationic lipid | 6 h | 24 h | 48 h | 7 d |
|---|---|---|---|---|---|
| 1 | YK-407 | 4001500 | 2015870 | 885288 | 48410 |
| 2 | YK-401 | 1557640 | 806240 | 393020 | 10512 |
| 3 | YK-402 | 1470100 | 798408 | 345740 | 9940 |
| 4 | YK-403 | 1588400 | 855204 | 308540 | 9857 |
| 5 | YK-422 | 1329410 | 708120 | 271372 | 9476 |
| 6 | YK-423 | 1627420 | 756472 | 350120 | 10093 |
| 7 | YK-415 | 117840 | 64501 | 15790 | 4041 |
| 8 | YK-417 | 60480 | 19987 | 7045 | 2284 |
| 9 | YK-009 | 981240 | 705470 | 100560 | 9555 |
| 10 | SM-102 | 691480 | 123380 | 32871 | 6723 |
| 11 | ALC-0315 | 841020 | 189740 | 40125 | 7014 |
| 12 | Compound 21 | 600500 | 111040 | 31540 | 6378 |
| 13 | Compound 23 | 581400 | 100970 | 32917 | 6105 |
| 14 | HHMA | 661080 | 120010 | 33346 | 5958 | a. Expression Differences in Mice

As can be seen from Table 19, among this series of compounds, LNP formulations prepared from YK-407, YK-401, YK-402, YK-403, YK-422 and YK-423 had the highest amount and the longest duration of mRNA expressions in mice.

The expression amount of YK-407 could reach 33.96 times that of YK-415 and 66.16 times that of YK-417 at 6 h, 31.25 times that of YK-415 and 100.86 times that of YK-417 at 24 h, 56.07 times that of YK-415 and 125.66 times that of YK-417 at 48h, and 11.98 times that of YK-415 and 21.20 times that of YK-417 at 7d.

The expression amount of YK-401 could reach 13.22 times that of YK-415 and 25.75 times that of YK-417 at 6 h, 12.50 times that of YK-415 and 40.34 times that of YK-417 at 24 h, 24.89 times that of YK-415 and 55.79 times that of YK-417 at 48h, and 2.60 times that of YK-415 and 4.60 times that of YK-417 at 7d.

The expression amount of YK-402 could reach 12.48 times that of YK-415 and 24.31 times that of YK-417 at 6 h, 12.38 times that of YK-415 and 39.95 times that of YK-417 at 24 h, 21.90 times that of YK-415 and 49.08 times that of YK-417 at 48h, and 2.46 times that of YK-415 and 4.35 times that of YK-417 at 7d.

The expression amount of YK-403 could reach 13.48 times that of YK-415 and 26.26 times that of YK-417 at 6 h, 13.26 times that of YK-415 and 42.79 times that of YK-417 at 24 h, 19.54 times that of YK-415 and 43.80 times that of YK-417 at 48h, and 2.44 times that of YK-415 and 4.32 times that of YK-417 at 7d.

The expression amount of YK-422 could reach 11.28 times that of YK-415 and 21.98 times that of YK-417 at 6 h, 10.98 times that of YK-415 and 35.43 times that of YK-417 at 24 h, 17.19 times that of YK-415 and 38.52 times that of YK-417 at 48h, and 2.34 times that of YK-415 and 4.15 times that of YK-417 at 7d.

The expression amount of YK-423 could reach 13.81 times that of YK-415 and 26.91 times that of YK-417 at 6 h, 11.73 times that of YK-415 and 37.85 times that of YK-417 at 24 h, 22.17 times that of YK-415 and 49.70 times that of YK-417 at 48h, and 2.50 times that of YK-415 and 4.42 times that of YK-417 at 7d.

The data were analyzed using GraphPad Prism software. Any one of YK-407, YK-401, YK-402, YK-403, YK-422 and YK-423 had significant differences from other compounds at each time. The expression amount and duration were significantly improved.

b. Differences in Chemical Structure

This series of compounds only have minor differences in some groups. For example, the $G_3$, $G_4$ or L group differs by 1-2 C, and other structures are slightly different, but the mRNA expression level of YK-407 could reach 120 times that of YK-417.

Brief Summary

Compared with structurally similar compounds with $G_3$ and $G_4$ being $HO(CH_2)_2$— or $HO(CH_2)_3$—, the L group being —$(CH_2)_2$—, —$(CH_2)_3$— or —$(CH_2)_4$—, LNP formulations prepared from YK-407, YK-401, YK-402, YK-403, YK-422 and YK-423 had the highest intensity and longest duration of mRNA expressions in mice. For example, the mRNA expression in mice of YK-407 could reach 120 times at 48 hours, and still 20 times at 7 days that of YK-417. The mRNA expression in mice was consistent with the cell transfection tests in Example 7.

It was also found that there is no correspondence between the mRNA expressions in mice and the structure of cationic lipids. LNP formulations even if prepared from compounds in which there are only minor differences in some groups(for example, G₃, G₄ or L groups differs by 1-2 C, and other structures are slightly different), are very likely to have very different levels and durations of mRNA expression in mice.

Therefore, it is very difficult and requires a lot of creative work to screen out cationic lipid compounds with high and sustained expression in animals from a series of compounds that only have minor differences in some groups.

Distribution of Liposomes in Mice

The in vivo imaging in mice results showed that the distributions in mice of liposomes prepared from different compounds were quite different. Some had protein expression in the liver, while some had no protein expression in the liver but had protein expression in the spleen.

Figure 14:
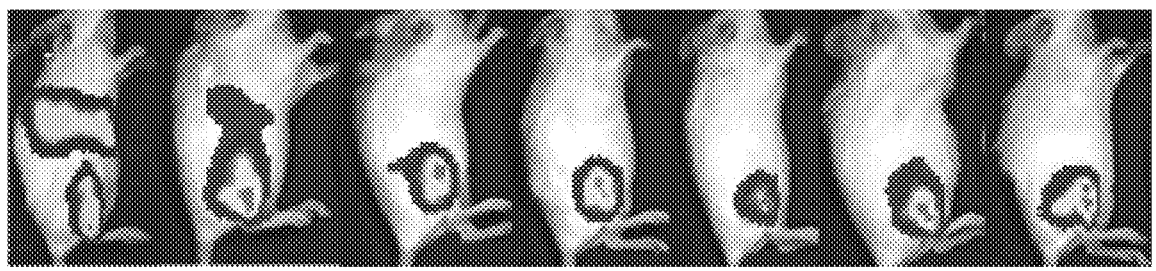
FIG. 14 shows in vivo protein expression of LNP formulations of Fluc-mRNA prepared from different cationic lipids (SM-102, YK-402, YK-407, YK-411, YK-418, YK-419 and YK-424) in mice.
Figure 15:
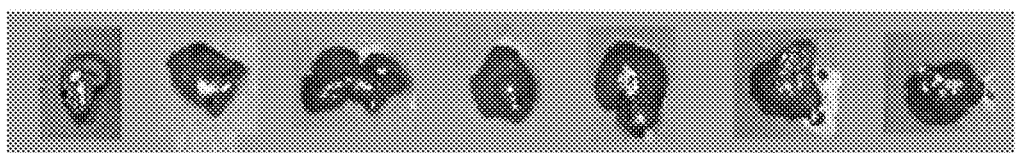
FIG. 15 shows expression of LNP formulations of Fluc-mRNA prepared from different cationic lipids (SM-102, YK-402, YK-407, YK-411, YK-418, YK-419 and YK-424) in the liver, spleen, lung, heart and kidney of mice.
Figure 15:
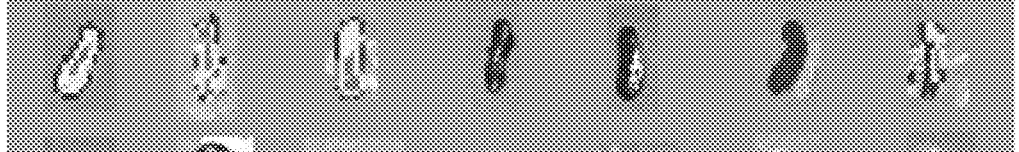
Figure 15:
Figure 15:
Figure 15:

The details are as follows: at 6h, some cationic lipids, such as SM-102, ALC-0315, compound 21, compound 23, HHMA and YK-402, had protein expression in the liver, wherein the expression amount of YK-402 was reduced compared with SM-102; while some compounds, such as YK-407, YK-411, YK-418, YK-419 and YK-424, had no protein expression in the liver (FIG. 14). SM-102, YK-402, YK-407, YK-419 and YK-424 had protein expression in the spleen, wherein, YK-407, YK-419 and YK-424 had expression only in the spleen, which can deliver mRNA directly to spleen, but had no expression in other organs such as liver, lung, heart and kidney (FIG. 15). YK-411 and YK-418 had no protein expression in liver, spleen, lung, heart and kidney, indicating that these two compounds had expression in muscle. Current mRNA vaccines usually express proteins in muscle. The results for ALC-0315, compound 21, compound 23 and HHMA were similar to SM-102 and are not shown in the figures.

It can be seen that compared with the cationic lipids in the prior art, liposomes prepared by some compounds designed by the present application, such as YK-407, YK-411, YK-418, YK-419 and YK-424, after being injected in muscle, would not stay in the liver and express the target protein. If the mRNA carried in the liposome is expressed in the liver, the expressed protein will be metabolized by the liver, which will increase the burden on the liver. Therefore, some compounds designed in this application will reduce toxicity to the liver or have no hepatotoxicity compared with the representative cationic lipids in the prior art.

In addition, liposomes prepared from some compounds designed in this application, such as YK-407, YK-419 and YK-424, are able to deliver mRNA directly to the spleen, without expression in other organs such as liver, lung, heart and kidney. The spleen is the largest secondary lymphoid organ in the body, so it can quickly induce immune responses and produce antibodies. It can significantly improve the prophylactic effect without changing the vaccine components and has important clinical significance. It has good targeted effects in developing treatments for diseases caused by damage or abnormality of the spleen, such as lymphoma and leukemia.

Brief Summary

Compared with the representative cationic lipids in the prior art, such as SM-102, ALC-0315, compound 21, compound 23 and HIMA, the liposomes prepared by the compounds designed in this application reduce the amount of target protein expressed in the liver (YK-402), or will not stay and express the target protein in the liver (YK-407, YK-411, YK-418, YK-419 and YK-424), and thus have reduced or no toxicity to the liver. Moreover, liposomes prepared by some compounds designed in this application, such as YK-407, YK-419 and YK-424, can deliver mRNA directly to the spleen, without expression in other organs, such as liver, lung, heart and kidney, which significantly improve the prophylactic effect without changing the vaccine components and have important clinical significance.

Summary

1) In vivo animal delivery tests on LNP formulations prepared from a series of designed compounds were conducted, and cationic lipid compounds with high and sustained expression of mRNA in mice, such as YK-407, YK-401, YK-402, YK-403, YK-422 and YK-423, were screened out.

This series of designed compounds are significantly different in chemical structure from the representative cationic lipids in the prior art, such as SM-102, ALC-0315, compound 21, compound 23, HHMA and YK-009. Their head structures including G₃, G₄ and L groups are significantly different, and other parts are also different, so there are also great differences in polarity, acidity and alkalinity, and hydrophilicity.

2) LNP formulations prepared from YK-407, YK-401, YK-402, YK-403, YK-422 and YK-423 had high and sustained expressions of mRNA in mice, which were significantly improved compared with the representative cationic lipids in the prior art. For example, an mRNA expression in mice of YK-407 could reach 27 times that of SM-102, 22 times that of ALC-0315, 28 times that of compound 21, 27 times that of compound 23, and 27 times that of HHMA.

Compared with structurally similar compounds with G₃ and G₄ being HO(CH₂)₂— and the L group being —(CH₂)₂—, LNP formulations prepared from YK-407, YK-401, YK-402, YK-403, YK-422 and YK-423 had the highest intensity and longest duration of mRNA expressions in mice. For example, an mRNA expression in mice of YK-407 could reach more than 600 times at 6 hours, 1000 times at 24 hours, and still 100 times at 7 days that of YK-411.

Compared with structurally similar compounds with G₃ and G₄ being HO(CH₂)₂— or HO(CH₂)₃—, the L group being —(CH₂)₂—, —(CH₂)₃— or —(CH₂)₄—, LNP formulations prepared from YK-407, YK-401, YK-402, YK-403, YK-422 and YK-423 had the highest intensity and longest duration of mRNA expressions in mice. For example, an mRNA expression in mice of YK-407 could reach 120 times at 48 hours, and still 20 times at 7 days that of YK-417.

Compared with the representative cationic lipids in the prior art, such as SM-102, ALC-0315, compound 21, compound 23 and HHMA, the liposomes prepared by the compounds designed in this application reduce the amount of target protein expressed in the liver (YK-402), or will not stay and express the target protein in the liver (YK-407, YK-411, YK-418, YK-419 and YK-424). Therefore, compared with cationic lipids in the prior art, LNP formulations prepared from the compounds designed in this application have reduced or no toxicity to the liver. Moreover, some compounds designed in this application, such as YK-407, YK-419 and YK-424 are able to deliver mRNA directly to the spleen without expression in other organs such as liver, lung, heart and kidney, which significantly improve the prophylactic effect without changing the vaccine components and have important clinical significance.

3) There is no corresponding relationship between the structure of the cationic lipid and the high and sustained expression of delivered mRNA in mice. Regardless of the cationic lipid compounds with small or large structural differences, LNP formulations prepared therefrom are likely to have very large differences in terms of mRNA expression in animals. It is impossible to predict whether mRNA will be highly and continuously expressed in animals based on the chemical structure of cationic lipids. Therefore, it is very difficult and requires a lot of creative work to screen out cationic lipid compounds with high and sustained expression of mRNA.

Conclusions

1. This series of designed compounds, including YK-407, YK-401, YK-402, YK-403, YK-422 and YK-423 are significantly different in chemical structure from the representative cationic lipids in the prior art, such as SM-102, ALC-0315, compound 21, compound 23, HHMA and YK-009. Their head structures including $G_3$, $G_4$ and L groups are significantly different, and other parts are also different, so there are also great differences in polarity, acidity and alkalinity, and hydrophilicity.

Among a series of designed compounds in the present application, LNP formulations prepared from YK-407, YK-401, YK-402, YK-403, YK-422 and YK-423 have significantly improved encapsulation efficiency, drug loading concentration, and total RNA concentration, significantly improved cell transfection efficiency, significantly reduced cytotoxicity, significantly improved mRNA expression amount and duration in mice, as compared with representative cationic lipids in the prior art. For example, YK-407 can have an encapsulation efficiency 29.0% higher than compound 23, a drug loading concentration 1.78 times that of compound 23, and a total RNA concentration 1.41 times that of compound 21. The cell transfection efficiency of YK-407 can reach 12 times that of SM-102, 13 times that of compound 21 and 15 times that of compound 23. The cell survival rate of YK-401 can be 28.00% higher than that of ALC-0315, 7.31% higher than that of SM-102, and 10.94% higher than that of HHMA. LNP formulation prepared by YK-407 can have an mRNA expression amount in mice that is 27 times that of SM-102, 22 times that of ALC-0315, 28 times that of compound 21, 27 times that of compound 23, and 27 times that of HHMA.

Moreover, LNP formulations prepared from compounds designed in this application have a reduced amount of the target protein expression in the liver (YK-402), or do not stay and express the target protein in the liver (YK-407, YK-411, YK-418, YK-419 and YK-424), which have reduced or no toxicity to the liver, as compared with representative cationic lipids in the prior art. YK-407, YK-419 and YK-424 are able to deliver mRNA directly to the spleen without expression in other organs such as liver, lung, heart and kidney, which significantly improve the prophylactic effect without changing the vaccine components.

Among designed compounds, LNP formulations prepared from YK-407, YK-401, YK-402, YK-403, YK-422 and YK-423 have a significantly improved cell transfection efficiency, significantly reduced cytotoxicity, and significantly increased expression amount and duration of mRNA in mice compared with other compounds.

Compared with YK-407, YK-401, YK-402, YK-403, YK-422 and YK-423, other compounds have similar structures and only differ in some groups (for example, $G_3$, $G_4$ or L groups differ by 1-2 C, and other structures are slightly different), but their activities are very different. For example, the cell transfection efficiency of YK-407 can reach 2500 times that of YK-404 and YK-411, and the cytotoxicity of YK-407, YK-401, YK-402, YK-403, YK-422 and YK-423 can be reduced by 50% compared with YK-411. The LNP formulation prepared from YK-407 had an expression level of mRNA in mice 1000 times that of YK-411.

2. There is no obvious correspondence between the structure of cationic lipid compounds and intracellular transfection efficiency, toxicity to cells, and the high and sustained mRNA expression in animals for LNP formulations prepared therefrom. Compounds with small structural differences are likely to have very large differences in transfection efficiency and/or toxicity to cells and intracellular expression.

For example, YK-411 is very similar in structure to YK-407. YK-411 only has 2 more C in the $G_1$ group; 1 less C in the $R_1$ group; 2 more C in the single chain of the $R_2$ group, and 2 less C in each single chain of the double chain in the $R_2$ group. However, the cell transfection efficiency of YK-407 is 2500 times that of YK-411. The toxicity of YK-407 to transfected cells is 55% lower than that of YK-411. The mRNA expression in mice of YK-407 can reach 1000 times that of YK-411.

Therefore, it is very difficult and require a lot of creative work to screen out suitable cationic lipid compounds that can simultaneously have high transfection efficiency and low toxicity to cells, as well as high and sustained expression of mRNA in mice.

3. Through unique design and extensive screening, the present disclosure has found that some compounds, such as YK-407, YK-401, YK-402, YK-403, YK-422 and YK-423 can deliver nucleic acids with significantly improved encapsulation efficiency, drug loading concentration and total RNA concentration, significantly improved cell transfection efficiency, significantly reduced cytotoxicity, and significantly improved expression amount and duration in animals, as compared with other compounds in the prior art, thus achieving unexpected technical effects.

The invention claimed is:
1. A compound or a pharmaceutically acceptable salt thereof, wherein the compound is selected from the group consisting of:

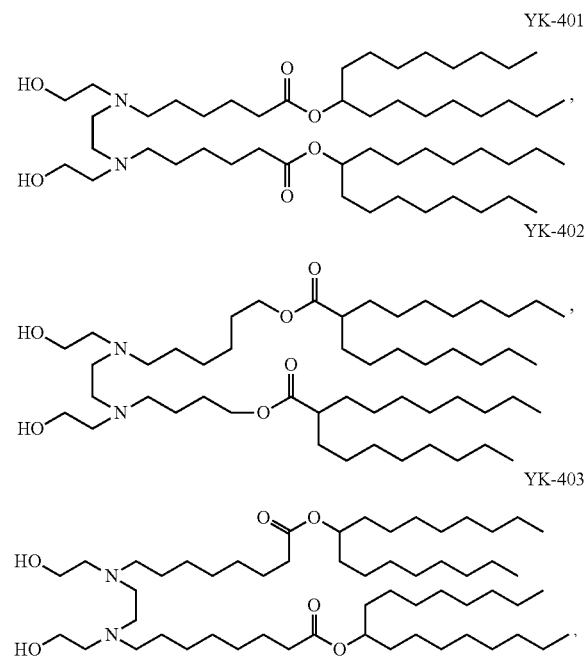

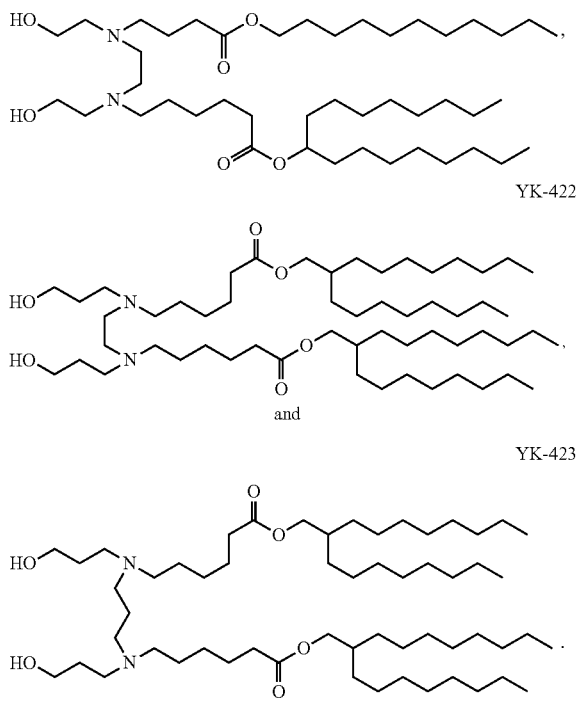

2. A composition comprising a carrier, wherein the carrier comprises a cationic lipid, and the cationic lipid contains the compound or a pharmaceutically acceptable salt thereof according to claim 1.

3. The composition according to claim 2, wherein the carrier further comprises a neutral lipid.

4. The composition according to claim 2, wherein the neutral lipid is selected from the group consisting of phosphatidylcholine, phosphatidylethanolamine, sphingomyelin, ceramide, sterol and a derivative thereof.

5. The composition according to claim 2, wherein the carrier further comprises a structured lipid.

6. The composition according to claim 5, wherein the structured lipid is selected from the group consisting of cholesterol, nonsterol, sitosterol, ergosterol, campesterol, stigmasterol, brassicasterol, tomatine, ursolic acid, alpha-tocopherol, and corticosteroid.

7. The composition according to claim 2, wherein the carrier further comprises a polymer-conjugated lipid.

8. The composition according to claim 7, wherein the polymer-conjugated lipid is selected from the group consisting of PEG-modified phosphatidylethanolamine, PEG-modified phosphatidic acid, PEG-modified ceramide, PEG-modified dialkylamine, PEG-modified diacylglycerol, and PEG-modified dialkylglycerol.

9. The composition according to claim 2, wherein the carrier comprises a neutral lipid, a structured lipid and a polymer-conjugated lipid, and the molar ratio of the cationic lipid, the neutral lipid, the structured lipid and the polymer-conjugated lipid is (25~75): (5~25): (15~65): (0.5~10).

10. The composition according to claim 2, wherein the composition is a nanoparticle formulation which has an average particle size of 10 nm to 300 nm and a polydispersity coefficient less than or equal to 50%.

11. The composition according to claim 2, wherein the cationic lipid further comprises one or more other ionizable lipid compound(s).

12. The composition according to claim 2, further comprising a therapeutic or prophylactic agent.

13. The composition according to claim 12, wherein the therapeutic or prophylactic agent is selected from the group consisting of a nucleic acid molecule, a small molecule compound, a polypeptide and a protein.

14. The composition according to claim 13, wherein the therapeutic or prophylactic agent is a nucleic acid.

15. The composition according to claim 2, wherein the composition further comprises one or more of pharmaceutically acceptable excipients or diluents.

16. The composition according to claim 2, wherein a molar ratio of the cationic lipid to the carrier is from 25% to 75%.

17. The composition according to claim 3, wherein the molar ratio of the cationic lipid to the neutral lipid is from 1:1 to 15:1.

18. The composition according to claim 4, the neutral lipid is from the group consisting of 1,2-dilinoleoyl-sn-glycero-3-phosphocholine (DLPC), 1,2-dimyristoyl-sn-glycero-phosphocholine (DMPC), 1,2-dioleoyl-sn-glycero-3-phosphocholine (DOPC), 1,2-dipalmitoyl-sn-glycero-3-phosphocholine (DPPC), 1,2-distearoyl-sn-glycero-3-phosphocholine (DSPC), 1,2-diundecanoyl-sn-glycero-phosphocholine (DUPC), 1-palmitoyl-2-oleoyl-sn-glycero-3-phosphocholine (POPC), 1,2-di-O-octadecenyl-sn-glycero-3-phosphocholine (18:0 Diether PC), 1-oleoyl-2-cholesterylhemisuccinoyl-sn-glycero-3-phosphocholine (OChemsPC), 1-hexadecyl-sn-glycero-3-phosphocholine (C16 Lyso PC), 1,2-dilinolenoyl-sn-glycero-3-phosphocholine, 1,2-diarachidonoyl-sn-glycero-3-phosphocholine, 1,2-didocosahexaenoyl-sn-glycero-3-phosphocholine, 1,2-dioleoyl-sn-glycero-3-phosphoethanolamine (DOPE), 1,2-diphytanoyl-sn-glycero-3-phosphoethanolamine (ME 16.0 PE), 1,2-distearoyl-sn-glycero-3-phosphoethanolamine, 1,2-dilinoleoyl-sn-glycero-3-phosphoethanolamine, 1,2-dilinolenoyl-sn-glycero-3-phosphoethanolamine, 1,2-diarachidonoyl-sn-glycero-3-phosphoethanolamine, 1,2-didocosahexaenoyl-sn-glycero-3-phosphoethanolamine, 1,2-dioleoyl-sn-glycero-3-phospho-rac-(1-glycerol) sodium salt (DOPG), dipalmitoyl phosphatidylglycerol (DPPG), palmitoyl oleoyl phosphatidylethanolamine (POPE), distearoyl-phosphatidyl-ethanolamine (DSPE), dipalmitoyl phosphatidylethanolamine (DPPE), dimyristoyl phosphoethanolamine (DMPE), 1-stearyl-2-oleoyl-stearoylethanolamine (SOPE), 1-stearoyl-2-oleoyl-phosphatidylcholine (SOPC), sphingomyelin, phosphatidylcholine, phosphatidylethanolamine, phosphatidylserine, phosphatidylinositol, phosphatidic acid, palmitoyl oleoyl phosphatidylcholine, lysophosphatidylcholine and lysophosphatidylethanolamine (LPE).

19. The composition according to claim 5, the molar ratio of the cationic lipid to the structured lipid is from 0.6:1 to 3:1.

20. The composition according to claim 7, the molar ratio of the polymer-conjugated lipid to the carrier is from 0.5% to 10%.

21. The composition according to claim 8, the polymer-conjugated lipid is selected from the group consisting of distearoyl phosphatidylethanolamine polyethylene glycol 2000 (DSPE-PEG2000), dimyristoylglycero-3-methoxy polyethylene glycol 2000 (DMG-PEG2000) and methoxy-polyethylene glycol ditetradecylacetamide (ALC-0159).

22. The composition according to claim 10, wherein the nanoparticle formulation has an average particle size of 90 nm to 280 nm and a polydispersity coefficient less than or equal to 40%.

23. The composition according to claim 12, wherein the mass ratio of the carrier to the therapeutic agent or prophylactic agent is from 10:1 to 30:1.

24. The composition according to claim 14, the therapeutic or prophylactic agent is ribonucleic acid (RNA) or deoxyribonucleic acid (DNA), the RNA is selected from the group consisting of small interfering RNA (siRNA), asymmetric interfering RNA (aiRNA), microRNA (miRNA), Dicer-substrate RNA (dsRNA), small hairpin RNA (shRNA), messenger RNA (mRNA), and mixtures thereof.

* * * * *